United States Patent
Movia et al.

(10) Patent No.: US 10,118,120 B2
(45) Date of Patent: Nov. 6, 2018

(54) FILTER CARTRIDGE ARRANGEMENTS AND ASSEMBLIES; PREFERRED FEATURES; METHODS OF ASSEMBLY AND USE

(71) Applicants: Massimo Movia, Enemonzo (IT); Julien Dils, Linter (BE); Paul Gossez, Hevillers (BE)

(72) Inventors: Massimo Movia, Enemonzo (IT); Julien Dils, Linter (BE); Paul Gossez, Hevillers (BE)

(73) Assignee: Donaldson Company, Inc., Minneapolis, MN (US)

( * ) Notice: Subject to any disclaimer, the term of this patent is extended or adjusted under 35 U.S.C. 154(b) by 253 days.

(21) Appl. No.: 14/892,846

(22) PCT Filed: May 30, 2014

(86) PCT No.: PCT/US2014/040361
§ 371 (c)(1),
(2) Date: Nov. 20, 2015

(87) PCT Pub. No.: WO2014/194275
PCT Pub. Date: Dec. 4, 2014

(65) Prior Publication Data
US 2016/0144310 A1    May 26, 2016

Related U.S. Application Data

(63) Continuation of application No. 14/266,560, filed on Apr. 30, 2014, now Pat. No. 9,387,425.
(Continued)

(51) Int. Cl.
*B01D 46/24* (2006.01)
*B01D 46/00* (2006.01)
*B01D 46/52* (2006.01)

(52) U.S. Cl.
CPC ..... *B01D 46/2414* (2013.01); *B01D 46/0005* (2013.01); *B01D 46/2411* (2013.01);
(Continued)

(58) Field of Classification Search
CPC ............ B01D 46/2411; B01D 46/2414; B01D 46/521; B01D 2271/027; B01D 2275/201; B01D 2275/206
See application file for complete search history.

(56) References Cited

U.S. PATENT DOCUMENTS 4,365,980 A * 12/1982 Culbert .............. B01D 46/0004
55/315
4,390,354 A * 6/1983 Witchell .............. B01D 46/002
55/337
(Continued)

FOREIGN PATENT DOCUMENTS

WO    2008/157251    12/2008
WO    2009/014986    1/2009

OTHER PUBLICATIONS

Declaration of Steven A. Carter with Exhibit A dated Jan. 20, 2017.
(Continued)

*Primary Examiner* — Robert Clemente
(74) *Attorney, Agent, or Firm* — Merchant & Gould P.C.

(57) ABSTRACT

The present disclosure relates to filter assemblies. The features described and characterized are typically applied in gas (for example, air) cleaner assemblies. A typical use is in air cleaner assemblies for vehicles or other equipment. The techniques described relate, at least in part, to provision of assemblies with preferred configurations for convenient servicing and operation, while ensuring a proper cartridge is appropriately positioned, oriented and secured for use. Many
(Continued)

of the techniques relate to arrangements in which features at opposite ends of a housing and/or cartridge are eccentrically positioned as described.

20 Claims, 113 Drawing Sheets

Related U.S. Application Data

(60) Provisional application No. 61/829,666, filed on May 31, 2013, provisional application No. 61/832,269, filed on Jun. 7, 2013, provisional application No. 61/974,273, filed on Apr. 2, 2014.

(52) U.S. Cl.
CPC ...... *B01D 46/521* (2013.01); *B01D 2265/021* (2013.01); *B01D 2265/06* (2013.01); *B01D 2271/027* (2013.01); *B01D 2275/206* (2013.01)

(56) References Cited

U.S. PATENT DOCUMENTS

| | | | |
|---|---|---|---|
| 4,498,915 A * | 2/1985 | Witchell | B01D 46/12 55/498 |
| 6,652,614 B2 | 11/2003 | Gieseke et al. | |
| 7,520,913 B2 | 4/2009 | Mills et al. | |
| 8,038,756 B2 | 10/2011 | Iddings et al. | |
| 8,066,791 B2 | 11/2011 | Baseotto et al. | |
| 8,128,724 B2 | 3/2012 | Mills et al. | |
| 8,163,056 B2 | 4/2012 | Coulonvaux et al. | |
| 8,273,143 B2 | 9/2012 | Coulonvaux et al. | |
| 8,292,984 B2 | 10/2012 | Baseotto et al. | |
| 8,361,181 B2 | 1/2013 | Osendorf et al. | |
| 8,404,029 B2 | 3/2013 | Lundgren et al. | |
| 8,480,778 B2 | 7/2013 | Baseotto et al. | |
| 8,499,749 B2 | 8/2013 | Mosset et al. | |
| 8,545,588 B2 | 10/2013 | Iddings et al. | |
| 8,714,142 B2 | 5/2014 | Jacob et al. | |
| 8,741,017 B2 | 6/2014 | Nelson | |
| 8,747,512 B2 | 6/2014 | Mills et al. | |
| 8,758,467 B2 | 6/2014 | Lundgren et al. | |
| 8,814,973 B2 | 8/2014 | Baseotto et al. | |
| 8,834,610 B2 | 9/2014 | Lundgren et al. | |
| 8,864,866 B2 | 10/2014 | Osendorf et al. | |
| 9,067,161 B2 | 6/2015 | Campbell et al. | |
| 9,162,174 B2 | 10/2015 | Baseotto | |
| 9,221,004 B2 | 12/2015 | Iddings et al. | |
| 9,238,189 B2 | 1/2016 | Baseotto et al. | |
| 9,353,658 B2 | 5/2016 | Jacob et al. | |
| 9,440,177 B2 | 9/2016 | Wood et al. | |
| 9,504,949 B2 | 11/2016 | Lundgren et al. | |
| 9,610,529 B2 | 4/2017 | Mills | |
| 9,636,615 B2 | 5/2017 | Osendorf et al. | |
| 9,718,019 B2 | 8/2017 | Baseotto et al. | |
| 9,737,839 B2 | 8/2017 | Lundgren et al. | |
| 9,752,747 B2 | 9/2017 | Lundgren et al. | |
| 2009/0049814 A1 * | 2/2009 | Baseotto | B01D 46/009 55/482 |
| 2009/0094951 A1 * | 4/2009 | Baseotto | B01D 46/0024 55/498 |
| 2013/0043181 A1 | 2/2013 | Krull | |
| 2013/0220258 A1 * | 8/2013 | Beck | F02B 77/00 123/184.21 |
| 2013/0263744 A1 * | 10/2013 | Osendorf | B01D 46/0005 96/380 |
| 2014/0033668 A1 | 2/2014 | Kleynen | |
| 2014/0102060 A1 | 4/2014 | Kato et al. | |
| 2014/0109885 A1 | 4/2014 | Kalayci et al. | |
| 2014/0208702 A1 | 7/2014 | Lundgren et al. | |
| 2014/0208703 A1 | 7/2014 | Willems et al. | |
| 2014/0215982 A1 | 8/2014 | Wood et al. | |
| 2015/0101298 A1 * | 4/2015 | Osendorf | B01D 46/2414 55/502 |

OTHER PUBLICATIONS

Exhibit B, Pending claims of U.S. Appl. No. 14/297,738 dated Jan. 23, 2017.
Exhibit C, Pending claims of U.S. Appl. No. 14/996,491 dated Jan. 23, 2017.
Exhibit D, Pending claims of U.S. Appl. No. 14/467,222 dated Jan. 23, 2017.
Exhibit E, Pending claims of U.S. Appl. No. 14/977,930 dated Jan. 23, 2017.
Exhibit F, Pending claims of U.S. Appl. No. 14/518,102 dated Jan. 23, 2017.
Exhibit G, Pending claims of U.S. Appl. No. 14/485,896 dated Jan. 23, 2017.
Exhibit H, Pending claims of U.S. Appl. No. 15/262,090 dated Jan. 23, 2017.
Exhibit I, Pending claims of U.S. Appl. No. 15/360,223 dated Jan. 23, 2017.
Exhibit J, Pending claims of U.S. Appl. No. 14/273,801 dated Jan. 23, 2017.
Exhibit K, Pending claims of U.S. Appl. No. 15/167,034 dated Jan. 23, 2017.
Search Report and Written Opinion corresponding to PCT/US2014/040361 dated Mar. 9, 2015.
Exhibit B, Pending claims of U.S. Appl. No. 15/477,235 dated May 14, 2018.
Exhibit D, Pending claims of U.S. Appl. No. 15/663,997 dated May 14, 2018.
Exhibit F, Pending claims of U.S. Appl. No. 15/582,995 dated May 14, 2018.
Exhibit G, Pending claims of U.S. Appl. No. 15/693,928 dated May 14, 2018.

* cited by examiner

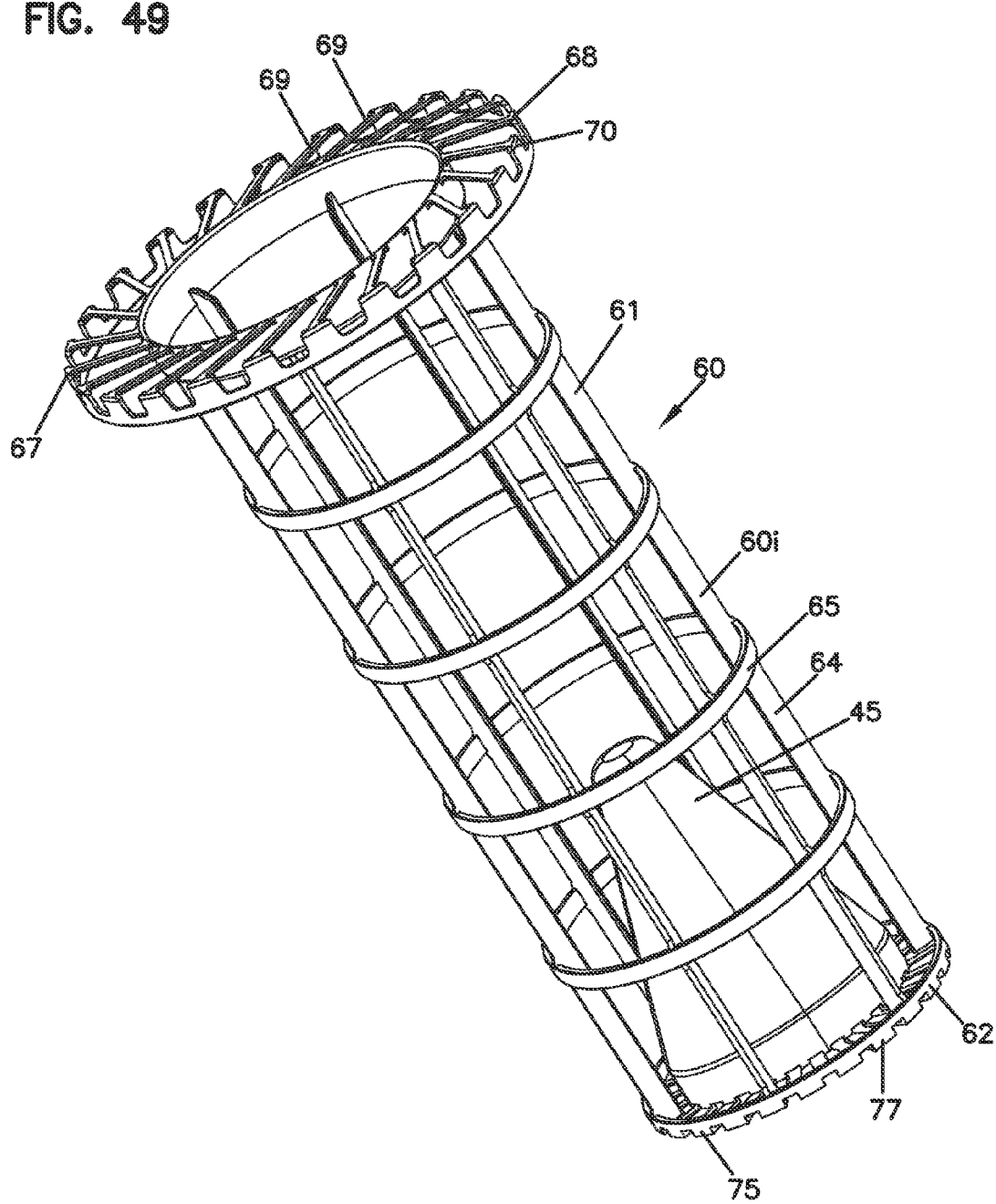

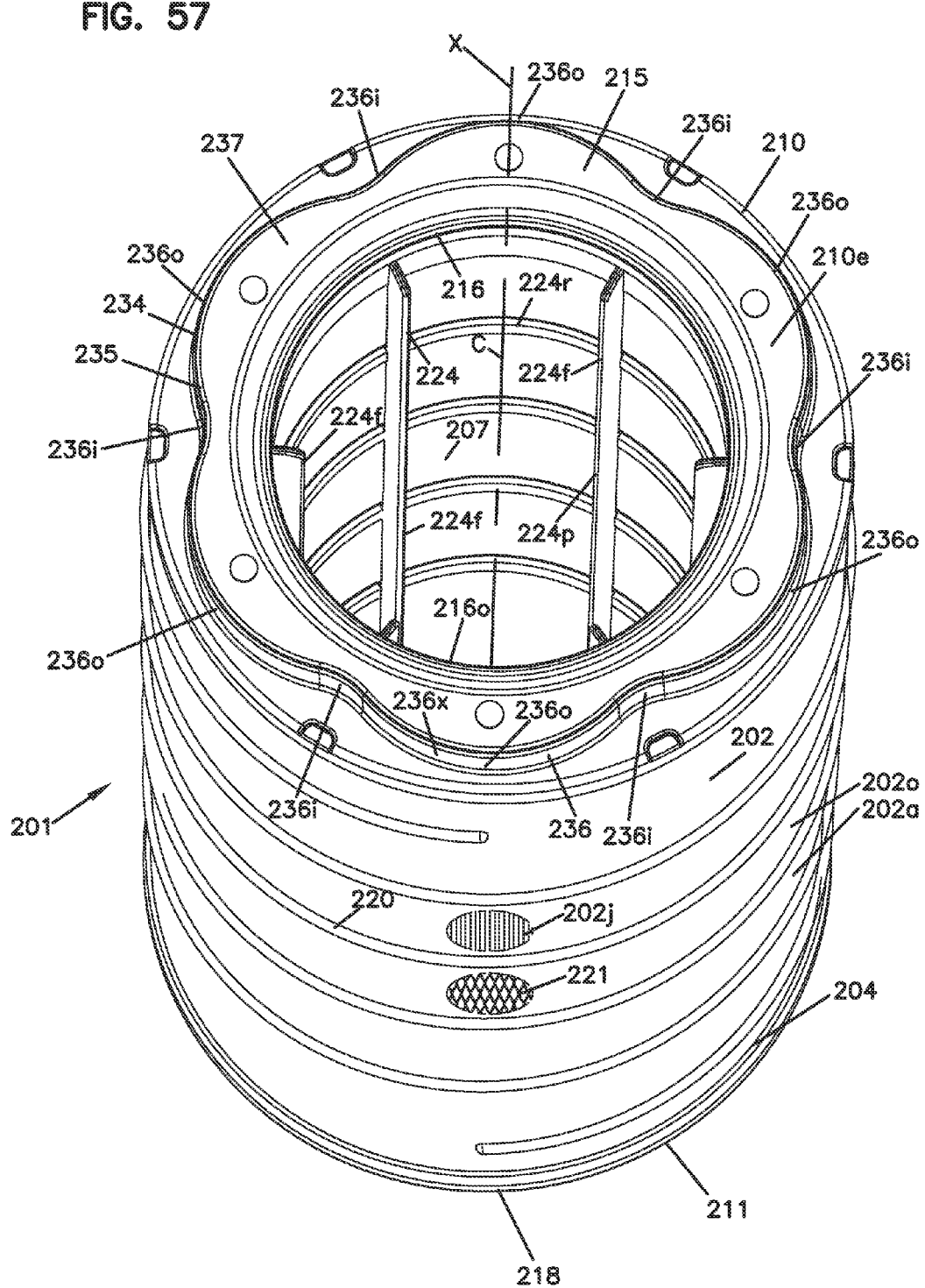

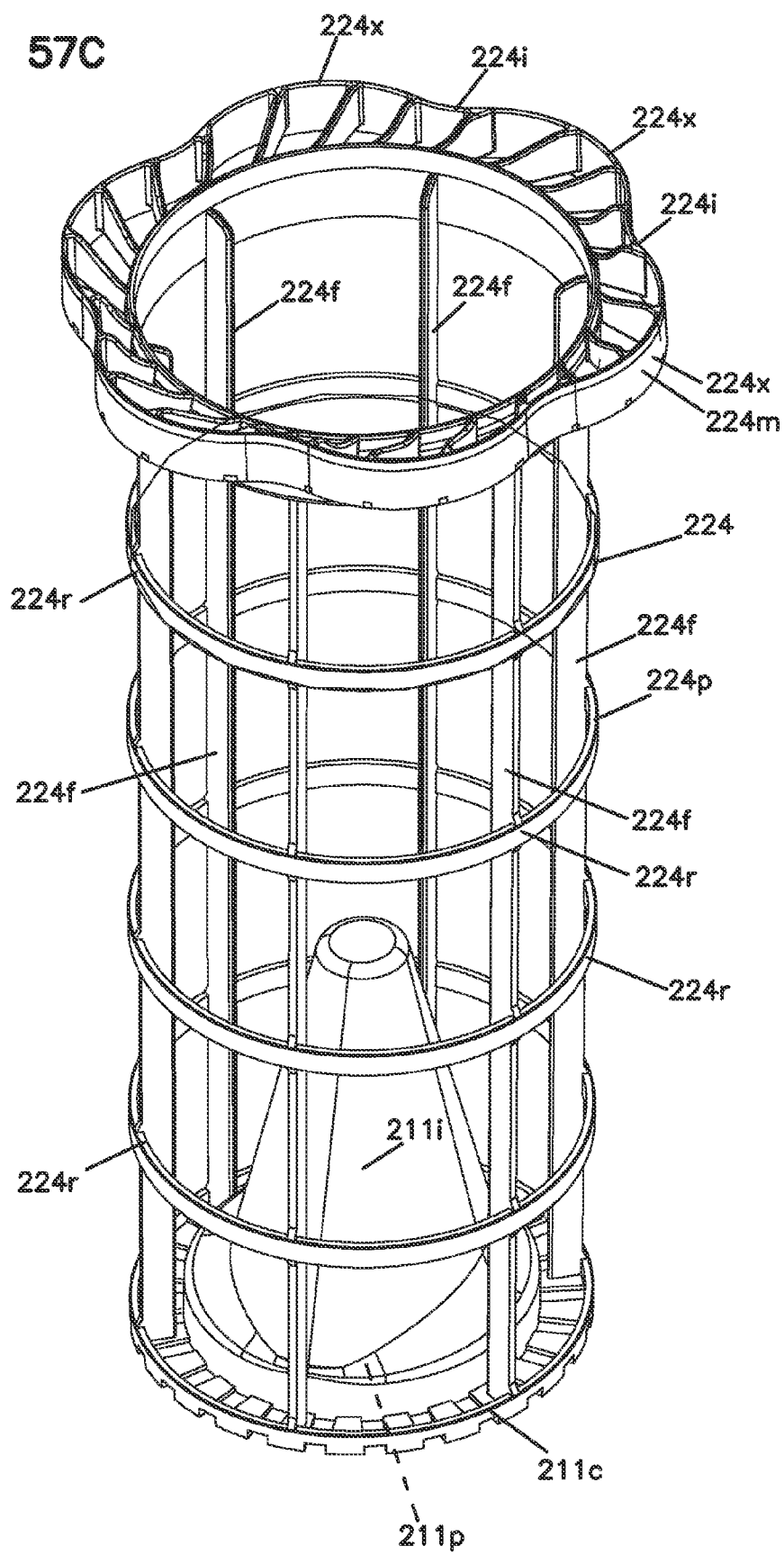

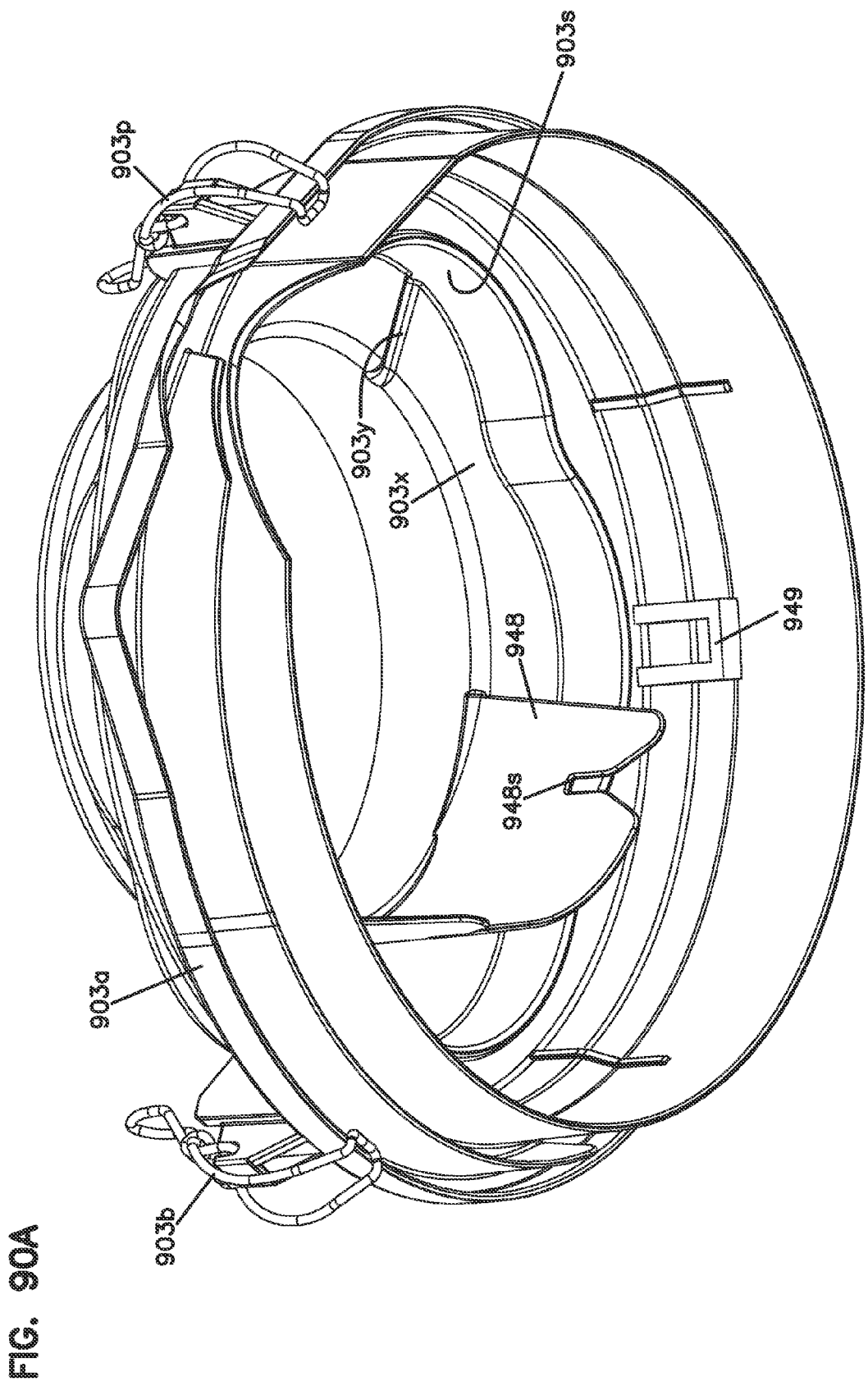

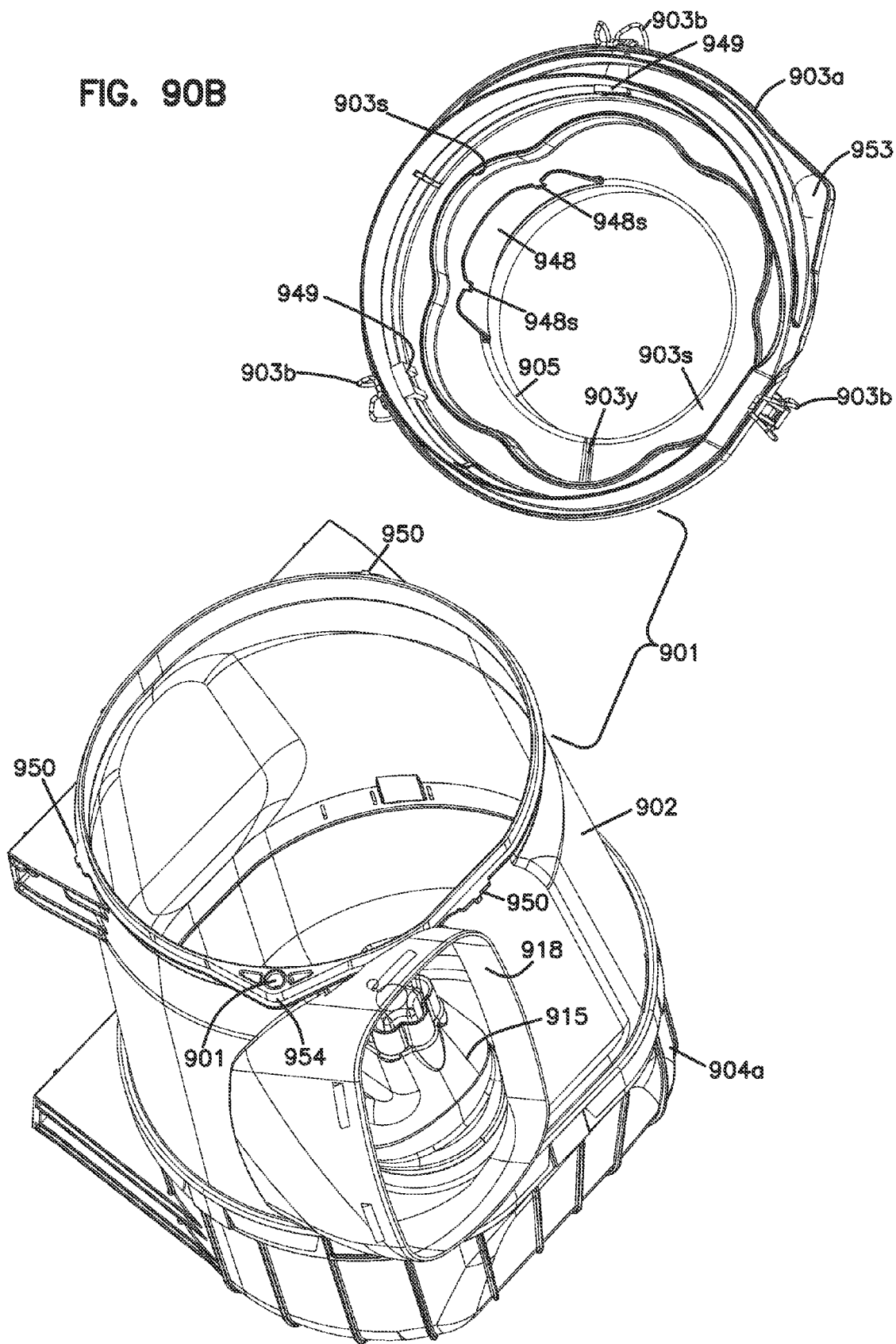

FILTER CARTRIDGE ARRANGEMENTS AND ASSEMBLIES; PREFERRED FEATURES; METHODS OF ASSEMBLY AND USE

This application is being filed as a U.S. National Stage Application of a PCT Application filed on 30 May, 2014.

CROSS-REFERENCE TO RELATED APPLICATION

The present application includes the disclosure of, with edits and additions: PCT Application No. PCT/US2014/040361, filed 30 May 2014; U.S. provisional 61/974,273, filed Apr. 2, 2014; U.S. provisional 61/832,269, filed Jun. 7, 2013; and, U.S. 61/829,666 filed May 31, 2013. The complete disclosures of U.S. provisionals 61/974,273; 61/832,269; and, 61/829,666 are incorporated herein by reference. A claim of priority is made each of PCT/US2014/040361; 61/974,273; 61/832,269; and, 61/829,666, to the extent appropriate.

The present application also includes certain information, features and arrangements disclosed in U.S. Ser. No. 14/266,560, filed Apr. 30, 2014. The complete disclosure of U.S. Ser. No. 14/266,560 is incorporated herein by reference. A claim of priority is also made to U.S. Ser. No. 14/266,560 to the extent appropriate.

FIELD OF THE DISCLOSURE

The present disclosure relates to filter assemblies. The features described and characterized are typically applied in gas (for example, air) cleaner assemblies. A typical use is in air cleaner assemblies for vehicles or other equipment. The techniques described relate, at least in part, to provision of assemblies with preferred configurations for convenient servicing and operation, while ensuring a proper cartridge is appropriately positioned, oriented and secured for use.

BACKGROUND

Filter assemblies are used to filter a variety of materials, including gaseous fluids (gas or air filters, or crankcase ventilation filters) and liquid materials (liquid filters such as oil filters, fuel filters, hydraulic filters and water filters). The techniques described herein are particularly useful for application with respect to gas filters such as air cleaners, for example of the type used to filter combustion intake air for internal combustion engines of a variety of vehicles and other equipment such as: trucks; buses; off road construction equipment; agriculture equipment; generator sets; etc. However the techniques can be applied in other applications.

Air cleaners, of the type of concern here, typically include a housing with a removable and replaceable main filter cartridge positioned therein. In some instances they may be used with a secondary or safety filter cartridge.

The housings typically include at least one service or access cover for selected access to the internally received filter cartridge(s) for servicing. A filter cartridge is typically serviced by being removed and either: by being replaced with factory new cartridge; by being refurbished and being reinstalled; or, by being replaced with a previously used, but refurbished, cartridge.

Issues relating to air cleaner arrangements with serviceable filter cartridges include: ensuring proper installation and sealing; obtaining appropriate support for the filter cartridge within the air cleaner, against unintended motion or movement; ensuring proper air (fluid) flow through the system in use; providing for convenient servicing; and/or, ensuring that the air cleaner housing is protected against improper installation of a filter cartridge.

Improvements in air cleaner assemblies and filter cartridges therefor, which are directed to these issues, are described herein.

BRIEF DESCRIPTION OF THE DRAWINGS

FIG. 17 is a schematic fragmentary cross-sectional view depicting a second portion of a filter cartridge in accord with FIGS. 1-3 in sealing engagement with a portion of a housing.

FIG. 49 is a schematic perspective view of a liner support or liner component usable in forming the cartridge of FIG. 45.

FIG. 57 is a schematic open end perspective view of an alternate cartridge in accord with the principles of the present disclosure.

FIG. 57C is a schematic perspective view of the component of the filter cartridge of FIG. 57.

in FIG. 90 portions being broken away to depict internal detail.

FIG. 90A is a schematic end side perspective view of an access cover of the assembly of FIGS. 88-90.

FIG. 90B depicts engagement between an access cover and a housing central portion.

in FIG. 91, portions being broken away to depict internal detail.

SUMMARY

Figure 1:
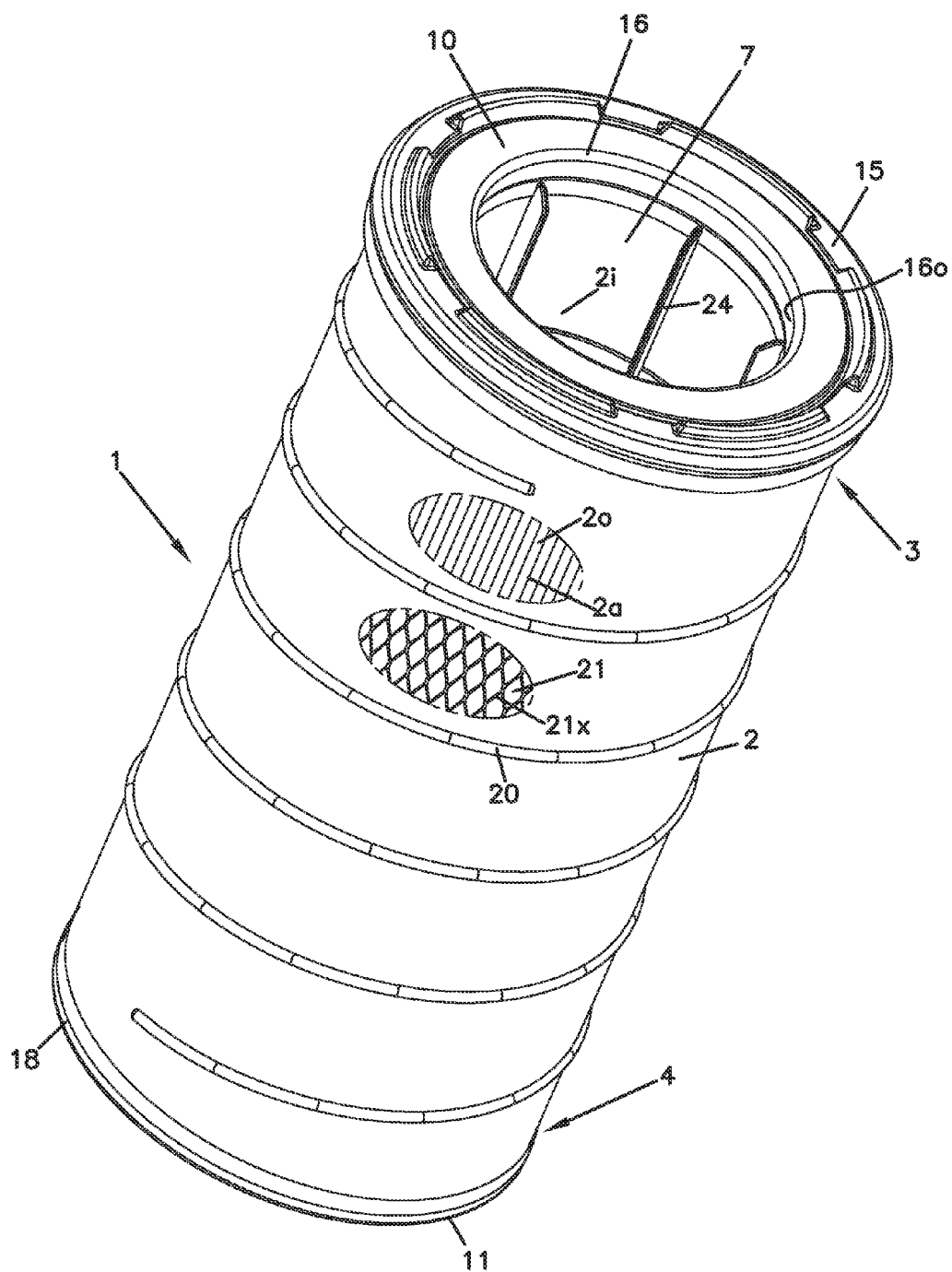
FIG. 1 is a schematic perspective view an example filter cartridge including features according to the present disclosure.

According to the present disclosure, selected features of filter cartridge arrangements and assemblies are provided. Also methods of assembly and use are provided. The techniques and features are particularly applicable in the context of an air filter cartridge used with, or for use with, an air cleaner assembly. Alternate applications of selected techniques described herein are possible, however.

The techniques described can be used to provide for various advantages relating to such issues as: ensuring proper installation and sealing of a filter cartridge within an air cleaner assembly; obtaining appropriate support for the filter cartridge within the air cleaner, against unintended motion or movement; ensuring proper air (or gas) flow through the system, i.e. through the air (gas) cleaner, in use; providing for convenient servicing; and/or ensuring that the (air) cleaner housing is protected against improper installation of a filter cartridge. There is no specific requirement that the features and techniques be applied in a manner to obtain all of the advantages. However, various example systems characterized in the drawings do accomplish these advantages.

A variety of individually advantageous features and techniques are described. There is no specific requirement that they all be applied to obtain some advantage. Thus, many specific features can be viewed as optional, to obtain additional advantage.

In a first type of example systems characterized, a filter cartridge is provided with filter media surrounding an open filter interior. The filter media has first and second ends, each of which defines a media perimeter adjacent opposite end pieces. In the first types of example filters, the media perimeters (at opposite ends) are eccentrically aligned in the cartridge, in accord with characterizations made herein.

A variety of techniques are characterized which relate to eccentric positioning (aligning) of features at opposite ends of the cartridge relative to one another, when used according to the present disclosure. In the previous paragraph, an example was characterized in which a perimeter portion of the media adjacent each end piece defines eccentrically positioned or aligned patterns. Other features at opposite ends of the media (that can be used in addition, or alternately, to provide eccentric positioning or alignment to advantage) include selected features of end pieces at opposite ends of the cartridge and/or housing engagement members positioned at opposite ends of the cartridge.

Advantageous air cleaners and air cleaner housing arrangements are also characterized. Further, methods of assembly and use are characterized.

While many of the features relate to eccentric positioning of features at opposite ends of the cartridge, there is no specific requirement of such eccentric positioning in order to obtain an advantage according to certain of the techniques characterized herein. This will be apparent from certain of the following characterizations.

There is no specific requirement that an arrangement include all of the advantageous features characterized herein in order to obtain some advantage according to the present disclosure. Further, there is no specific requirement that the described techniques, when applied, be applied to obtain all of the advantages possible with techniques according to the present disclosure.

DETAILED DESCRIPTION

I. Features of an Advantageous Filter Cartridge; and, Methods of Assembly, FIGS. 1-9

A. General Cartridge Features

An example filter cartridge providing an indication of how the principles characterized herein can be embodied is indicated in FIGS. 1-6. As will be understood from discussions relating to possible variations described herein below, the depictions of FIGS. 1-6 provide an example of a useful embodiment. The principles can be embodied in a variety of alternate forms.

Referring to FIG. 1, a filter cartridge 1 is depicted. In general, the filter cartridge 1 comprises an extension of media 2 extending between a first media end 3 and an opposite second media end 4. For the particular example depicted, the media 2 is configured surrounding an open filter interior 7.

The media 2 generally extends between: a first end piece (cap) 10, positioned at the first media end 3; and, a second end piece (cap) 11, positioned at the opposite second end 4 of the media 2.

For the example filter cartridge 1 depicted, the first end piece 10 is an open-end end piece 15 having a central air flow aperture 16 therethrough, in flow communication with the open filter interior 7. This will be typical.

For the example cartridge 1 depicted, the second end piece 11 is preferably a closed end piece 18. By the term "closed" in this context, it is meant that the end piece 11 does not have an aperture therethrough that is in flow communication with the open filter interior 7; i.e. through which flow can occur that also flows through flow aperture 16. Alternatives are possible, and, in some instances, the end piece 11 can be constructed as an open end piece. However, a closed end piece 18 is typical and preferred for many applications characterized herein.

Still referring to FIG. 1, typically the cartridge 1 will be configured for "out-to-in" flow during filtering. By this, it is meant that filtering flow generally occurs from an outer perimeter 2o of the media 2 to an inner media perimeter 2i surrounding open interior 7. Alternate or reverse flow is possible in some applications of the techniques described herein, however.

Of course when the cartridge 1 is configured for out-to-in flow through the media 2 during filtering, aperture 16 will be an outlet aperture 16o.

In a typical application for air filtration, the media 2 will be pleated in extension between ends 3 and 4; i.e., the media 2 will be pleated media 2a comprising a plurality of pleats surrounding the interior 7. This provides for a relatively high media area within a selected volume, which is advantageous for cartridge lifetime and efficiency. A variety of media types can be chosen for the media 2, from media materials currently available and in use, or from those yet to be developed. Often the media 2 chosen will be cellulose fiber media, but alternatives are possible. The media can be provided with a surface treatment such as a fine fiber or other material thereon, if desired, to advantage.

Referring to FIG. 1, the cartridge 1 depicted is shown with an optional adhesive bead 20 thereon, surrounding the media 2 and engaging outer pleat tips. The bead 20 will help secure outer pleat tips in proper position, orientation, and spacing during use.

The filter cartridge 1 can be provided with an optional outer liner 21 surrounding an outer perimeter 2o of the media 2. Such liners are well known for other types of cartridges, and similarly can be applied for use with cartridges such as cartridge 1. A variety of liners already known that can be used include: expanded metal liners; perforated metal liners; porous plastic liners; and, a variety of other arrangements. A particularly useful outer liner for cartridge 1, is a flexible plastic net construction 21x, for example comprising polyethylene. Such a stretchable outer liner can help provide for protection to integrity of the media 2 during shipping and handling. Substantially rigid structural support (not provided by a flexible net liner) is typically not of substantial concern, however, when the arrangement is configured for out-to-in flow during filtering, since the air pressure during use generally pushes the media 2 inwardly rather than outwardly. Depending on the type of material chosen for the liner 21, the liner can be positioned underneath the bead 20 or over the bead 20.

Typically, especially when used with out-to-in flow arrangements, the cartridge 1 will preferably be provided with an inner liner or support structure 24, around which the media 2 is positioned. The inner liner or support structure 24 generally comprises a relatively rigid structure that extends between the media ends 3,4 and the end pieces 10,11, to provide structural support to the media 2. The inner liner 24 can comprise a variety of materials including metal or plastic. For typical applications of the present techniques, the inner liner 24 will often be a molded plastic construction as discussed below.

As thus far characterized, the cartridge 1 has been described with the features applied in a wide variety of filter arrangements, including air filter arrangements. Examples including such features are units characterized in: U.S. Pat. Nos. 6,652,614; 6,837,920; 6,986,805; 7,291,198; 7,572,310; 7,981,187; 7,070,642; 7,988,757; 7,662,203; 8,216,335; 8,394,166; 7,524,349; 7,981,186; 8,292,984; 8,066,791, incorporated herein by reference.

B. Selected Advantageous Cartridge Features

Figure 2:
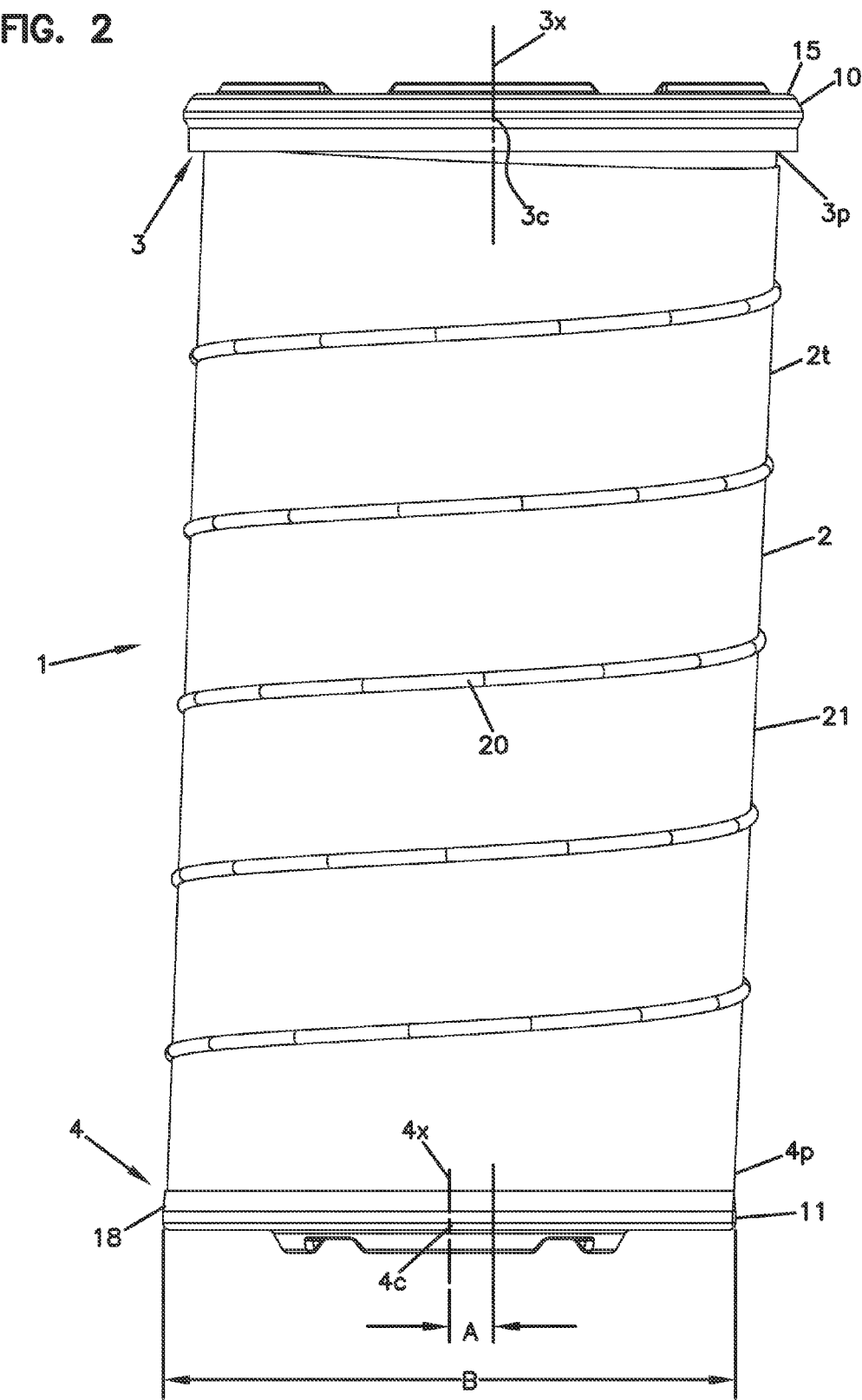
FIG. 2 is a schematic side elevational view of the cartridge depicted in FIG. 1.

Attention is now directed to FIG. 2, in which like reference numerals indicate features already characterized. From a review of FIG. 2, an understanding of some of the manners in which the depicted cartridge 1 distinguishes many previous cartridges such those in references U.S. Pat. Nos. 6,652,614; 6,837,920; 6,986,805; 7,291,198; 7,572,310; 7,981,187; 7,070,642; 7,988,757; 7,662,203; 8,216,335; 8,394,166; 7,524,349; 7,981,186; 8,292,984; 8,066,791, identified above, can be understood.

For example, the cartridge 1 includes selected features at opposite ends that can be defined as "eccentric" or "eccentrically aligned or positioned" in end view or axial projection (i.e. in projection in a plane perpendicular to a shortest (axial) direction between end pieces 10, 11). The cartridge 1 depicted includes a variety of features that can be characterized in this manner. There is no specific requirement, however, that all features depicted and characterized herein as potentially being eccentric be implemented in an eccentric manner, in a cartridge, to obtain some advantage according to the present disclosure. This will be apparent from descriptions herein that relate to operational advantages of the eccentrically aligned features.

Referring to FIG. 2, media end 3 immediately adjacent to, or embedded in end piece 10, can be characterized as having an outer perimeter 3p, defined by one or more of: the outer liner 21, FIG. 1; and the outer pleat tips 2t. The perimeter 3p can be characterized as surrounding a center, indicated at 3c, and defined by axis 3x. Center 3c may be characterized as a first center $c_1$.

At end 4, the media 2 can be characterized as having an outer perimeter 4p also defined by the outer liner 21, FIG. 1; and/or, the outer pleat tips 2t, which perimeter 4p surrounds a center 4c, defined by central axis 4x. Center 4c may be characterized as a second center $c_2$.

As can be seen from inspection from FIG. 2, with respect to the outer perimeters at 3p, 4p, the opposite ends 4, 3, are eccentric relative to one another. That is, while each outer perimeter 3p, 4p, surrounds and defines a center (3c, 4c, respectively) those centers (3c, 4c) are offset or eccentrically aligned with respect to one another, when viewed in end view, i.e. when projected into a plane perpendicular to a shortest direction between the ends 3, 4, or end pieces 10, 11. A portion of this offset, eccentricity or eccentric alignment is indicated in the plane of projection of the side cross-sectional view of FIG. 2, at dimension A.

Eccentricity (eccentric alignment) between features at opposite ends at cartridge 1, as discussed in greater detail below, can be used to provide advantage in use of the cartridge 1. It can be implemented in a variety of forms, and can be used, depending on how specifically implemented, to obtain one or more of a number of advantages. Among the possible advantages that can be obtained, depending on how the eccentricity is specifically implemented, are one or more of the following:

1. Performance advantages in use;
2. Preferred secure engagement of the cartridge within a housing;
3. Advantage in ensuring that the cartridge is a proper one for the housing of concern; and,
4. Ensuring a preferred flow pattern of air within the housing during use.

It is noted that there is no specific requirement that features characterized herein be implemented to obtain all the advantages characterized above. Rather, they can be optionally implemented to obtain one or more of the advantages, depending on the circumstances.

Figure 4:
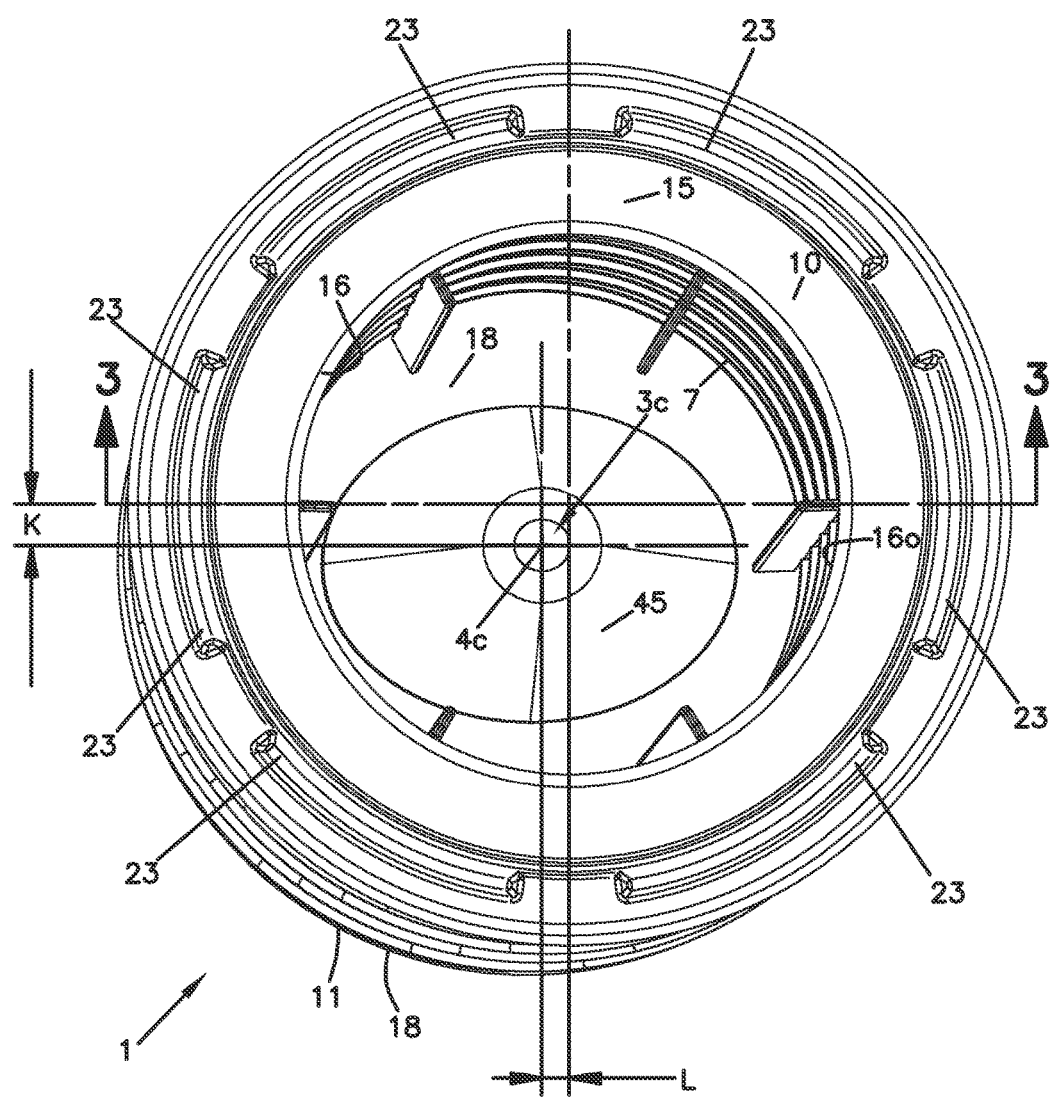
FIG. 4 is a schematic top plan view of the filter cartridge depicted in FIGS. 1-3.

Attention is now directed to FIG. 4. FIG. 4 is a top plan view of cartridge 1, taken toward end piece 10. At 3c, the center of an outer perimeter 3p (FIG. 2) of the media 2 at end 3 is shown in projection; and, at 4c a center of the media outer perimeter 4p (FIG. 2) at end 4 of the media 2 is shown in projection. Thus, FIG. 4 is a form of projection as characterized herein above. It can be seen that the offset or eccentricity Z between centers 3c and 4c can be characterized (in the example) in two dimensions (in the plane of projection) by offset K and offset L respectively. This would lead to a conclusion of a linear dimension or distance (Z) of offset or eccentric alignment corresponding to the square root of ($L^2+K^2$).

Figure 3:
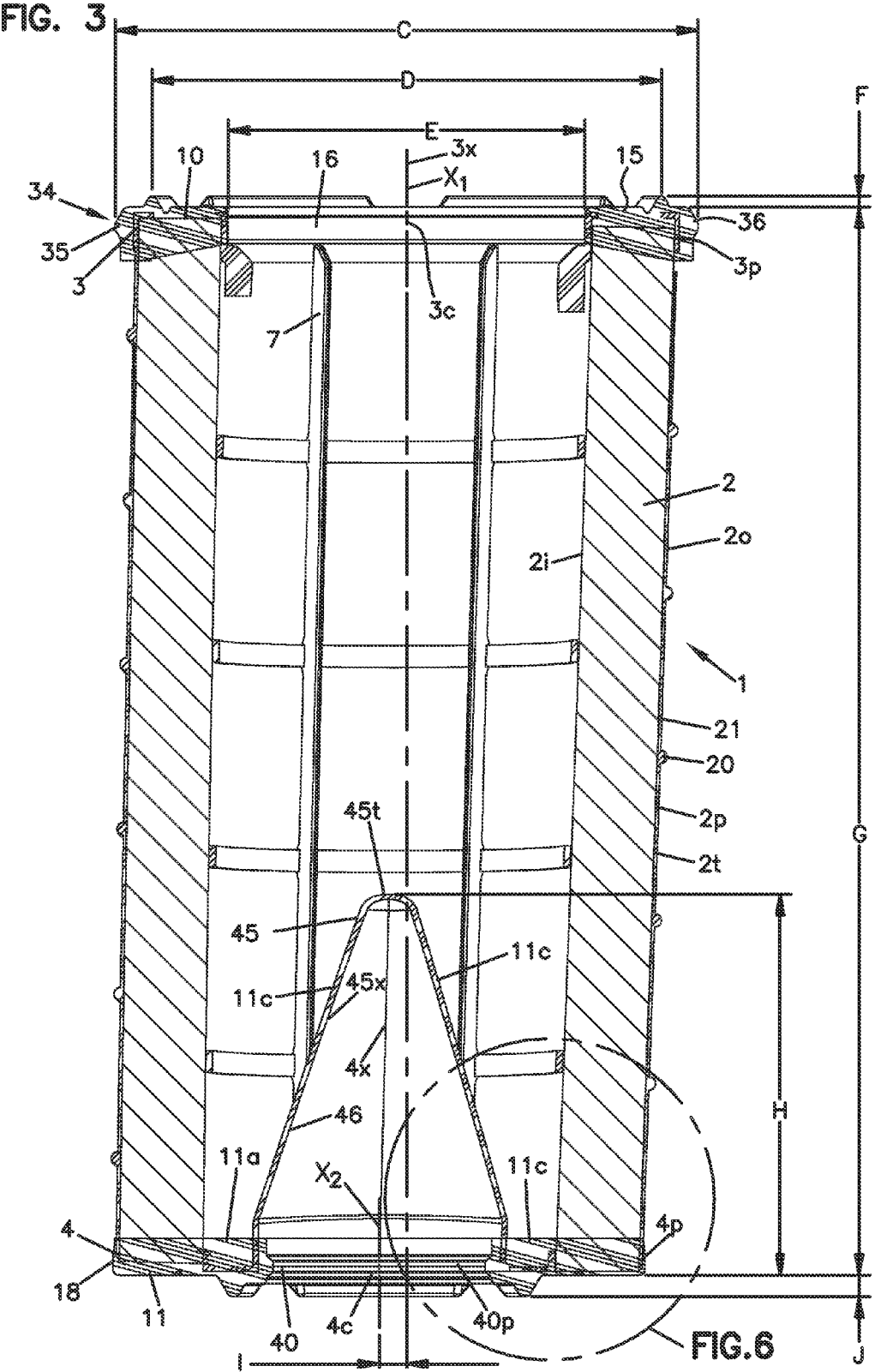
FIG. 3 is a schematic selected cross-sectional view of the filter cartridge depicted in FIGS. 1 and 2.

Still referring to FIG. 4, attention is directed to end piece 10. Projecting from end piece 10, i.e. toward the viewer in the orientation of FIG. 4, are provided a plurality of optional spaced projections 23. The projections 23 are contact projections for an end of a housing, for example access cover, when the cartridge 1 is installed and will typically be formed from a compressible resilient material from which portions of end piece 15 are also formed. Typically, the projections 23 are formed integral with other molded-in-place portions of the end piece 15, as described below. In the particular cartridge 1 depicted, the projections 23 form a projection member that comprises spaced projections 23. In some applications, the projections 23 can be joined to one another, forming a single continuous ring. In FIG. 4, attention is also directed to cross section line 3-3, which defines the cross-sectional view of FIG. 3. Referring to FIG. 3, the cross-sectional view depicted provides further understanding of additional unique features of the cartridge 1.

Again, a characteristic of certain preferred applications of the present technology, relates to eccentric positioning (alignment) of selected features at opposite ends of the cartridge 1. As indicated, this can be implemented in a variety of ways, and can be characterized with respect to a variety of selected cartridge features. By the terms "eccentric", "eccentric alignment" and variations thereof in this context, it is generally meant that centers ($c_1$, $c_2$) of the identified features [when projected into a plane perpendicular to a shortest direction between the opposite ends (3, 4) or end caps (10, 11)] are not aligned with one another, i.e., do not overlap, but rather are offset by a distance at eccentricity Z.

A first example of such eccentricity (or offset) was characterized above in connection with a center 3c of the outer perimeter 3p of the media 2 adjacent end 3; and, a center 4c of the outer perimeter 4p of media end 4, at opposite end 4 from end 3. In FIG. 3, the eccentricity is shown by locations 3c and 4c; and, the amount of offset in the plane of the cross-section depicted is shown at I.

It is noted that, with respect to the outer perimeter definitions 3p, 4p, when the media 2 is pleated, reference is meant to a pattern defined by outer pleat tips, and minor variations from unevenly defined pleat tips, or minor variations in pleat tip orientation, are meant to be ignored.

The eccentricity in the cartridge 1 can be defined and/or provided in alternate ways. For example, it can be defined in some instances with respect to end cap features rather than (or in addition to) media features.

An example of this can be understood by reviewing certain housing engagement features of the two end caps 10, 11, respectively. Referring first to end cap 10, FIG. 3, the end cap 10 preferably seals to a housing feature, such as an access cover feature or other feature, by a housing seal arrangement 34. A variety of housing seal arrangements can be used. The particular housing seal arrangement 34 depicted is a radial seal arrangement 35. A housing radial seal or radial seal arrangement is generally an arrangement configured to provide sealing forces (in releasable sealing engagement) generally directed toward or away from a central axis $X_1$, around which the seal 35 extends. In this instance, the housing radial seal arrangement 35 is circular, although alternatives are possible, such as oval or other arrangements. A center indicated by axis $X_1$, then, is a center of a seal pattern defined by the seal arrangement 35. In this example, the housing seal arrangement 35 is an outwardly directed housing radial seal 36, meaning that the seal surface of seal 35 faces radially outwardly away from axis $X_1$. The principles described can be applied with an inwardly directed radial seal, however, i.e. with a seal directed generally toward axis $X_1$.

Thus, referring to FIG. 3, it can be seen that the housing radial seal 35 is an (outwardly directed) radial seal 36 in the example defining a circular pattern around a center defined by central axis $X_1$ that extends perpendicularly through a center of a seal definition provided by housing radial seal 35. This axis $X_1$ coincides with center 3c and axis 3x since, in the example, the seal 36 and outer media perimeter 3p at end 3 define concentric (or nearly concentric) circles.

Still referring to FIG. 3, it can be understood that in this example, the first housing seal member 35 is a seal member having a seal projection perimeter in a plane orthogonal to a central axis $x_1$ of the seal pattern first end piece. By this it is meant that the housing seal member 35, with respect to a plane therethrough, is orthogonal to the central axis $X_1$ rather than slanted thereto. Alternatives are possible.

The second end cap 11, FIG. 3, preferably engages a housing, when installed, by an optional second housing or bottom engagement arrangement 40. The second (or bottom) housing engagement arrangement 40 for the example depicted, is also radially directed, around a central axis $X_2$. In this instance, the direction of radial engagement is radially inward engagement, although alternatives are possible.

The radial engagement arrangement 40 can be a seal, but it is not required to be a seal since, in the example depicted, the end cap 11 is closed, i.e., central region 11c thereof is not open to allow passage of air into cartridge interior 7.

Typically, the second housing bottom or bottom engagement 40 is a not a mere loose alignment or engagement. Rather, typically and preferably it is a "resistive" engagement arrangement. By the term "resistive engagement arrangement" and variants as used herein, it is meant that the arrangement has some positive interaction that makes separation of the end cap 11 from the housing require applied force. Typical resistive engagement arrangements will be ones in which a member 40 of the end cap 10 is compressed into engagement with a portion of the housing. These will be characterized as "compressive" engagement arrangements or by similar terms. Although such a compressive, resistive, engagement arrangement can be configured continuously to also form a seal when the end cap 11 is closed, there is no specific requirement of a seal at the engagement.

The engagement arrangement may be of a type characterized herein as an "interference" arrangement, or by similar terms, when an interference fit between arrangement 40, and the housing is used either in additional to, or instead of, a compressive engagement.

The pattern defined by (inner) perimeter 40p of the second or bottom housing engagement arrangement 40 can have a variety of shapes. For example, it can be circular. However, in the example cartridge 1 depicted, the inner perimeter 40p defined by second or bottom housing engagement arrangement 40 is oval, in the example generally elliptical. Since it is oval, its center will, in general, be definable at the midpoint of a longest bisecting line of the oval. In the example depicted, the center is indicated by central axis $X_2$, which also corresponds to defining the center 4c of the outer perimeter 4p of the media 2, although alternatives are possible.

In projection, a center of a portion of housing seal arrangement 35 defined by axis $X_1$ and a center of the second housing engagement arrangement 40 defined by axis $X_2$ are eccentric, i.e. are offset or eccentrically aligned relative to one another. That is, when projected into a plane perpendicular to the shortest direction between end pieces 10, 11, the center $X_1$ of seal arrangement 35 and center $X_2$ of second housing engagement arrangement 40 do not align, but are offset by an eccentricity Z. Alternately stated, axes $X_1$ and $X_2$ are not coaxial. When projected into the plane of the cross-section of FIG. 3, this offset or eccentricity is indicated by dimension I. Of course, in projection in a plane perpendicular to a shortest direction between end pieces 10 and 11, the offset in two dimensions is shown by the offset by the centers 3c, 4c, FIG. 4, by dimensions L and K, since the axes $X_1$ and $X_2$ correspond to, and define, centers 3c, 4c, respectively, in the embodiment as shown. Alternatives are possible.

In the discussion provided thus far, with respect to eccentric positioning of selected features of opposite end pieces 10, 11, the discussion has been with respect to features that are used for engagement with the housing; in the example a radial seal at one end cap and a radially directed housing engagement feature at the other. It is noted that advantageous eccentricity can be defined by alternate features on, or associated with, the two end caps or other cartridge features at opposite ends. This is discussed below.

It is also noted that for the example depicted in FIG. 3, and described herein, the media 2 is generally cylindrical. This will be typical, however, in some instances, the media can be configured, for example, in a somewhat conical pattern. Examples of such variations are also discussed below.

C. Additional Features of Cartridge 1

Turning now to additional features of cartridge 1, FIGS. 1-3, attention is directed to FIG. 3, and especially end piece 11. Again, end piece 11, in the example depicted, is, generally, a "closed" end piece 18. That is, it is not open to unfiltered flow of material therethrough, at any location that would allow unfiltered flow into interior 2i and to outlet flow aperture 16. Since the end piece 11 is characterized as closed, its center 11c, which extends across a region surrounded by the media 2, is also closed.

In the example cartridge 1 depicted, a receiver projection or guide receiver 45 is positioned as part of the closed end piece 11, within housing interior 7. The receiver projection 45 generally projects from a location adjacent end 4 of the media toward end piece 10 and media end 3, a distance corresponding to at least 10% of a distance between media ends 3,4, typically at least 15% of that distance, usually at least 20% of that distance, and often an amount within the range of 25-60%, inclusive, for example 25-50%, inclusive, of that distance. Alternatives are possible, however.

Further, in a typical application, the receiver projection projects from a location adjacent end 4 toward end 3, a distance of at least 50 mm, usually at least 80 mm, often at least 100 mm, and typically an amount within the range of 100-280 mm inclusive (e.g. 100-250 mm, inclusive), often 120-250 mm, inclusive (e.g. 120-220 mm, inclusive).

Typically, the receiver projection 45 is configured so that an outer or exterior surface 45x thereof (i.e., a surface on a side away from end piece 10 and interior 2i) surrounds or defines a receiver recess 46 into which a guide projection in housing is received, during installation of cartridge 1 in use. Structure to accomplish this, and operational advantages and results, are discussed further below.

Similarly to the receiver projection, the receiver recess 46 also typically projects from a location adjacent end 4 the media toward end piece 10 and media end 3, a distance corresponding to at least 10% of a distance between the media ends 3, 4, typically at least 15% of that distance, usually at least 20% of that distance and often an amount within the range of 25-60%, inclusive, for example 25-50%, inclusive, of that distance. Further, the recess 46 typically has a dimension of extension or depth, from a location adjacent end 4 toward end 3, of at least 50 mm, usually at least 80 mm, often at least 100 mm, and typically an amount within the range of 100-250 mm inclusive (e.g. 100-280 mm, inclusive), for example often 120-250 mm inclusive (e.g. 120-220 mm, inclusive).

Still referring to FIG. 3, it is again noted that end piece 11, characterized above, is a closed end piece. In the terminology used herein, the term "closed" is applicable in this context, in spite of the presence of the recess 46, since projection 45 is itself closed and forms a portion of the closed interior region 11c of end piece 11. Thus, air that enters recess 46, i.e. through aperture defined by engagement arrangement 40, cannot also pass through aperture 16 of end piece 10.

The receiver projection 45, and the corresponding receiver recess 46, can be defined in a variety of shapes. For example, it can be conical. The particular example depicted shows a projection 45, viewable in FIG. 4, and recess that have a tapering shape toward tip 45t but with a generally oval cross-section instead of circular. In some instances, it may be desirable to configure the projection 45 and recess such that they have a shape such that can only receive a housing projection therein, in a single rotational orientation between the two. Thus, it might be modified from an oval shape, for example by distorting a side. This is discussed further below.

Also, there is no specific requirement of a particular geometric configuration of each of the two features used for defining the eccentricity; nor, is there any requirement that the features of each have the same general geometric pattern or be different geometric patterns from one another. This will be understood from some of the variations discussed herein below. It is also noted that there is no specific requirement that the media have the same pleat depth, constantly throughout its length, as shown in the example of FIG. 3; pleat depth being the distance between the outer pleat perimeter 2p or tips 2t and the inner pleat tips or perimeter 2i. Variations are possible.

D. Variations in Pleat Tip Definition

It is noted that herein geometric shapes defined by pleat tips have been referenced. The term is meant to refer a shape defined by a perimeter that touches the various pleats tips, whether it is by reference to the inner pleat tips or the outer pleat tips. General shapes, such as circular, were referenced above. Alternate shapes are possible, including for example, oval. In general, when reference herein is made to a general shape defined by pleat tips, minor pleat tip variations are meant to be ignored. For example, if a pleat is slightly distorted, it would cause an internal dip in the actual perimeter pattern of the outer pleat tips. Such minor variations are meant to be ignored, for example, when it is stated that a pleat tip pattern is a circular or generally circular pattern.

Typically, when the media is pleated and the pleat depth remains constant, the first media outer perimeter adjacent the first end will have a first dimension of length and the second media outer perimeter adjacent the second end piece will have a second dimension of length, the first dimension of length being within 98%-102% of the second dimension of length, usually at 99%-101%, and often approximately equal. Similarly the first media outer perimeter adjacent first end will have a length within 15 mm (for example within 10mm) of the second dimension of length. The dimensions are merely meant to indicate that minor variations from pleat variations adjacent opposite ends are not meant to be of concern.

In more general terms, in many applications of the techniques described herein, the media outer perimeter adjacent the first end piece will have a dimension of length within the range of 90-110%, typically 95-105%, of the dimension a length for the media outer perimeter adjacent the second end piece. Of course, in certain preferred applications, the two dimension of lengths will be nearly equal, i.e. within 98%-102%, often 99%-101%, of each other.

If the media is cylindrical, then immediately adjacent where the media is embedded in the end pieces of 10, 11, a pattern, around the perimeter of the media, if taken in a plane orthogonal to a central axis for the corresponding end piece, will be distorted slightly from circular, since the cylinder is slanted. Herein, in the discussions comprising a media perimeter definition to an end piece definition, this minor distortion from circular is generally ignored, especially when the slant angle is less than 5°.

E. Other Cartridge Features

Figure 5:
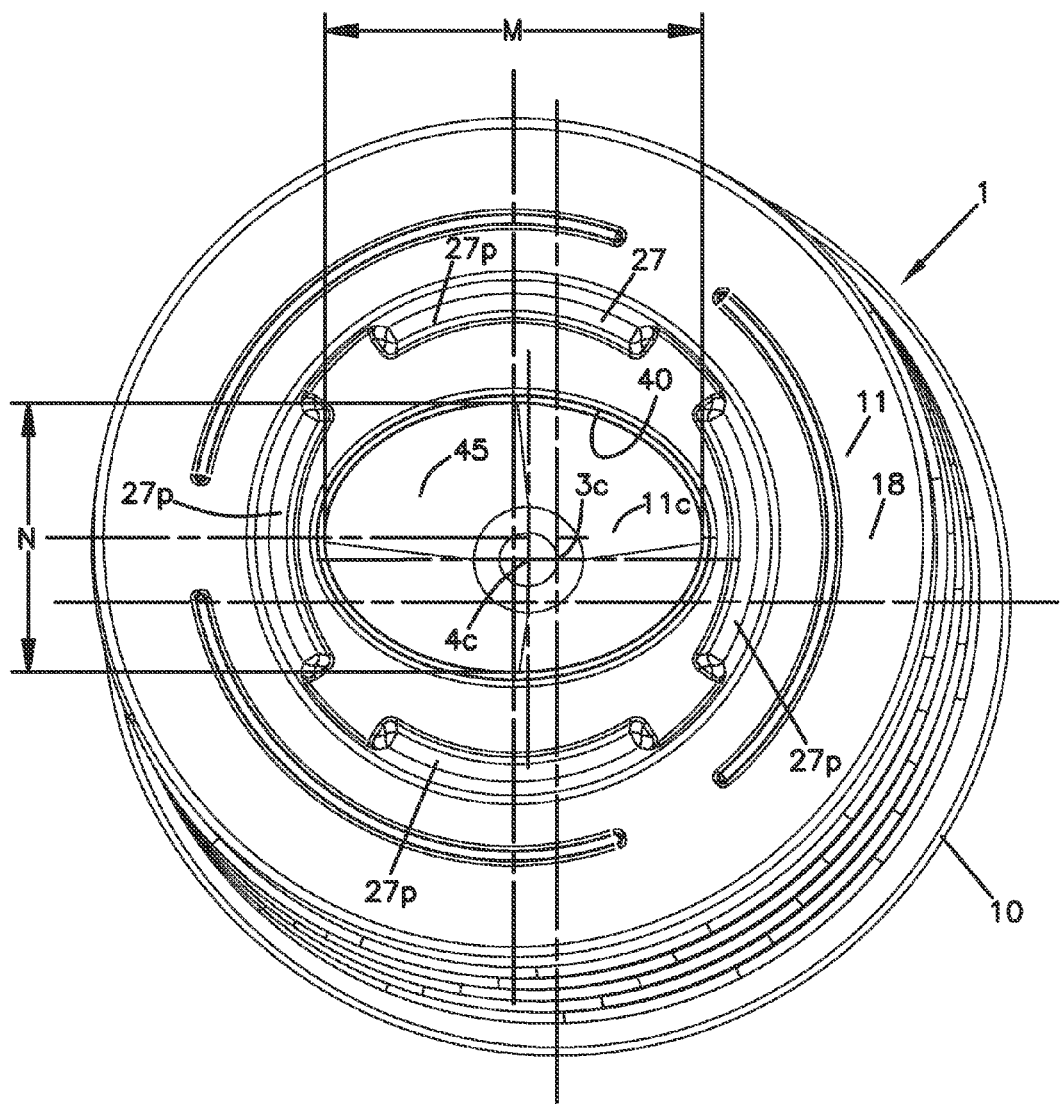
FIG. 5 is a schematic bottom plan view of the filter cartridge depicted in FIGS. 1-4.
Figure 6:
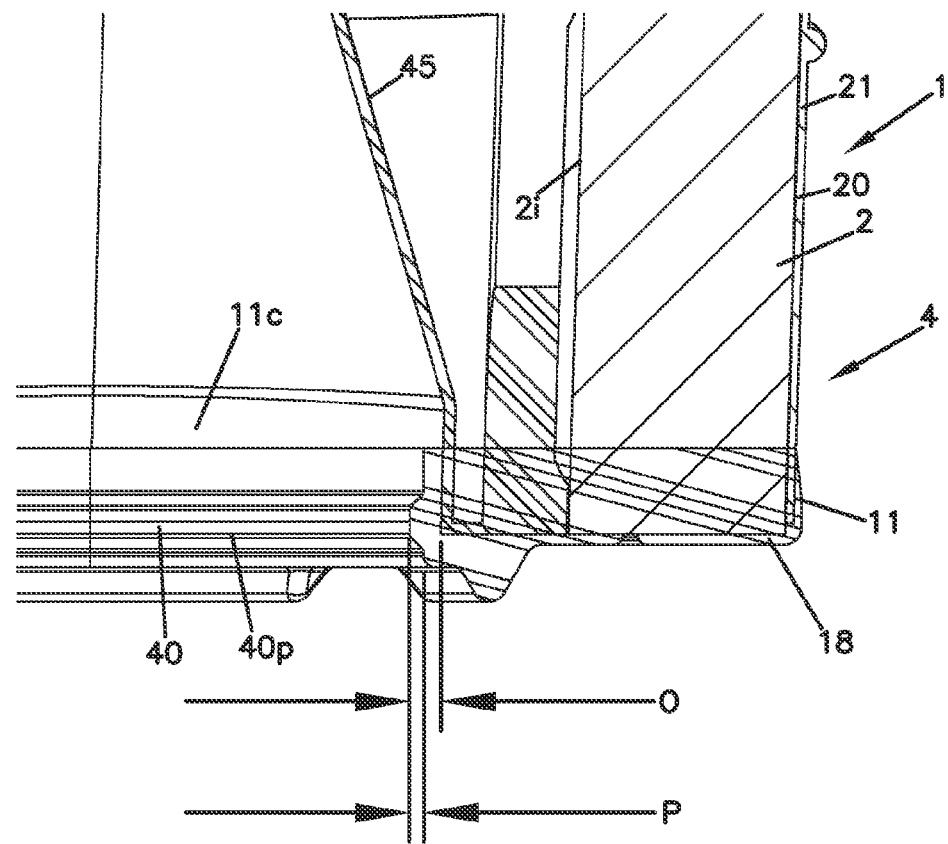
FIG. 6 is a schematic enlarged fragmentary cross-sectional view of an identified portion of the filter cartridge of FIG. 3.

Attention is directed to FIG. 5 and in particular to end piece 11. Positioned on end piece 11, and projecting toward the viewer, is a projection arrangement 27, in the example depicted comprising a plurality of spaced projections 27p. The projection arrangement 27 could alternatively be a continuous ring. The projections 27p operate similarly to projections 23, discussed above for end piece 10. That is, the projections 27p would typically be formed from a compressible material, for example from selected molded-in-place portions of end piece 11 are formed. These projections 27p will help cushion the cartridge 1 within the housing and take up tolerance variations.

From a comparison of FIGS. 3, 4 and 5, a characteristic of certain applications of the present invention will be understood. In particular, with media patterns eccentrically positioned, there will be at least one cross-section in which opposite perimeter edges of the media and/or liner will slant in the same general direction from end piece 11 toward end piece 10, with respect to the central axis of either end piece 11, 10. When the media is cylindrical with opposite ends eccentrically positioned, the cross-section of greater emphasis of this slant would be the cross-section taken through the projection centers of each end. Referring to FIG. 4, this would be a cross-section generally along a line from 4c to 3c, indicated by offset Z. The angle of this slant, for each opposite side of the cross-section, will typically be at least 0.3°, usually at least 0.6°, often at least 1°, usually no more than 10° and in a typical application will be within the range of 1°-10°, for example 1°-8°, inclusive.

It is not meant to be suggested that the amount of slant for the two opposite edges in this cross-section will be the same. There may be variations introduced, from pleat variations, for example.

Also, the media need not necessarily be cylindrical. For example, in some instances, even if the media is tapered, i.e. is somewhat conical, the appropriate cross-section will still show a slant in the same general direction of the opposite edges, in the appropriately chosen cross-section.

It is not meant to be suggested, however, that all cross-sections would show the slant. For example, a cross-section perpendicular to the direction between locations 4c, 3c, FIG. 4, would likely not show a slant at all or only a minimal one from a draft the angle, etc.

It is noted that the cross-section of FIG. 3 does show some slant, but it is not taken a maximal indication of slant, since it is not taken through a center of both end pieces.

F. Assembly of Cartridge 1; Additional Features

A variety of methods can be used to assemble a cartridge in accord with cartridge 1. In a typical approach, an extension of pleated media is made and positioned over a central liner or support 24. Typically end cap material is then molded-in-place on the separate ends. The end cap material will, typically, in the molding process, close pleat ends and will typically be configured to form housing engagement features such as a housing seal arrangement (for example, housing seal arrangement 35) and/or a second end housing engagement arrangement (for example second housing engagement arrangement 40).

Figure 7:
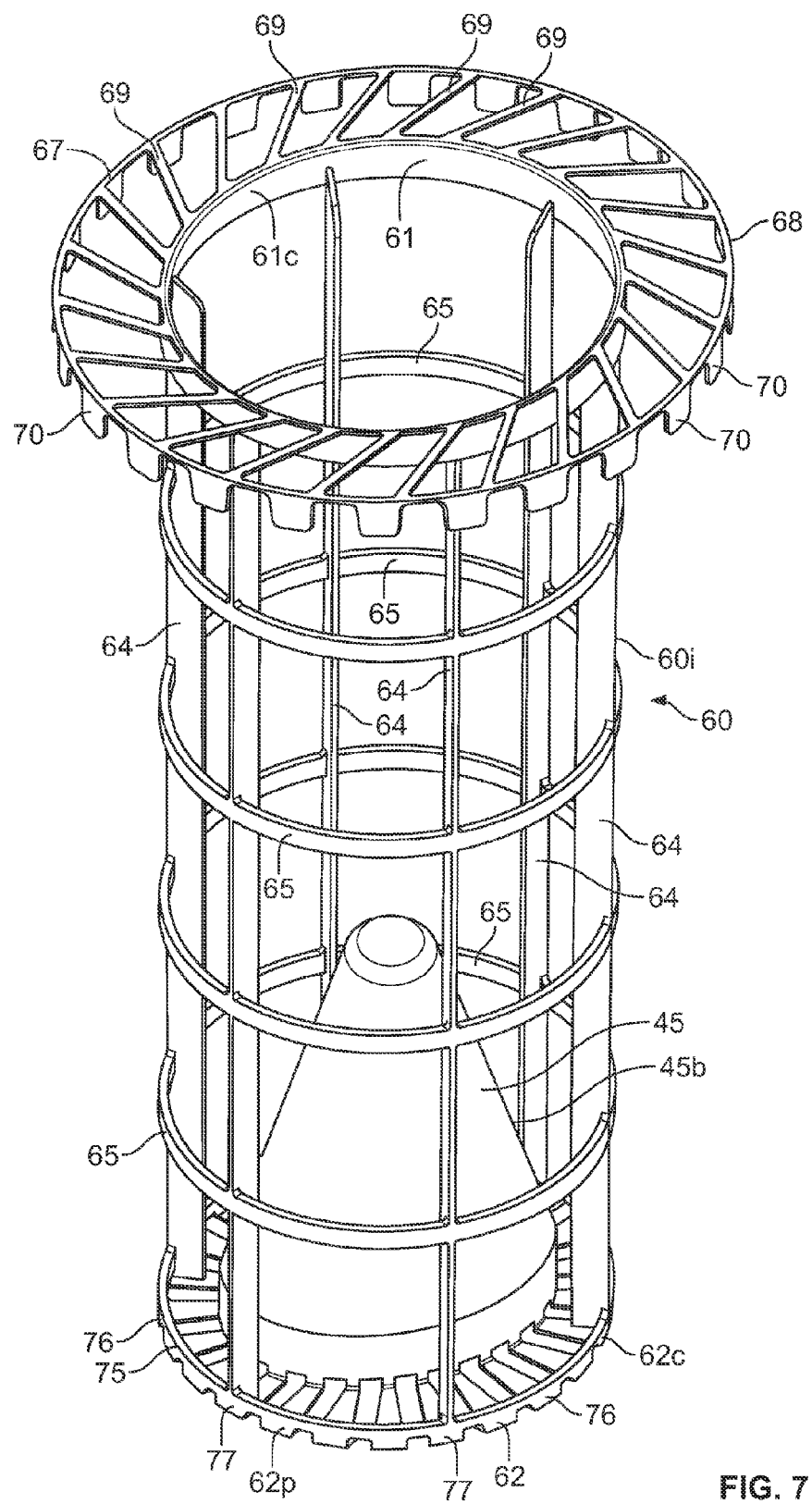
FIG. 7 is a schematic perspective view of a liner member or component useable in the assembly of the filter cartridge of FIG. 1.
Figure 8:
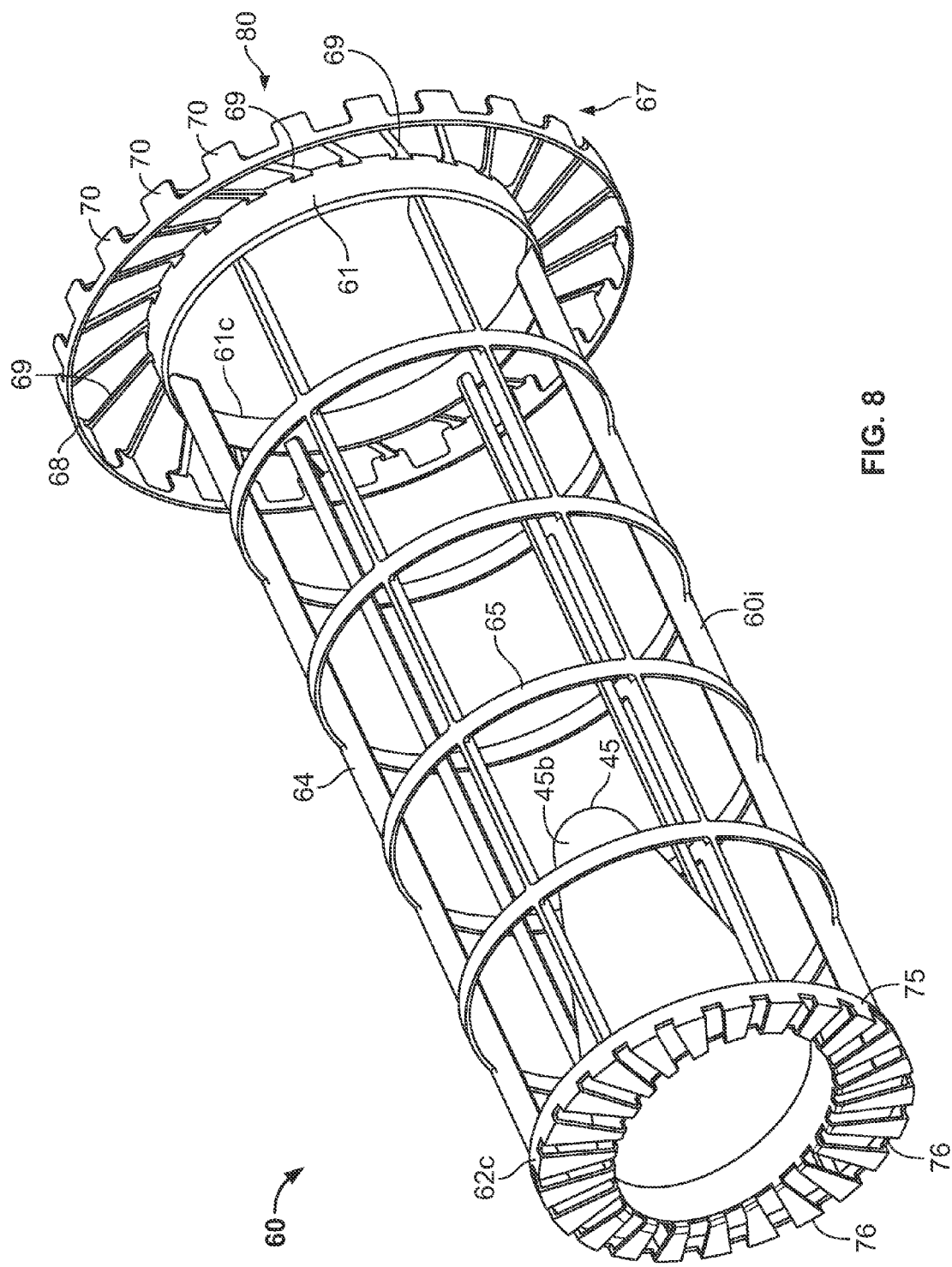
FIG. 8 is a schematic second perspective view of a modified version of the liner member or component of FIG. 7.
Figure 9:
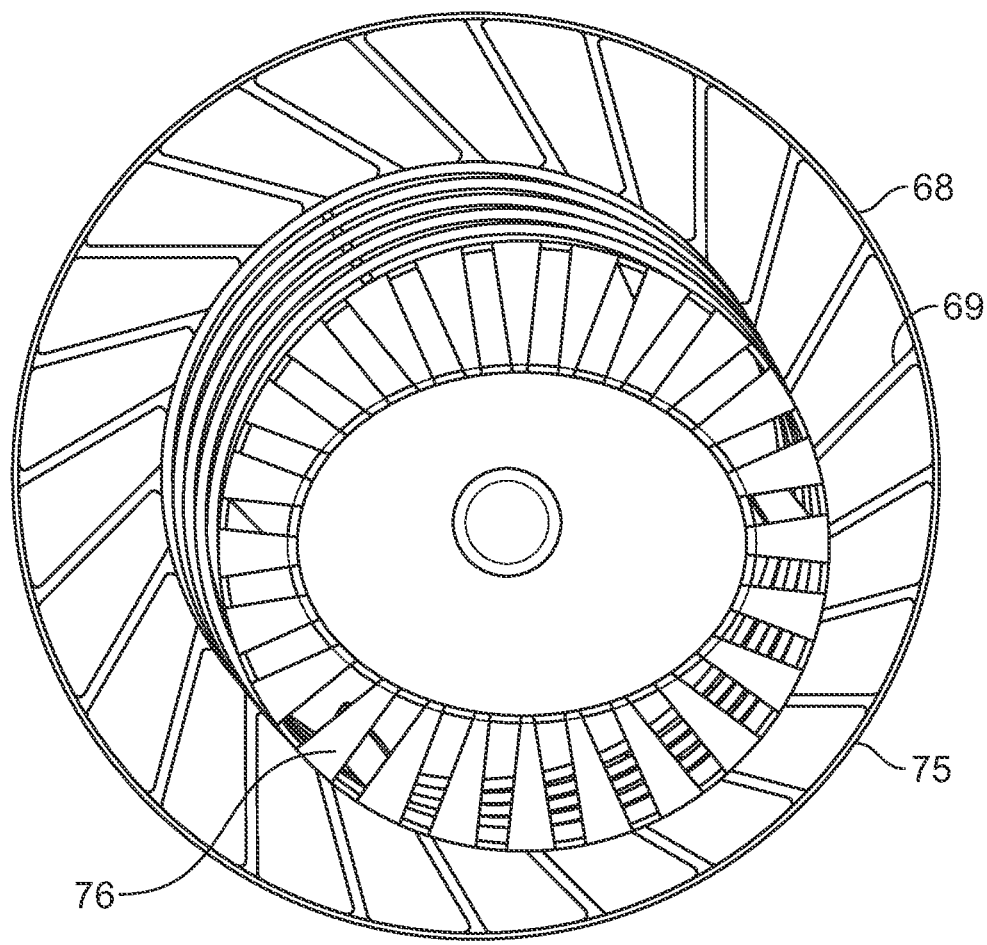
FIG. 9 is a schematic closed end view of the liner member or component of FIG. 8.

In general, when a process of the type characterized above is used, a typical component feature is the inner liner or support, typically preformed, i.e. provided before cartridge assembly. An example of a usable preformed inner liner or support is shown in FIG. 7. In FIGS. 8 and 9, an analogous support or preform (or preformed support) is shown, indicating certain optional variations discussed herein below in this section.

Figure 60:
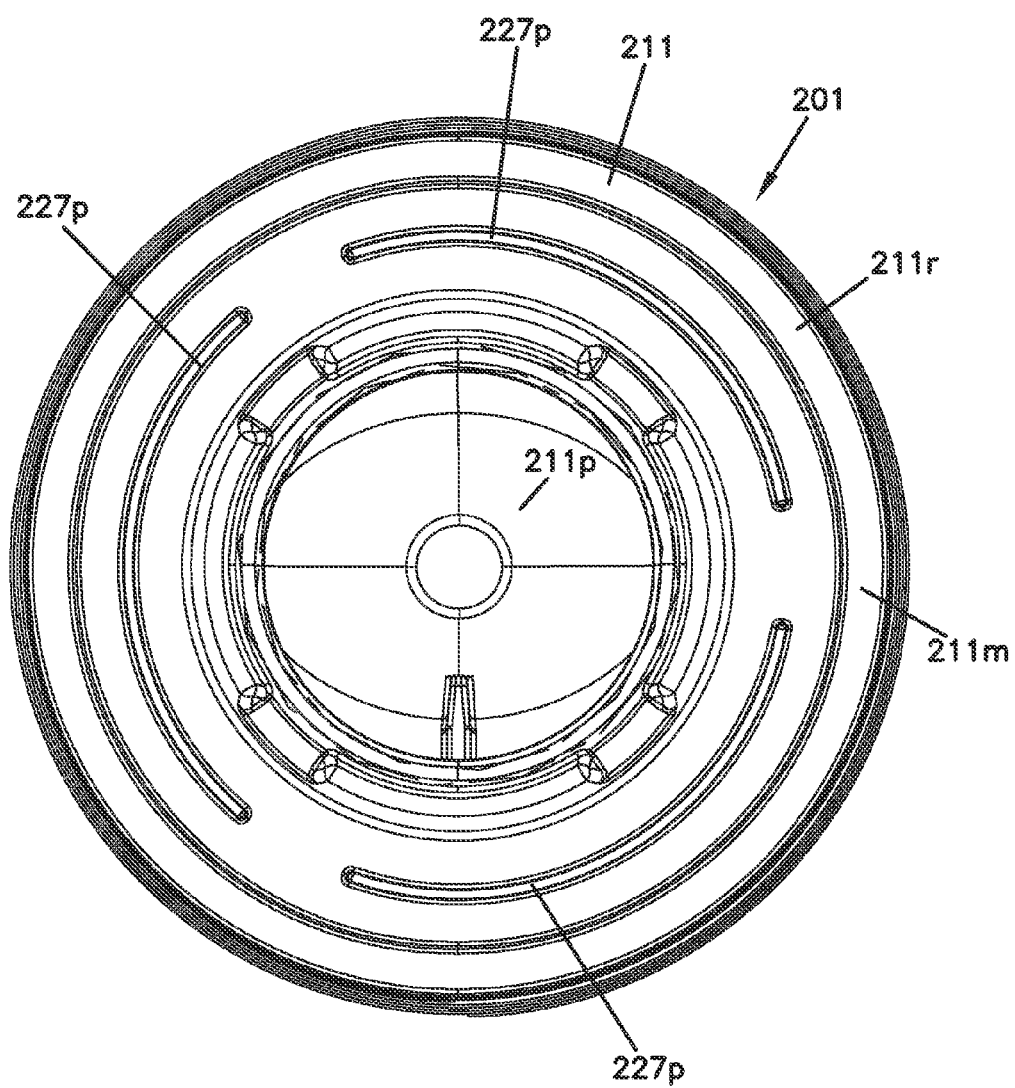
FIG. 60 is a schematic bottom view of the filter cartridge of FIG. 57.

Referring first to FIG. 7 at 60, a liner arrangement preform or construction usable in the construction of cartridge 1 is depicted schematically. In FIG. 60, the liner construction can be seen as comprising an internal or inner liner section 60i extending between opposite liner ends 61, 62. In general, the media 2 would be configured around internal liner 60i, in extension between the ends 61,62. End 61, for the liner arrangement 60, would be positioned at or within end piece 10, FIG. 1, and liner end 62 become positioned in or at end piece 11, FIG. 1.

Referring to FIG. 7, the inner liner section 60i is a porous section allowing for fluid flow (typically gas or air) therethrough in use. In the example depicted, section 60i comprises a plurality of longitudinal extensions or ribs 64 interconnected by lateral ribs 65. Although alternatives are possible, this is a particularly convenient arrangement when the liner arrangement 60 comprises molded plastic.

End 61 for the example depicted, includes an inner end or rim member 61c; and, end 62 defines an inner end or rim member 62c. In general, the two rims 61c, 62c, and the ribs 64 extending therebetween, are configured to define the extent of eccentricity desired for the media 2 when positioned around 60i. Thus, in the example depicted, the rim members 61c, 62c are eccentrically aligned as the term is used herein.

It is noted that for the example arrangement depicted, rim member 61c defines a circular pattern, and rim member 62c also defines a circular pattern. As a result, when an extension of media having a constant pleat depth is positioned around the inner liner section 60i, it will generally conform to a configuration having inner and outer pleat tips at each end 3, 4, defining a circular pattern. Also, the outer pleat tips will generally define a generally cylindrical pattern, if the longitudinal extensions 64 do not taper substantially in extension from one end to the other.

Such a configuration is typical for applications according to the present disclosure, but alternatives are possible. For example, one of the rims 61c, 62c, or both, can be configured in a non-circular pattern. Also, the longitudinal extensions 64 can be tapered, for example inwardly in extension toward end 62, to define a somewhat slanted (i.e. eccentric with respect to ends) conical pattern, if desired. Of course, still other shapes are also possible.

Still referring to FIG. 7, at end 61, liner structure 60 includes an (outer) perimeter rim 68 secured to inner perimeter rim 61 by spaced extensions 69. During assembly, the media 2, when positioned around inner liner section 60i, can be pushed toward end 61, until it abuts at least selected portions of extensions 69. It is noted that, for the example, the extensions 69 do not align with any diameter for rim 61 or rim 68. This is desirable (but not required in all applications) since it preferably prevents any of the extensions 69 from specifically aligning with the ends of any of the pleats when pleated media is used. This is advantageous as it avoids blinding off ends of the pleats in a molding process described further below.

Still referring to FIG. 7, it is noted that end member 67, comprising ring 61, outer rim 68 and extensions 69, includes thereon a plurality of optional perimeter tabs 70. The perimeter tabs 70 are spaced from one another, and is used, would be positioned around an outer perimeter of the media adjacent end 3p. The tabs 70 provide some support to the seal 36. That is, when the seal 36 is compressed radially inwardly during installation, the material forming the seal 36 will be backed up by the tabs 70, which provides selected/desired amount of resistance to the compression and not forced to the seal definition.

Herein, the end member 67, can be characterized as an end member of the support structure 60, that extends adjacent to and across a first end 3 of the media 2, at end piece 10.

In FIG. 7, attention is now directed to end member 75 at end 62. End member 75 has an outer perimeter or rim member 62p and inner receiver member 45. Optional extensions 76, spaced from one another, provide connection between receiver 45 and perimeter rim 62p. The spacing between extensions 76 allows for flow of resin during molding of end piece 11 as discussed below. It is noted that for the example depicted, member 45, as discussed above, is solid, i.e. non-porous. Thus, it is a closed member 45b.

Figure 45:
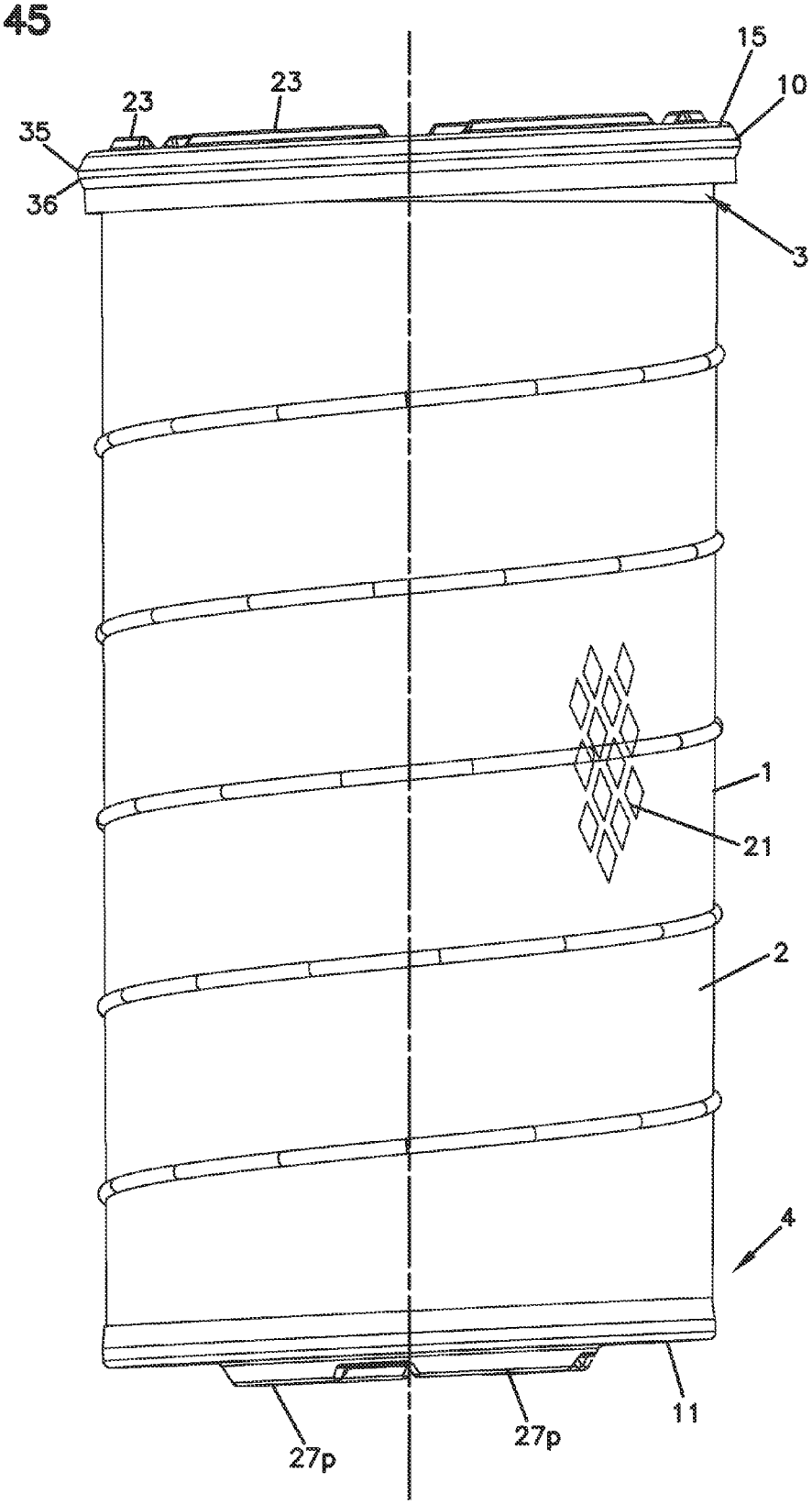
FIG. 45 is a schematic side elevational view of a filter cartridge installable in the air cleaner assembly of FIGS. 31 and 32.

Still referring to FIG. 45, it is noted that the extensions 76 turn before engagement with rim 62c to provide spaced projection ends 77 at perimeter 62p. Attention is now directed to FIG. 8. In FIG. 8, preform or liner arrangement 60 is depicted with an optional variation indicated at 80. In particular, spaced extensions 69 terminate at spaced tabs 70, which engage rim 68. Thus, a difference in the arrangements in FIG. 8 and FIG. 7 is merely that the optional tabs 70 do not depend from the rim in FIG. 8, rather the optional tabs 70 project upwardly from the rim and then each tab 70 engages an extension 69.

In general operation, the support of FIG. 7 and the support of FIG. 8 will operate similarly. The outer perimeter of the tabs 70 in FIG. 8 will be somewhat more rigid and less flexible in backing up the seal 36, however, in the final product.

In FIG. 9, an end view of the liner or liner support 60, FIG. 8 is depicted. One can see eccentric positioning between features at opposite ends.

In general, construction of a filter cartridge 1 using a preform, liner or support 60 of the type depicted in FIGS. 7-9 would be as follows. An extension of media 2 surrounding an open interior would be pushed over end 62 until it engages end 61. The media can be cylindrical or alternately configured. The media can be pleated, although alternatives are possible. The media inner perimeter will be sized to engage (surround) the inner rim 61c and mimic its shape. This will cause offset in the centers of the outer perimeters of the media at opposite ends 3, 4 of the type discussed above.

An optional outer liner, of course, can be provided at various stages. For example, it can be included around the media before the media is put over the liner 60. It could be positioned over a combination of the media and inner liner. Indeed, in some instances, it could be positioned over the otherwise completed cartridge.

Construction of the end pieces 10, 11 needs to be completed. There is no specific requirement of the order in which these end pieces are completed.

As an example, for this description it will be assumed that the process used involves completing construction of end piece 10 first. This can be done, for example, by positioning a portion of a combination of media 2 and support 60 (typically with an outer liner if used) in a mold of appropriate size and shape for molding selected molded-in-place features of the end piece 10. Appropriate resin material can be provided in the mold for molding the remainder of the end piece 10 in place. Typically, the molding will be an open mold process, allowing for portions of the media 2 and liner structure 60 to project outwardly (upwardly) from the mold.

A variety of materials can be used for the resin. Typically, the resin will be chosen from materials of appropriate physical and chemical properties for the intended use. Molded-in-place end cap materials formed from polyurethane of the type chosen for various other types of end caps having radial seals thereon will be typical. An example will be two-part polyurethane of the type characterized in U.S. Pat. No. 7,070,642. A typical material will be molded to an as molded density of no greater than 450 kg/m$^3$, typically no greater than 355 kg/cm$^3$ often no greater than 290 kg/cm$^3$ and usually within the range of 190-300 kg/cm$^3$, for example 208-275 kg/cm$^3$. It will typically be molded to a hardness, Shore A, of no greater than 30 and typically no greater than 22, usually no greater than 20 and often within the range of 10-18, inclusive. Such materials are well known and have been used in the molding of end caps previously, such as for example as described in U.S. Pat. No. 8,216,335

The mold can be configured appropriately to form radial seal section 36 in a convenient manner, in the same molding operation that closes the end of the media 2 by embedding the media within the molded-in-place material and closing all portions of the end cap 11, except for central aperture 16 to gas flow therethrough. The opposite end piece 11c an be generated in an analogous manner by positioning end 4 of the media and end structure 62 in the mold. An analogous resin material can be used for molded-in-place portions of second end piece 11 if desired. It can simultaneously form the second or bottom end housing engagement feature 40, by mold features included in the mold.

In the next section, an air cleaner assembly is described using a cartridge 1 of the type depicted in FIGS. 1-6 and constructed using a liner of the types of FIGS. 7-9.

II. An Example Air Cleaner Assembly

A. General Air Cleaner Features, FIGS. 10-15

In FIGS. 10-15, an example air cleaner assembly, using a cartridge 1 in accord with FIGS. 1-6, is shown provided with selected internal engagement arrangements.

Figure 10:
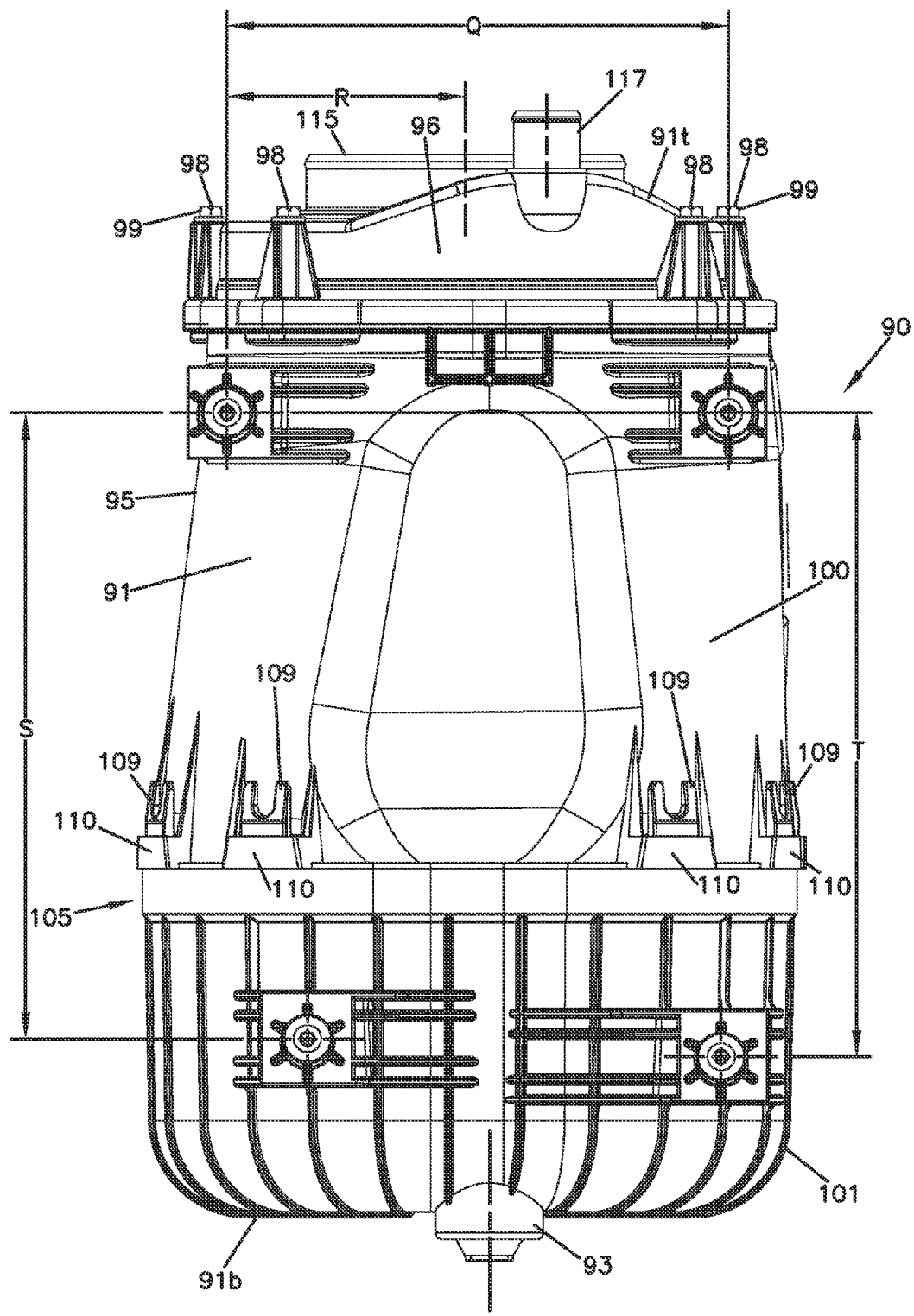
FIG. 10 is a schematic side elevational view of an air cleaner assembly with which the filter cartridge of FIG. 1 is useable.

Referring first to FIG. 10, at 90, an air cleaner assembly according to the present disclosure is provided. The air cleaner assembly 90 includes a housing 91 defining an interior. Within in the interior, cartridge 1 would typically be operably positioned for use.

The particular air cleaner 90 depicted is configured with a housing 91 that would be oriented with a long dimension extending generally vertically, in use. Principles of the present application are particularly well adapted for such a use. However alternate orientations of housings are possible with selected applications of techniques described herein. Still referring to FIG. 10, as a result of the orientation, housing 91 has a first (top) end 91t and a second, opposite, (bottom) end 91b.

Still referring to FIG. 10 (bottom) end 91b is typically provided with an optional evacuator arrangement 93 therein, from which, for example, liquid (typically water) collected within an interior of housing 91 can be ejected during use. Also in some instances, some particulate material drawn into the assembly 90 can be evacuated through evacuator assembly 93. Such evacuator assemblies are well known and have been widely used in air cleaner assemblies. Generally, such evacuator assemblies comprise an appropriately sized, positioned and oriented port over which is fitted an evacuator valve that can periodically open to release collected material such as water.

In a typical assembly, configured for "out-to-in flow" during filtration, the evacuator arrangement 93 is in direct flow communication with an unfiltered air annular surrounding an installed filter cartridge in use. By this it is meant that flow from an air cleaner inlet to the evacuator arrangement 93 can occur, without that flow passing through the filter media of the filter cartridge. This will be typical and preferred, when the evacuator arrangement 93 is configured to allow water, for example, to drain from the assembly.

As indicated previously, the principles described herein are developed for implementation with air cleaner assemblies in which the filter cartridge, for example cartridge 1, is a service component. That is, the cartridge 1 is removable, from and replaceable in, the air cleaner housing 91 as may be desired for operational lifetime of the air cleaner 90. To account for this, the housing 91 generally includes a body or body portion 95 and a removable access cover portion 96. During servicing, or other removal/installation operation involving the cartridge 1, the access cover 96 is removed from the lower body 95, allowing access to the internally received cartridge 1. After servicing or other operation, the access cover 96 is then replaced on the body part 95, where the cartridge is appropriately positioned. For the example air cleaner assembly 90 depicted, the access cover 96 is secured to the body part 91 by fasteners 98, in the example comprising bolts 99. Alternate types of fastener arrangements (for example over center latches) can be used, however.

It is noted that in the example depicted, the air flow outlet is located at a top of the housing. While this will be typical in many instances, alternatives are possible. Indeed, the outlet can even be positioned in a bottom of the housing, if desired. Similarly, the access cover, depicted in the example as being at the top of the housing, can be alternately positioned, for example at the bottom of the housing.

For the example air cleaner assembly 90 depicted, the housing main body 95 is constructed in two separate sections that are secured to one another after formation. The two sections are indicated by housing body central section 100 and housing body (closed) end section 101. In the example, the evacuator arrangement 93 is positioned in the housing body (closed) end section 101.

A joint between the sections 100, 101 is indicated at 105. For the particular assembly 90 depicted, the joint 105 is a snap-fit arrangement with projections 109 on section 101 snap-fit into holders 110 on section 100. Alternatives are possible. In the example, the joint 105 is configured and made such that once assembled, section 101 cannot be readily disconnected from section 100. In some applications, in the techniques described herein, the bottom section 101 can be removably secured to the central section 100. This could be advantageous, when it is desired to allow servicing or service access to the cartridge from the bottom.

Still referring to FIG. 10, for the example air cleaner assembly 90 depicted, an outlet 115 for a filtered flow from the air cleaner 90, is indicated on the housing 91. In the particular example depicted, the outlet 115 is positioned in the access cover 96. This will be typical for many applications of the techniques described herein.

Still referring to FIG. 10, attention is directed to tap or conduit 117. Tap or conduit 117 can be used to direct a portion of air flow to a desired location or it can be used to bring gas flow from other structures into an outlet end of housing 91; and/or it can be used to connect a pressure monitor (restriction indicator) or other equipment to the housing 91.

Figure 11:
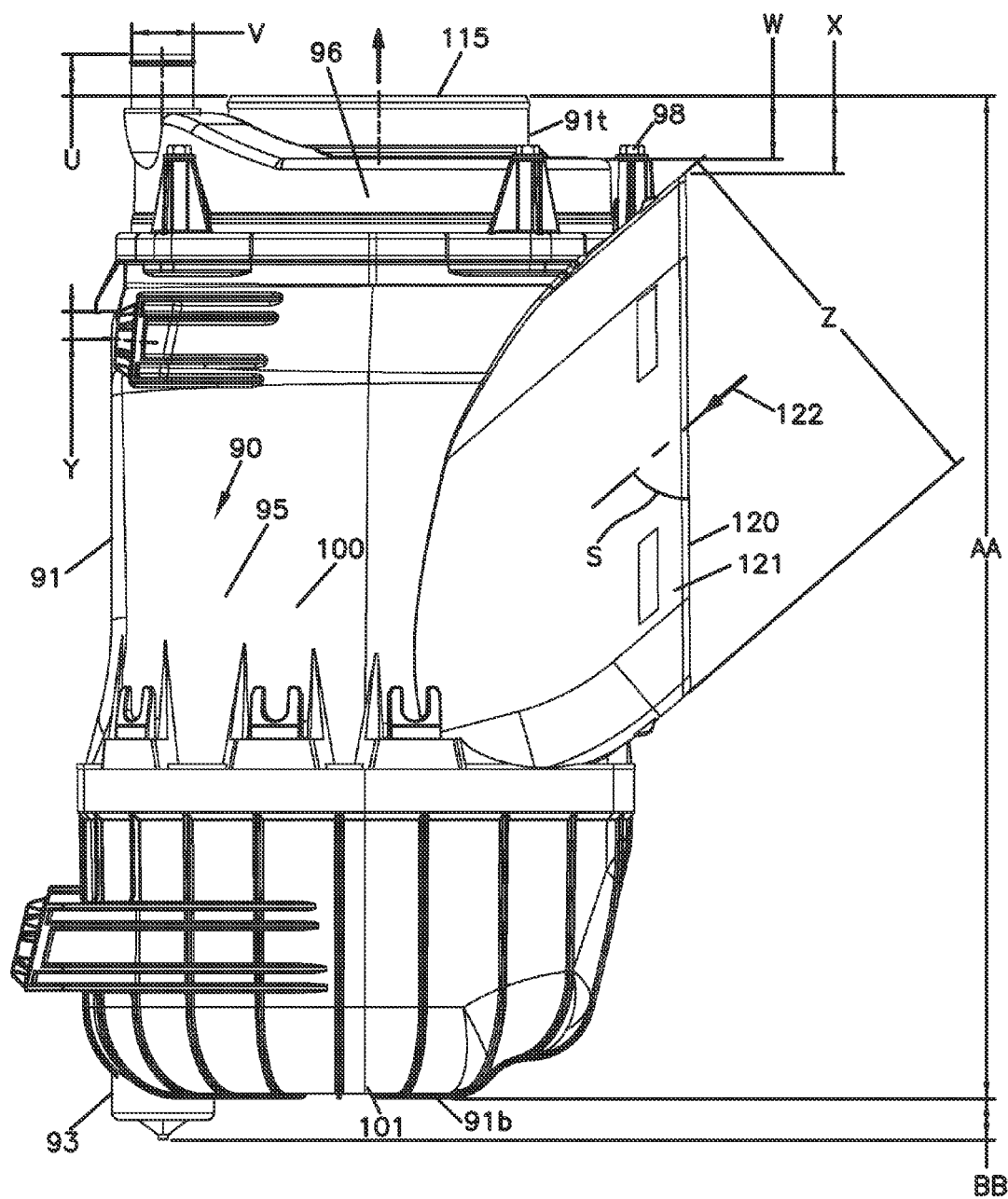
FIG. 11 is a schematic second side elevational view of the air cleaner assembly of FIG. 10.

Attention is now directed to FIG. 11, a second side elevational view of air cleaner assembly 90. The view of FIG. 11 is generally taken from the right of the orientation shown in FIG. 10. Like reference numerals indicate features previously characterized. In FIG. 11, inlet 120, for gas (typically air) to be filtered, is indicated. It is noted that the particular inlet 120 is a slanted, tangential, inlet 121, although alternatives are possible. By tangential, it is meant that the inlet 120 is configured to direct air flow into an interior of the housing 91 in a direction generally tangential (i.e. not toward a center or central axis thereof) and into a cyclonic pattern around an interiorly received cartridge. By "slanted" in this context, it is meant that the inlet 120 is configured to direct the inlet air more toward one or the other of the ends 91$t$, 91$b$, in this instance toward end 91$b$, i.e. the bottom of the air cleaner housing 91 in use. Thus, the incoming air is directed into a cyclonic pattern to help remove the water and particulate material carried therein, by centrifugal separation, to be directed toward optional evacuator outlet 115. In FIG. 11, arrow 122 indicates the general direction of inlet flow.

It is noted that in many instances, the slant can be defined by a slant angle. The slant angle would be an acute angle, for example, as in FIG. 11, between a center line direction of the inlet 120, and a direction parallel to a shortest direction between the ends 91$t$, 91$b$. This angle, indicated at S, will typically be at least 30°, usually at least 40°, and often within the range of 45°-65° (or 45°-70°) inclusive, a typical example being within the range of 48°-65°, inclusive.

Figure 12:
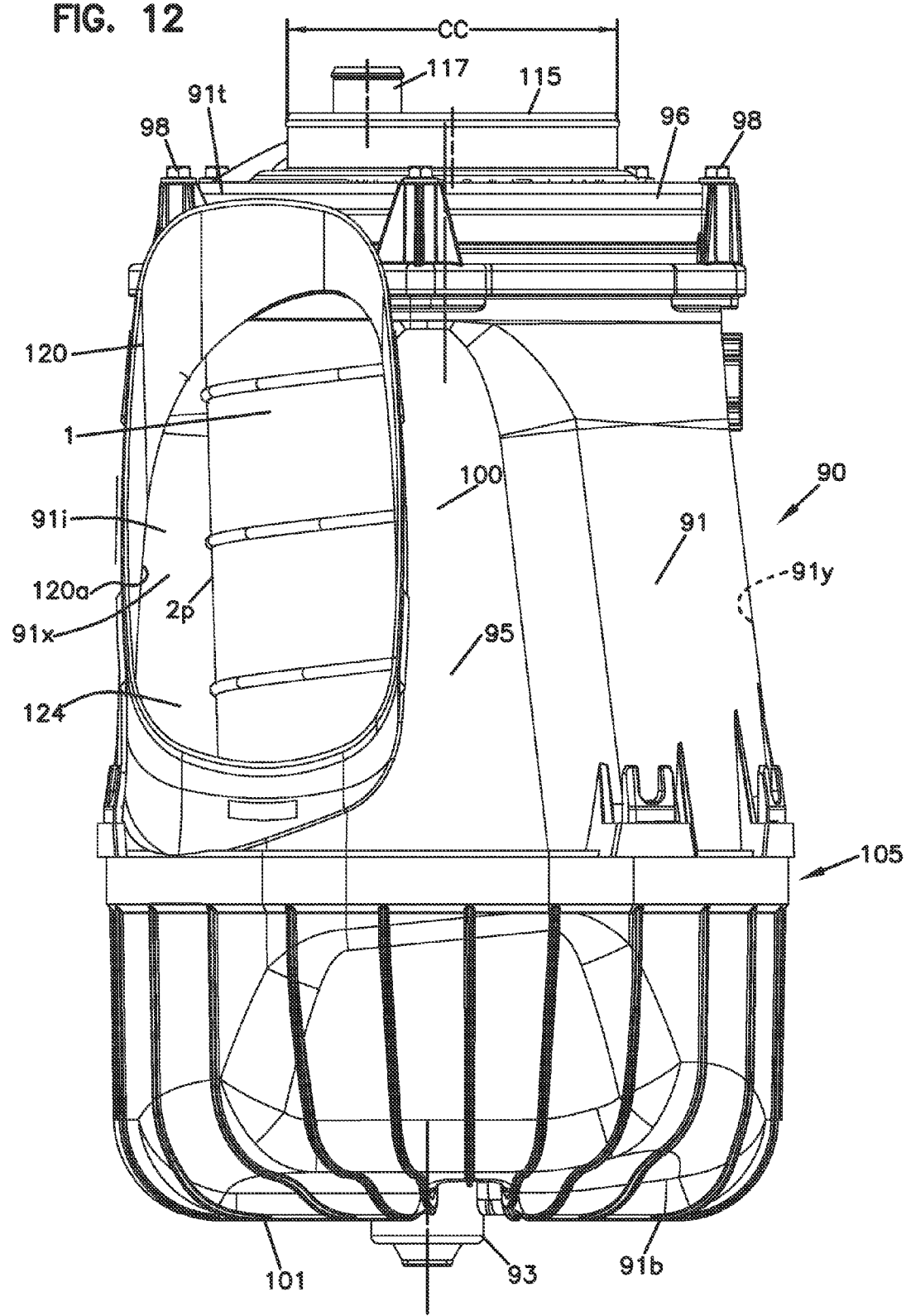
FIG. 12 is a schematic third side elevational view of the air cleaner assembly of FIG. 10.

In FIG. 12, another side elevational view of air cleaner assembly 90 is depicted. Here, the view is toward the air flow inlet 120 and one can see a portion of cartridge 1 through an inlet aperture 120$a$ of inlet 120.

From a review of FIG. 12, one can understand that the cartridge 1 is oriented such that it slants at an outer perimeter 2$p$ away from a first, inner, sidewall section or portion 91$x$ of housing 91 where air is directed from inlet 120 around the cartridge 1, as the media 2 extends from a region adjacent upper end 91$t$ toward bottom 91$b$. That is, an annulus 124 around the cartridge 1 is not constant in shape, from a cartridge end adjacent top 91$t$ to bottom 91$b$. Rather, the annulus 124 widens in lower portions. In the example the annulus 124 will be understood to widen in regions where air is immediately directed into the housing 91$i$ from inlet 120. Cartridge and air cleaner features which allow for this, and advantages which result from it, are discussed further below.

Still referring to FIG. 12, when the cartridge is configured as cartridge 1, with a generally cylindrical media 2, typically the media 2 will be such that a first perimeter portion edge adjacent housing 91$x$ slants away from the first housing section 91$x$, as it extends from the first end piece 10 toward the second end piece 11; and, is such that a perimeter portion or edge opposite that first portion or edge also slants away from internal section 91$x$ as it extends toward end piece 11 and housing bottom 101.

The slanting characterized in the previous paragraph, with respect to the media edge or first portion (and an opposite media edge portion) slanting away from the housing sidewall, in extension from the first end piece toward the second end piece, is meant to be "independently" of the shape of the sidewall portion in the region (adjacent the media edge or first portion) into which the inlet air is directed. By "independently" in this context, it is meant that the slanting characterized is the result of the media configuration, and is independent of the sidewall configuration. Thus, the sidewall could be slanted toward the cartridge, away from the cartridge, be irregularly configured, or be generally perpendicular to end pieces of the cartridge, with a slanting definition to the media still being as characterized.

For example, and referring to FIG. 12, at region 91$y$, the housing slants as it extends toward housing bottom 101 more so than it does at region 91$x$.

In addition, while referring to FIG. 12, it can be understood that the definition of the inlet 120 for the example depicted, is non-circular. Rather, the inlet 120 has a shape or rim definition that is longest in a dimension generally corresponding to direction from top 91$t$ to bottom 91$b$ and narrowest in a direction perpendicular to that (vertical in use) direction. Typically a ratio of the vertical or longest dimension to the mid-dimension perpendicular to that largest dimension is at least 1.3:1 typically at least 1.4:1, for example, within the range of 1.5:1 to 3:1, inclusive (for example 1.5:1-2.3:1, inclusive). Advantages from such a shape of the inlet definition are also discussed herein below. Herein, the mid-dimension is a dimension perpendicular to the longest dimension and taken at a mid-point of the longest dimension.

Figure 13:
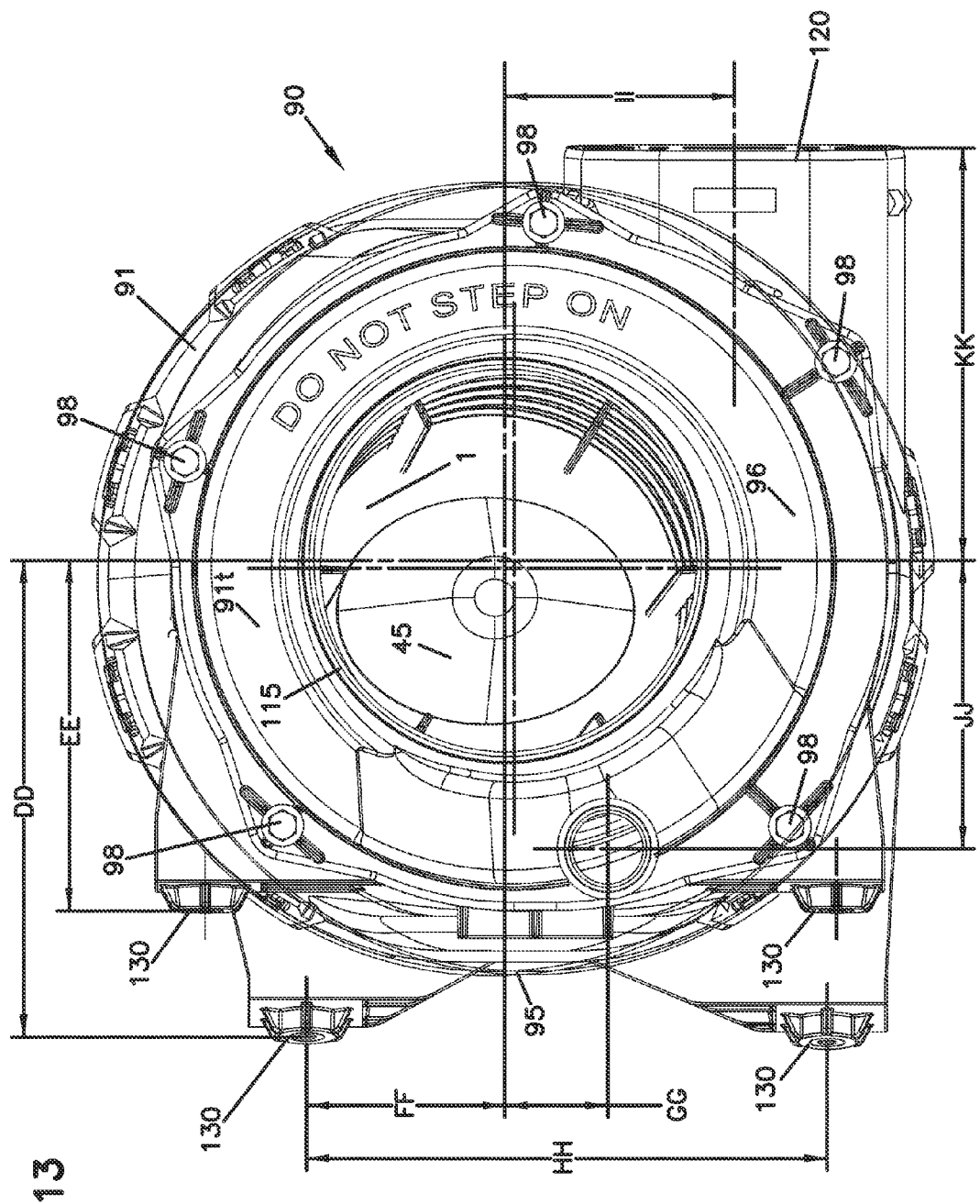
FIG. 13 is a schematic outlet end view of the air cleaner assembly of FIG. 10-12.

Attention is now directed to FIG. 13. In FIG. 13, a top plan view of the air cleaner assembly 90 is depicted. One can view portions of the cartridge 1 through the outlet 115. Also, in FIG. 13, mounting pads 130 facilitating mounting of the air cleaner assembly 90 on a vehicle or other equipment in use, are shown. Typically, the mounting pads 130 are provided on the housing body 95, so that the access cover 96 is free to be more easily removed during servicing. If the bottom 101 is also intended to be removable from the center 100, to allow for servicing from the bottom, then typically all of the mounting pads 130 will be positioned on the housing central section 100.

Figure 14:
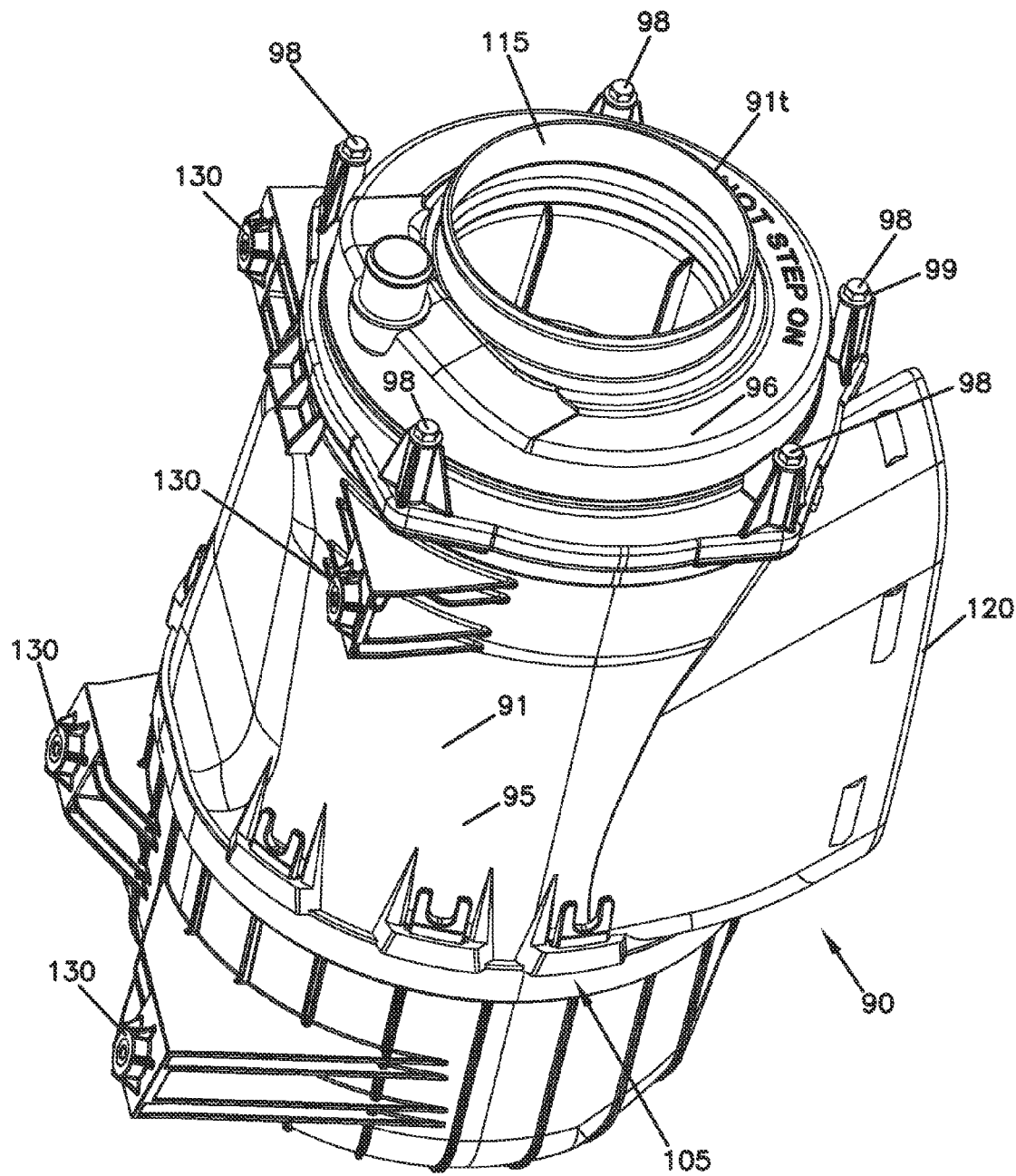
FIG. 14 is a schematic outlet end perspective view of the air cleaner assembly of FIGS. 10-13.

In FIG. 14, a perspective view of air cleaner assembly 90 is provided with features previously indicated identified by like reference numerals.

Figure 15:
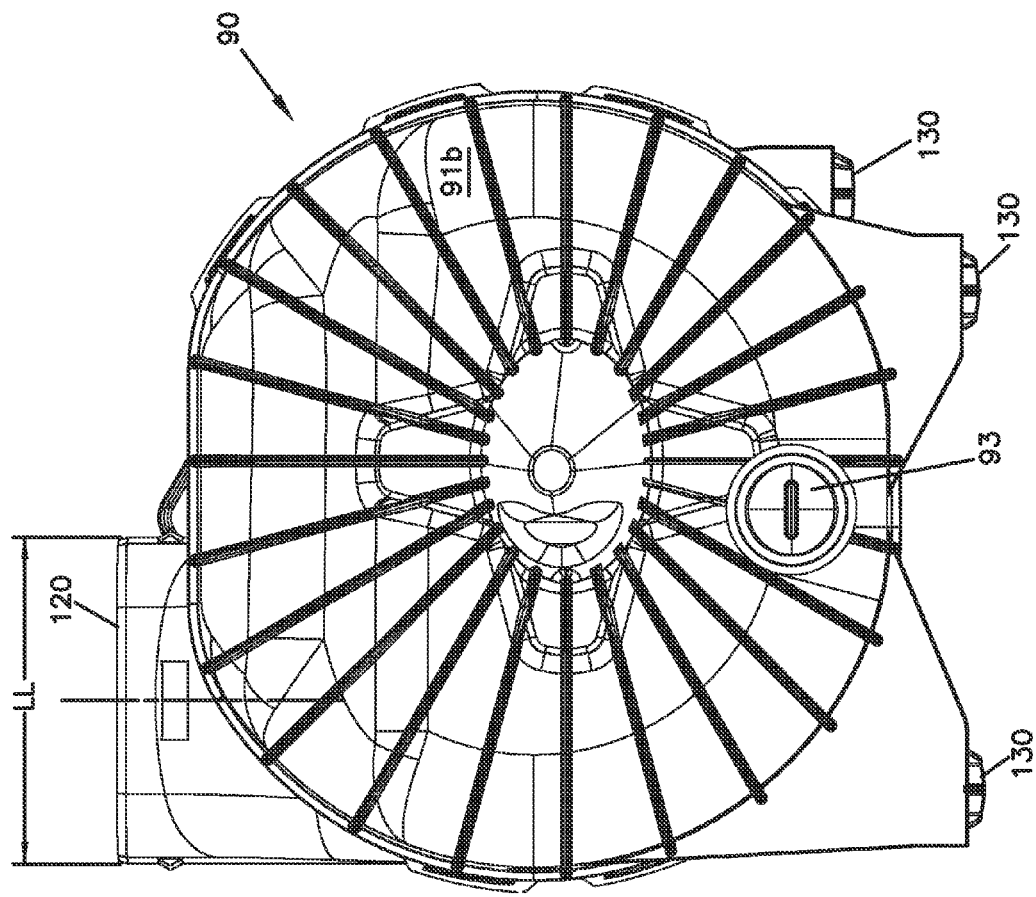
FIG. 15 is a schematic bottom plan view of the air cleaner assembly of FIGS. 10-14.

In FIG. 15, a bottom plan view of the air cleaner assembly 90 is provided.

B. Selected Features of Engagement Between the Cartridge 1 and the Housing 91

In air cleaner assembly 90, the internally received filter cartridge 1 is generally positioned within the housing interior 91i, with opposite end sections of the cartridge 1 in engagement with the housing 91. The particular cartridge 1 depicted and described herein, is removably secured at the first end piece 10 to the access cover 96 by a seal arrangement. This seal arrangement is generally referred to as a housing seal arrangement and is what prevents air from inlet 120 that has not been filtered, from reaching outlet 115. At end 11, engagement between the housing engagement 40 and the housing body section 95 is also desirable, in part to ensure that the cartridge 1 remains appropriately oriented during installation and use.

Figure 16:
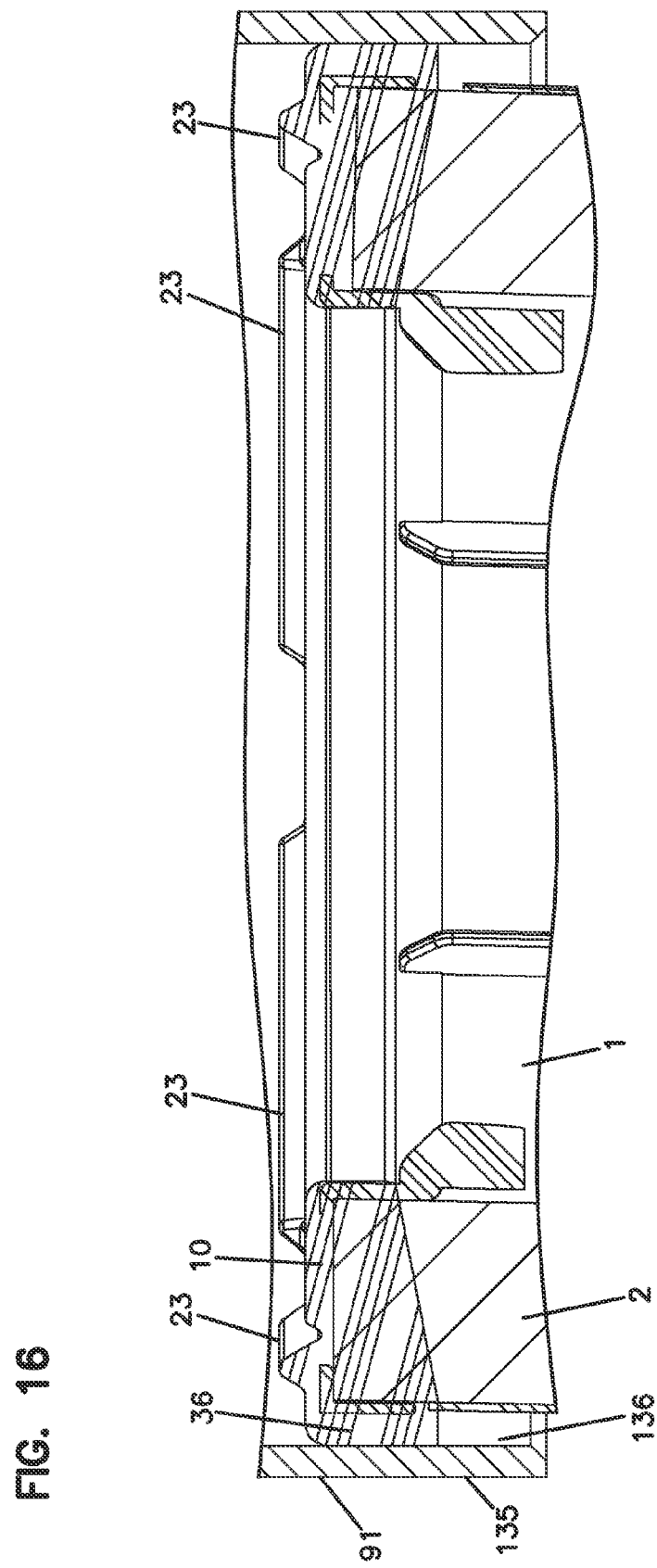
FIG. 16 is a schematic fragmentary cross-sectional view depicting a portion of a filter cartridge in accord with FIGS. 1-3 in sealing engagement with a portion of an air cleaner assembly.
Figure 117:
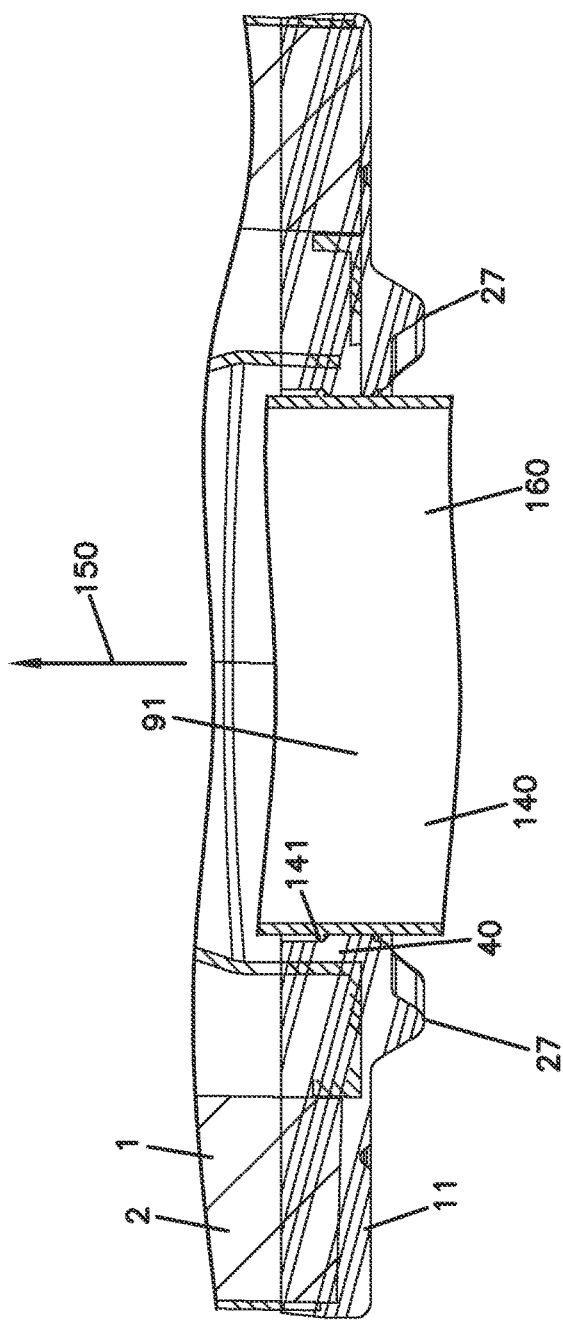

In FIG. 16, engagement of a cartridge end piece 10 and a portion of the housing 91, for an example system as shown, is depicted schematically. Referring to FIG. 16, a schematic fragmentary view of the cartridge 1 adjacent end cap 10 is depicted. At 135, a sealing flange is shown surrounding end piece 10. The sealing flange 135 would typically be positioned on a portion of the housing, for example on the access cover 96. It is noted that in this instance, the sealing flange 135 includes an inner seal surface 136, which is engaged by seal member 36 on the cartridge 1 in a sealing manner. This typically occurs as the access cover 96 is pushed downwardly onto body section 95, with a cartridge 1 already positioned in the body section 95. It is noted that in FIG. 16, the schematic depiction is meant to indicate how sealing would occur between the portion 136 in the housing, and end piece 10. The figure is not meant to indicate other engagements that may have occurred during installation, for example between projections 23 and a portion of the housing.

In FIG. 17, a typical selected engagement between end piece 11 and a portion of the housing 91 is depicted in fragmentary cross-sectional view. Referring to FIG. 17, at 140, an engagement projection positioned in the housing 91 is depicted schematically. The engagement projection 140 (or projection 160) of housing 91 is positioned such that housing engagement arrangement 40 will properly engage it, when the cartridge 1 is installed. Projection 140 (or 160) is positioned in body section 95, typically bottom 101. Of course, a seal can be formed at this location, but again a seal is not required in an example in which the end piece 11 is closed.

Referring to FIG. 17, attention is directed to optional interference projection member 141 on projection 140 (or 160). The optional interference projection or member 141 is positioned so that when the end piece 11 is pushed over engagement arrangement 140, the projection arrangement 40 on the end piece 11 pushes into, and in some instances, past member 141. The result is that interference projection 141 will provide additional resistance to the cartridge 1 being separated from projection member 140 (or 160) by movement in the direction of arrow 150. Advantages from this will be discussed below.

Figure 18:
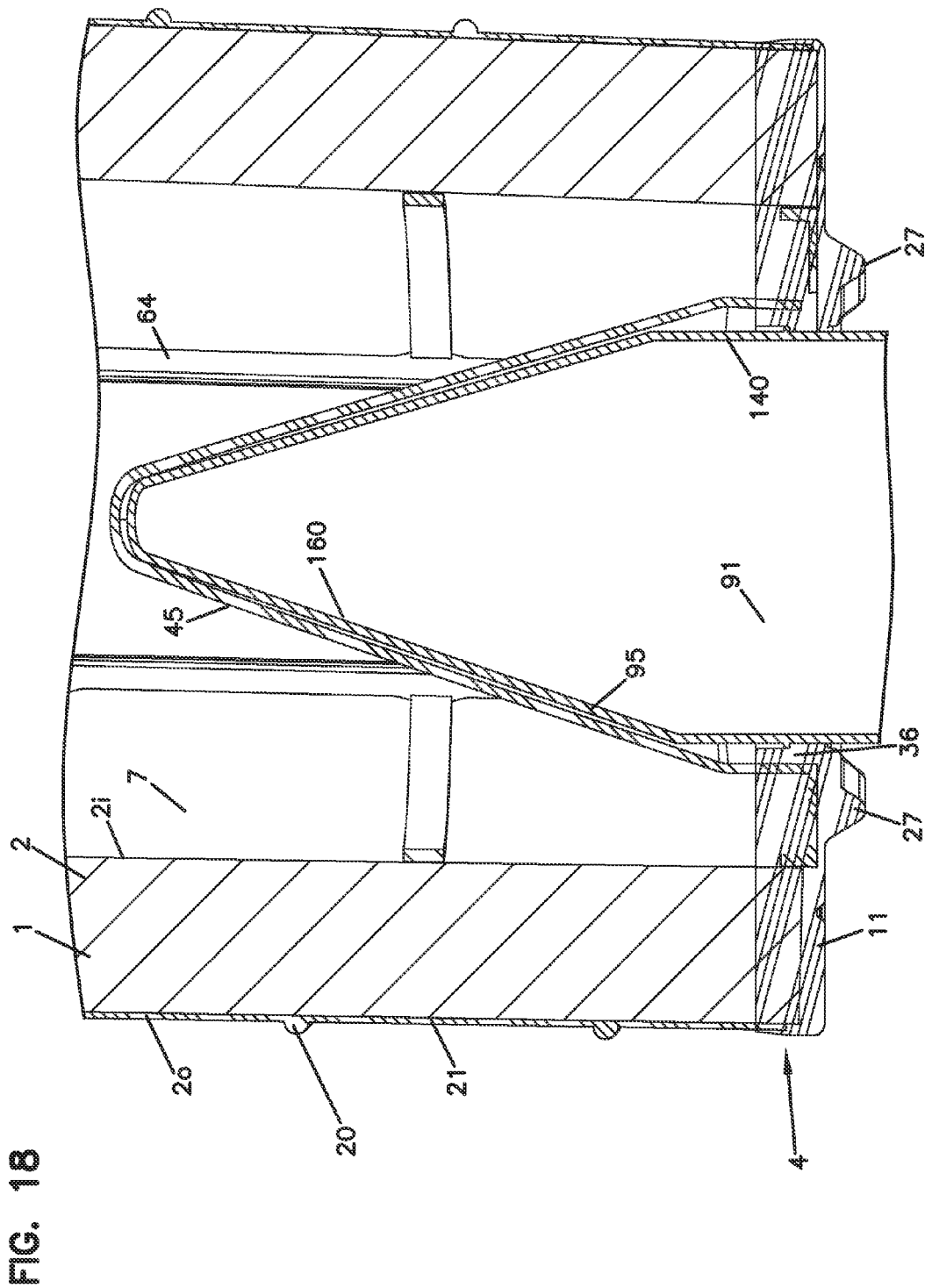
FIG. 18 is a schematic fragmentary cross-sectional view analogous to FIG. 17, and showing additional portions of the filter cartridge and air cleaner assembly.

In FIG. 18, a second schematic cross-sectional view analogous to FIG. 17, but showing more portions of the cartridge 1 and projection 140 (or 160) are depicted. Here, receiver projection 45 is shown fit over a guide projection 160 in the housing 91, i.e. guide projection 160 extends into a receiver recess defined by projection 45. It can be understood that as the cartridge 1 is lowered into the housing 91, alignment between the projection 160 and the receiver 145 will help orient the cartridge 1 (during further lowering) into proper rotational and longitudinal orientation, i.e. into proper engagement with the housing. Further, relating to this is discussed below.

Typically, the projection 160 and receiver recess defined by the projection 45 are selected such that the projection 160 extends into the receiver recess a distance of at least 50% of the length of the receiver recess, preferably 60% of this length, and most preferably at least 80% of this length. Also, typically, the amount of projection is at least 40 mm, typically at least 80 mm and in some instances 100 mm or more.

Referring to FIGS. 17 and 18, it is noted that the schematic figures are meant to only indicate certain select engagements between the cartridge 1 and the housing 91, as described. It is not meant to be suggested that all possible engagements are depicted. For example, there could be engagements involving other projections at bottom 101.

C. Optional Provision of a Separation Differential Between Ability to Separate the Access Cover from First End Piece 10; and, Ability to Separate the Cartridge 1 from Projection 140 (i.e. the Housing Body 95)

Typically, especially when the assembly is used in the orientation as depicted in FIG. 12, it will be preferred that it be easier to separate the access cover 96 from the cartridge first end piece 10, than it is to separate the cartridge 1 from the housing body 95, during servicing. A reason for this is that (because) servicing typically involves lifting the access cover 96 upwardly away from the cartridge 1, it is preferred that the cartridge 1 not be pulled out of the housing 91 during this operation. In some instances, this can be managed simply by relying on the weight of the cartridge 1 to make it likely that as the access cover 96 is lifted, the cartridge 1 will tend to stay in place. However, in some instances, it may be desirable to optionally provide for an increase in resistance to separation between the engagement arrangement 40 (i.e. the cartridge 1) and the housing 91 relative to resistance to the separation of the housing seal 36 from the access cover 96.

An optional manner in which this can be accomplished is through use of an interference projection arrangement such as projection arrangement 141 discussed above. Other manners relate to configuring the materials of the end cap 11 in the region of the housing engagement 40 such that greater pressure of engagement occurs; or, such that more force is required to separate region 40 from projection 140.

Also, the access cover 96 is typically and preferably configured so that once removed, a portion of the cartridge 1, adjacent end piece 11, will project upwardly (typically 10-60 mm) out of the housing body portion 95 facilitating grasping with the cartridge 1 at this location for removal from housing body 1.

D. Use of a Projection/Receiver Arrangement to Facilitate Proper Orientation of the Cartridge 1 within the Housing Body 95, During Assembly As is discussed in more detail below, an eccentric configuration of the cartridge 1 is useful in part to provide for preferred air flow characteristics in the annulus 124 surrounding the cartridge in association with the inlet 120.

When the cartridge 1 is appropriately eccentric to provide for this advantage, it is desirable to ensure that the cartridge 1 is appropriately oriented when positioned in the housing body 95 to obtain this advantage.

Secured and desired orientation in the cartridge 1 relative to the housing body 95 is preferably provided by an optional projection/receiver arrangement, for example one that includes the receiver guide member or receiver 45 on the cartridge 1, engaging a guide projection 160 in the housing body 95, as generally shown in FIG. 18. This can be accomplished by providing for an appropriate shape of the two, to ensure that an appropriate radial alignment is needed, for installation to occur.

For example, as referenced above, and as viewable in FIG. 4, the projection 45 (and receiver recess) can be provided with a non-circular cross-sectional shape, in the example shown an oval cross-sectional shape that tapers as it extends upwardly. An analogous mating shape to the projection 160 in a housing body 95, FIG. 18 can be used. When this is the case, only two theoretical rotational orientations between the cartridge 1 and the projection 160 housing body 95 are possible. In one, the cartridge 1 could be fully lowered into (i.e. installed in) the housing. In the other, due to the eccentricity of the cartridge 1, as lowering is initiated, interference would often occur, preventing or inhibiting the cartridge 1 from being fully installed.

Of course, in alternative configurations the shape of one or both of the receiver 45 and projection 160 can be chosen so that only a single rotational engagement orientation between the two is possible, facilitating, even further, desired rotational orientation to cartridge 1 relative to the housing body 95 during installation. This can be done, for example, by using a shape for one or both that can only fully engage the other in one orientation. An example would be to distort the oval configurations depicted along one long side, to flatten or straighten them out somewhat. Alternates are possible.

It is also noted that a resistive engagement member 40 in the cartridge 1 at the end cap 11, can facilitate retaining the cartridge 1 in proper orientation before the access cover 96 is installed, and after the access cover 96 is removed.

III. Application of the Techniques Described Herein to Accomplish Selected Advantage Air cleaners design and manufacturing must take into account a number of varying interests and concerns. For example, the features should be selected in manners that are readily manufacturable. Performance issues are of great concern. The filter cartridge should be provided in a manner that will have adequate lifetime for the desired use. This often means providing as large an amount of surface area of media within a given volume as can reasonably be accommodated without undue restriction to flow.

The vehicle or other equipment manufacturers' concerns are in many instances controlling. It is often desirable to provide an air cleaner that is as small as reasonable for a given application to manage weight concerns and also space issues. However, there are also concerns if restriction to air flow through the air cleaner is too great. Larger air cleaners with larger flow volumes more readily accommodate such concerns.

Many of the techniques described herein can be applied to provide for advantages with respect to the above. For example, the air cleaner housing 91 depicted can be configured with a relatively small outer size (by comparison to many air cleaner arrangements for analogous use) and/or with relatively small inner cross-sectional sizes with respect to the annulus around selected portions of the cartridge 1. This is, in part, because a critical portion of the annulus, located where the inlet 120 initially directs air between the cartridge and the housing sidewall, has been opened up due to the slant in the media at this location, provided by the described eccentricity. The slant is preferably not, in the preferred example depicted, accomplished by merely making a conical shaped cartridge, since, generally, a tapering conical media (concentrically aligned at both ends) has lower media surface area than an analogous cylindrical media.

Of course, the techniques can be applied with some eccentric conical tapering the cartridge. However, the eccentricity provided, ensures that movement of the bottom end 4 of the cartridge 1 further away from the side of the housing toward which air is initially directed, occurs.

A relatively long narrow shape used for the inlet 120, facilitates this, along with the slanted directing of the inlet toward the bottom end. First, slanting of the inlet toward the bottom end helps ensure that the initial in flow of air occurs in the widest portion of the annulus, i.e. where the media has been tapered away from the sidewall the most. A long, narrow shape of the inlet opening, allows for a relatively large inlet opening, for relatively high air flow rates, even though a relatively small air cleaner housing radius (cross-dimension) is provided. It also can be used to facilitate a directing of the air into the relatively narrow annulus.

As discussed above, the features described herein can also be applied to help ensure a proper cartridge is used, and is properly oriented. These features relate to the preferred engagement arrangements at the opposite ends of the cartridge, especially ones which require eccentric features for engagement. These same features can help ensure that the cartridge is fully secured in position, once lowered into the housing bottom, so that it remains appropriately oriented when the access cover is installed.

Also, due to be eccentricity, the cartridge is secured against rotation, in use.

In some instances, it will be desired to make the housing body in two separate pieces such as central piece 100 and bottom piece 101 discussed above. This facilitates construction in which the bottom piece 101 has an eccentric projection relative to features in the access cover 96 that will be secured to the central piece 100.

IV. Some Selected Variations

A. Variations in the Selected Eccentric Features; FIGS. 19-23

Herein above, two different features relating to eccentricity were discussed. A first was described in connection with the media, by having opposite ends of the media define perimeters eccentrically positioned. A second was a described eccentricity with respect to selected end cap features at opposite ends, especially with respect to those features that engage the housing at opposite ends. This latter eccentrically is reflected by an eccentric orientation of the seal 36 and the second housing engagement arrangement 40.

A wide variety of variations in these features and in other cartridge features that can be used to provide eccentricity is possible. Selected examples are indicated herein.

Figure 19:
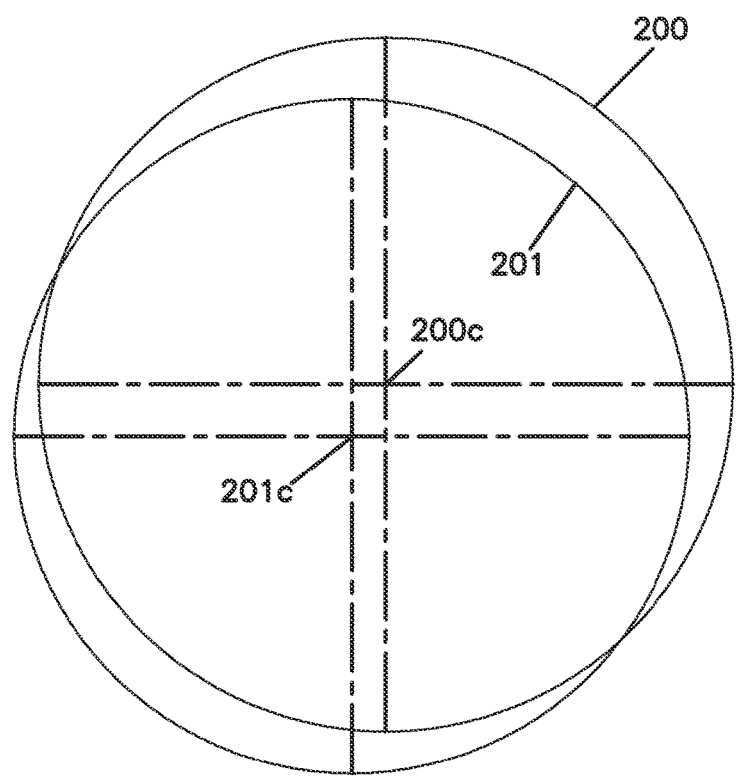
FIG. 19 is a schematic first depiction of a perimeter projection alignment in accord with the present description.

In FIG. 19, a schematic view is provided of two selected cartridge features oriented (aligned) eccentrically. The schematic view of FIG. 19 generally corresponds to the situation in which both features are circular and both features define the same size definition. An example of the schematic view of FIG. 19 would be the one described above for cartridge 1, with the outer perimeter of the media at end 3 provided in the drawing at perimeter 200 and the outer perimeter of the media at the lower end of the cartridge indicated in the drawing at perimeter 201. Eccentricity between the two is shown by offset of the two centers 200c, 201c, respectively.

An example of the FIG. 19 schematic, then, would be one in which the media is generally cylindrical and the perimeters 200, 201 represent either outer pleat tip definition or inner pleat tip definition, assuming consistency of media depth and no substantial tapering in the media between the opposite ends.

Of course, definitions 200, 201 could comprise other portions of the cartridge at opposite ends, defining circular portions of the same diameter. Examples could be inner liner or outer liner definitions.

Figure 20:
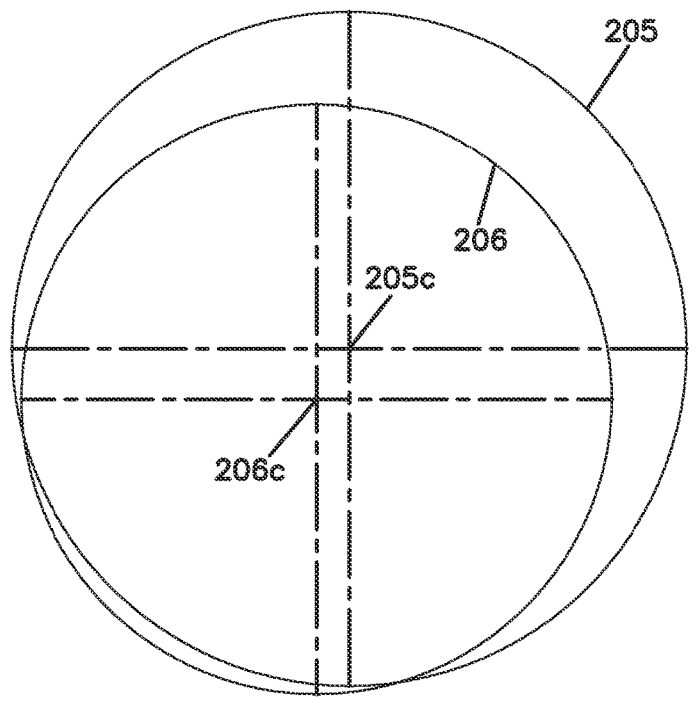
FIG. 20 is a schematic second depiction of a perimeter projection alignment in accord with the present description.

In FIG. 20, a selected variation is shown schematically. Here, the two eccentric features are defined with perimeter of different dimensions. For example, one is shown at 205 with center 205c, the other at 206 with center 206c. An example would be media that tapers in outer diameter in extension from end 3 to end 4. Thus, the media configuration would be conical, but would still be distorted for an eccentric end orientation. Of course, other features could be similarly of differential size but still eccentrically positioned. From FIG. 20, it can be seen that even if the media is conical, advantages according to the present disclosure can be obtained if the eccentricity of the type characterized is used, since it can help pull the media away from the region of annulus where the air flow enters the housing even more than provided by a mere conical taper, at least relative to an opposite side.

Of course, other possibilities could lead to an orientations of eccentricities somewhat similar to that shown in FIG. 20. For example, one of the patterns could relate to an outer pleat tip or outer media perimeter while the other relates to an inner pleat tip pattern or other cartridge feature at the other end.

Figure 21:
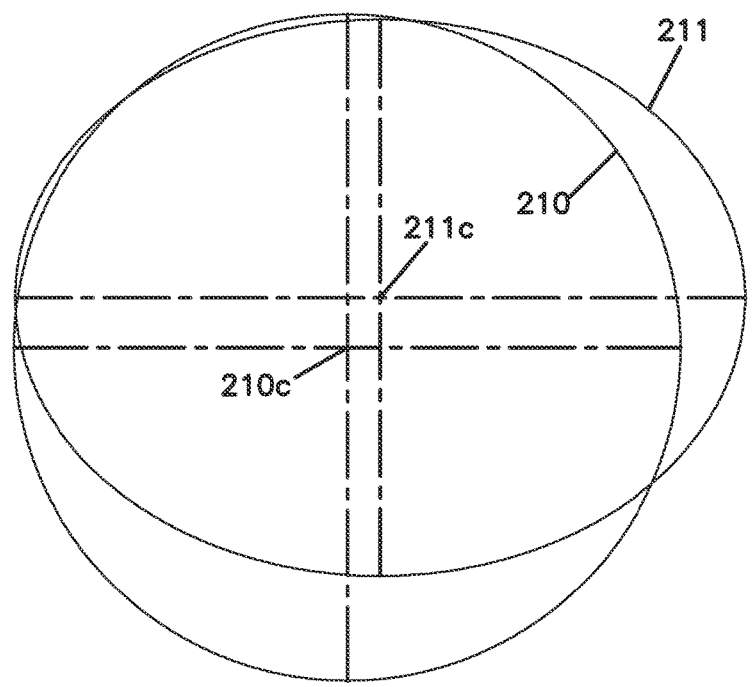
FIG. 21 is a schematic third depiction of a perimeter projection alignment in accord with the present description.

It is not required that each of the perimeter definitions used to define the eccentricities be circular, or that they both be of the same shape. In FIG. 21, an example is shown. Here, one perimeter definition is shown at 210 with center 201c, the other at 211 with center 211c; the centers 210c, 211c being eccentric. In this instance, the general shape of the two perimeters 211, 210 is different, one (210) being circular, the other (211) being oval, in this instance, elliptical. Of course, both can be non-circular. Thus, the example of FIG. 21 indicates not only that the shapes can be non-circular, but they can be different from one another. An example of the arrangement shown in FIG. 21, would be (if implemented with different relative sizes between perimeters 210 and 211 than shown) if perimeter 210 was defining structure associated with a first end cap, while perimeter 211 was defining a base of an oval projection member such as member 45.

Figure 22:
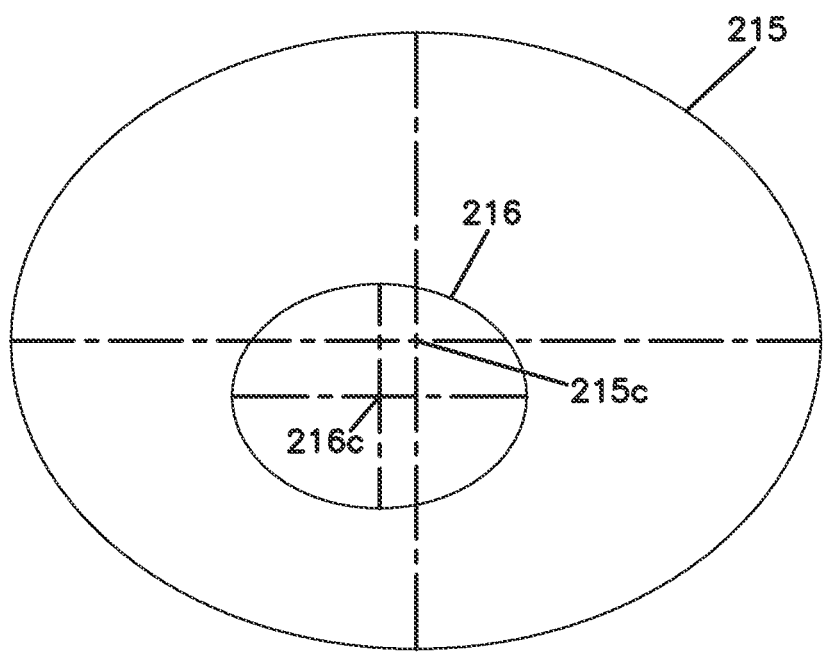
FIG. 22 is a schematic fourth depiction of a perimeter projection alignment in accord with the present description.

In FIG. 22, an example analogous to FIG. 21 is shown, in which the two perimeters (215, 216) with centers 215c, 216c, respectively are shown. Here, both are oval. Again, relative sizes could be varied somewhat. An example (with different relative diameters) could be oval media perimeter definitions at each end, with a conical, but eccentric, taper.

Figure 23:
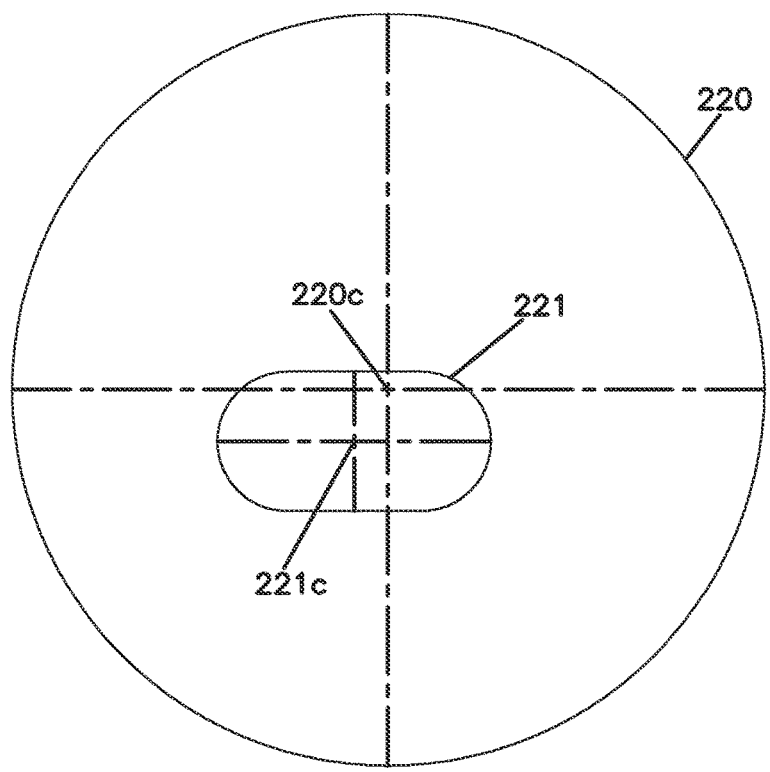
FIG. 23 is a schematic fifth depiction of a perimeter projection alignment in accord with the present description.

Of course, variations in the oval shape are also possible. In FIG. 23, two perimeter sections, 220, 221 with centers 220c, 221c respectively are shown. Here, pattern 220 is circular, and pattern 221 is oval. However the oval shape to pattern 221 is a shape sometimes referred to as "racetrack" which has a pair of opposite parallel sides and a pair of opposite curved ends.

In the examples depicted above, the relative sizes of perimeters in each of the comparisons are meant to be variables that can be modified depending on the cartridge features of interest.

From the above, it can be understood that eccentricity can be introduced with respect to any one of various comparative features between opposite ends of the cartridge, whether it be housing engagement features, media perimeter features, or other general end cap or structural features. Typically, although not required in all arrangements, it will be preferred that the eccentricity be introduced by at least media features, to obtain the desirable annulus advantage discussed above. It will also be typically desirable that the features involving housing engagement at the opposite ends also be centric, for facilitating engagement with opposite housing pieces.

Figure 24:
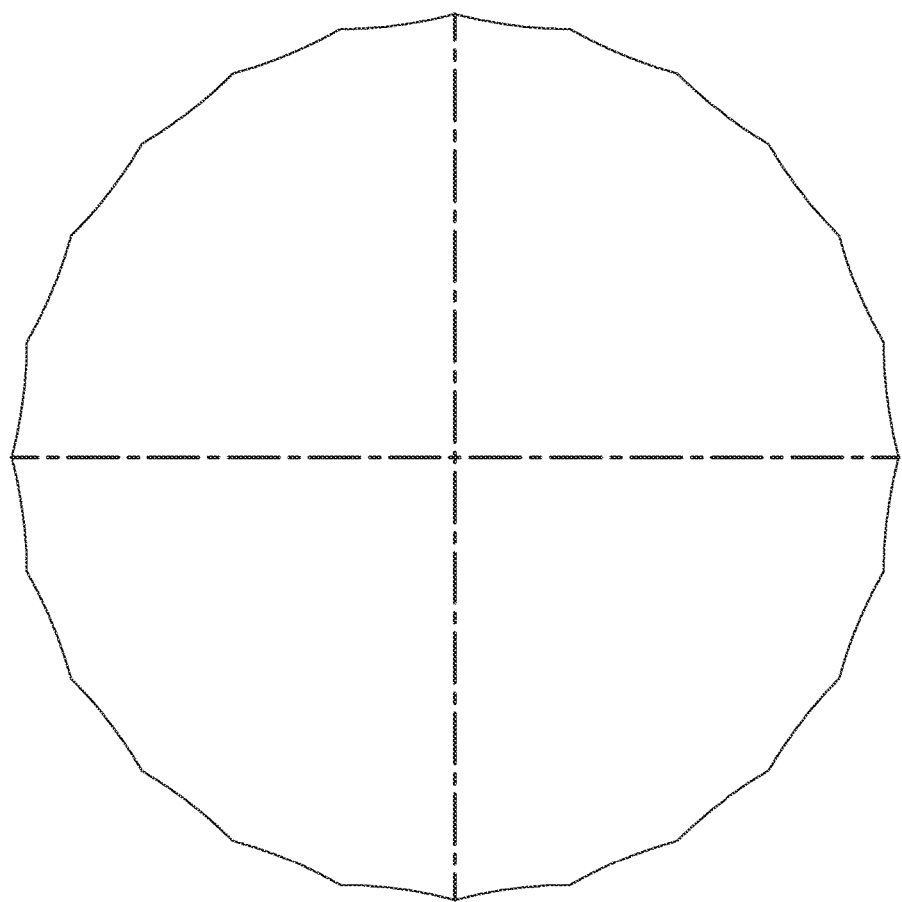
FIG. 24 is a schematic depiction of an alternate housing end cap perimeter usable with a cartridge according to the present disclosure.

B. Non-regular Geometric Shapes, FIGS. 24 and 25

It is noted that in the examples provided, the perimeter shapes have generally been regular shapes such as oval or circular. Alternatives are possible. For example, in FIG. 24, a perimeter shape for the outside of an end cap such as a lower end cap 11, is shown, the shape being of the type described in U.S. Pat. No. 8,444,735 incorporated herein by reference. Such features and advantageous can be implemented in arrangements according to the present disclosure.

Figure 25:
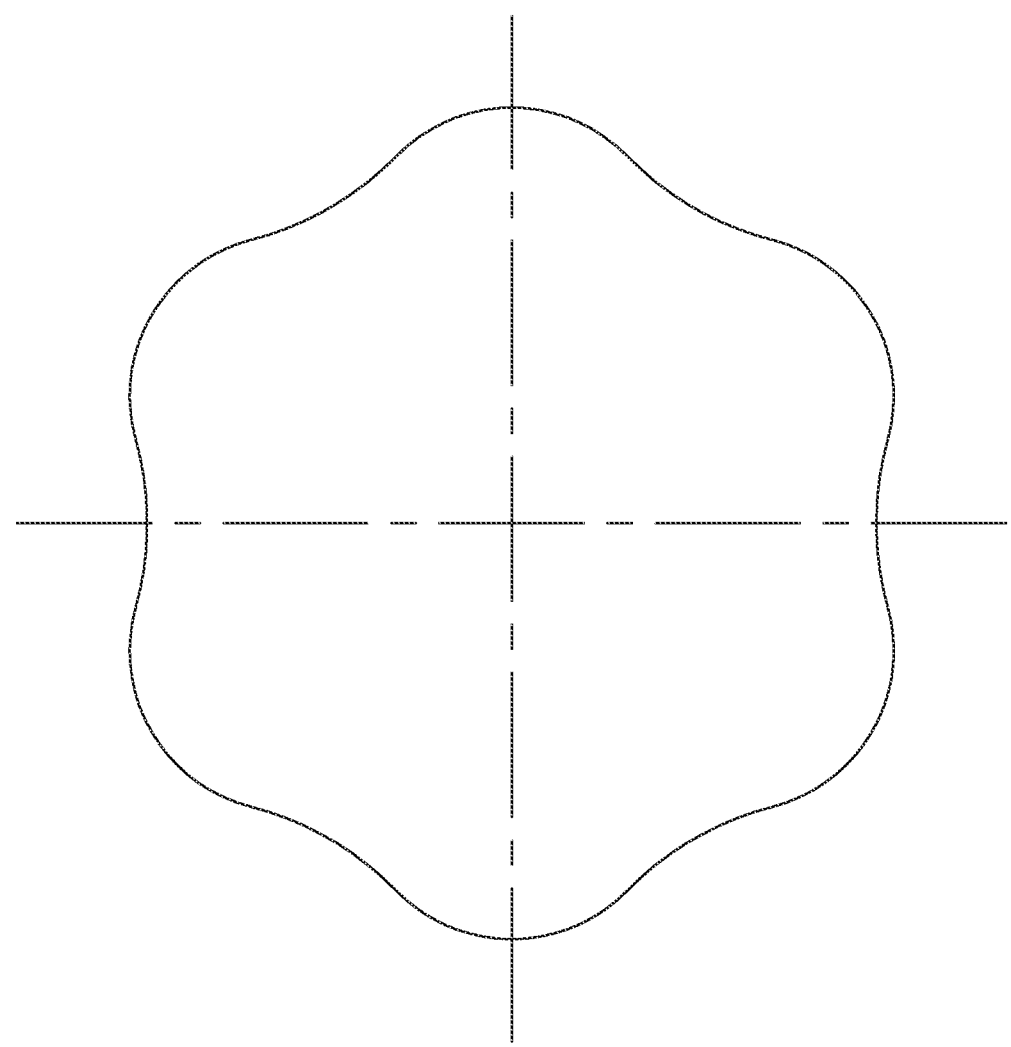
FIG. 25 is a schematic depiction of an alternate seal perimeter definition usable with a cartridge according to the present disclosure.

In FIG. 25, another alternate perimeter shape is depicted, that can be used, for example, for the shape of the seal on end cap 10. The seal shape of FIG. 25 is of a type generally described in U.S. Ser. No. 13/662,022, incorporated herein by reference. This seal shape can be used with principles according to the present disclosure.

Still other shapes can be used, including irregular ones or ones that do not show repeating features around the perimeter definition. The eccentricity in such instances, when used, will generally be accomplished by ensuring that an approximate geometric center of the two aligned features in projection is offset.

V. Use with an Optional Secondary or Safety Cartridge, FIGS. 26 and 27

It is noted that the features characterized herein can be implemented in an assembly which also uses a secondary or safety filter cartridge. A secondary or safety filter cartridge is, generally, a cartridge positioned downstream of the main filter cartridge 1. With an out-to-in flow pattern, the safety filter cartridge is typically positioned with media projecting into the open filter interior 7 of the main filter cartridge 1.

Figure 26:
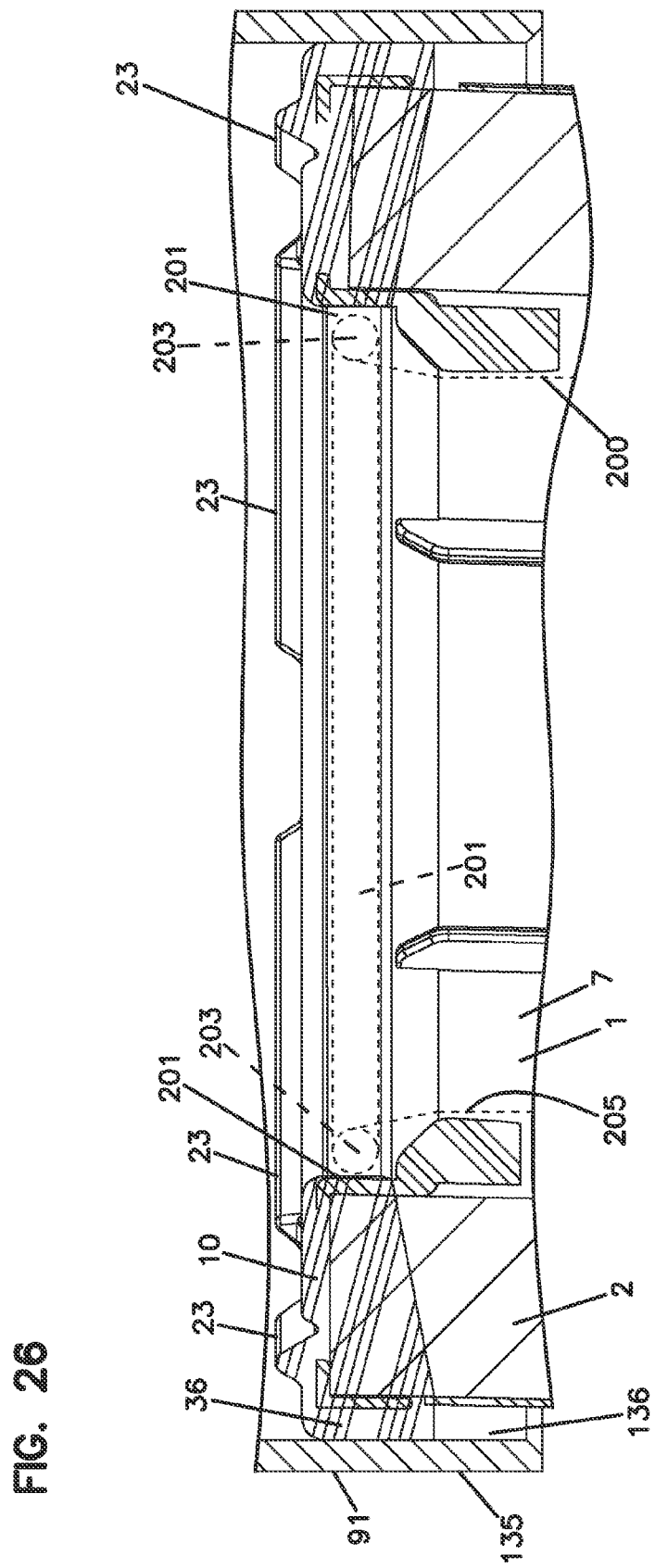
FIG. 26 is a schematic fragmentary cross-sectional view analogous to FIG. 16, depicting positioning of an optional secondary filter or safety cartridge within the assembly.
Figure 27:
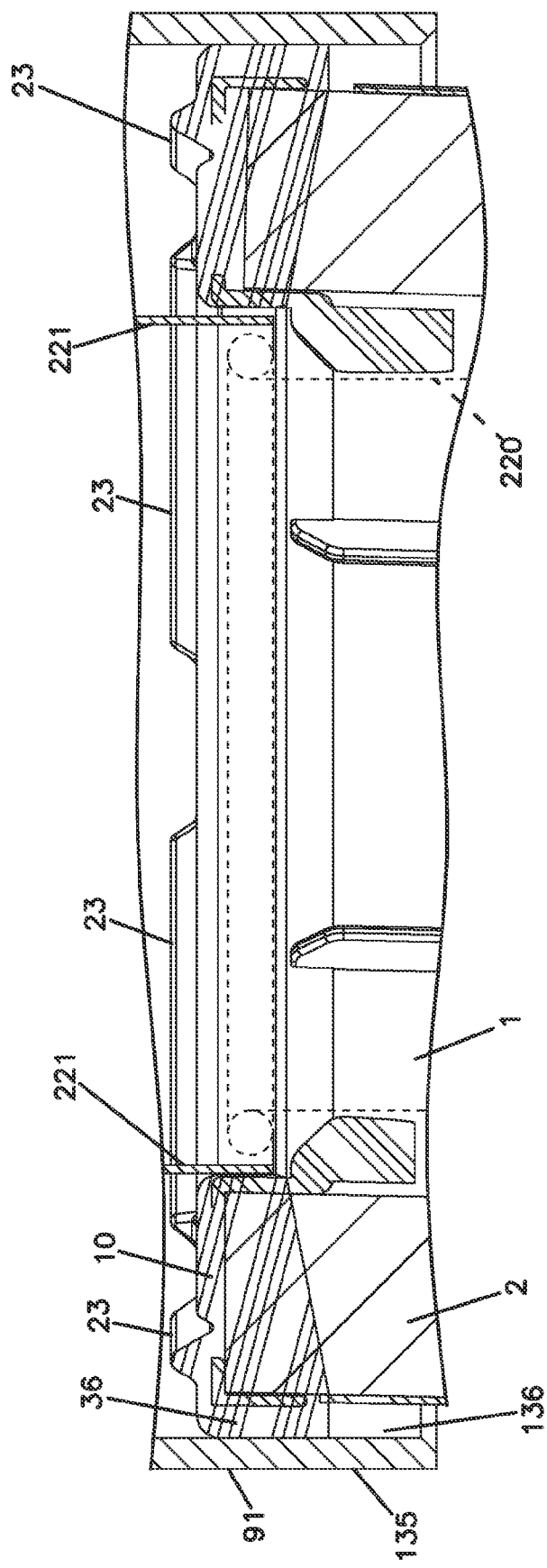
FIG. 27 is a schematic fragmentary cross-sectional view analogous to FIG. 26, depicting an alternate positioning of an optional secondary or safety cartridge within the assembly.

Two examples of such arrangements are depicted in the fragmentary, schematic, view of FIGS. 26 and 27, each of which is a variation of FIG. 16.

Referring first to FIG. 27, an optional safety cartridge 200 is depicted, in phantom, sealed to ring 201 on the main filter cartridge 1 at seal 203. The secondary or safety filter cartridge 200 then projects downwardly into the open filter interior 7. The media 205 of the secondary filter cartridge 200 can be pleated or unpleated. At an opposite end, not depicted, the safety cartridge 200 can either stop short of projection 45, or it can be configured to receive a portion of projection 45 therein.

In some instances, it may be desirable to seal the secondary or safety cartridge to a portion of the access cover. An example of this is provided in FIG. 27, which is also a variation of FIG. 16. Here, the safety cartridge 220 is shown sealed to a seal flange 221 on the access cover. The secondary or safety cartridge 220 can be otherwise similar to safety cartridge 200 discussed above, and be used analogously.

VI. An Example Workable System

Herein, when features are characterized as eccentrically aligned or eccentrically positioned, when projected into a plane perpendicular to a shortest dimension between the opposite end pieces, the features can be characterized as being spaced by an eccentricity distance Z. A typical eccentricity distance Z for two eccentrically aligned features according to the present disclosure, would be at least 5 mm, often at least 8 mm, although alternatives are possible. In many instances, the eccentricity distance Z would be within the range of 8-50 mm, often within the range of 10-40 mm, inclusive (for example 10-30 mm, inclusive).

In the various figures, example dimensions are indicted by letter designators. In this section, example dimensions usable to create an example working system of the type described are provided. It is noted that variations from the dimensions can be practiced, while obtaining many of the benefits of the present application.

The example dimensions of the system in FIGS. 1-15 are as follows: in FIG. 2, A=19.1 mm; and, B=249.4 mm; In FIG. 3, C=269.8 mm; D=235.8 mm; E=165 mm; F=5 mm; G=495.1 mm; H=176.5 mm; I=12.7 mm; and, J=10 mm. In FIG. 4, K=12.5 mm; and, L=8.4 mm; In FIG. 5, M=112 mm; and, N=80 mm; in FIG. 6, O=5.5 mm; and, P=2.5 mm; in FIG. 10, Q=269 mm; R=127.8 mm; S=336.2 mm; and, T=345.9 mm; in FIG. 11, U=23.7 mm; V=35 mm; W=35.8 mm; X=44.2 mm; Y=15.7 mm; Z=226.3 mm; AA=570.8 mm; and, BB=23.3 mm; in FIG. 12, CC=170 mm; in FIG. 13, DD=203.1 mm; EE=149.3 mm; FF=84.6 mm; GG=43.7 mm; HH=221.8 mm; II=97.7 mm; JJ=123 mm; and, KK=176 mm; and, in FIG. 15, LL=145.2 mm.

Again, the principles of the present disclosure can be applied in a variety of systems, with many variations from the dimensions indicated above. It will be the case, however, that in many typical applications, the media of the cartridge will be at least 300 mm long, usually at least 400 mm long since the techniques will be most preferred in an application in which the media is sufficiently long to move out of the way of inlet flow, and selected portion of the assembly, to obtain advantage. Also, it will typically be the case that the cartridge has a largest outer pleat dimension, corresponding to a diameter when the pleat tips define a circular pattern, of at least 190 mm and typically at least 200 mm, for example 200-350 mm. This, too, is an indication that the principles are developed for preferred application in situations in which the filter cartridge is relatively large, and needs to handle a large air flow during filtering.

VII. A Second Example Workable System; FIGS. 28-53

In FIGS. 28-53, a schematic depiction of a second workable system is provided. The system is generally in accord with descriptions provided previously herein above with selected variations as depicted or discussed.

In the embodiment of FIGS. 28-54, like reference numerals to indicate generally analogous or analogously functioning parts to those previously described are used. Also, like features have analogous features. Selected variations are characterized with specificity herein below.

A. The Air Cleaner Housing and Access Cover, FIGS. 29-44

The air cleaner assembly of FIGS. 29-54 uses cleaner air 91 housing generally analogous to housing 91, FIGS. 10-15.

Figure 31:
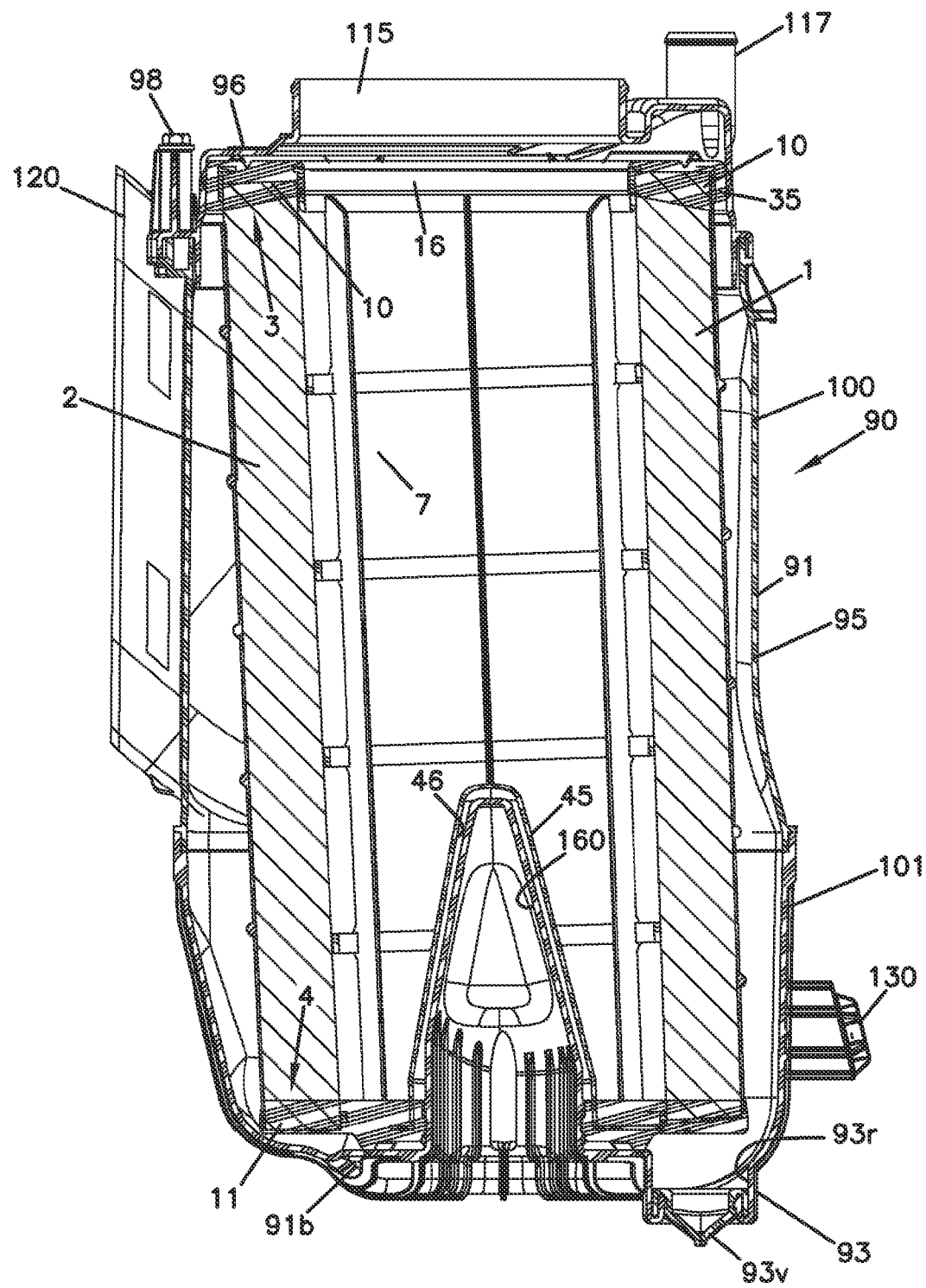
FIG. 31 is a schematic, cross-sectional view of an air cleaner assembly having a housing body (in accord with FIGS. 29 and 30) an access cover, and including a filter cartridge therein.
Figure 32:
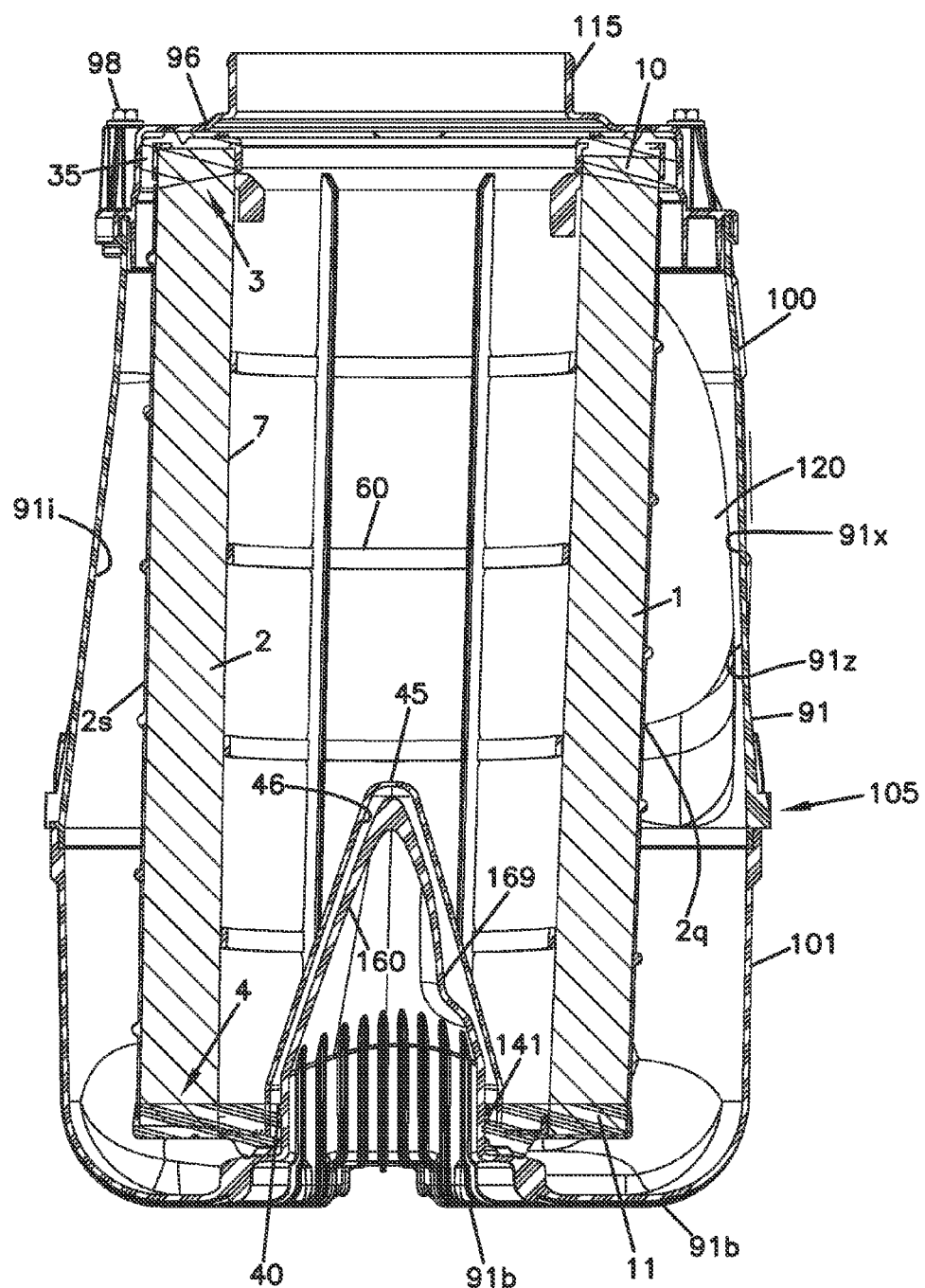
FIG. 32 is a second schematic cross-sectional view of the assembly of FIG. 31.

Referring to the cross-sectional views of FIGS. 31 and 32, the air cleaner assembly 90 then includes a housing 91 having a housing body 95 and an access cover 96 inside of which housing 91 is received a filter cartridge 1. In the example, the housing body 95 comprises body sections 100 and 101, body section 100 being a central body section and body section 101 being an end body section.

Figure 29:
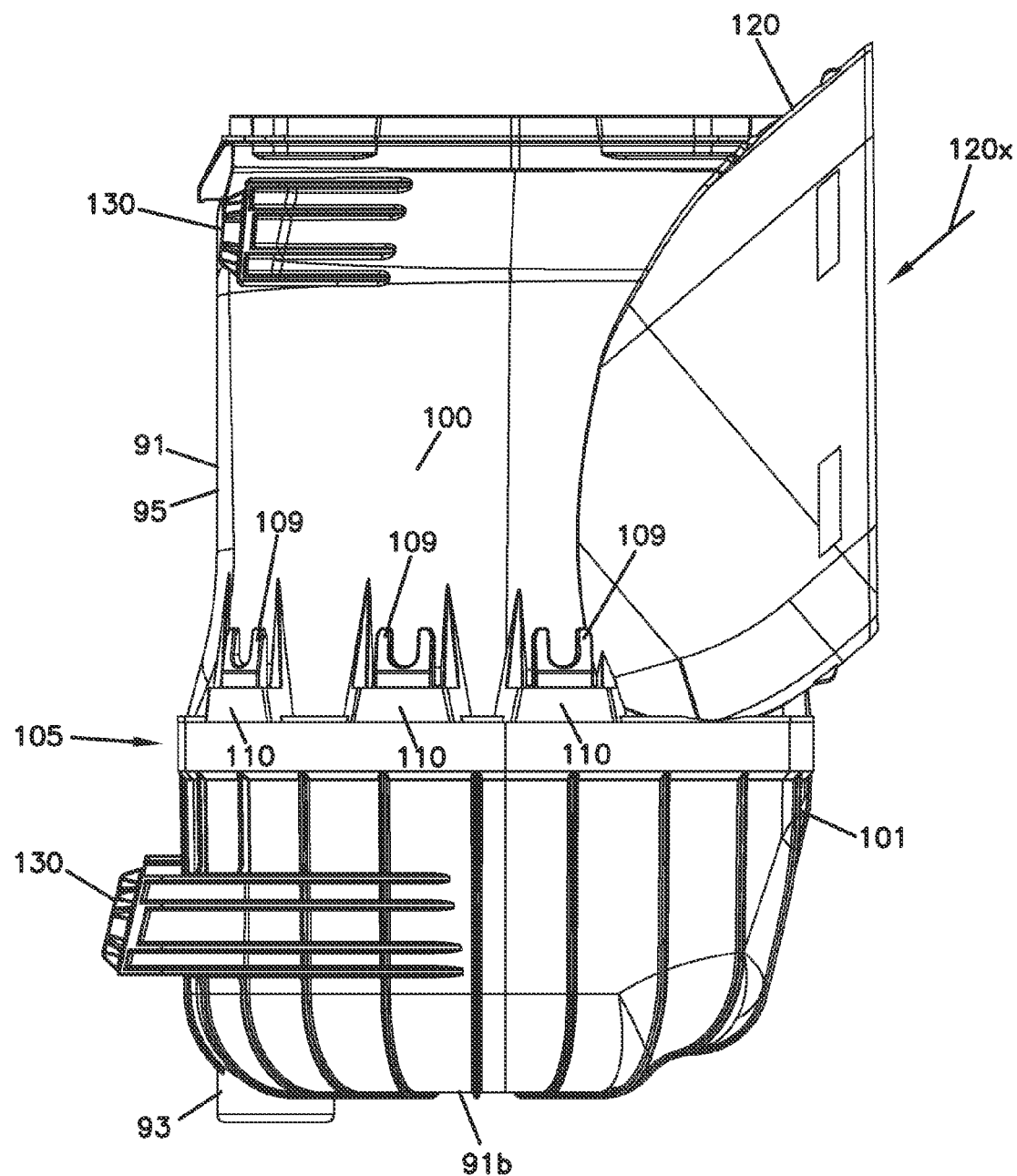
FIG. 29 is a schematic side elevational view of an air cleaner housing body usable in an air cleaner assembly according to the present disclosure.

In FIG. 29, the housing body 95 comprising separate sections 100 and 101 is viewable in side elevational view. Here, air flow inlet 120, which is a slanted inlet, can be seen. A general direction of air flow into the housing interior, via inlet 120, is shown by arrow 120x. The tangential, i.e. inlet, flow is directed along a sidewall direction between the cartridge 1 and a sidewall of section 100, as it enters the housing.

Also in FIG. 29, projection 93 which operates as an evacuation port, for receiving an evacuation valve member thereon, is depicted, in housing section 101.

Figure 30:
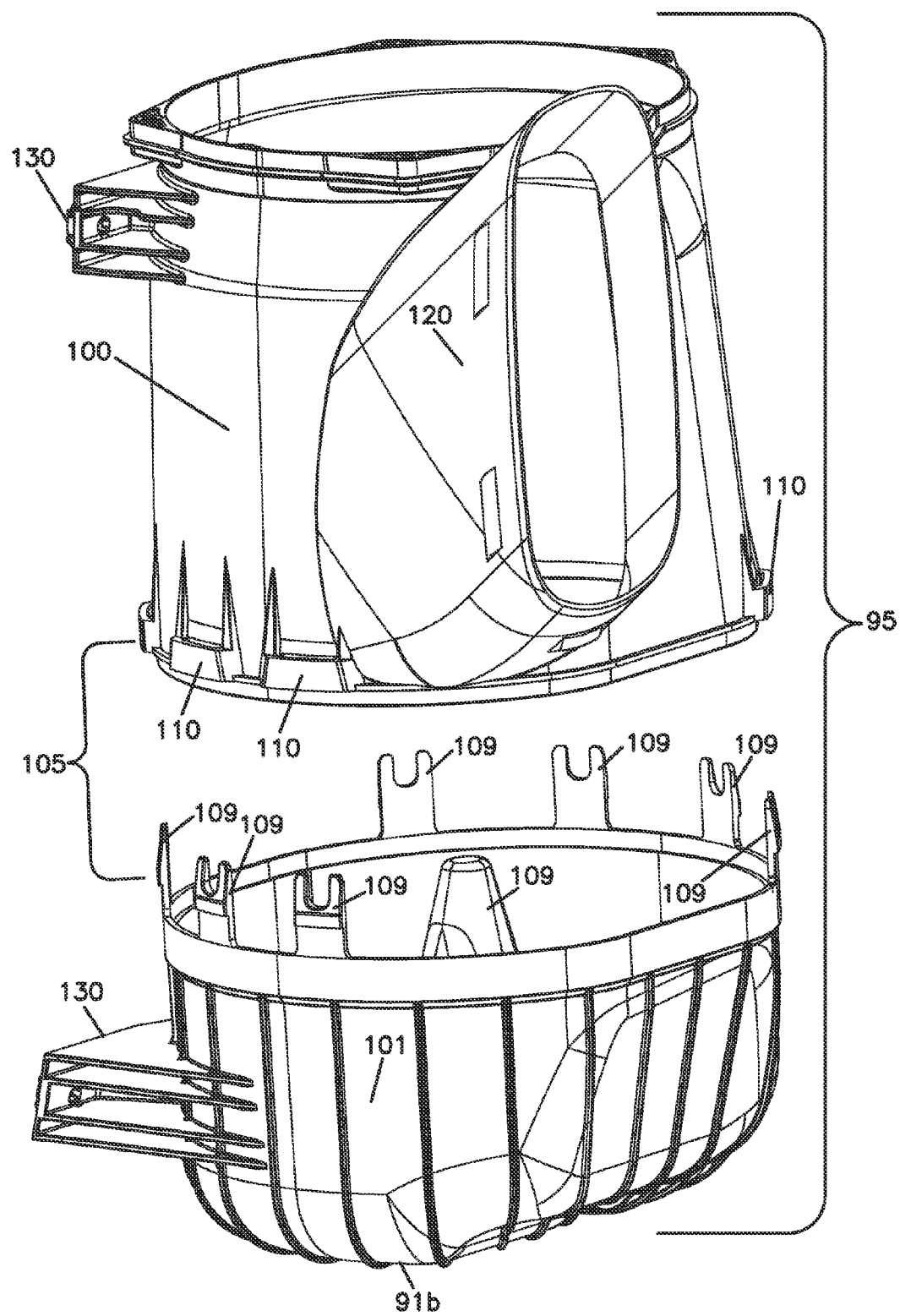
FIG. 30 is a schematic exploded perspective view of the housing body of FIG. 29.

In FIG. 30, the housing body 95 is depicted in exploded view comprising central section 100 with inlet 120, and lower section or end section 101. Mounting pads 130 for securing the air cleaner assembly 90 in place in use are viewable. Also, a snap fit engagement between the end section 101 and the central section 100 can be viewed comprising receivers 110 and projections 109, at seam 105.

Referring to FIG. 30, for the example assembly depicted, end piece 101 is snap-fit to central member 100, and is not typically removed therefrom it in use. Thus, one of the mounting pads 130 is positioned on the end piece 101. If the end piece 101 was intended to be removable after air cleaner installation, for example, for service access, then a removable connection could be used to secure piece 101 to the center piece 100; and, there would typically not be a mounting pad 130 on end piece 101.

Still referring to FIG. 30, in housing end section 101, and a portion of projection or projection member 160 can be seen.

In the cross-sectional view of FIG. 31, cartridge 1 can be seen comprising an extension of media 2 having opposite ends 3 and 4, engaging opposite end pieces 10 and 11 respectively. The media 2 surrounds the open filter interior 7. End piece 10 is an open end piece, having a central flow aperture 16 and having an radially directed housing seal 35 thereon, engaging access cover 96 as a removable sealing member. End piece 11 is a closed end piece having a central receiver projection 45 therein defining a receiver recess 46 into which projection 160 on the housing 91 (in particular on end section 101) projects.

Still referring to FIG. 31, it is noted that the evacuation port 93 is in direct flow communication with the annulus around cartridge 1, in which filtered air will flow. This is because the system as drawn is for "out-to-in flow" during filtering; and, such a direct flow communication allows any water or preseparated material to reach the port 93 directly, without flowing through the media 1.

In the cross-sectional view of FIG. 32, taken generally at right angles to the view of FIG. 31, one can view the interior 91i of the housing 91 in a region where the inlet 120 directs air flow, initially, between the cartridge 1 and a portion 91x of the housing sidewall. It is this region (indicated at 91z) that is referred to herein as an internal sidewall section spaced from the filter cartridge at a location toward which the air flow inlet directs air flow. It can be seen that the cartridge 1 is configured to have the media outer perimeter at location 2q and section 91z, slant away from the sidewall section 91x in extension from end piece 10 toward end piece 11, opening up a greater flow area toward end 91b of the housing 91, opposite outlet 115, as the air flow is directed along an inlet slant. Also, for the example depicted, opposite media perimeter section 2q, a media perimeter section 2s also slants away from sidewall location 91x, as the media 2 extends from end piece 10 to end piece 11, although alternatives are possible.

Also referring to FIG. 32, one can see that the projection 160 in the housing 91 is distorted in shape from a simple oval perimeter (cross-section) tapering (conical type) projection, see especially region 160r. This configuration is discussed herein below. Further, projection 160 can be seen as having an interference member 141, for engagement by second engagement member 40 on end cap 11.

In FIG. 31 at 93v, an evacuator valve positioned in the housing (in projection 93) is viewable in cross-section. Such a valve would generally comprise a flexible member that can open under internal pressure to release material received within region 93r.

In FIGS. 33-38, features of the housing body 95, especially end section 101, can be viewed in detail. From inspection of these figures the shape of the projection 160 can be inspected.

Figure 33:
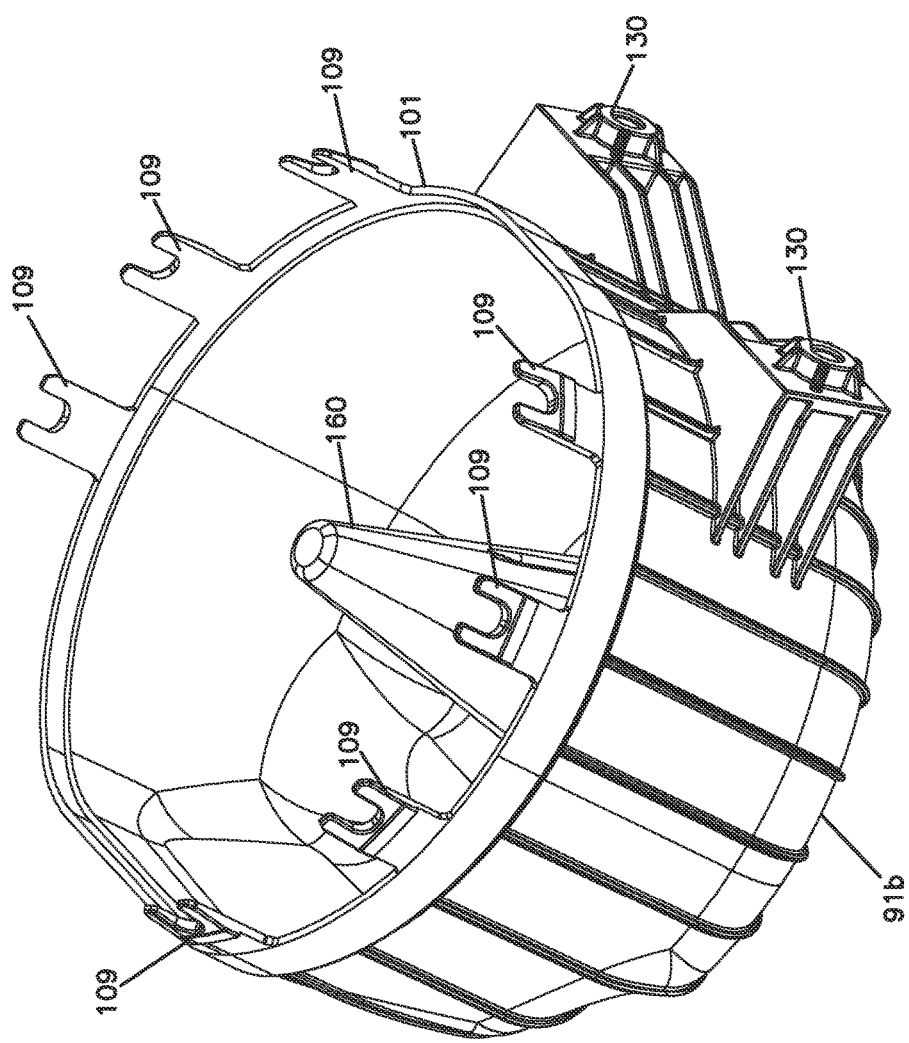
FIG. 33 is a schematic perspective view of a section of a housing body usable in the air cleaner assembly of FIGS. 31 and 32.
Figure 34:
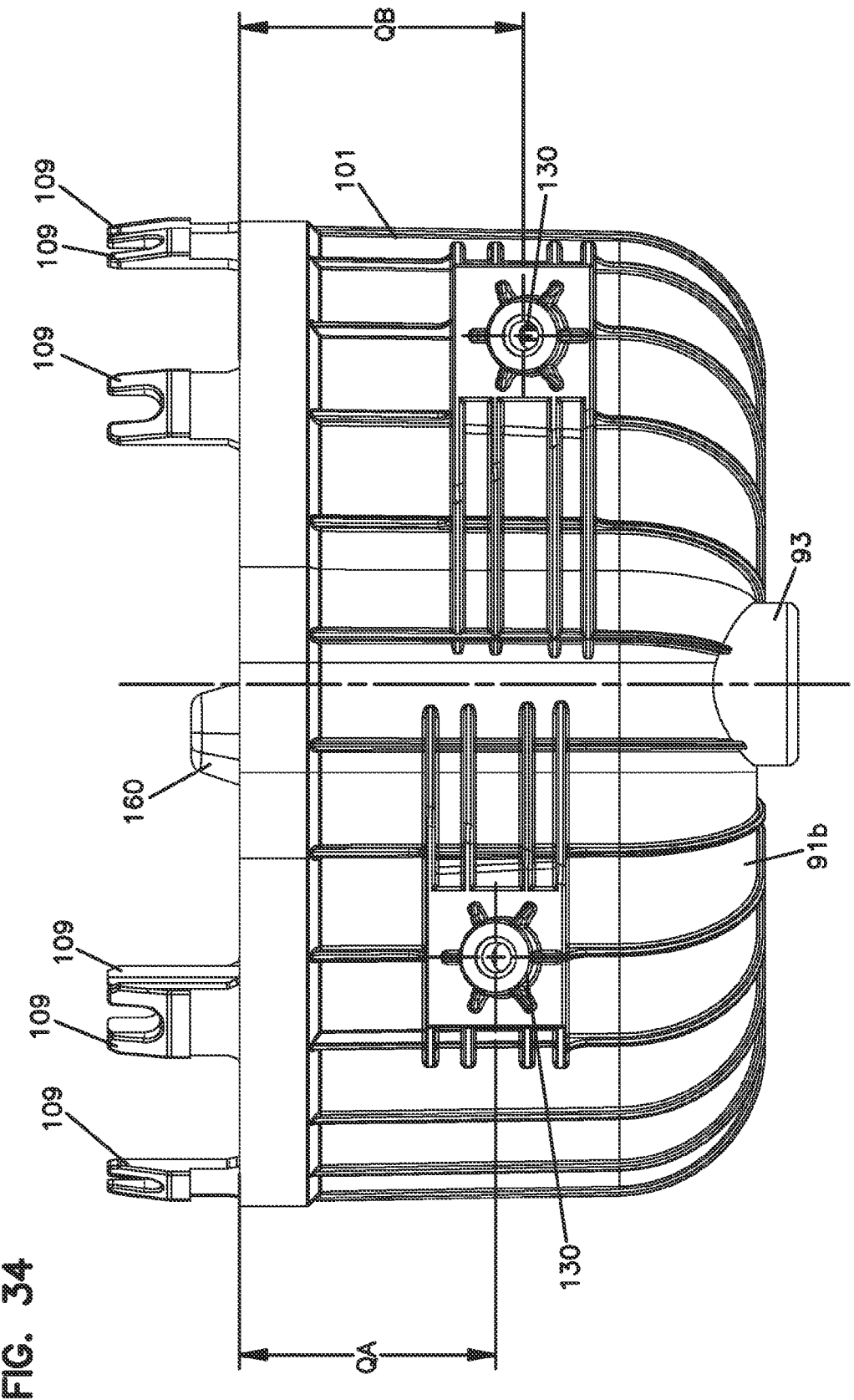
FIG. 34 is a schematic side elevational view of the housing body section of FIG. 33.
Figure 35:
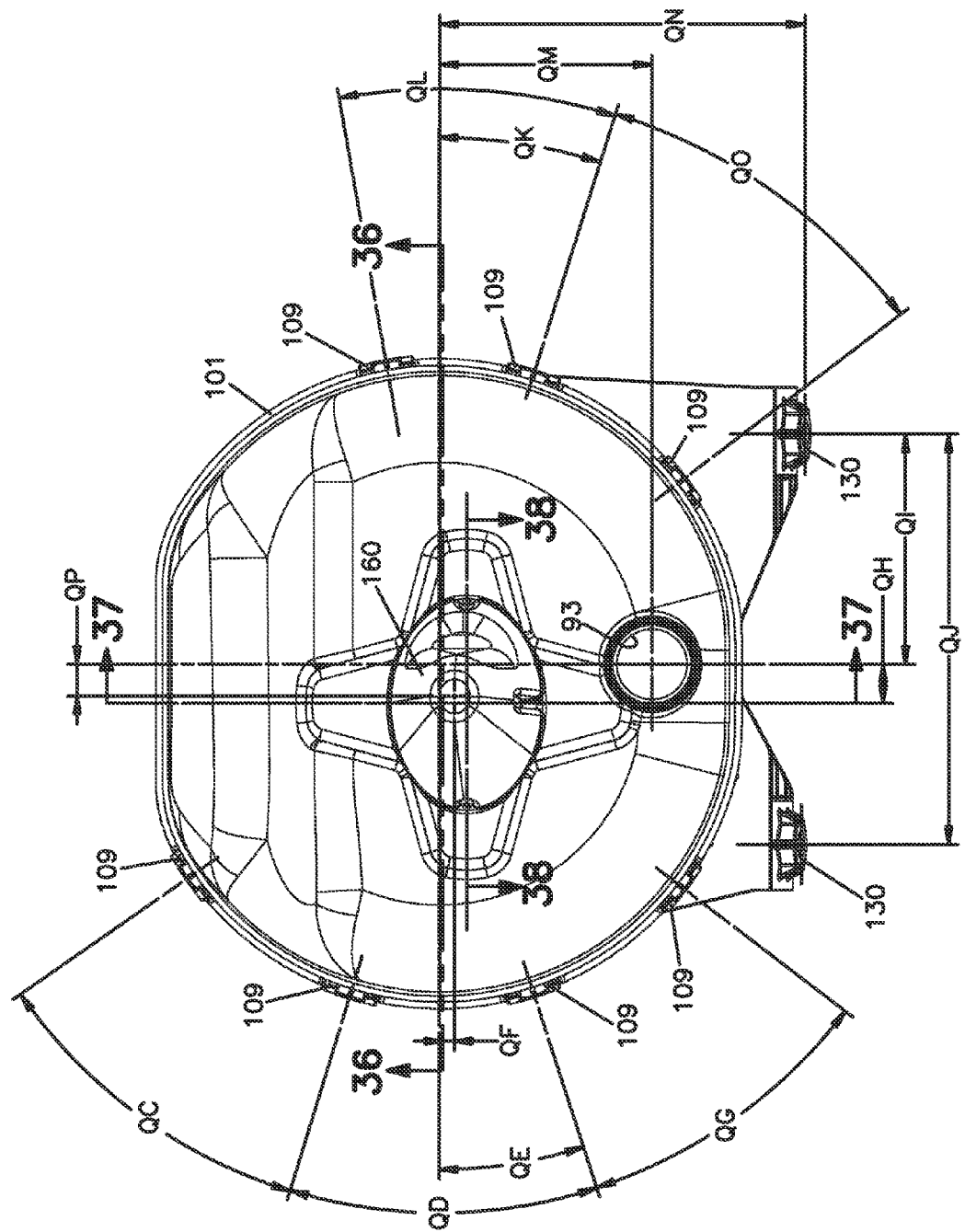
FIG. 35 is a schematic top plan view of the housing body section of FIGS. 33-34.
Figure 36:
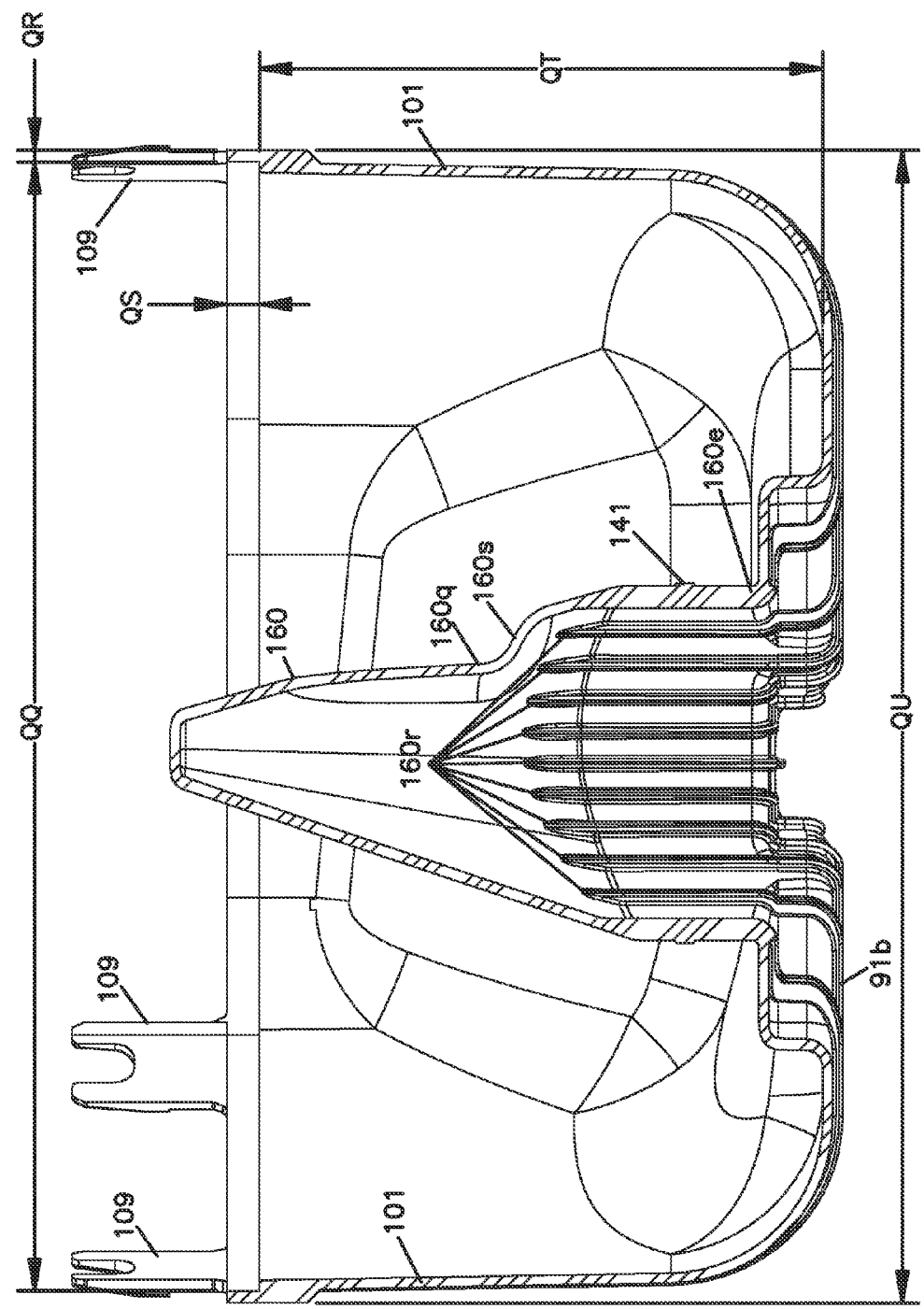
FIG. 36 is a schematic cross-sectional view of the housing body section of FIG. 35, taken along line 36-36 thereof.
Figure 37:
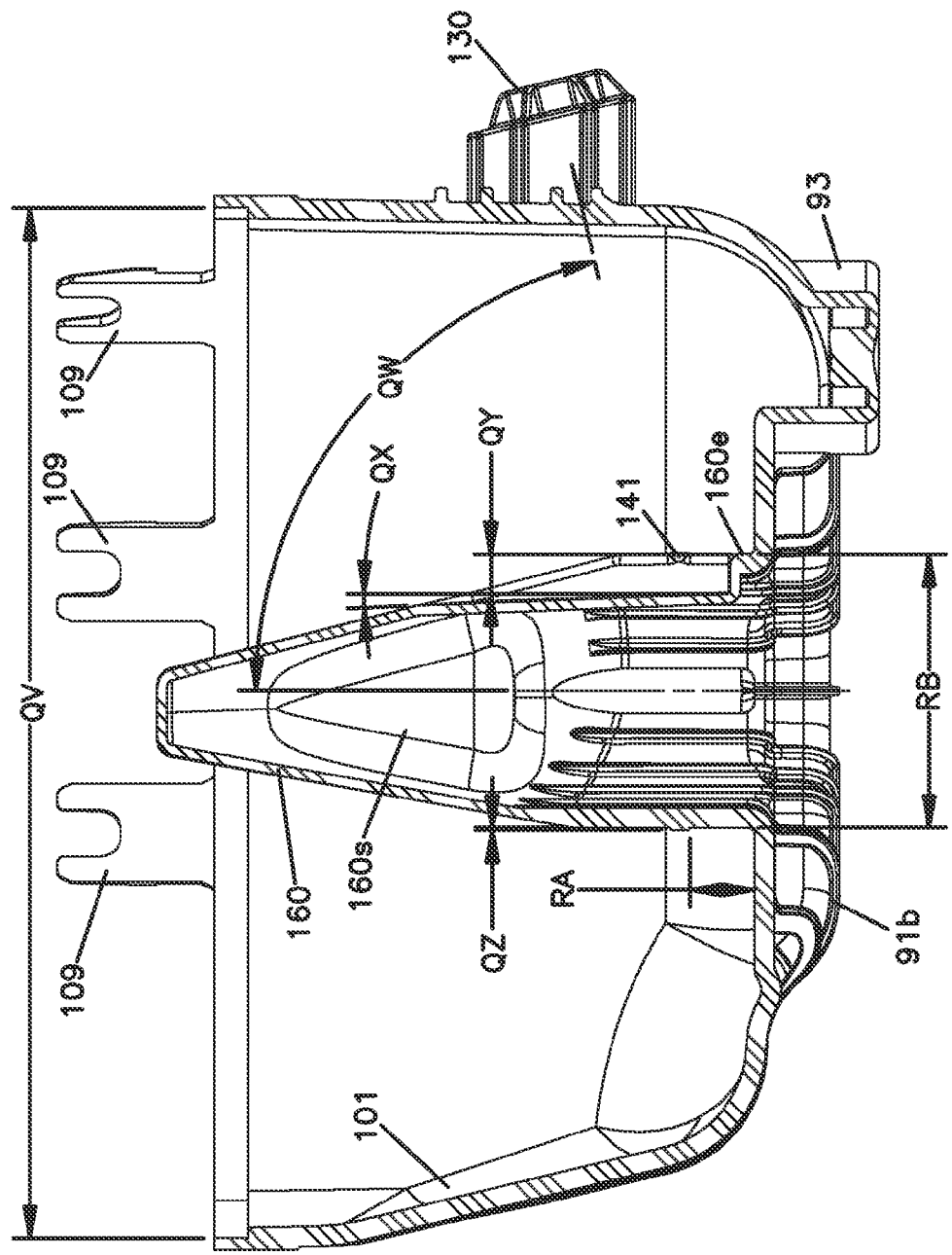
FIG. 37 is a schematic cross-sectional view of the housing body section of FIG. 35, taken along line 37-37 thereof.

In FIG. 33, a top perspective view of section 101 is provided. In FIG. 34, a side elevational view is provided. A plan view is provided in FIG. 35. In FIG. 36, a cross-sectional view taken along line 36-36, FIG. 35 is viewable. Here upon inspection of the cross-section, the projection 160 can be seen as having a side portion 160q distorted inwardly to create shoulder 160s. Also strengthening ribs 160r and interference projection 141 are viewable. In FIG. 37, a cross-sectional view taken along line 37-37, FIG. 35, generally at right angles to the view of FIG. 36 is provided. The internal distortion in the sidewall of shoulder 160s can be seen on an interior of the projection 160. Also, elongate rib 160y is viewable.

Figure 38:
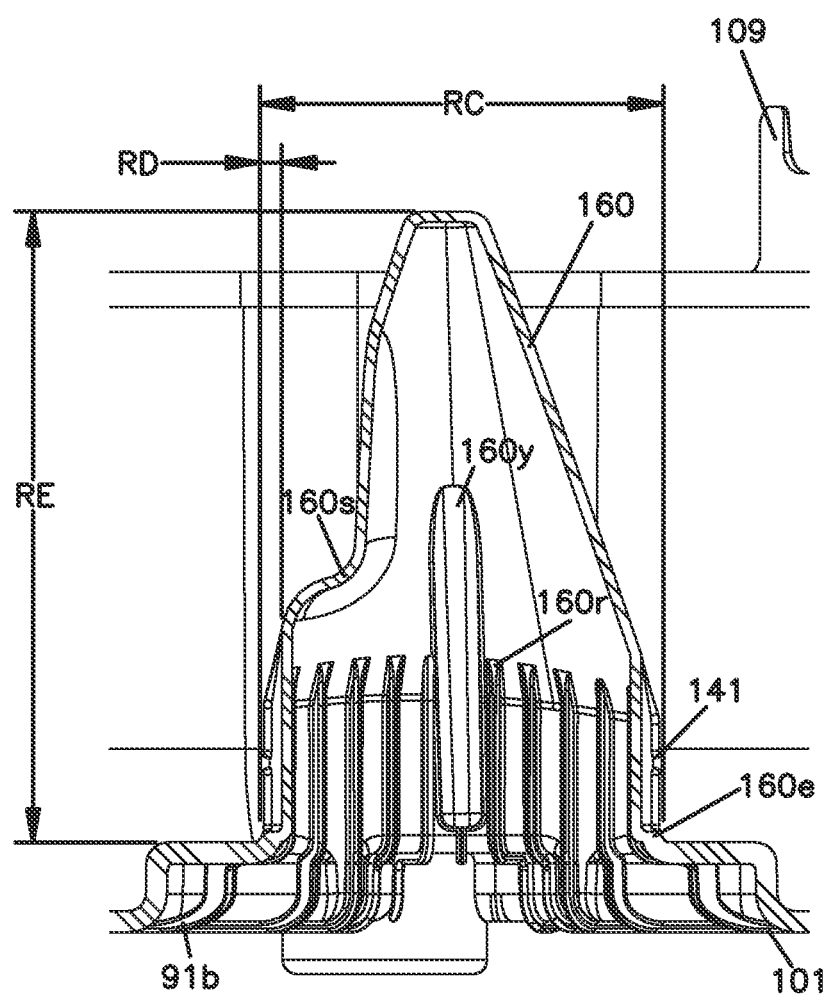
FIG. 38 is an enlarged fragmentary schematic cross-sectional view of a portion of a projection member of the body section of FIG. 35; the view of FIG. 38 being taken along line 38-38, FIG. 35.

In FIG. 38, an enlarged fragmentary view taken generally along line 38-38, FIG. 35, is provided to view the projection 160 and its distortion 100s is provided.

From FIGS. 33-38, it can be seen that the projection 160 does have an oval end 160e adjacent a lowermost or bottommost portion of the projection 100. However, as it rises upwardly and tapers inwardly, it does not maintain a constant oval cross-section, but rather is distorted, for example in the region 160s.

Figure 39:
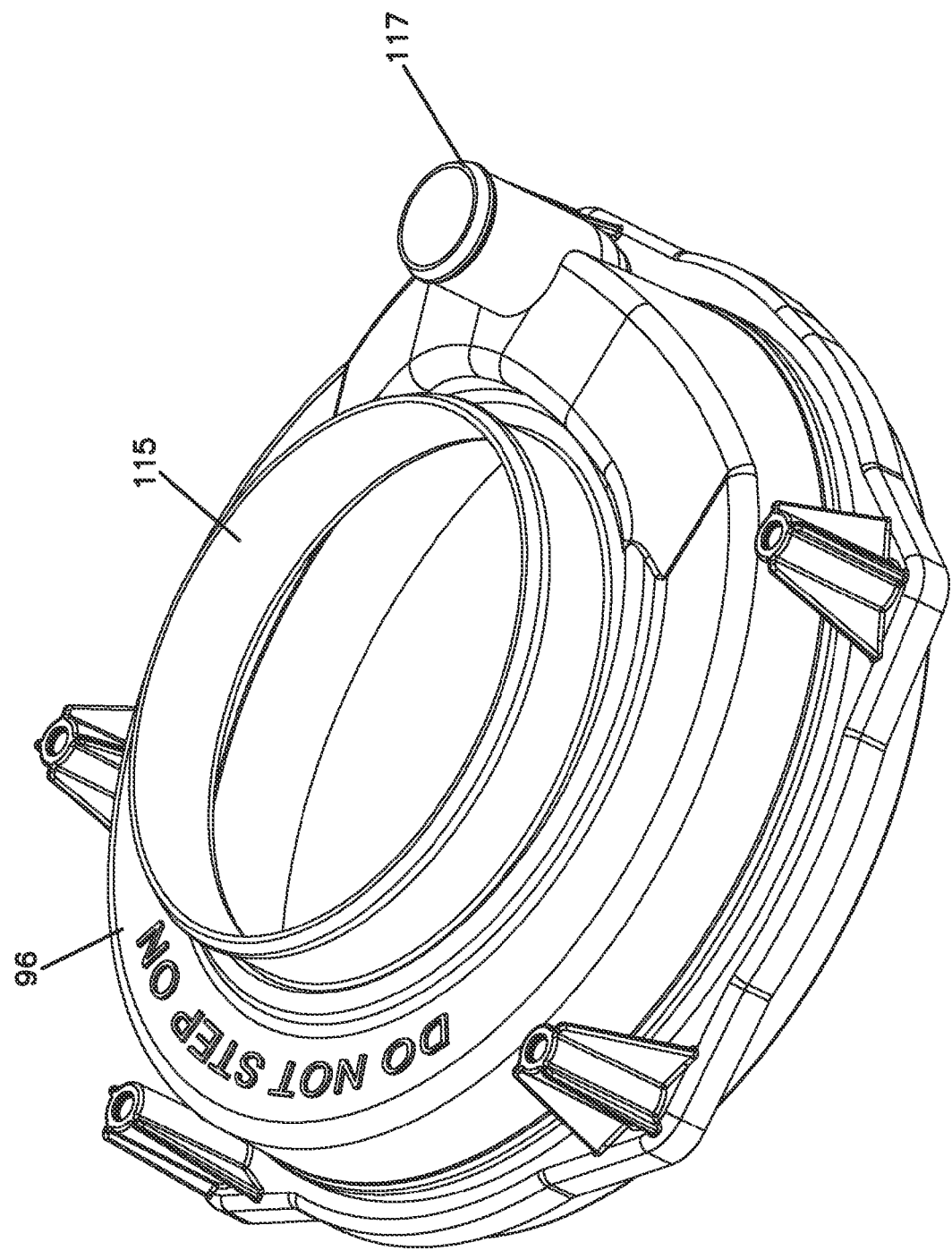
FIG. 39 is a schematic top perspective view of an access cover that can be secured to the body section of FIGS. 29-30 to provide the air cleaner assembly of FIGS. 31-32.
Figure 40:
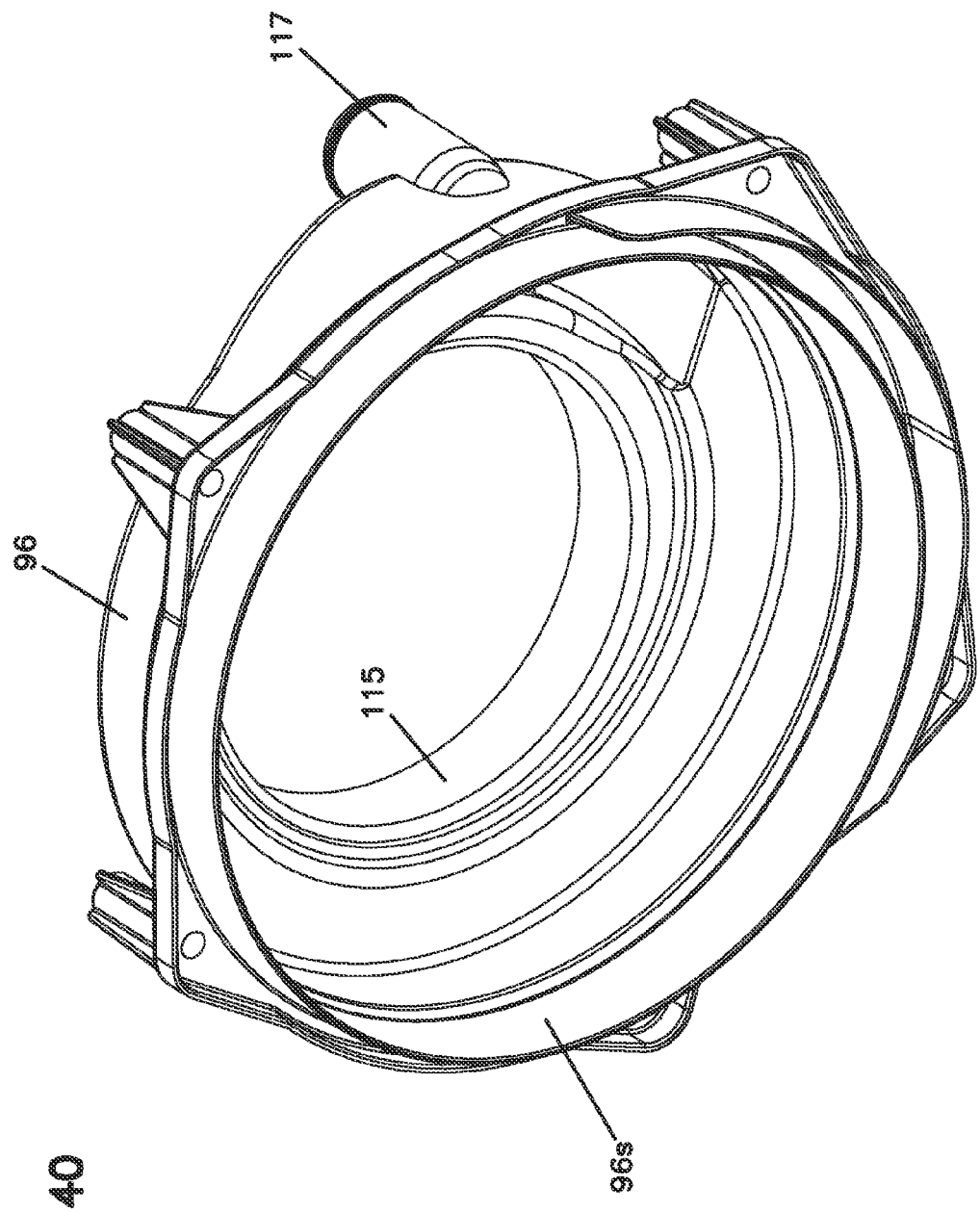
FIG. 40 is a schematic bottom perspective view of the access cover of FIG. 39.
Figure 41:
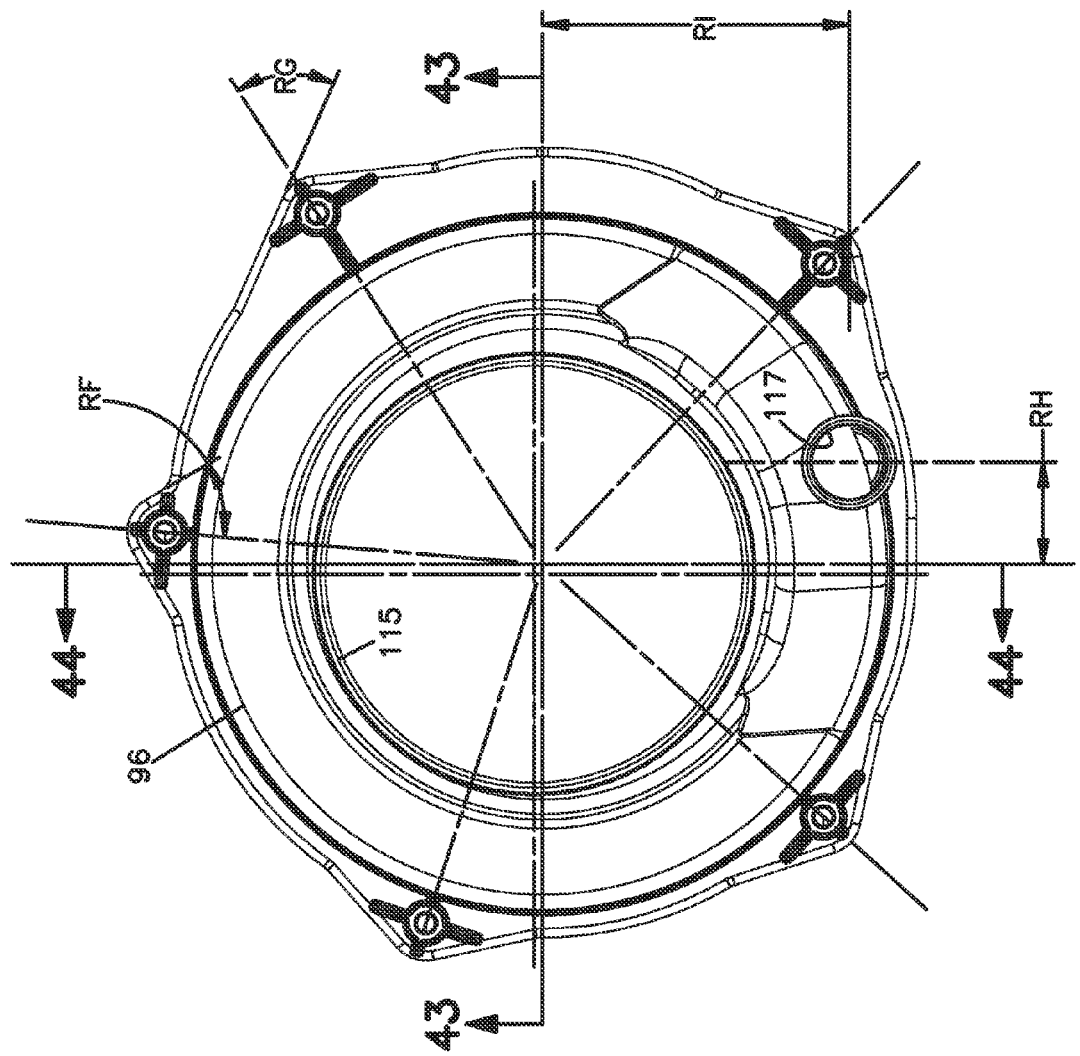
FIG. 41 is a schematic top plan view of the access cover of FIGS. 39-40.
Figure 42:
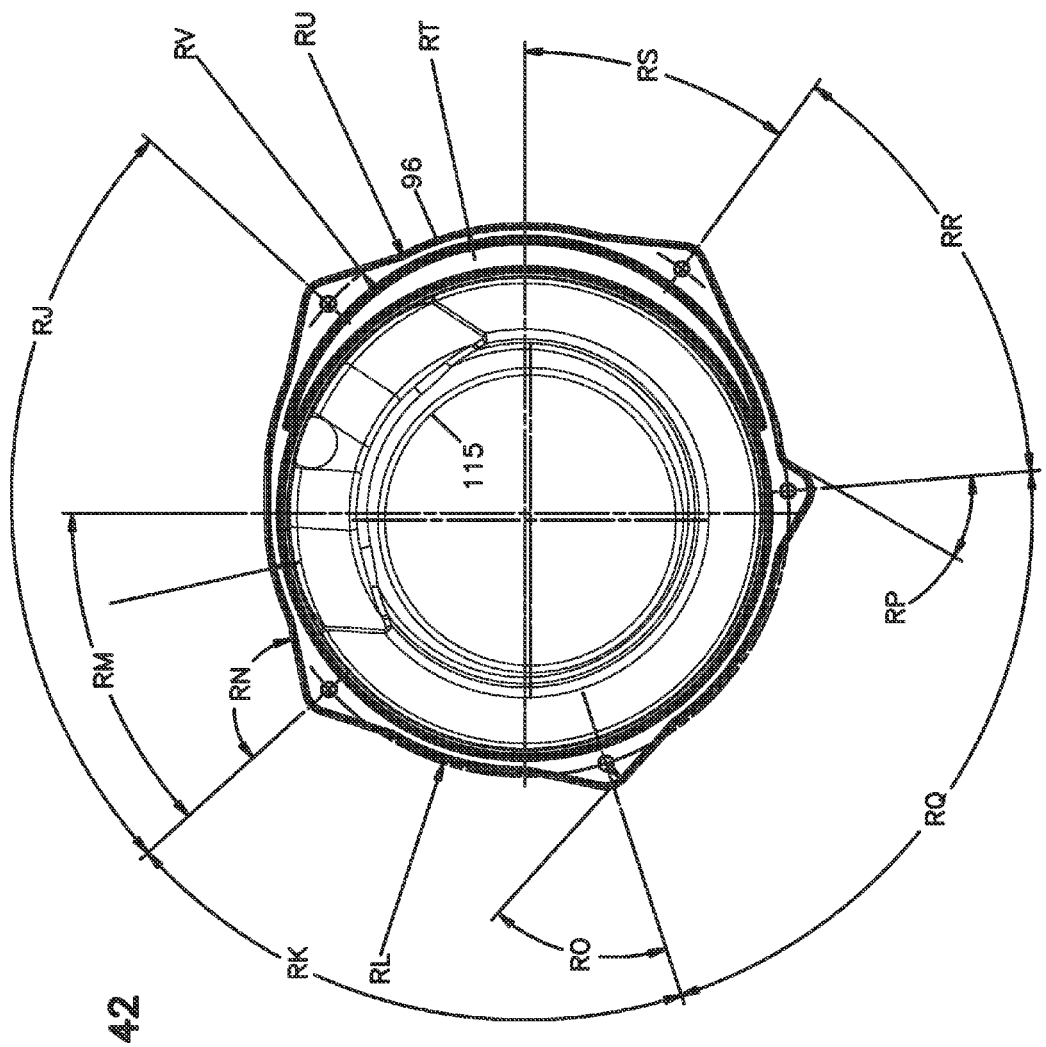
FIG. 42 is a schematic bottom plan view of the access cover of FIGS. 39-40.
Figure 43:
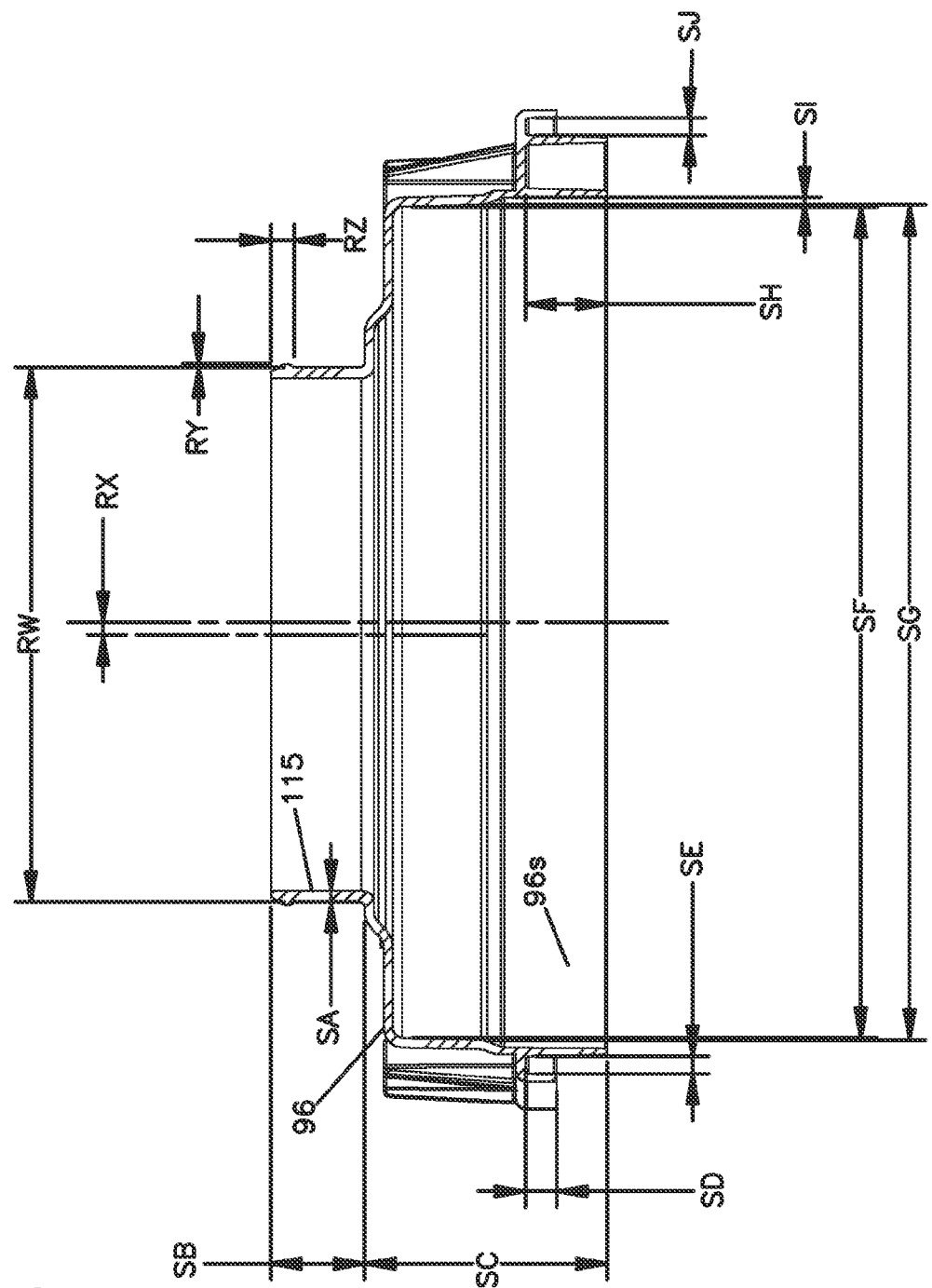
FIG. 43 is a schematic cross-sectional view of the access cover of FIG. 39-40, taken along line 43-43, FIG. 41.

In FIGS. 39-42, the access cover 96 is viewable. In FIG. 39, it is viewable in top perspective view. In FIG. 40, the access cover is viewable in bottom perspective view. In FIG. 41, a top plan view is provided (without information indicia). FIG. 42 is a bottom plan view. In FIG. 43, a cross-sectional view taken along line 43-43, FIG. 41 is provided; and, in FIG. 44, a cross-sectional view taken along line 44-44, FIG. 41 is viewable.

Still reviewing to FIGS. 39-44, one can see the seal surface 96s on the access cover to which the outwardly directed radial seal on the cartridge 1 is to be removably sealed, in installation.

B. The Filter Cartridge and Support Liner, FIGS. 45-53

Figure 44:
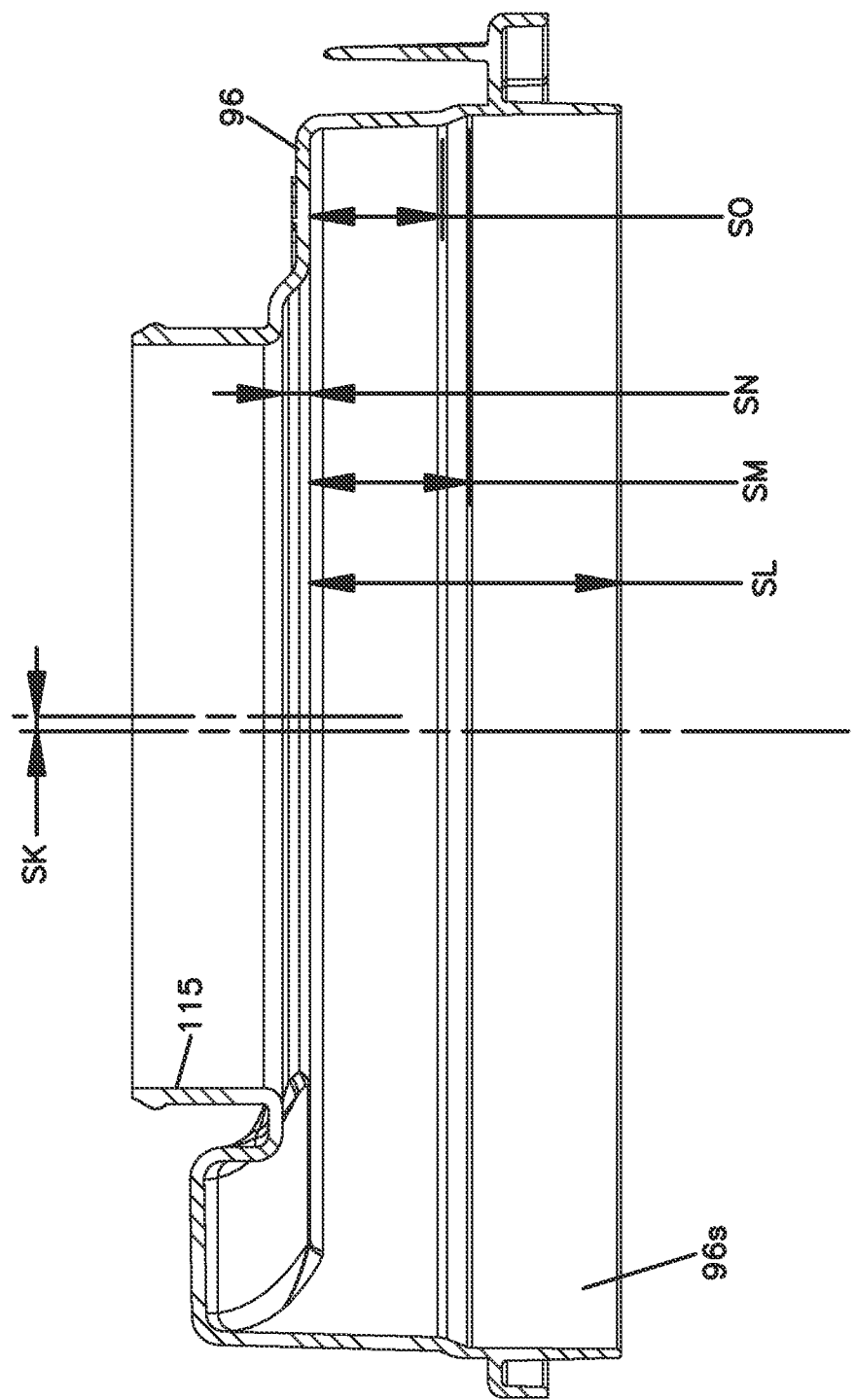
FIG. 44 is a second schematic cross-sectional view of the access cover of FIGS. 39-40, the view of FIG. 44 being taken along line 44-44, FIG. 41.
Figure 46:
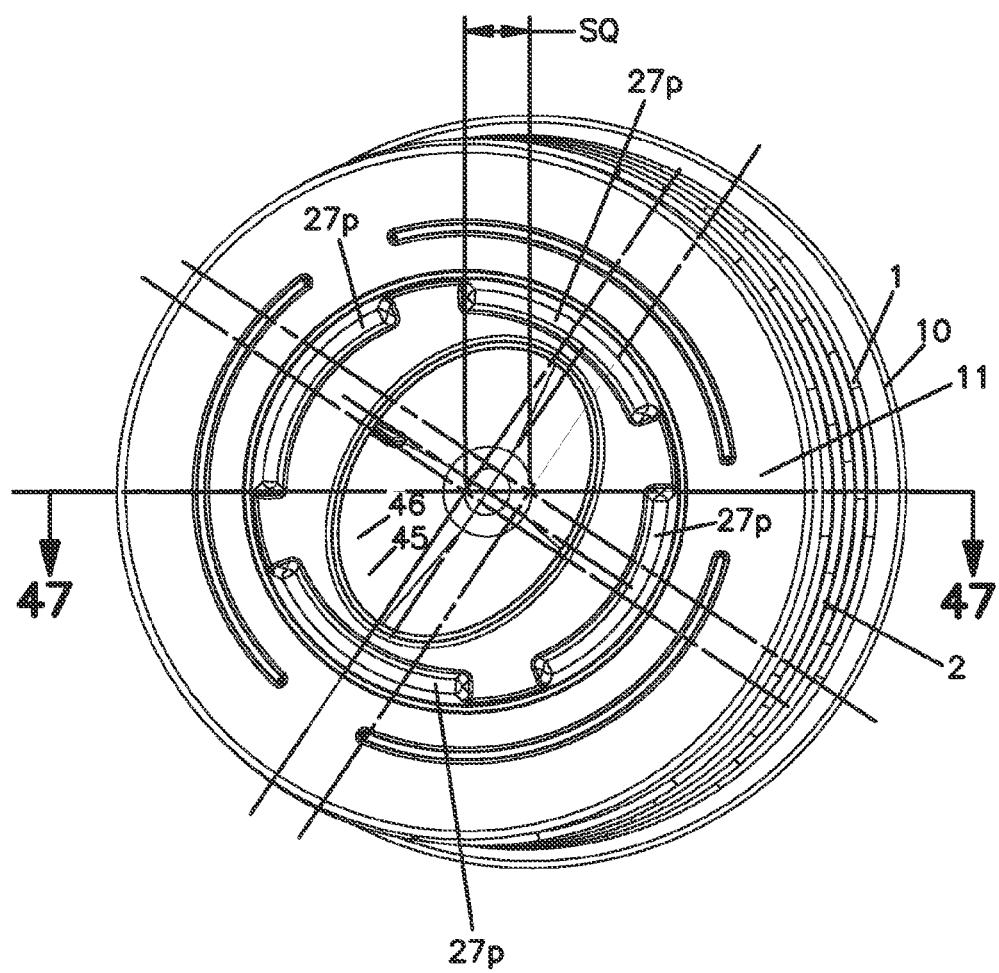
FIG. 46 is a schematic bottom plan view of the cartridge of FIG. 45.
Figure 47:
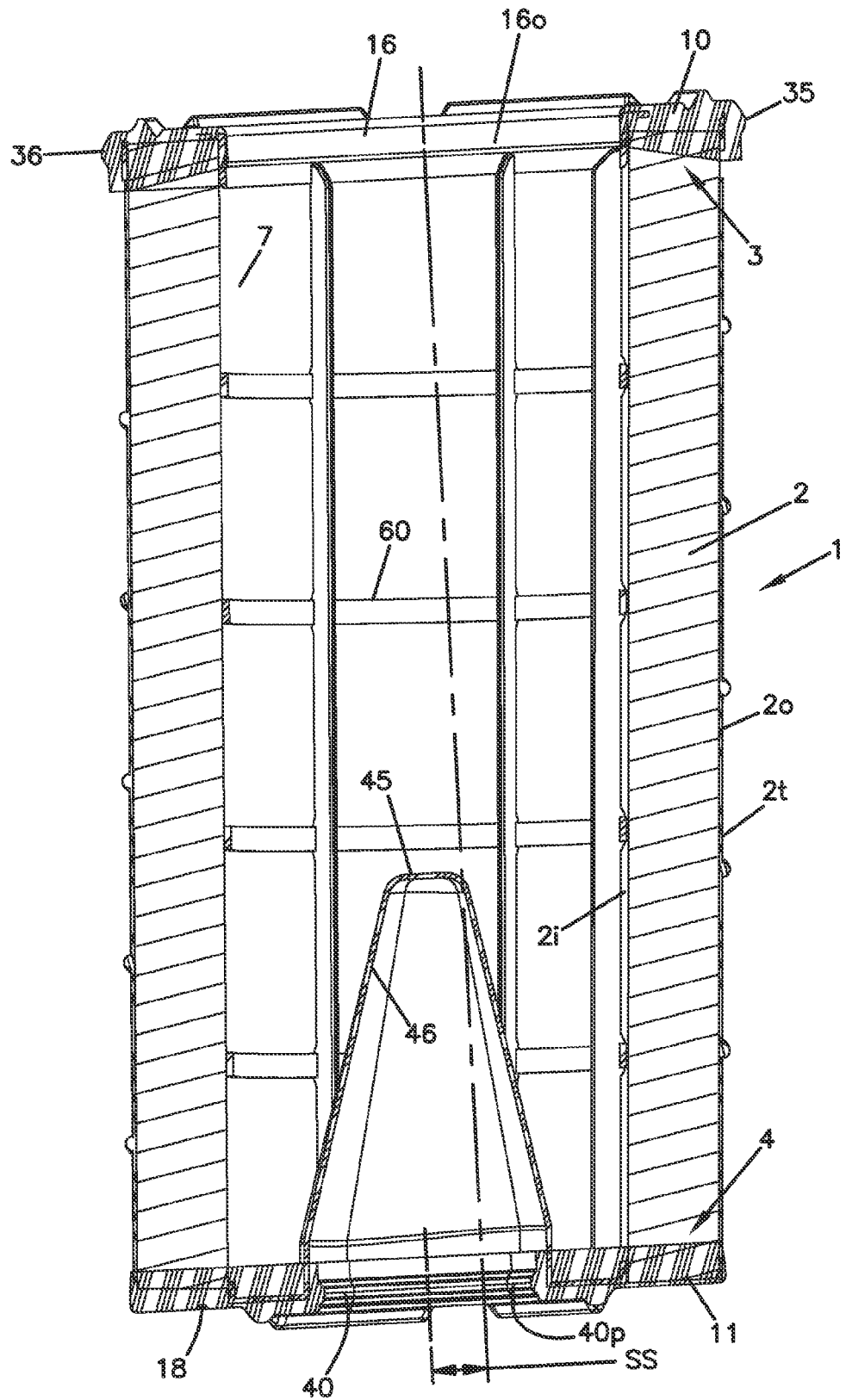
FIG. 47 is a schematic cross-sectional view of the cartridge of FIG. 45 taken generally along line 47-47, FIG. 46.

In FIGS. 45-53, features of cartridge 1 in a form installable in the air cleaner assembly of FIGS. 44-46 are shown. This cartridge 1 is viewable in a side elevational view in FIG. 45 and end view in FIG. 46, the view of FIG. 46 being toward the bottom end piece 11 and in cross-sectional view in FIG. 47; the view of FIG. 47 being taken along line 47-47, FIG. 46. The cartridge 1 can be seen to comprise media 2 around the central cartridge interior 7, the media 2 having opposite ends 3 and 4, engaging opposite end pieces 10 and 11 respectively. End piece 11 is closed, and end piece 10 is open. A housing seal, in the example in the form of radial seal 36 is viewable as an example outwardly directed radial seal an end piece 10. End piece 11 is closed, with a central recess projection 45 that is closed defining a recess receiver 46 on a side thereof not in flow communication with interior 7.

Figure 48:
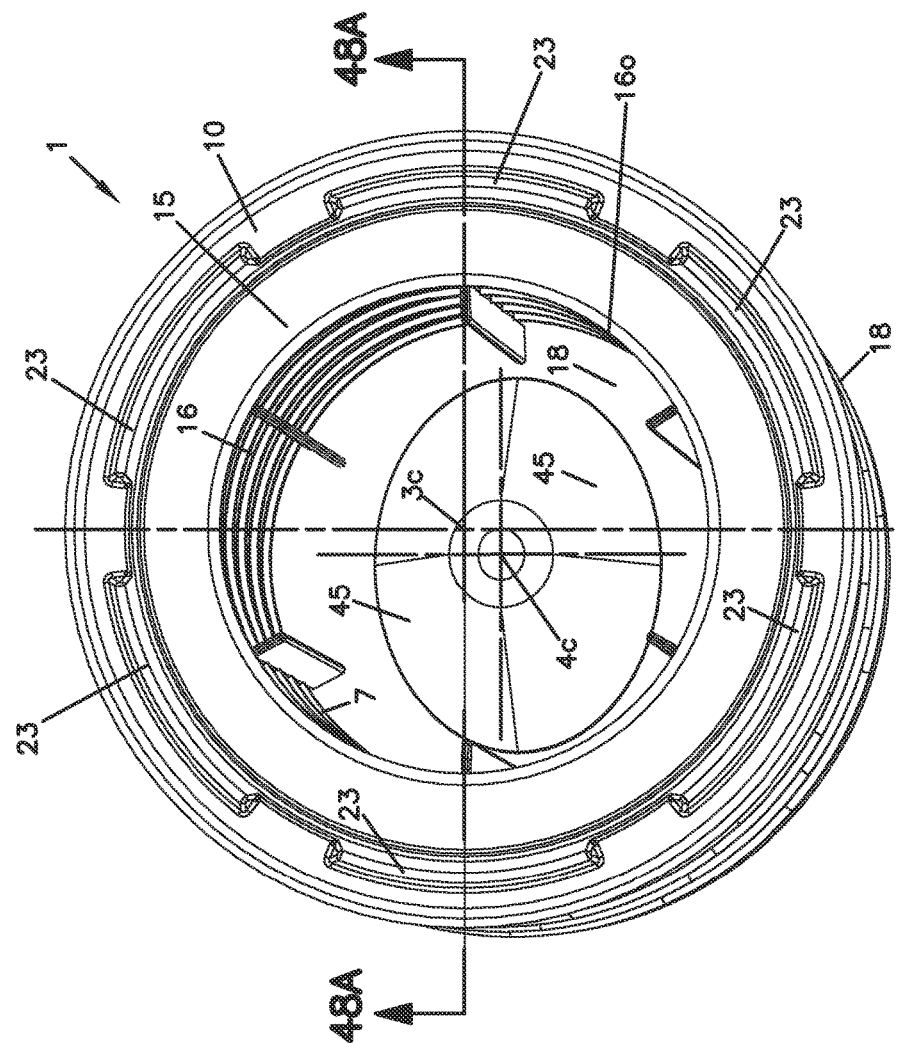
FIG. 48 is a schematic top plan view of the cartridge of FIG. 45.

In FIG. 48, a plan view is depicted taken generally toward end piece 10.

Figure 48A:
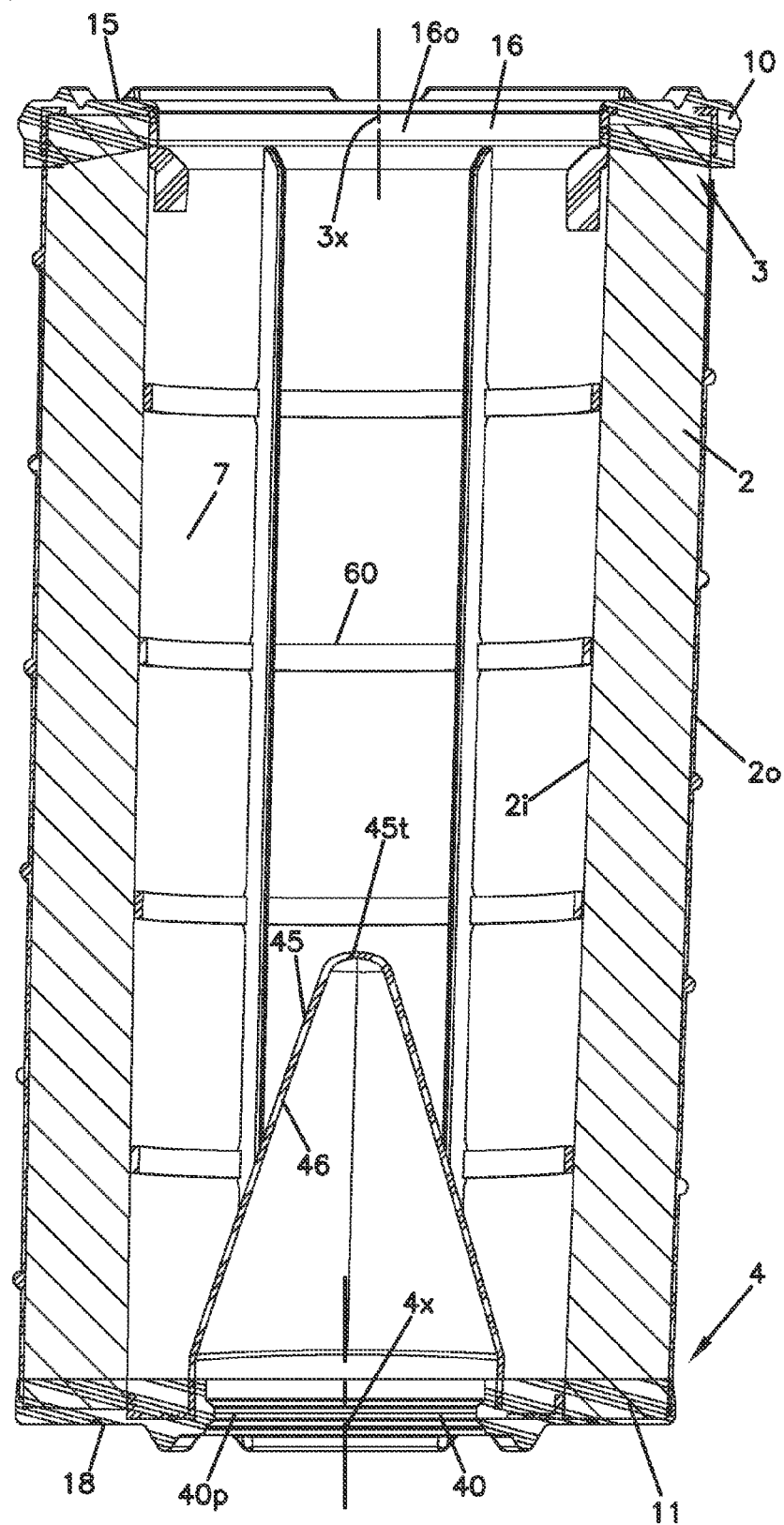
FIG. 48A is a schematic cross-sectional view of the cartridge of FIG. 48, taken along line 48A-48A thereof.

In FIG. 48A, a cross-sectional view taken generally along line 48-48, FIG. 48 is viewable. Central receiver projection 45 can be viewed generally having an oval shape perimeter and a tapered conical shaped as it extends upwardly toward tip 45t. It can be varied from the shape. Also, second housing engagement member 40 is viewable.

Figure 50:
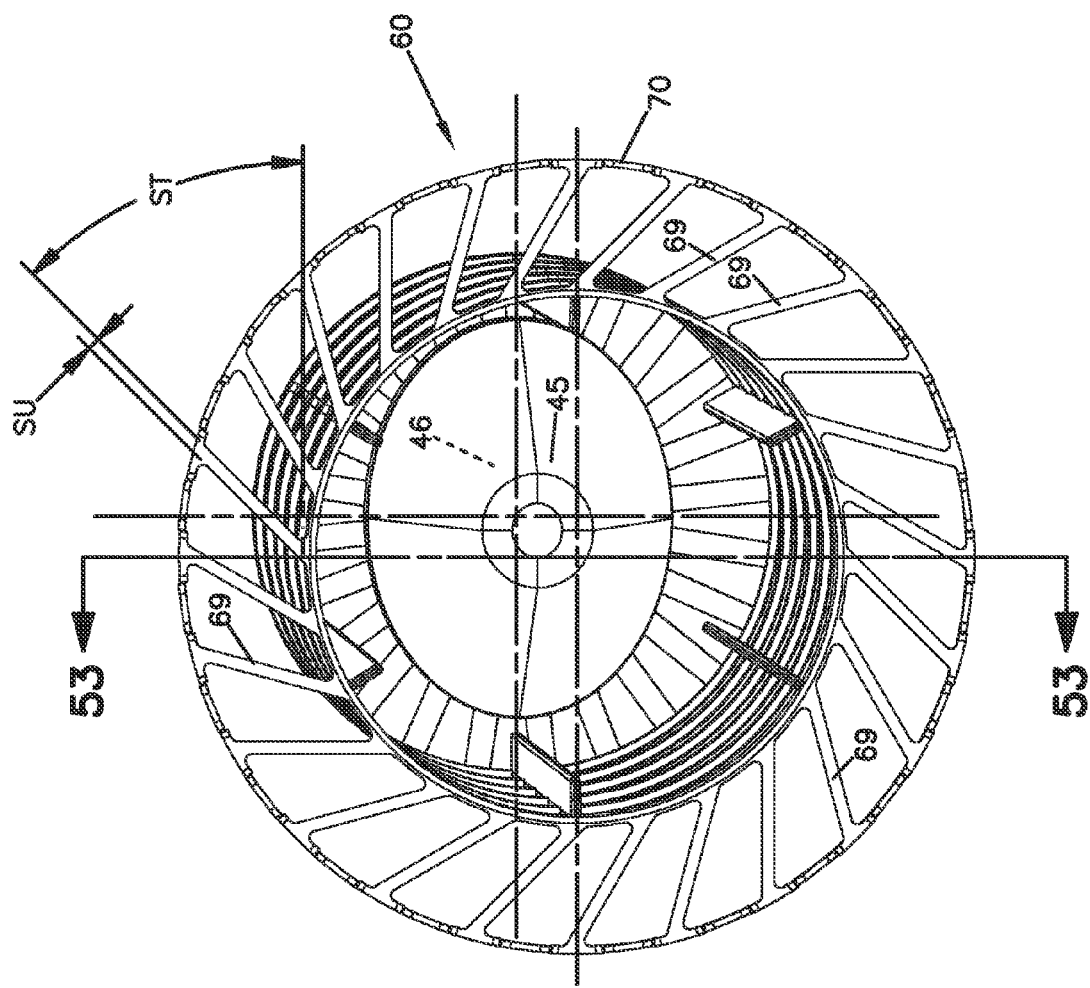
FIG. 50 is a schematic top end plan view of the liner component of FIG. 49.
Figure 51:
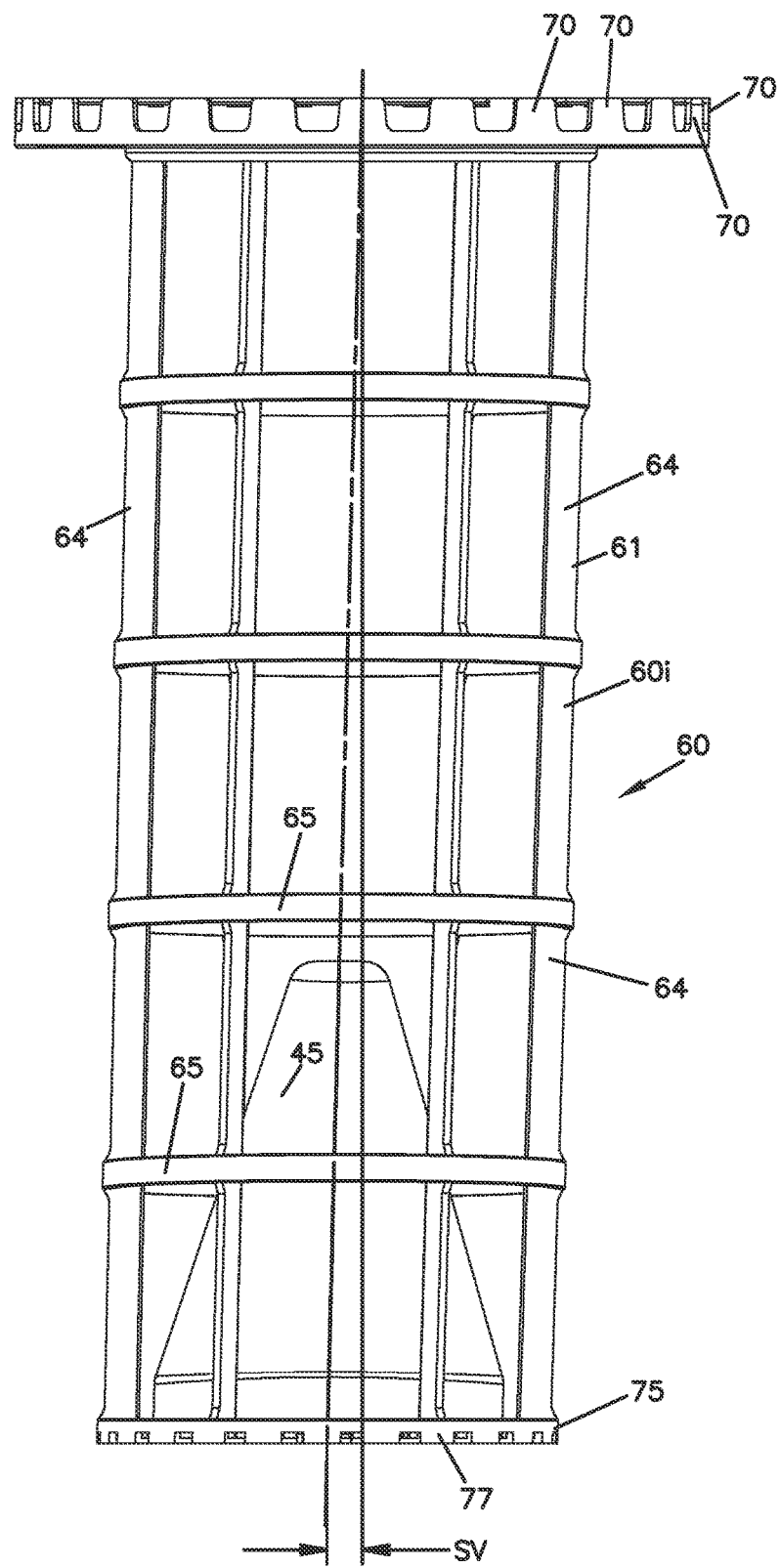
FIG. 51 is a schematic side elevational view of the liner component of FIGS. 49-50.
Figure 52:
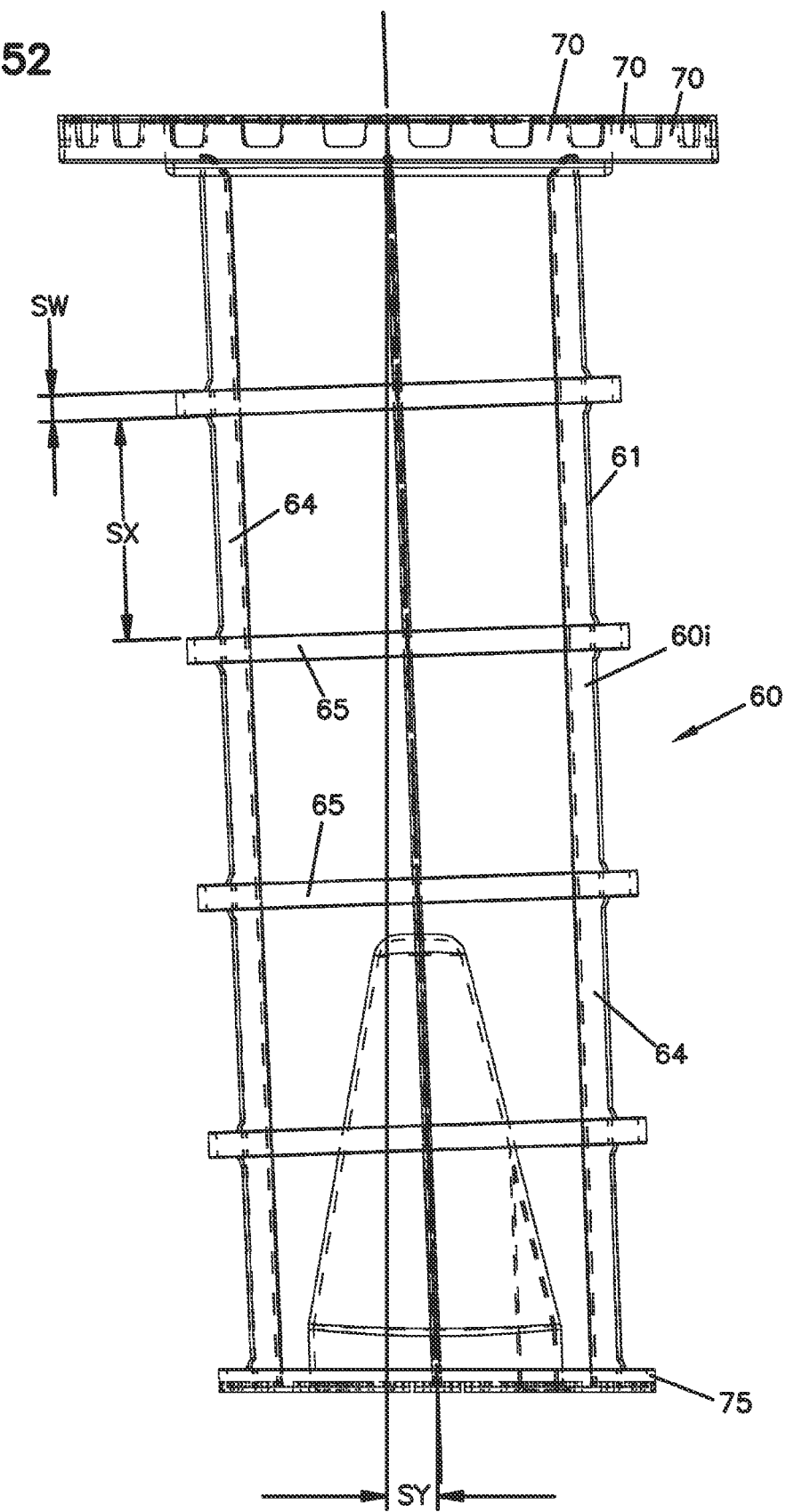
FIG. 52 is a second schematic side elevational view of the liner component of FIGS. 49-50.
Figure 53:
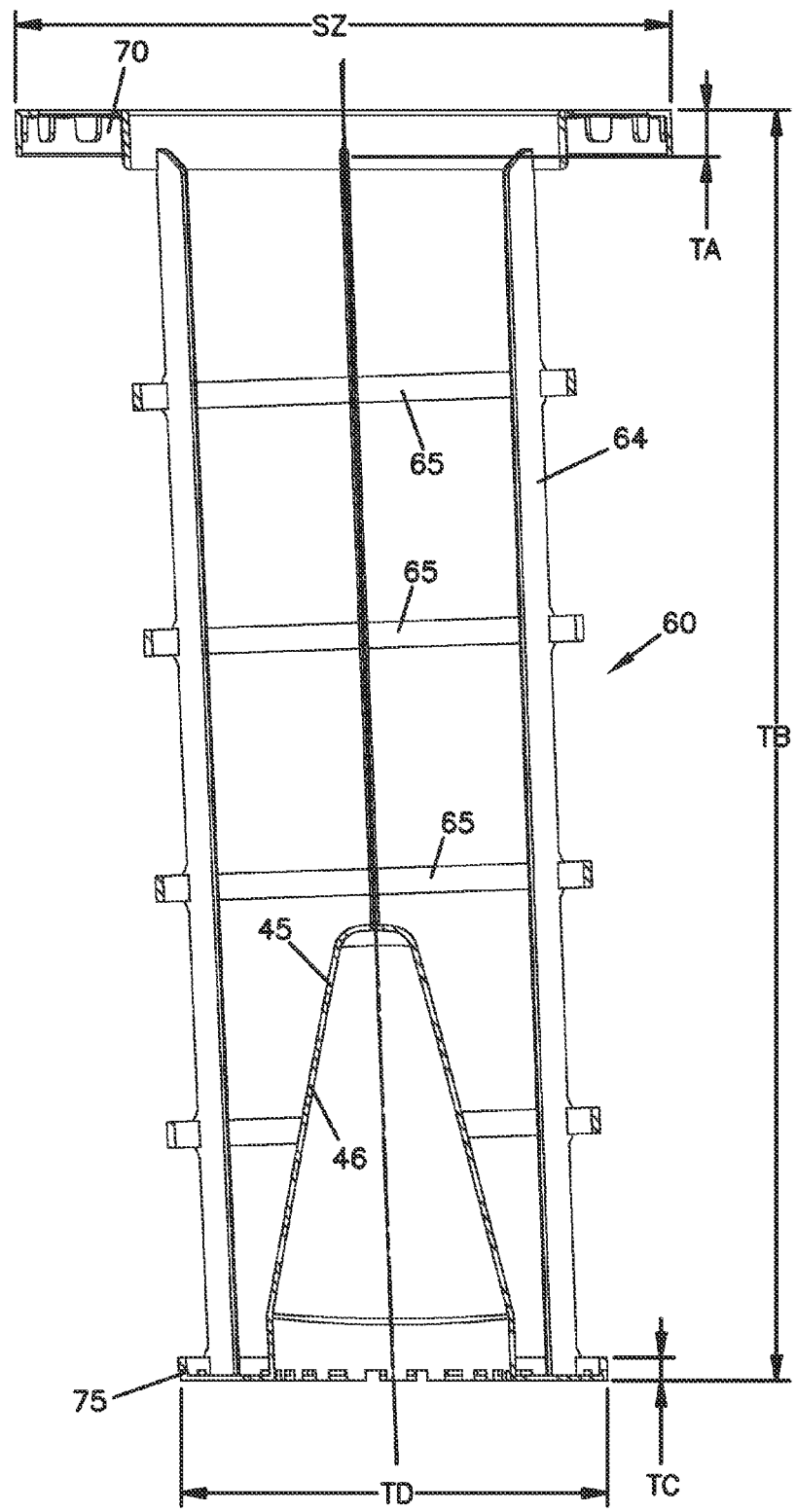
FIG. 53 is a schematic cross-sectional view taken generally along line 53-53, FIG. 50.

In FIGS. 49-53, features of an internal liner support 60 usable to flow cartridge of FIGS. 48-49 are provided. In FIG. 49, a schematic perspective view is provided. In FIG. 50, an end view, in FIGS. 51 and 52, side elevational views are provided; and, in FIG. 53 a cross-sectional view is provided.

C. Demonstration of Attempt at Improper Installation, FIGS. 54-56; Options

From the above descriptions, it will be apparent that in many applications of the techniques described herein, the cartridge and housing will be configured so that there is only one proper rotational orientation of the cartridge, relative to the housing, during installation. Alternatives are possible, but in typical preferred applications this will be the case.

It is preferred to provide the cartridge and housing in a configuration such that the only possible installation orientation is also the one proper one. A variety of features can be implemented to accomplish this. These features can be provided on the cartridge and housing, on the cartridge and access cover, or on all three.

Figure 54:
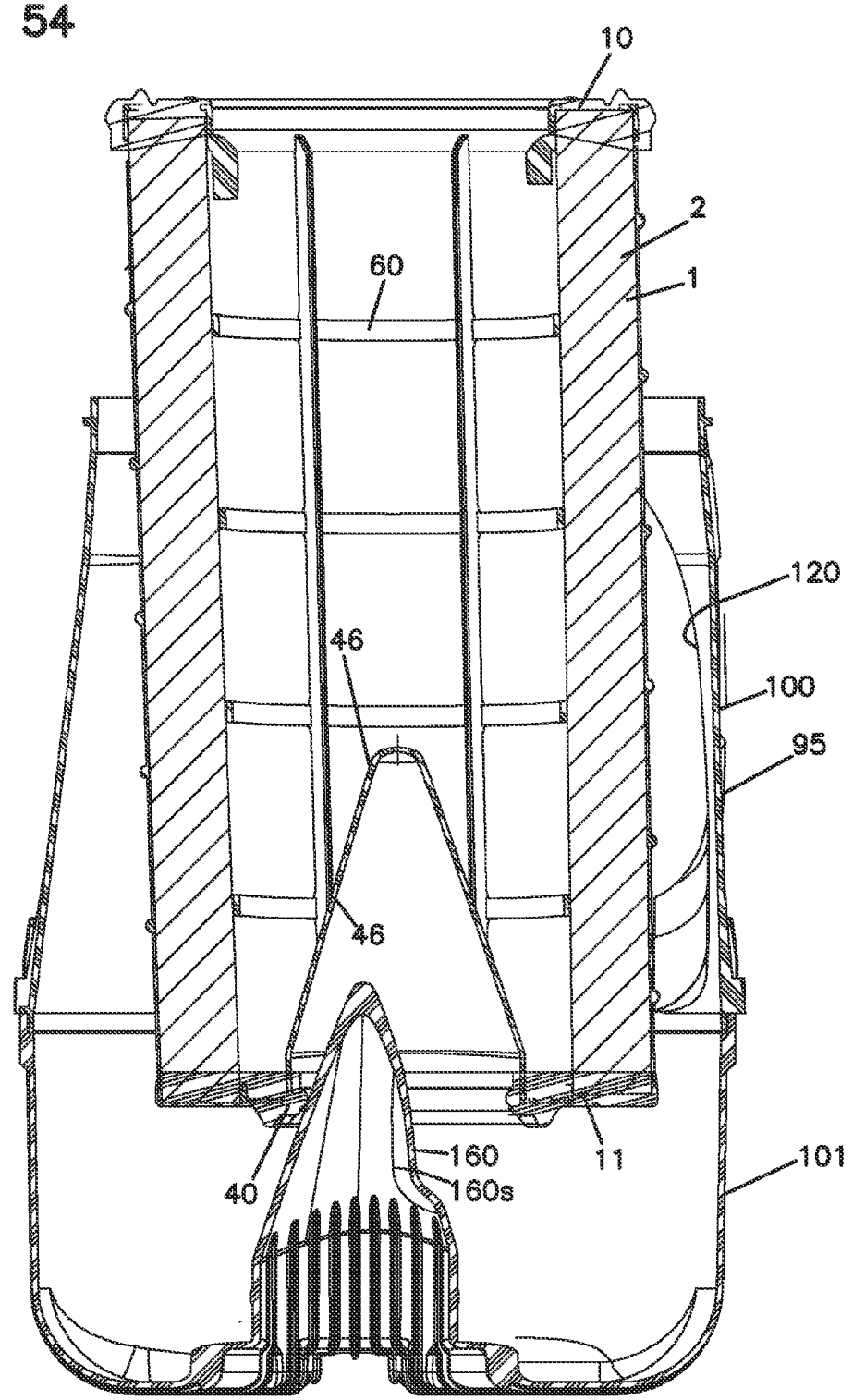
FIG. 54 is a schematic depiction of a step of attempting to wrongly insert a cartridge in accord with FIG. 47 into a housing body in accord with FIGS. 29 and 30.
Figure 55:
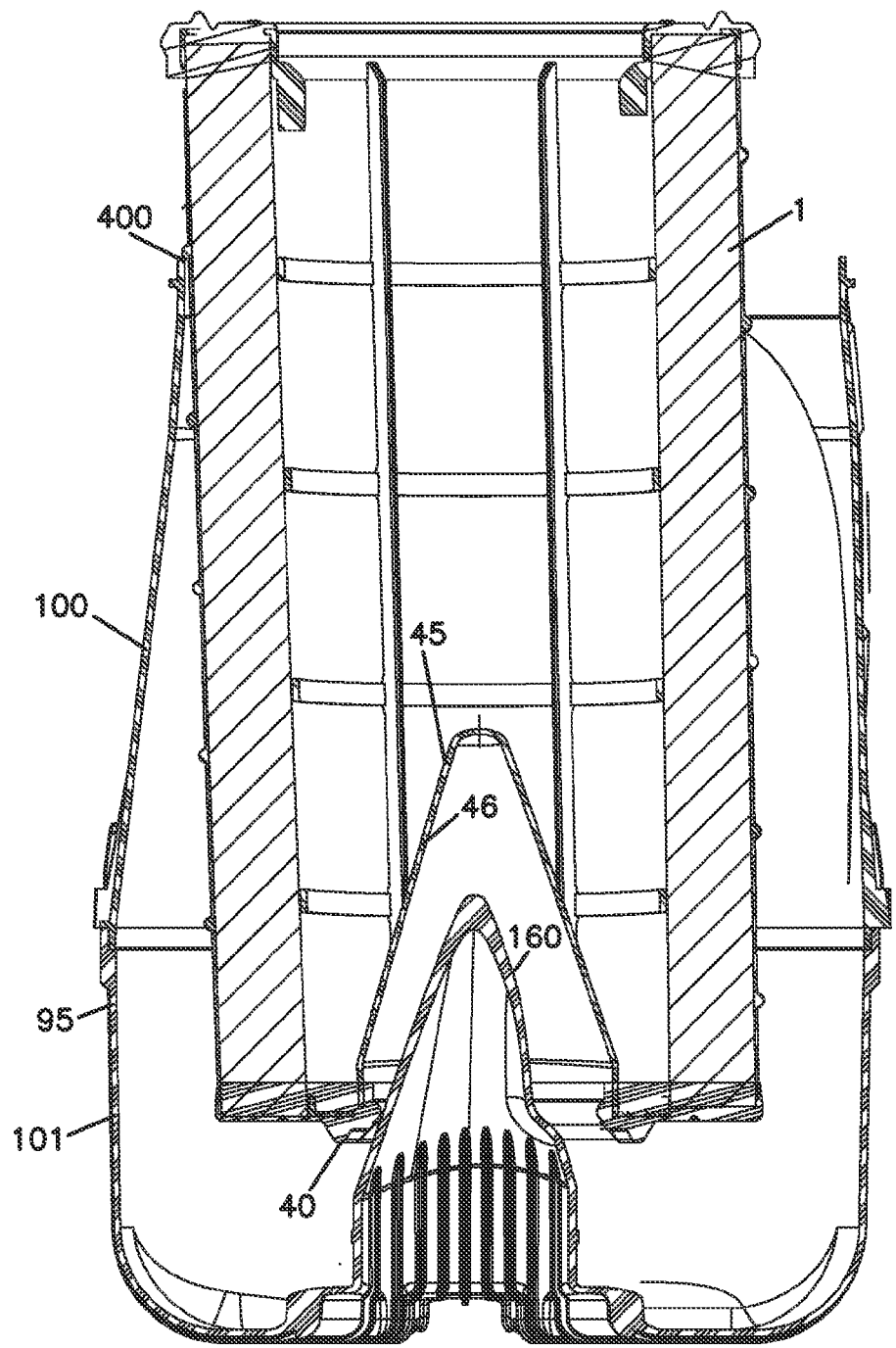
FIG. 55 is a schematic cross-sectional view analogous to FIG. 54, showing potential results of further efforts of installation.
Figure 56:
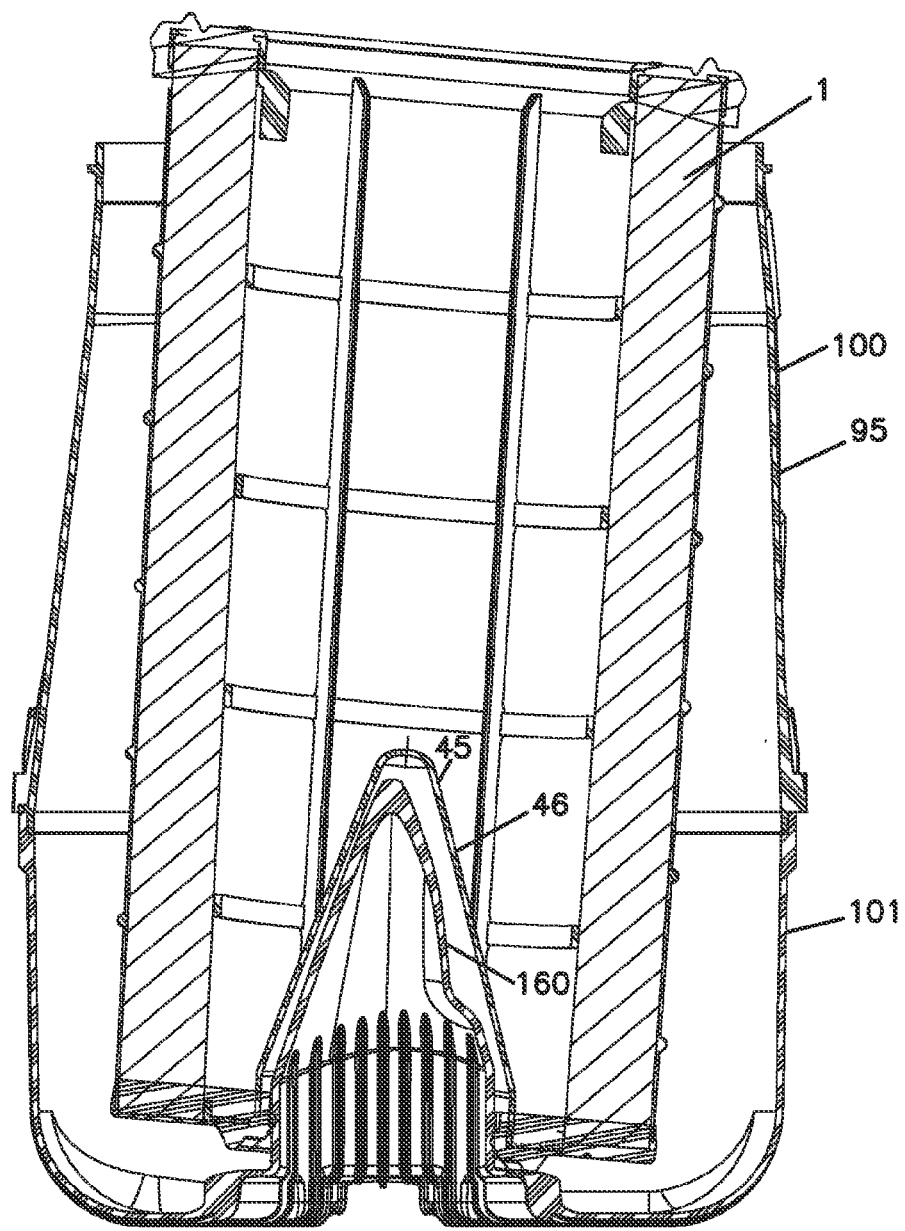
FIG. 56 is a schematic cross-sectional view analogous to FIGS. 54 and 55, depicting a potential outcome of still further efforts at incorrect installation.

In FIGS. 54-56, installation of cartridge 1 into a housing body 95 is depicted. In these figures, the cartridge and housing are generally in accord with FIG. 32, except the cartridge 1 has been rotated 180° around the central axis of one of the two end pieces 10, 11, and thus is being improperly lowered into the housing body. As the cartridge 2 is being lowered, at some point receiver 46, for example at engagement member 40, engages the projection 160. An example of such an engagement is shown in FIG. 54.

In FIG. 55, further lowering has occurred, and a cartridge 1 begins to jam, for example, as indicated at 400, beginning to indicate incorrect installation is occurring. Of course, the cartridge 1 can be wiggled and further installed in the example depicted, see FIG. 56. However, the installer can sense an improper installation due to improper alignment between the projection 160 and the cartridge 46. Also, the access cover will not properly install.

Of course, features can be modified to provide still stronger indication of improper orientation and alignment, if desired. For example, and referring to FIG. 54, recess or shoulder 160s can be configured in a combination with a modified feature in recess 46 such that if the one desired orientation is not obtained, installation will not occur due to structural interference.

Additional structural features can also be used to ensure that an installer attempting to improperly install a cartridge will feel, rather quickly, that the cartridge is not properly oriented to readily drop fully into the housing body 95 to become properly installed.

D. An Optional Safety Liner, FIG. 28

Figure 28:
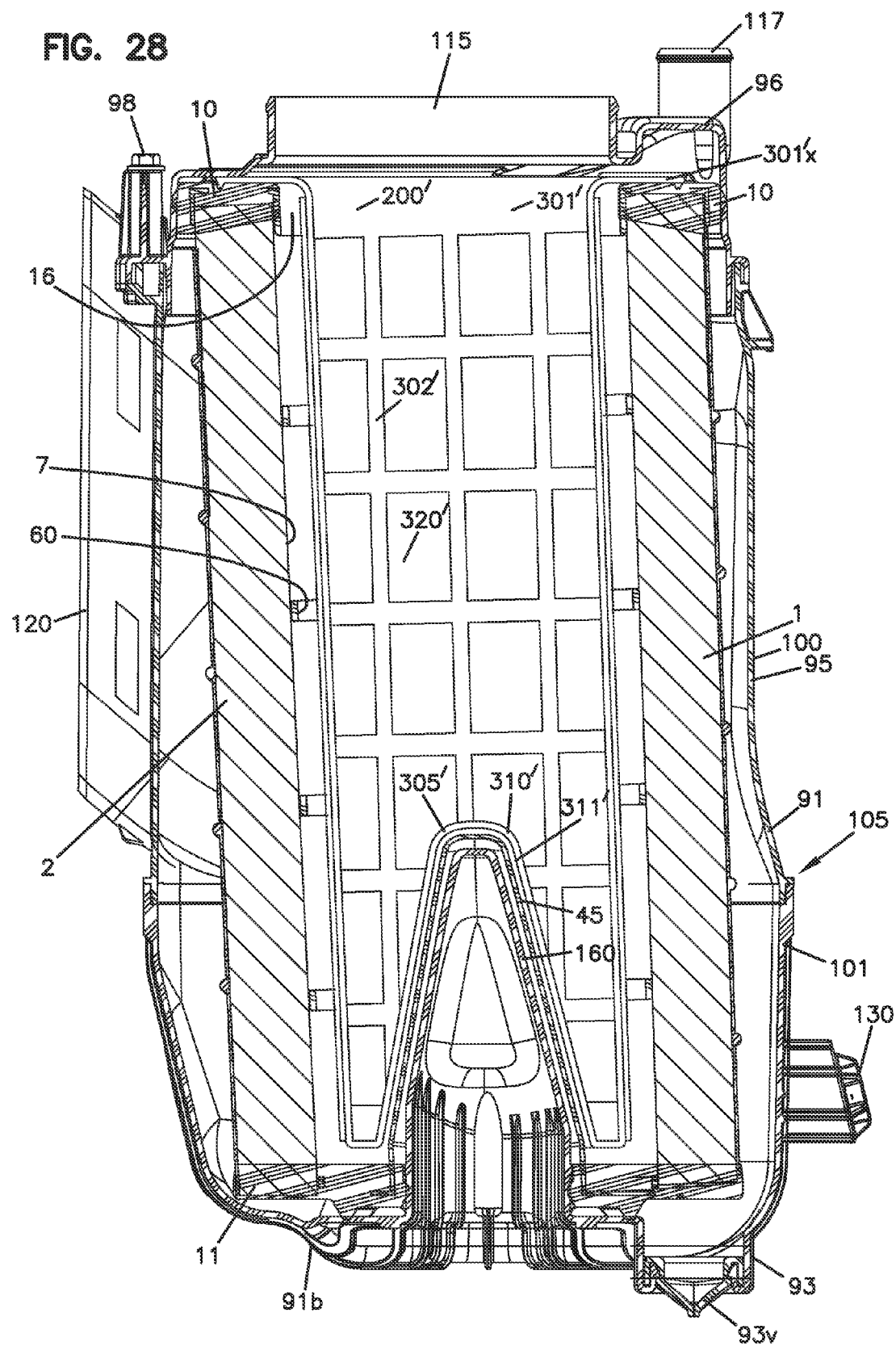
FIG. 28 is a schematic cross-sectional view depicting positioning of a safety filter cartridge within an assembly in accord with FIGS. 29-54.

In FIG. 28, a cross-sectional view analogous to FIG. 31 is provided, except showing an optional safety filter or secondary filter 200', schematically. The secondary or safety filter 200' is shown positioned with a first open outlet end piece 301' engaging end piece 10 of cartridge 1 by having a portion 301'x extending thereover. The safety filter 200 includes a liner or support member 302' that projects into interior 7 of main cartridge 1, to a closed end piece 305'. The closed end piece 305' is configured with a member 310' of projection/receiver arrangement 311' thereon configured to receive projecting therein, the projection 45 on the main cartridge 1 and projection 160 on the housing 91. The support 302' is depicted as a lattice framework, supporting the media 320' of the safety filter.

E. Example Dimensions

In the embodiment of FIGS. 29-30, some example dimensions were provided. These dimensions will indicate an example of a usable system, although alternate dimensions are possible. Referring to these figures: in FIG. 34, QA=91.3 mm; and, QB=101.1 mm; in FIG. 35, QC=38°; QD=35°; QE=17.5°; QF=16.6 mm; QG=35°; QH=21.3 mm; QI=124.2 mm; QJ=221.8 mm; QK=17.5°; QL=28°; QM=114.5 mm; QN=197.5 mm; QO=35°; and, QP=17.6 mm; in FIG. 36, QQ=344 mm; QR=3.6 mm; QS=10 mm; QT=171.5 mm; and, QU=351.2 mm; in FIG. 37, QV=309.2 mm; QW=76.5°; QX=2.2°; QY=11.8 mm; QZ=0.8 mm; RA=19.5 mm; and, RB=82 mm; in FIG. 38, RC=114.5 mm; RD=6.3 mm; and, RE=179 mm; in FIG. 41, RF=34.8°; RG=56.6°; RH=39.8 mm; and RI=119.6 mm; in FIG. 42, RJ=84.5°; RK=66°; RL=147.9 mm radius; RM=42°; RN=120°; RO=60°; RP=34.7°; RQ=76.7°; RR=49°; RS=36.1°; RT=142.3 mm radius; RU=11.0 mm radius; and, RV=147.5 mm radius; in FIG. 43, RW=170 mm; RX=3.9 mm; RY=1 mm; RZ=7.4 mm; SA=3.5 mm; SB=29.8 mm; SC=77.0 mm; SD =10 mm; SE=5.5 mm; SF=264.1 mm; SG=265.4 mm; SH=26 mm; SI=2.3 mm; and, SJ=5.5 mm; in FIG. 44, SK=3.3 mm; SL=68 mm; SM=34.8 mm; SN =6 mm; and, SO=29 mm; in FIG. 46, SQ=23 mm; in FIG. 47, SS=23 mm; in FIG. 50, ST=45°; and, SU=4 mm; in FIG. 51, SV=12.9 mm; in FIG. 52, SY=19.4 mm; SX=85 mm; and, SW=10 mm; and, in FIG. 53, SZ=252.6 mm; TA=18 mm; TB=490.4 mm; TC=9 mm; and, TD=164.6 mm.

VII. Selected Further Example Alternate Assemblies, Components Features, Techniques and Methods, FIGS. 57-78

A. An Alternate Example Assembly and Components; FIGS. 57-76

1. Alternate Seal Variation(s)

Herein above, at IV.B. some alternate seal configurations are discussed. An example discussed in connection with FIG. 25 was a seal shape of the general type characterized in U.S. Ser. No. 13/662,022, incorporated herein by reference. It is noted that U.S. Ser. No. 13/662,022 has published as US 2013/0263744 on Oct. 10, 2013; the publication US 2013/0263744 being incorporated herein by reference. Further, a corresponding PCT application PCT/US2012/062265 has published as WO 2013/063497 on May 2, 2013; WO 2013/063497 being incorporated herein by reference. In general, it will be understood that the seal configurations described and/or depicted in those incorporated references can be used with a filter cartridge and air cleaner assembly having general features in accord with the present disclosure, including the ones of FIGS. 1-56. Examples of this will be understood from an embodiment, and variations, discussed below, in connection with FIGS. 57-76.

It is noted that additional seal variations are included in U.S. Ser. No. 14/266,560, filed Apr. 30, 2014. The variations can be included in systems having other features in accord with the disclosures herein. The U.S. Ser. No. 14/266,560 application is incorporated herein by reference, in its entirety.

2. An Example Alternate Filter Cartridge, FIGS. 57-61

Referring to FIG. 57, the reference numeral 201 generally designates an alternate filter cartridge according to the present disclosure. The filter cartridge 201, among other things, includes a housing seal arrangement as discussed below that is generally in accord with the teachings of U.S. Ser. No. 13/662,022; US 2013/0263744; and, PCT WO 2013/063497 referenced above and incorporated by reference. Referring to FIG. 27, filter cartridge 201 generally comprises an extension of media 202 extending between a first media end 203 and a second media end 204. For the particular example depicted, the depicted media 202 is configured surrounding an open filter interior 207. The media 202 generally extends between: a first end piece (cap) 210 positioned at the first media end 203; and, second end piece (cap) 211, positioned at the opposite, second, end 204 of the media 202.

For the example filter cartridge 201 depicted, the first end piece 210 is an open end piece 215 having central air flow aperture 216 therethrough, in flow communication with the open filter interior 207.

As with previously described embodiments, for the example cartridge 201 depicted, the second piece 211 is typically and preferably a closed end piece 218. Also, although alternatives are possible, typically the cartridge 201 will be configured for "out-to-in" flow during filtering. Alternate or reverse flow is possible in some applications of the present techniques, however. When the cartridge 201 is configured and used for out-to-in flow during filtering, aperture 216 will be an outlet aperture 216o.

Typically, the media 202 will be pleated as shown schematically at 202j in extension between ends 203, 204; i.e. the media 202 will be pleated media 202a comprising a plurality of pleats. Thus, the media 202 can be as discussed above for previously described embodiments.

Referring to FIG. 57, the cartridge 201 depicted is shown with an optional adhesive bead 220 thereon, analogous to previously described bead 20, surrounding the media 202 and engaging outer pleat tips. The bead 220 will help secure the outer pleat tips in proper position, orientation and spacing during use.

As with previously described embodiments, the filter cartridge 201 can be provided with an optional outer liner 221, surrounding an outer perimeter 202o of the media 202. The liner can be as previously discussed above, for other embodiments.

As discussed above for other embodiments, typically, and especially when used with out-to-in flow arrangements, the cartridge 201 will be provided with a preformed inner liner support structure 224 (or preform 224p) around which the media 202 is positioned. The preform or support structure 224 will typically comprise a relatively rigid structure including a portion that extends between the media ends 203, 204 and the end pieces 210, 211, to provide structural support to the media 202 and resulting cartridge 201. The inner liner 224 can comprise a variety of materials including metal or plastic. For typical applications of the present techniques, the inner liner 224 (and overall preform 224p) will often be a molded plastic construction. An example such construction is depicted in FIG. 57C.

As thus far described, the filter cartridge 201 can be generally analogous to cartridge 1, discussed above. In FIG. 57, however, the cartridge 201 is depicted with an alternate housing seal arrangement (in specific detail) from that depicted in connection with cartridge 1. The alternate housing seal arrangement is generally in accord with seal arrangements described and/or depicted in: U.S. Ser. No. 13/662,022; US 2013/0263744; and, PCT WO 2013/063497, incorporated herein by reference. The variations described in these references can be used.

Referring to FIG. 57, attention is directed to end piece 210, in particular to housing seal arrangement 234. The housing seal arrangement 234 depicted is configured as a radial seal arrangement 235. In particular, the example housing seal arrangement 240 is depicted as an outwardly (or radially outwardly) directed housing radial seal 236, although alternatives are possible. The radial seal 236 in this instance is an outer perimeter seal surface 236x which surrounds perimeter portion 237 of end piece 210. In the example depicted, portion 237 of end piece 210 is configured to define a (perimeter) seal surface 236x that is non-circular in perimeter definition. In the example the perimeter shape is depicted in a manner comprising alternating convex (outwardly facing) surface sections 236o and concave (outwardly facing) sections 236i, as the surface 236x extends (continuously) peripherally around a central seal axis X (or seal center C). That is, section 236o generally curves radially outwardly away from such an axis X, or seal center C and sections 236i generally curve radially inwardly toward central axis X, or center C, as surface 236x undulates in its path of extension peripherally around central axis X. This type of seal can be advantageous, as described in the cited references. The surface 236x can be constructed using the techniques described in those references, and referenced below herein. Herein, when a reference is made to a seal axis or to a seal center, the reference is meant to define an axis or center point of the seal surface definition. The center or axis will typically be located at a position defined by the intersection of: a first longest line across the seal surface perimeter; and, a line perpendicular to that longest line, taken through a center of the first line. This would be a similar definition to the analogous centers discussed previously for the previously described embodiments.

Still referring to FIG. 57, as a result of the shape defined, the seal surface 236x can be characterized as comprising a plurality of lobes (in regions 236o) that are outwardly directed, and which are separated by recesses (in region 236i).

Typically there will be at least three such lobes, usually at least four, and often a number within the range of 4-12, inclusive. In the example depicted, there are six lobes.

In other fashions, the cartridge 1 can be generally analogous to cartridge 1, FIGS. 1-6. Variations are possible, however.

Figure 57A:
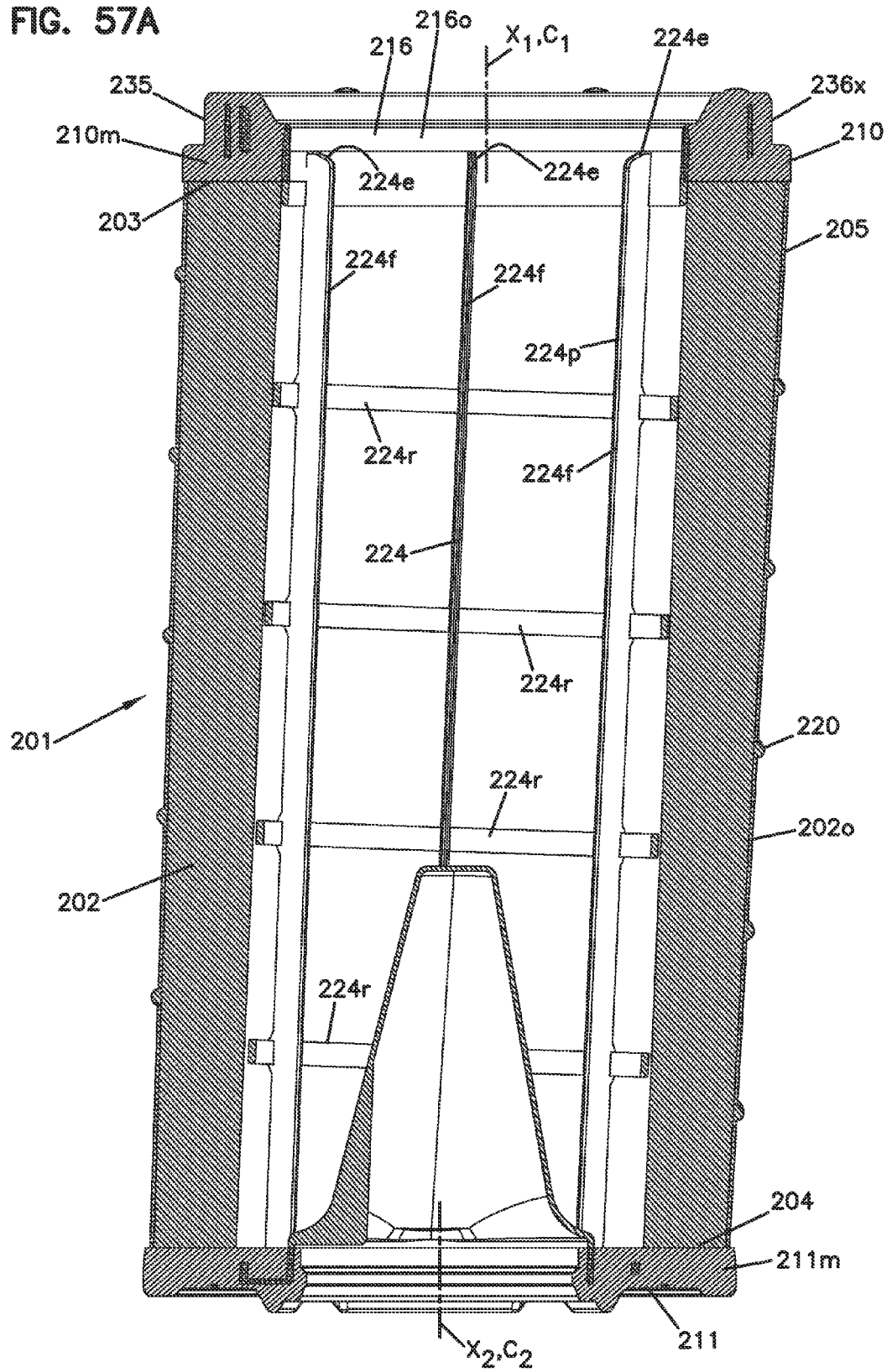
FIG. 57A is a first schematic cross-sectional view of the filter cartridge of FIG. 57.

In FIG. 57A, a first cross-sectional view of cartridge 201 is depicted. Analogous reference numerals indicate analogous parts. In FIG. 57A, the designation $X_1$, $C_1$, shows a central axis or center for selected features of the first end cap 210, including: an outer perimeter of the end cap; a seal surface 236x; and, central aperture 216; and, a center of an outer liner 205; preform 224p; and, outer and inner perimeters of media 203, in regions adjacent end cap 210.

In FIG. 57A, line $X_2$ and analogous center $C_2$ are generally center features associated with lower end cap 211, and the media end 204 (and features adjacent thereto). It can be seen from a review of FIG. 57A that $X_1$, $C_1$ are offset from $X_2$, $C_2$; i.e. the associated features of end cap 210 are eccentrically positioned relative to end cap 211, in manners generally analogous to those discussed above in connection with FIGS. 1-56.

Figure 57B:
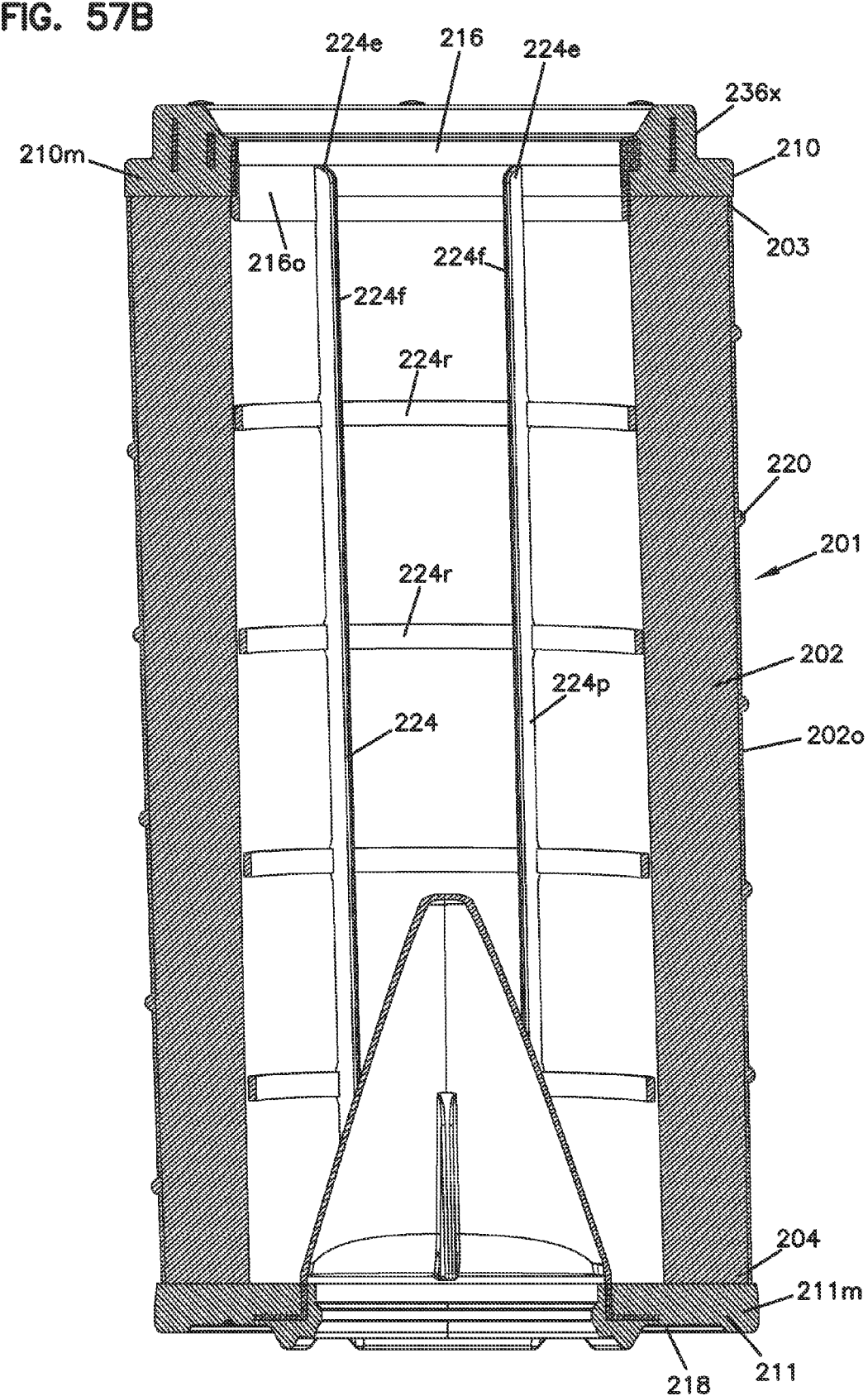
FIG. 57B is a second schematic cross-sectional view of the cartridge of FIG. 57; the view of FIG. 57B being taken approximately at a right angle to the view of FIG. 57A.

In FIG. 57B, one can see a second cross-sectional view of cartridge 201 taken generally at a right angle to the view of FIG. 57A.

In FIG. 57C, one can view a support 224 comprising a preform 224p, usable to form the cartridge 201. Among other things, upon review of FIG. 57C, one can view the support 224 as including a seal support member 224m comprising undulating surface around a center or central seal axis, $X_1$, $C_1$, FIG. 56A, with alternating outwardly convex (lobes) portions 224x and outwardly directed concave (recess) portions 224i. Surface 224m is generally a support surface to a seal such as housing seal arrangement 235. In the example, surface 224m is positioned in overlap with media end 203 at a location between inner and outer pleat tips.

It will be understood that to construct cartridge 201, the preform 224p can be provided with appropriate media wrapped therearound. The media could be provided in a form having an outer liner and/or bead arrangement, if desired. The various end pieces 210, 211 would be completed by placing an appropriate end of the media packs/preform into a mold with resin appropriate to form molded-in-place sections. The materials used for the molded-in-place portions of end pieces 210, 211 can be described above for the embodiments involving FIGS. 1-56.

The molding operation can be conducted analogously to the descriptions in U.S. Ser. No. 13/662,022; US 2013/0263744; and, PCT WO 2013/063497, incorporated by reference.

Figure 58:
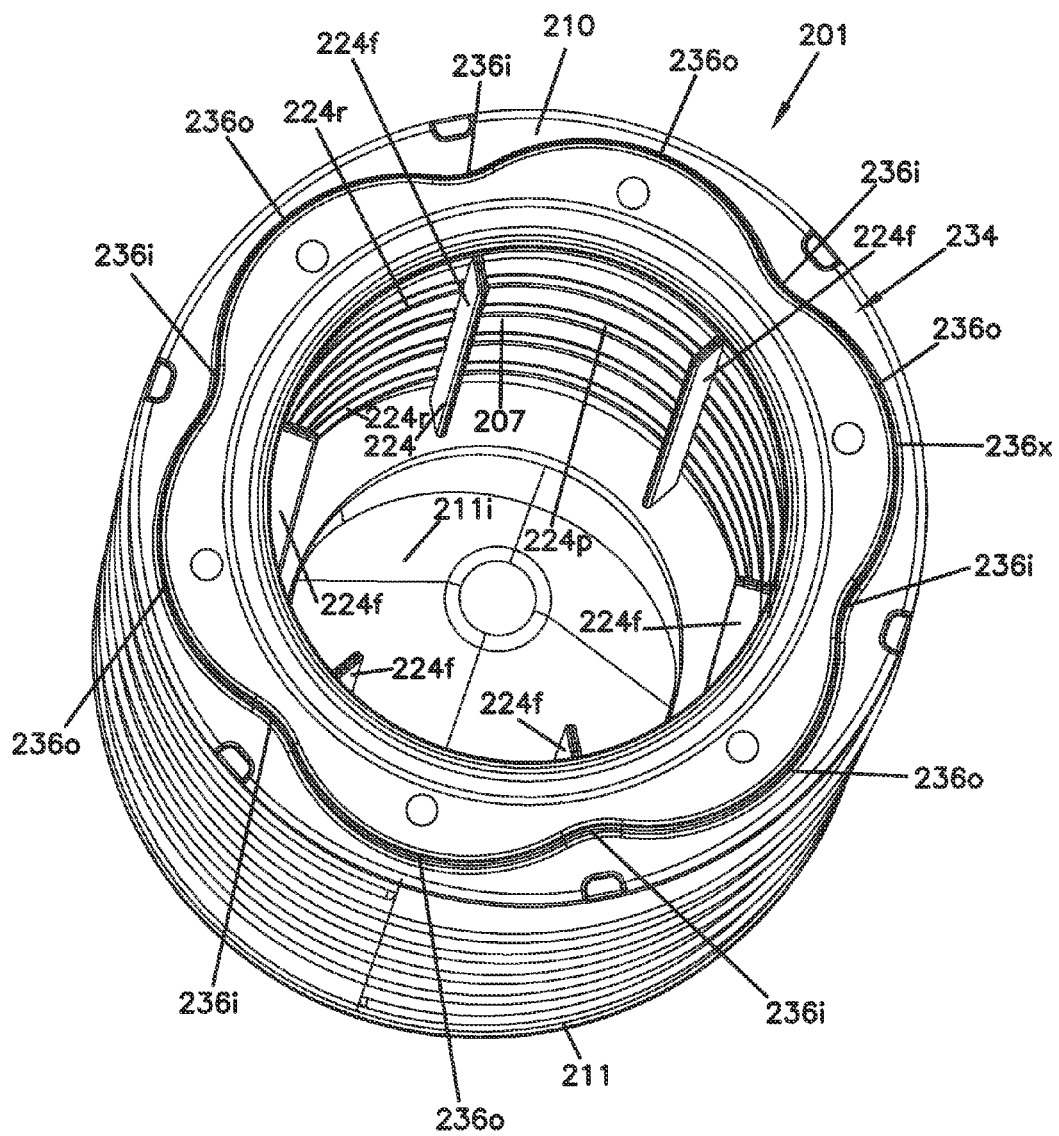
FIG. 58 is an alternate schematic open end perspective view of the filter cartridge of FIG. 57.

In FIG. 58, a second outlet end perspective view of cartridge 201 is depicted, the view of FIG. 58 showing more interior features than viewable in FIG. 57. Housing seal arrangement 234, with outwardly directed radial seal surface 236x is viewed, with the alternating radially (outwardly) convex and radially (inwardly) concave sections 236o and 236i respectively. In FIG. 57, further features of the cartridge 201 in interior 207 are viewable. In particular more features of liner 224 (and preform 224p) can be seen. The example liner 224 can be viewed as having a plurality of spaced longitudinal (fin) extensions 224f and spaced radial ribs 224r, (see also FIG. 57C). An interior central surface portion 211i of end piece 211 is also viewable. In the example cartridge depicted, this interior central surface portion 211i is closed, and comprises a central portion 211c of end piece 211, which can comprise a portion of a preform 224p used to provide support 224. Such a component is discussed further below.

Figure 59:
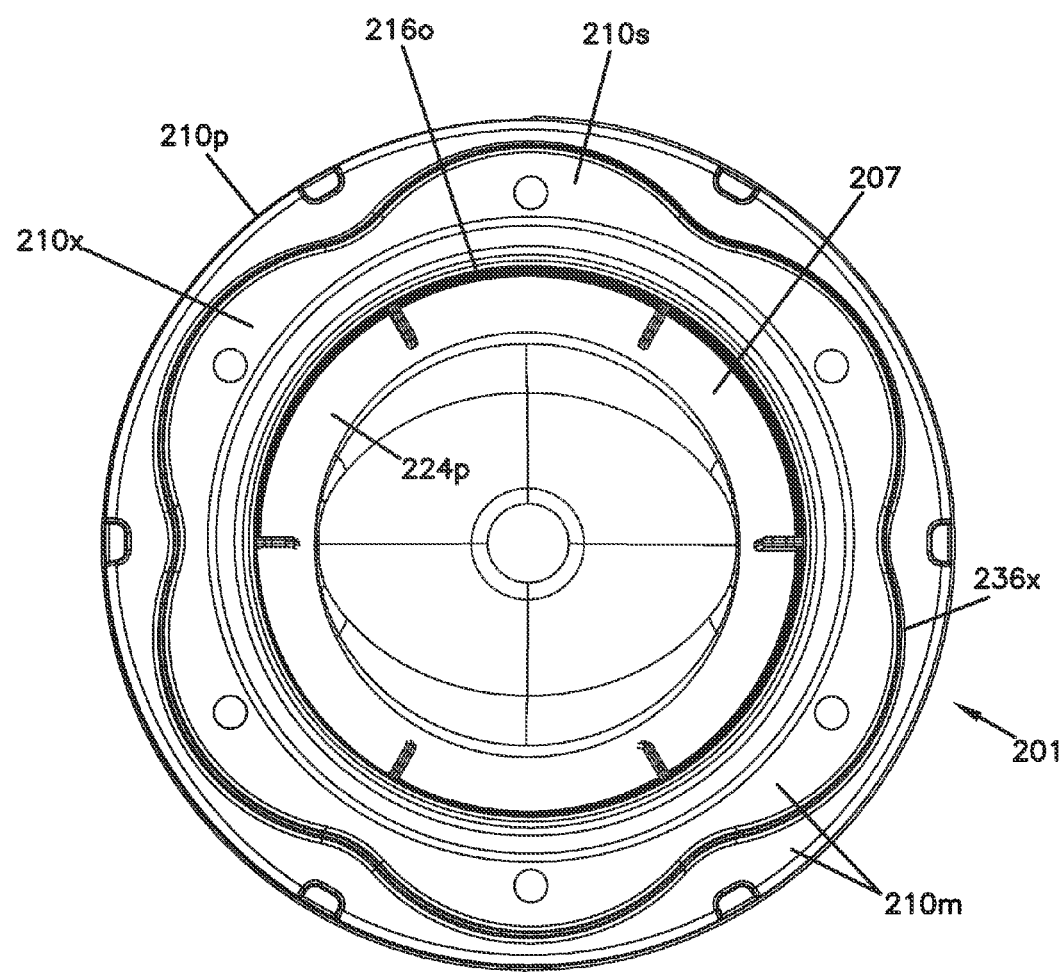
FIG. 59 is a schematic top view of the filter cartridge of FIG. 57.

In FIG. 59, a view is shown oriented such that only an outer axial surface portion 210s if end piece 210 and interior portions of cartridge 201 through aperture 216o are viewable. Again, the general configuration of housing seal surface 236x can be seen. Referring to FIG. 59, end piece 210 can be seen as defining a perimeter region 210p and a projection section 210x. The projection section 210x defines, along a periphery (perimeter) thereof, housing seal surface 236x. Again, referring to FIG. 59, interior 207 is viewable, with the preform 224p therein.

In FIG. 60, a view taken toward end piece 211 is shown. Here, the closed end 211c an be seen as comprising a molded-in-place ring portion 211r with central closure 211p. Ring segments 227p can be analogous to ring segments 27p, discussed above; and, section 211p can be viewed as projection somewhat analogous to projection 45 extending into open cartridge interior 207 toward end piece 210. Section 211p (see FIG. 57C) can be configured to engage in a preferred manner, a housing section analogously to projection 45, as discussed further below.

Figure 60A:
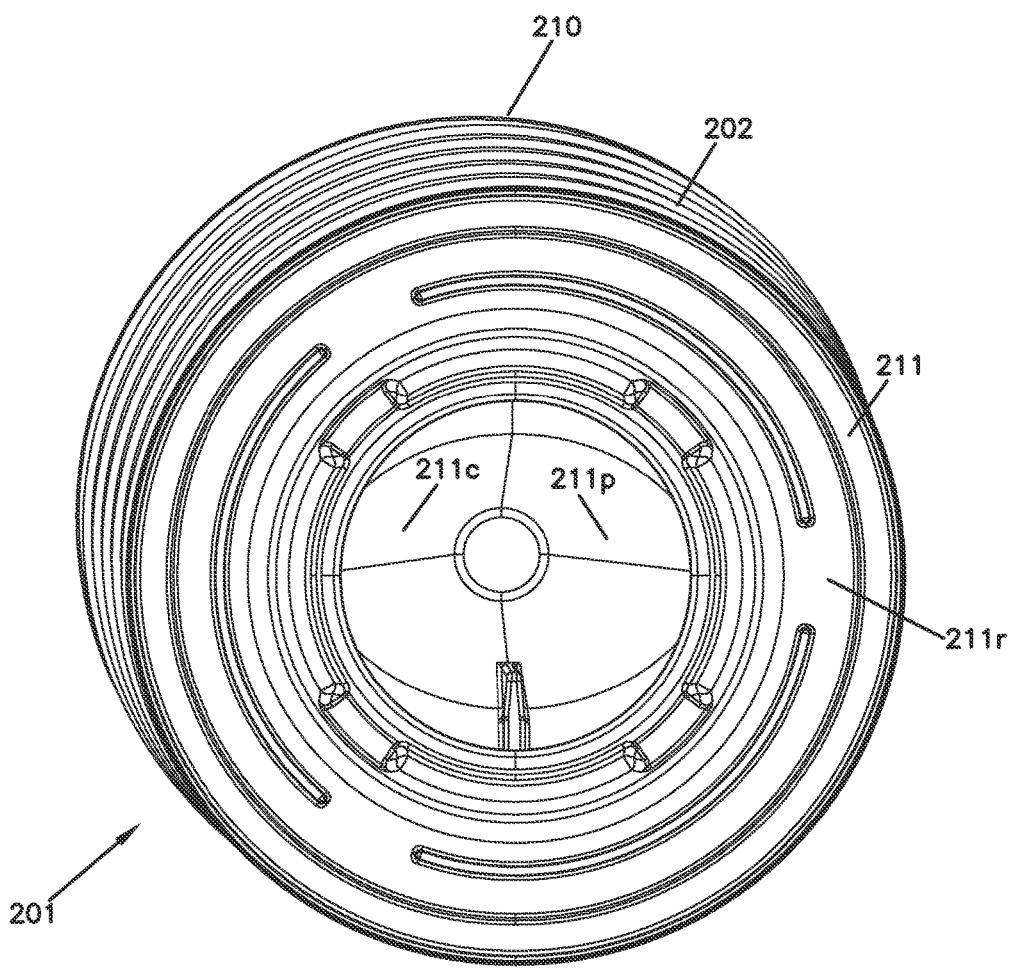
FIG. 60A is a second schematic bottom view of the bottom view of the filter cartridge of FIG. 57.

In FIG. 60A, a view similar to FIG. 60 is depicted, but offset slightly to see other features of cartridge 201.

Figure 61:
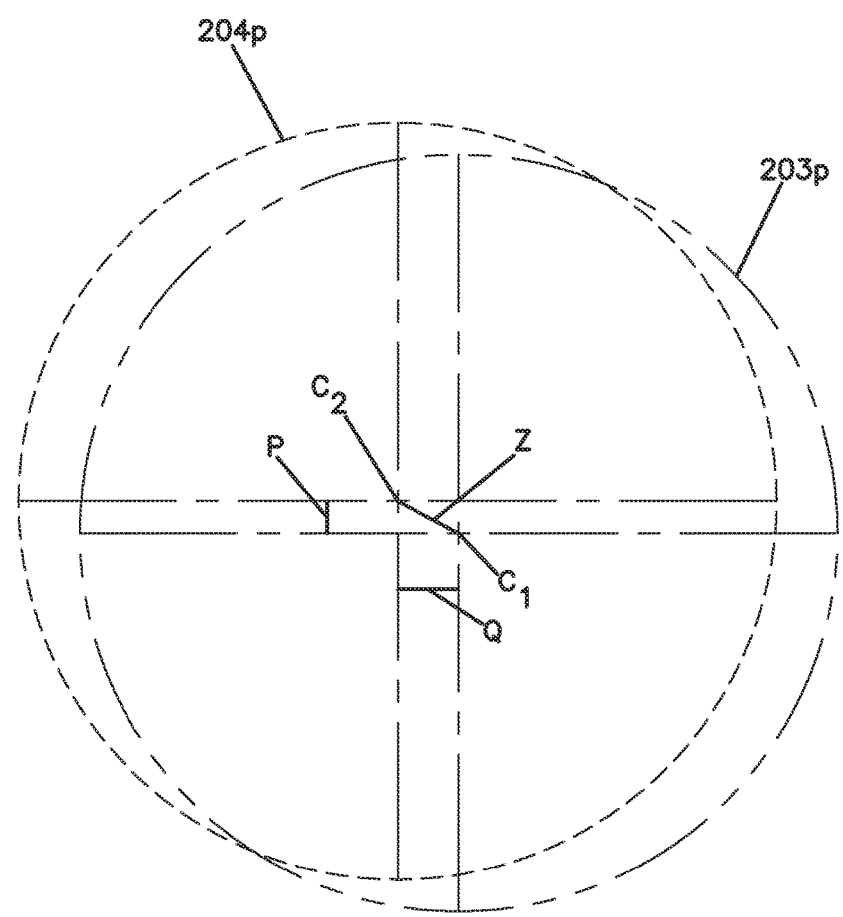
FIG. 61 is a schematic projection depiction of example eccentricity usable in the filter cartridge of FIGS. 57-60A.

The cartridge 201 can be implemented with an eccentricity similar to that for cartridge 1, if desired. In FIG. 61, a schematic representation showing eccentricity defined by a selected media perimeter 203p, at end 203, and a media perimeter 204p at end 204 is shown. The eccentricity Z can be seen as defined by the offsets P and Q respectively.

Variations in the media pack discussed above for cartridge 1 can be applied in connection with the cartridge 201, analogous to cartridge 1.

Herein above, reference was made to "molded-in-place" portions of end piece 210 and 211. With respect to end piece 210, these portions are indicated in FIGS. 57A and 57B at 210m. In general, 210m includes portions of media 203, any outer liner, and portions of support 224p embedded therein.

The molded-in-place portions of end piece 211 generally are indicated in FIGS. 57A and 57B at 211m. In general they comprise portions of end piece 211, any outer liner, end 204 of the media 202, and a closed end portion of preform 224p embedded therein.

C. An Example Air Cleaner Assembly and Assembly Components, FIGS. 62-76

In FIGS. 62-76, an air cleaner assembly, and components thereof, using cartridge 201 in accord with FIGS. 57-61 is shown generally at 290. The air cleaner assembly 290 can, if desired, be generally analogous to air cleaner assembly 90, discussed above, except as modified for engagement with cartridge 201.

Figure 62:
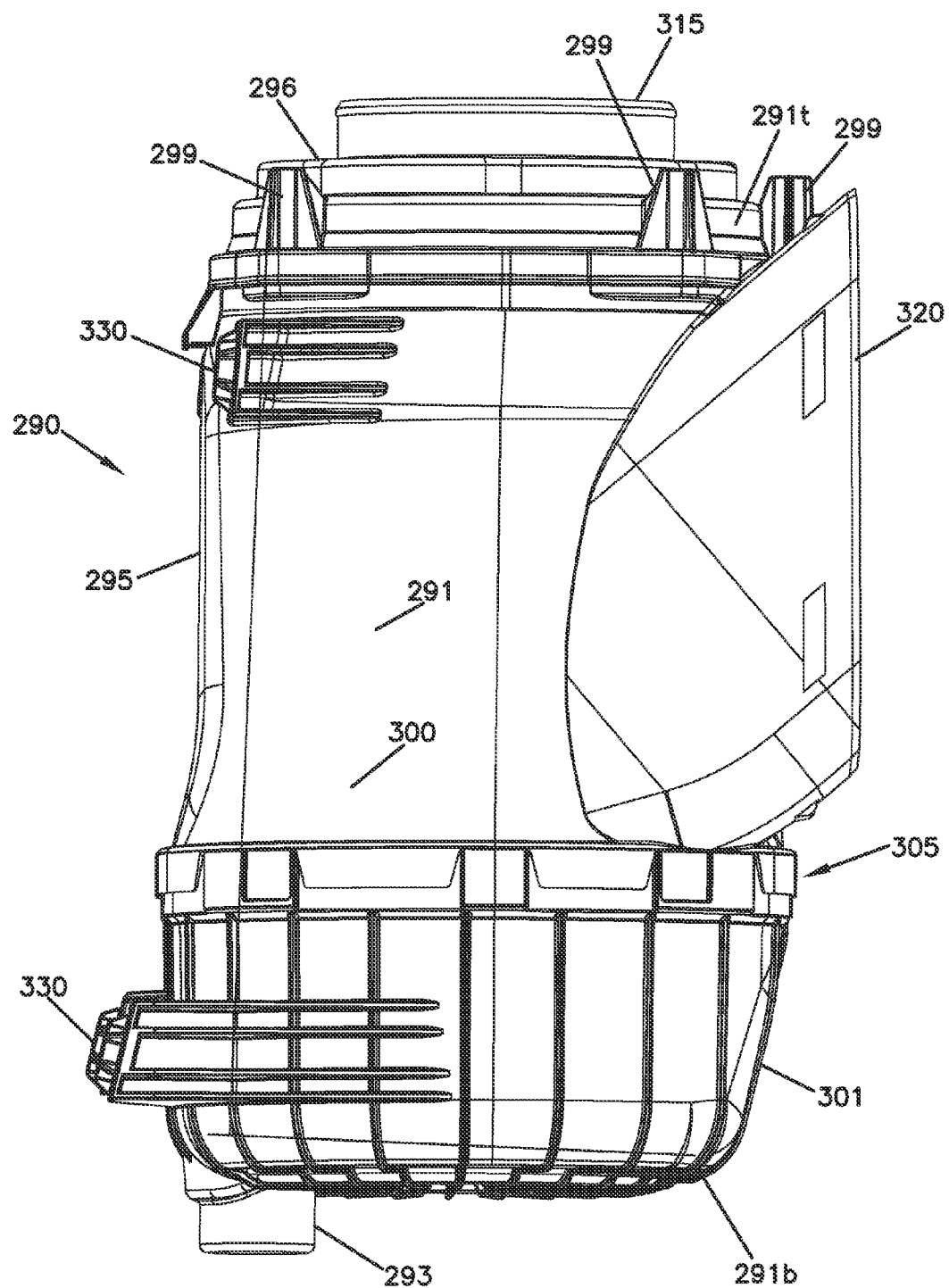
FIG. 62 is a schematic side elevational view of an air cleaner assembly including a filter cartridge in accord with FIGS. 57-60.

Referring to FIG. 62, the air cleaner assembly 290 can be seen as comprising a housing 291. The housing 291 would define an interior, in which cartridge 201 is (or would be) operably positioned for use.

The particular air cleaner 290 depicted is configured with a housing 291 that would typically be oriented for use in the orientation shown, i.e. with a long dimension extending generally vertically in use. Principles of the present application are particularly well-adapted for such use. However, as with air cleaner 90, alternate orientations of housings are possible with selected applications of the techniques described herein.

Still referring to FIG. 62, as a result of the orientation, housing 291 has a first (top) end 291t and a second, opposite, (bottom) end 291b. Also, as with the previously described air cleaner assembly 90, end 291b is provided with an optional evacuator arrangement 293 thereon.

As previously discussed with air cleaner assembly 90, typically the cartridge 201 is removable, and replaceable, in the air cleaner housing 291. To account for this, housing 291 generally includes a body or body portion 295 and removable access cover portion 296. During servicing, or other removal/installation operations involving the cartridge 201, the access cover 296 is removed from the (lower) body portion 295, allowing access to the internally received cartridge 201. After servicing or other operation, the access cover 296 is then replaced on the body part 295, in which the cartridge 201 is appropriately positioned and with installation of the access cover 296 resulting in proper sealing. For the example air cleaner assembly 290 depicted, the access cover 296 would be secured to the body part 291 by fasteners, for example comprising bolts (not shown) in holders 299. Alternate types of fastener arrangements can be used in some applications.

For the example air cleaner assembly 290 depicted, the main body 295 is optionally constructed in two separate sections that are secured to one another after formation, analogously to housing body 95 discussed above. The two sections are indicated by housing body central section 300 and housing body (closed) end section 301. In the example, the evacuator arrangement 293 is positioned in the housing body (closed) end section 301.

A joint between the sections 300, 301 is indicated at 305. Analogously to assembly 90, the joint 305 can be a snap-fit arrangement with projections on section 301 snap-fit into holders on section 300 (or vice versa). As with a previously described air cleaner assembly 90, application the joint 305 is configured and made such that once assembled; section 301 cannot be readily disconnected from section 300.

In alternate applications, the bottom end portion 301 of the housing can be made to be removable from the central portion 300. Thus, it could be attached by alternate means such as bolts or over center latches that can be disconnected. When this is the case, the assembly 290 can be serviced through the bottom end of the central section 300, if desired. As with previously discussed embodiments, when bottom end 301 is designed to be removable, typically the mounting pad will all be located on a central section 300.

Still referring to FIG. 62, for the example air cleaner assembly 290, an outlet 315 for filtered gas flow from the air cleaner 290 is indicated on the housing 291. For the particular example depicted, the outlet 315 is positioned on or in the access cover 296. This will be typical for many applications of the techniques are described herein, although alternatives are possible.

Still referring to FIG. 62, at 320, an inlet for gas (typically air) to be filtered is indicated. Analogously to inlet 120, inlet 320 is a slanted, tangential, inlet 321, although alternatives are possible. Preferred features characterized above in connection with inlet 120 and its relationship to other features of the assembly 90 can be used for inlet 320 and its relationship to other features and housing 291.

Figure 63:
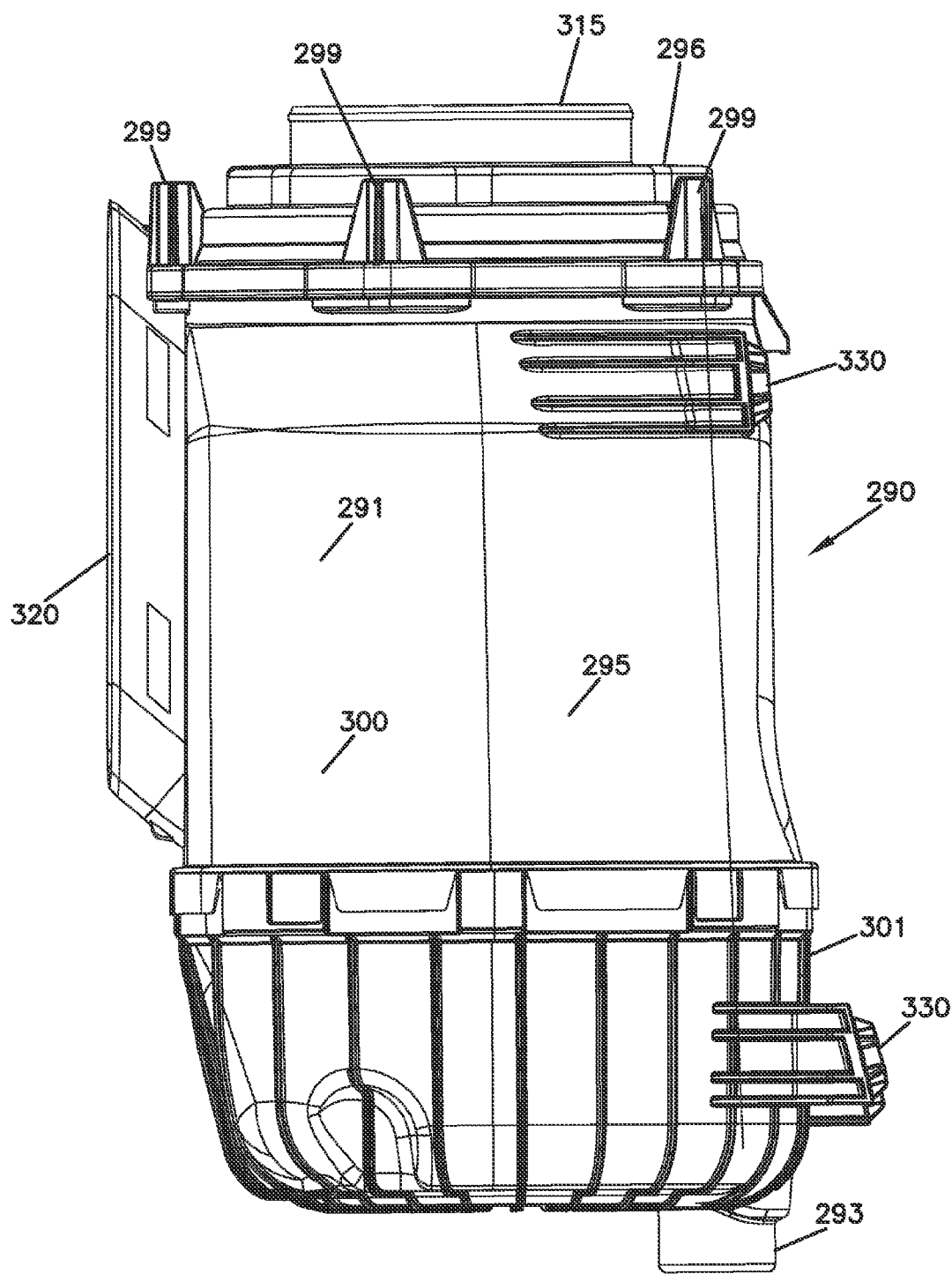
FIG. 63 is a second schematic side elevational view of the air cleaner assembly of FIG. 62; the view of FIG. 63 being opposite to the view of FIG. 62.

In FIG. 63, a side elevational view generally opposite the view of FIG. 62 is shown with like reference numerals indicating the same general features or parts. Referring to FIGS. 62-63 at 330 a mounting pad arrangement for the assembly is generally depicted. It is via this mounting pad arrangement 330 that the assembly 290 can be mounted on equipment, such as a vehicle, for use. Of course alternate mounting arrangements are possible.

Figure 64:
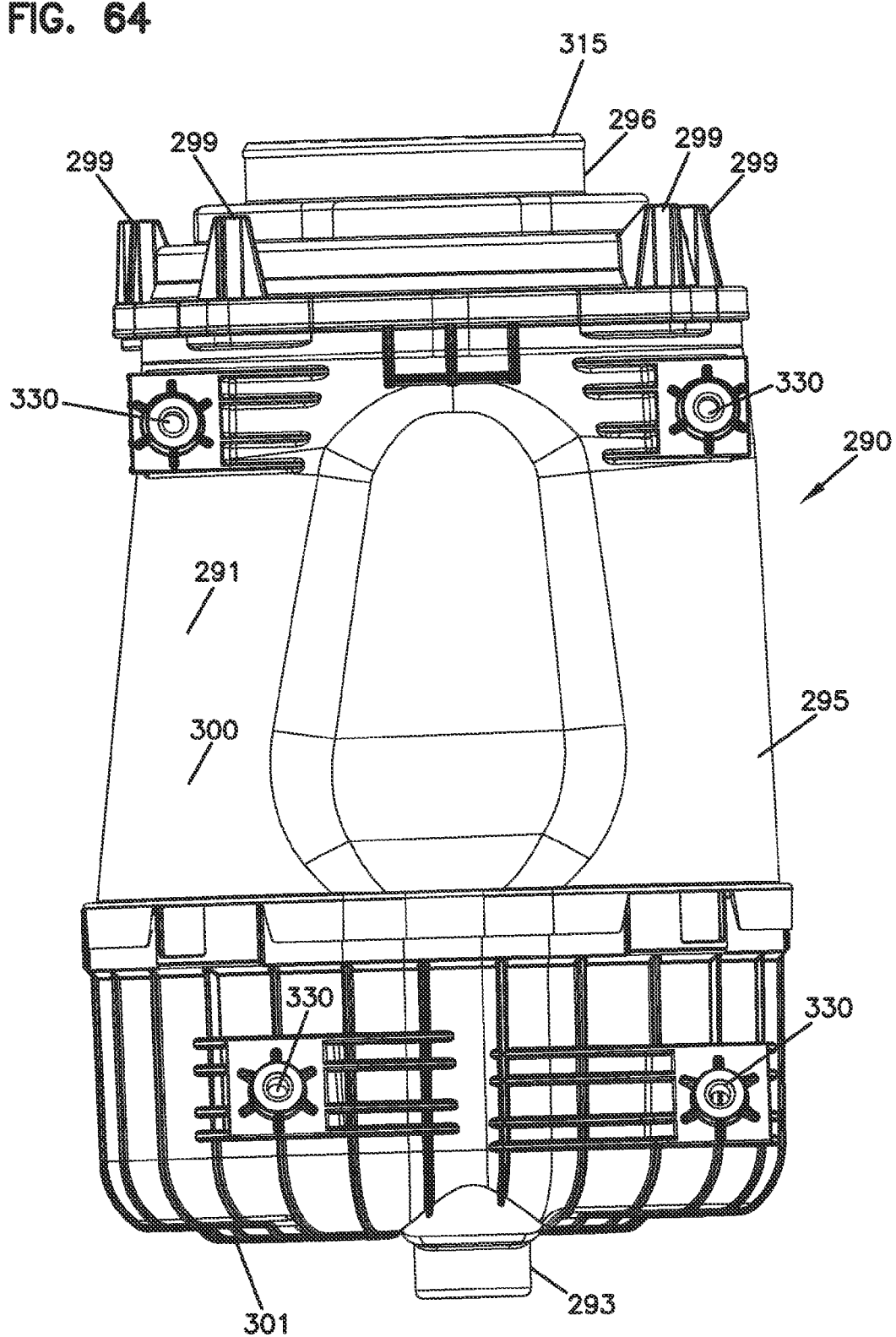
FIG. 64 is a third schematic side elevational view of the air cleaner assembly of FIGS. 62 and 63; the view of FIG. 64 being taken toward the left side of FIG. 62, or the right side of FIG. 63.

In FIG. 64, a third side elevational view is shown, the view generally be taken from the left side of FIG. 62, and/or the right side of FIG. 63. Again, like reference numerals indicate like parts.

Figure 65:
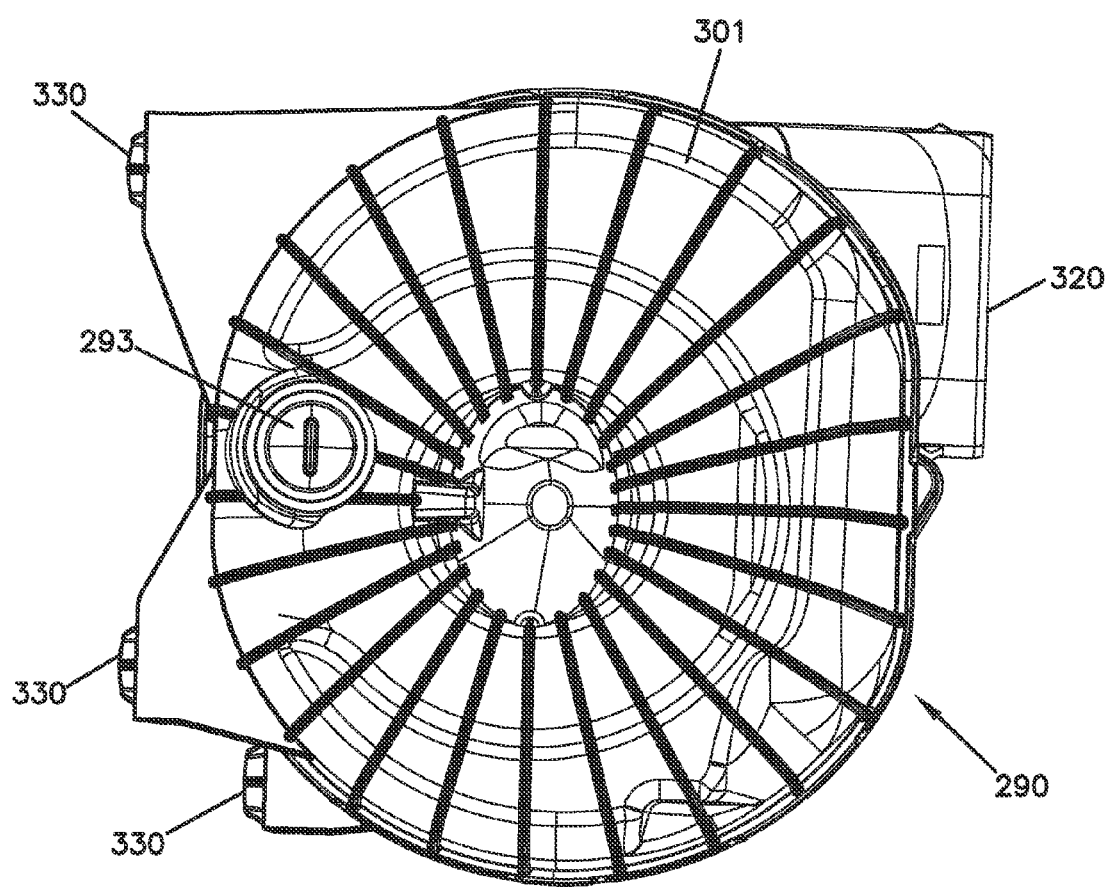
FIG. 65 is a schematic bottom view of the air cleaner assembly of FIGS. 62-64.

In FIG. 65, a bottom plan view of the air cleaner assembly 290 is depicted. Mounting pads 330 can be seen. In FIG. 65, analogous reference numerals to those used with respect to FIGS. 62-64, indicate analogous features.

Figure 66:
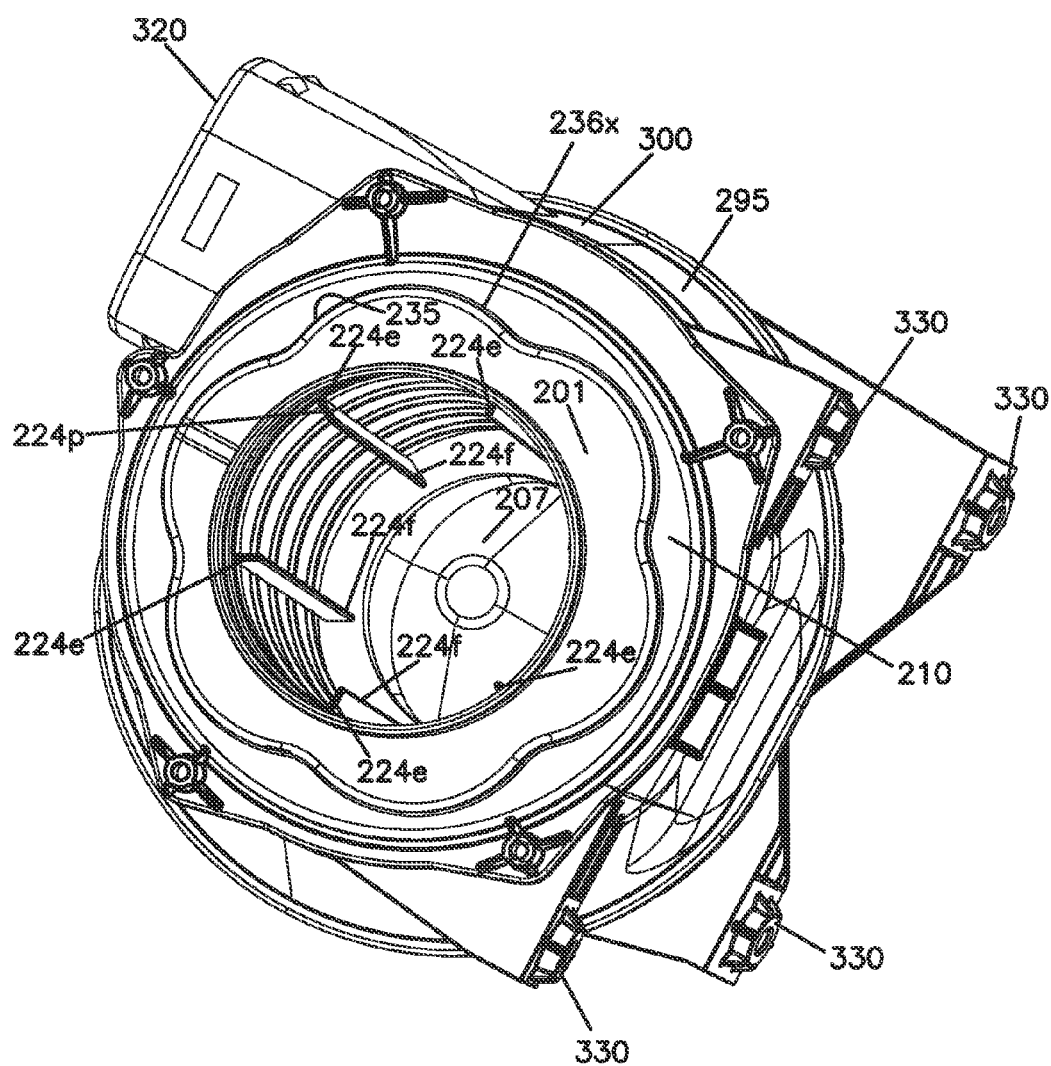
FIG. 66 is a schematic perspective view of the air cleaner assembly of FIGS. 62-65, taken toward an open end of an interiorly received cartridge and with an access cover removed.

In FIG. 66, a top perspective view of air cleaner assembly 290 is depicted with access cover 296, FIG. 62, 63 removed. Thus, housing body 295 can be viewed with cartridge 201 positioned therein.

From a review of FIG. 66, it will be understood that the access cover 296 would need to include a seal surface for engagement with a housing seal arrangement 235 to properly seal the cartridge 201 in place. Features of the access cover 296 that provide for this will be understood from the descriptions below in connection with FIGS. 67, 68. Before turning to those Figs., in FIG. 66 attention is directed to longitudinal extensions or fins 224f in the interior 207 of cartridge 201. In particular, attention is directed to end portions 224e of those longitudinal extensions or fins 224f, adjacent end piece 210.

These ends 224e of longitudinal extensions or fins 224f can be used, to advantage, to index portion of the cartridge preform 224p to a mold, when molded-in-place portions 210m of end piece 210 are molded-in-place on the media 202 and preform 224p. This helps properly position the various convex and concave portions of the to be formed in seal surface 236x, relative to other portions of the preform 224p for cartridge 201, during assembly. This is described, for example in U.S. Ser. No. 13/662,022; US 2013/0263744; and, WO 2013/0063497. Analogous techniques can be used for the assembly of cartridge 201.

Herein, flange 352 will sometimes be characterized as being an "inner indexing flange with a radial alignment receiving arrangement" therein; and, the end(s) 324e of the fin(s) 324f that are received within the receiver 352r of the "inner indexing flange having a "radial alignment receiver arrangement "therein" will sometimes be characterized as radial alignment indexing projection(s) received in the radial alignment receiving arrangement" or by similar terms.

Figure 67:
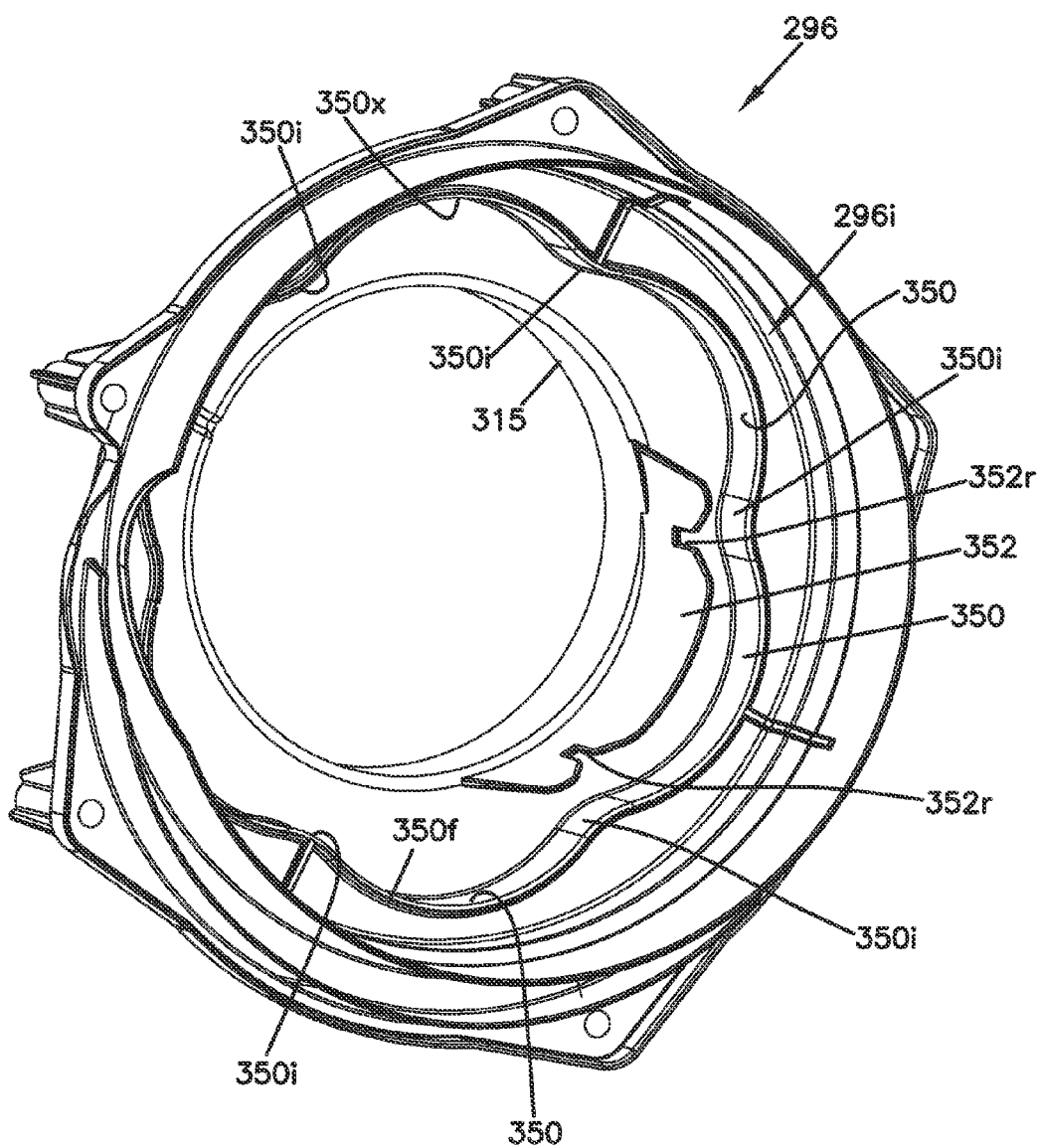
FIG. 67 is a first schematic inside perspective view of an access cover mountable on the assembly of FIG. 66 to form the air cleaner assembly of FIGS. 62-65.
Figure 68:
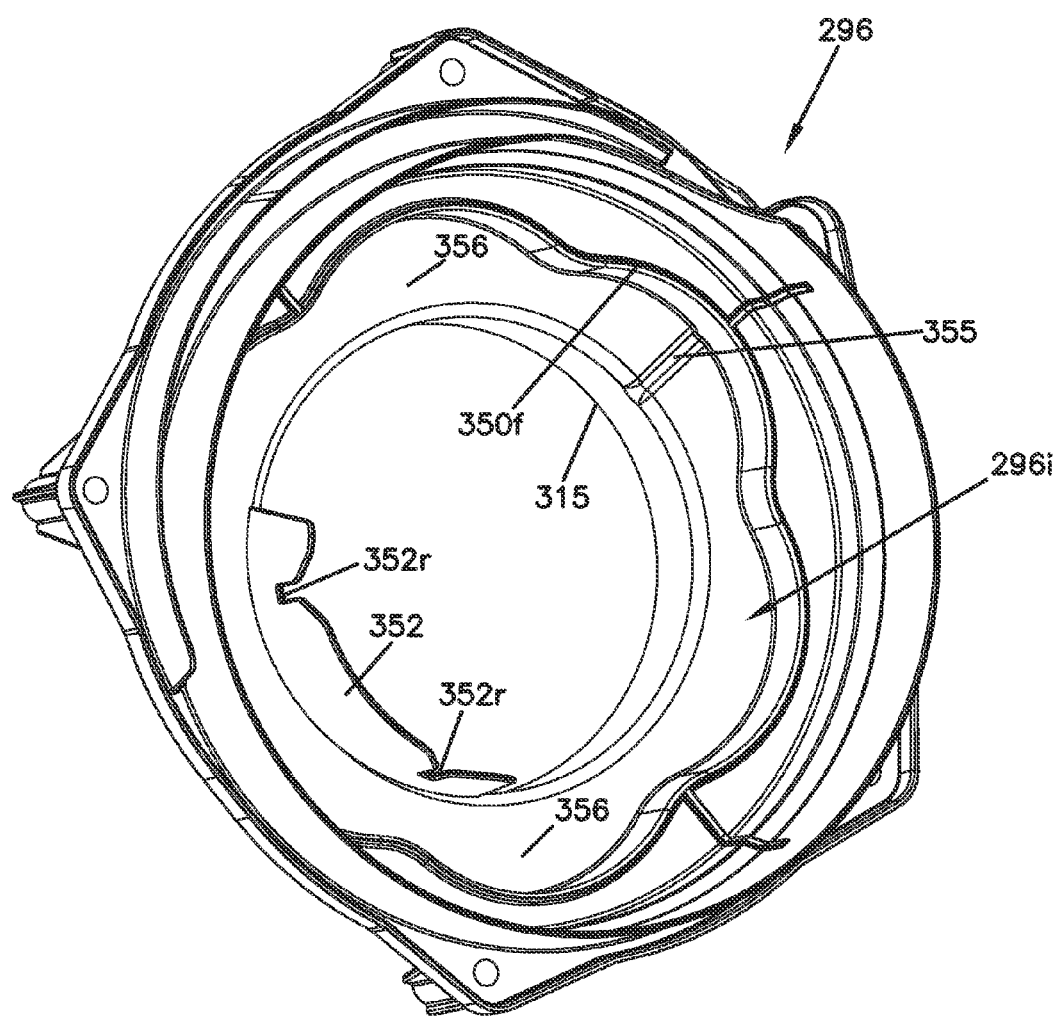
FIG. 68 is a second schematic inside perspective view of the access cover of FIG. 67.
Figure 69:
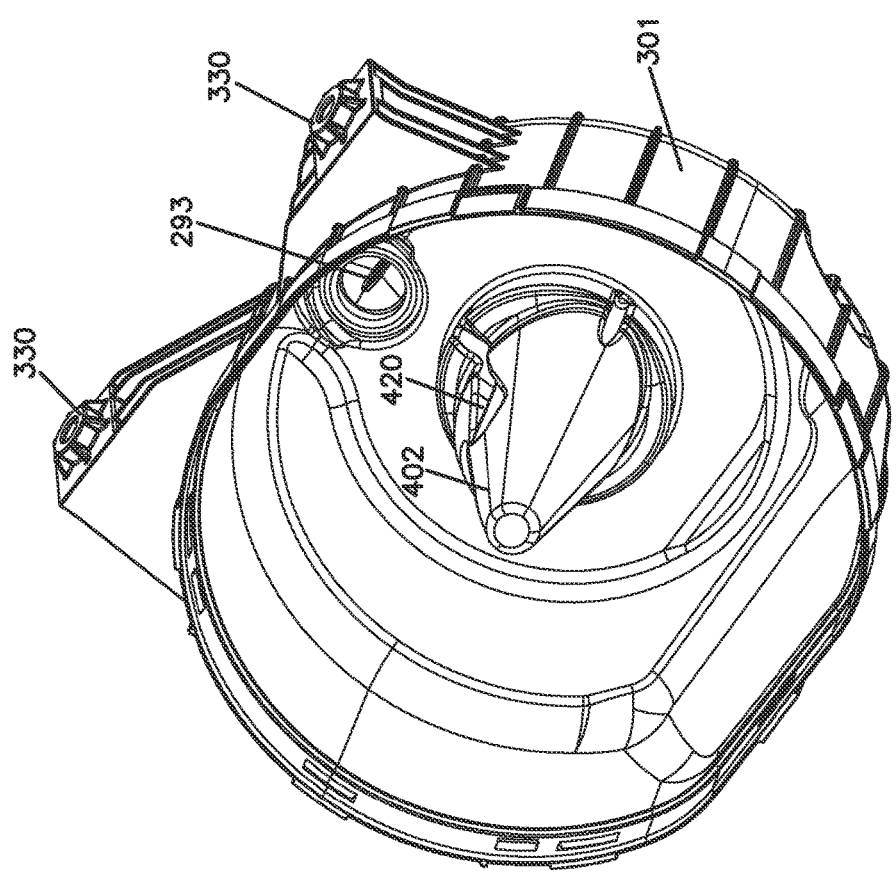
FIG. 69 is a schematic inside perspective view of a housing closed end component of the assembly of FIGS. 62-65.
Figure 70:
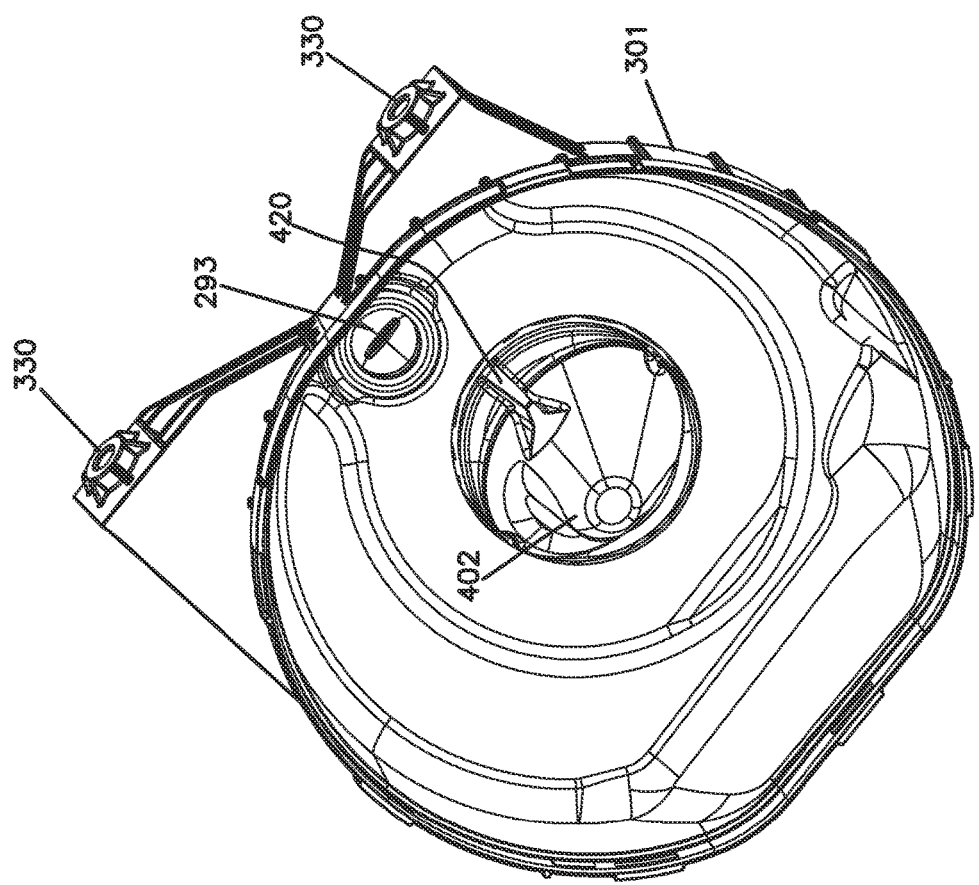
FIG. 70 is an alternate schematic inside perspective view of the housing closed end component of FIG. 69.
Figure 71:
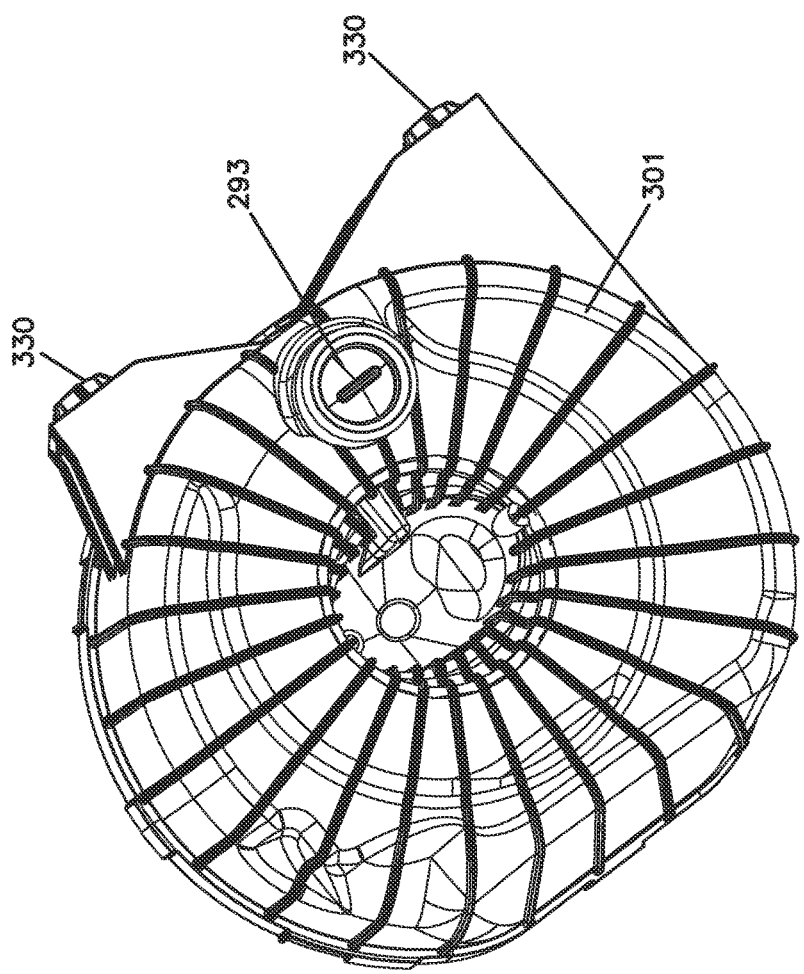
FIG. 71 is a schematic bottom view of the housing closed end component of FIGS. 69 and 70.
Figure 72:
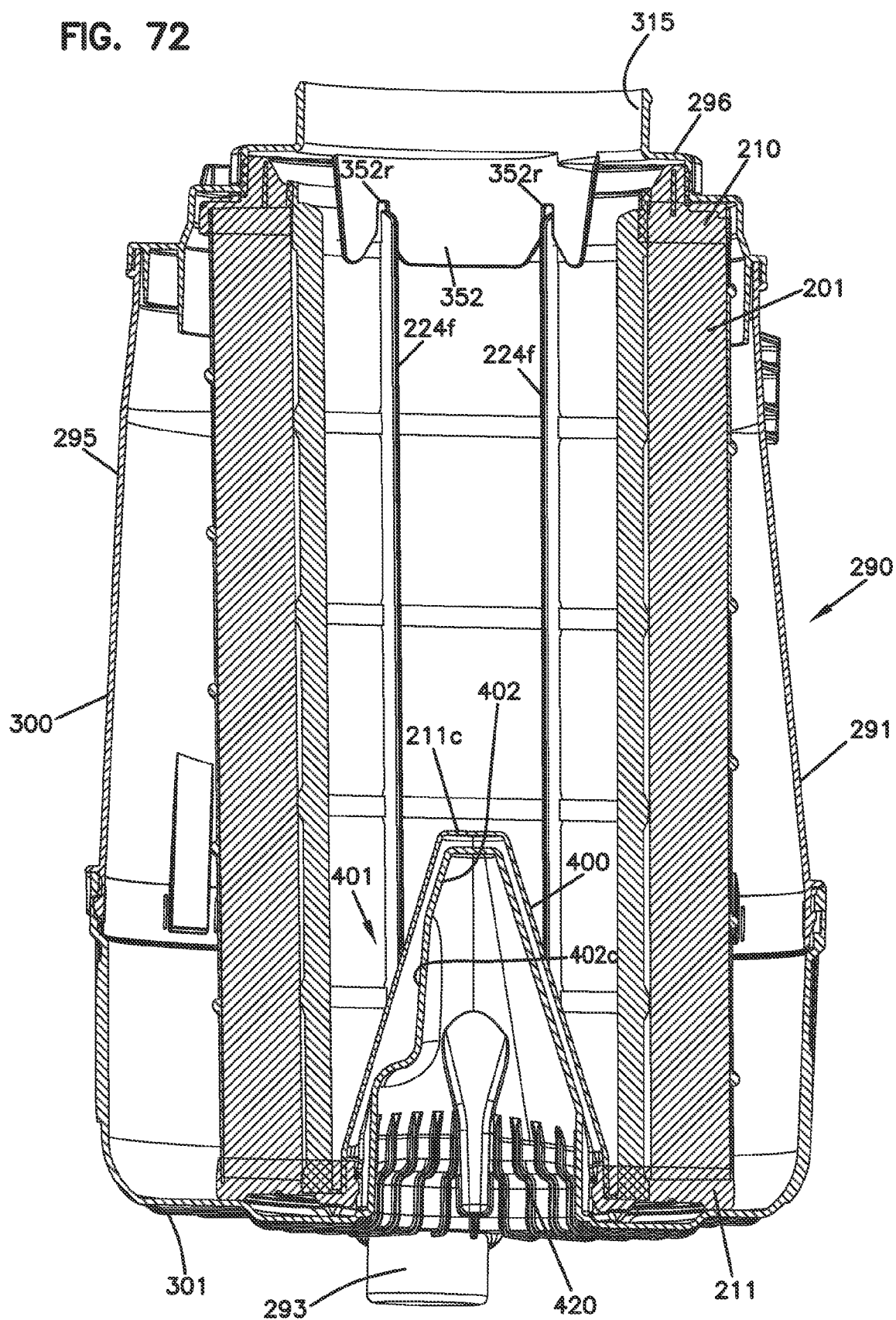
FIG. 72 is a schematic first cross-sectional view of the air cleaner assembly of FIGS. 62-65.

Attention is now directed to FIGS. 67 and 68, in which an inside surface or portion 296i of access cover 296 is shown in two perspective views. Referring first to FIG. 67, the access cover 296 can be viewed with outlet tube 315. Since the view is toward an interior 296i, housing seal surface 350 is viewable. The housing seal surface 350 is configured as a housing seal flange 350f to be sealingly engaged by the housing seal arrangement 235 on cartridge 201. Since the particular housing seal arrangement 235 of cartridge 201, is a radially outwardly directed seal surface having alternating convex and concave portions, surface 350 is analogously shaped, in a manner to mate. Thus, it includes outwardly curved (concave) portions 350x to mate with lobes or regions 236o; and, inwardly curved concave sections 350i to mate with recesses or sections 236i.

Indexing of access cover 296 rotationally relative to the cartridge 201, FIG. 66, will be desirable. To provide for this, the access cover 296 includes, on interior 296i, an indexing projection 352. The example indexing projection 352 depicted is arcuate, and does not extend in a full circle, but it could. It includes receiver recess(es) 352r therein, to selectively receive end(s) 224e, FIG. 66, of fins 224f during installation. The projection/receiver arrangement between the receiver(s) 352r and the fin end(s) 224e, provides for a rotational alignment projection/receiver (or indexing) arrangement, to ensure that the access cover 296 is oriented appropriately for proper installation on the remainder 295 of the housing with proper sealing of the housing seal arrangement 234 to seal surface 350. This means that the various lobes of the depicted seal surface 236 will be properly aligned with the various recesses 350x for proper sealing.

In FIG. 68, analogous features are viewable and indicated by analogous reference numerals. Also referring to FIG. 68, at 355, an irregularity in surface 356 is provided. The example irregularity 355 is a trough (in the view of FIG. 68).

In general, surface 356 overlaps end surface 210e of projection region 237, FIG. 57, of the cartridge 201. It is projection region 210c that forms, around its periphery, the seal surface 236.

It is preferable that surface 356 not be used as a seal surface. This is because in a typical housing it would not necessarily be configured appropriately and be made to appropriate standards for such a use. To inhibit undesirable use of surface 356 as a sealing surface, trough 355 is provided.

With respect to the arrangement of FIGS. 1-56, projection/receiver arrangements are discussed with respect to the closed end piece 211 and the housing bottom or end 296.

Analogous arrangements can be used in connection with cartridge 201 of FIGS. 57-61 and the assembly and components of FIGS. 62-76.

Figure 73:
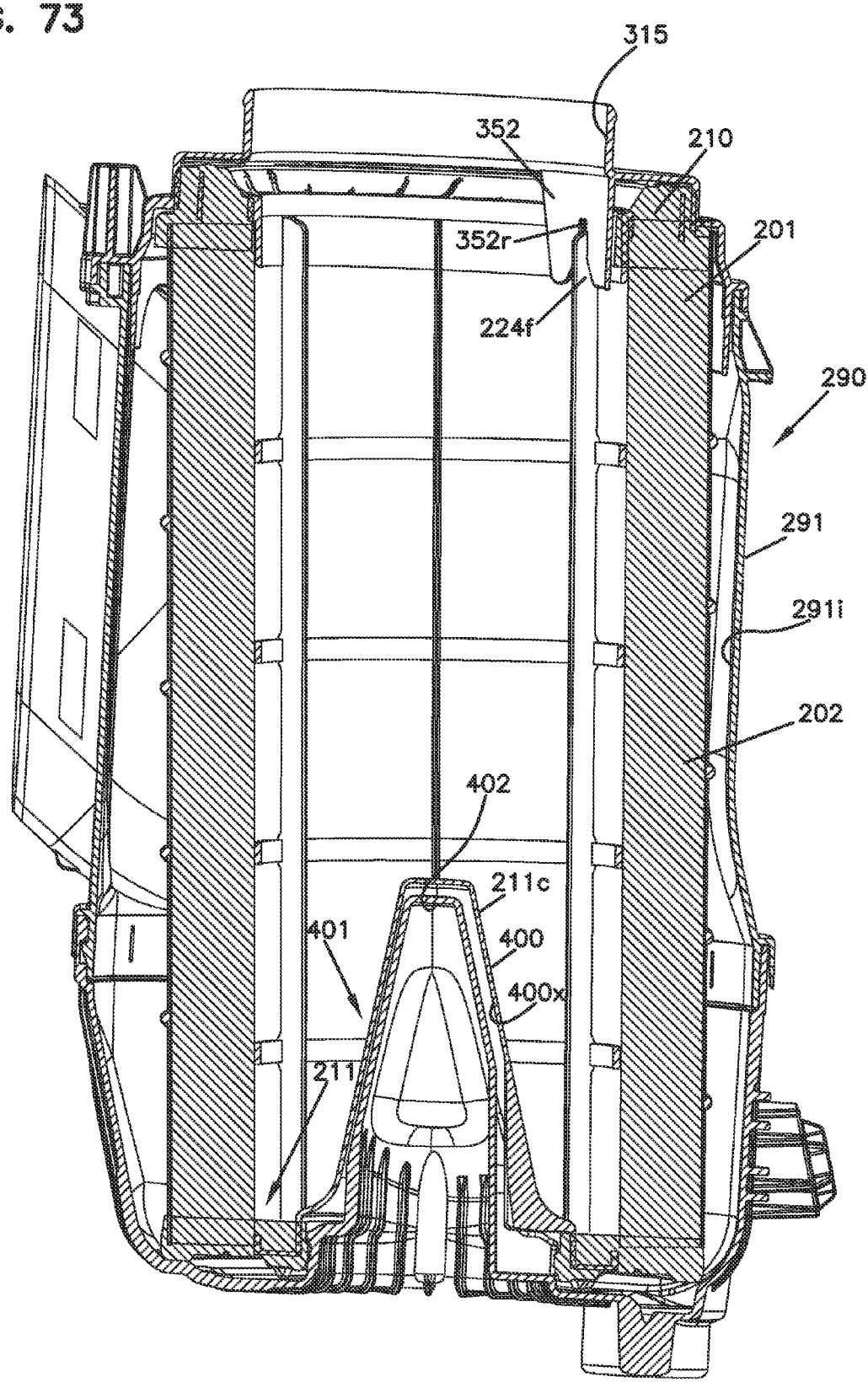
FIG. 73 is a schematic second cross-sectional view of the air cleaner assembly of FIGS. 62-65; the cross-sectional view of FIG. 72 being taken at a right angle to the cross-sectional view of FIG. 71.

With respect to this, attention is directed to FIG. 73, a cross-sectional view of air cleaner assembly 290. Here, cartridge 201 can be seen as positioned within interior 291i of housing 291. The cartridge 201 can be seen as having, at closed end 211, a central projection 400 analogous to projection 45, FIG. 3. This projection 400 is defined by central portion 211c of end piece 211. The central portion 211c can be formed as part of preform 224p.

The exterior side 400x (side away from end piece 210) of projection 400 defines a receiver member of a projection/receiver arrangement 401, along with guide projection 402 on the air cleaner end 296.

The projection/receiver arrangement 401 can be generally configured analogously to arrangements described above in connection with other embodiments, including with respect to such features as size, amount of projection, shape, etc. Thus, in general, the characterization of analogous features in connection with the embodiment of FIGS. 1-56 can be applied with respect to the embodiment of FIGS. 57-76, if desired.

Figure 74:
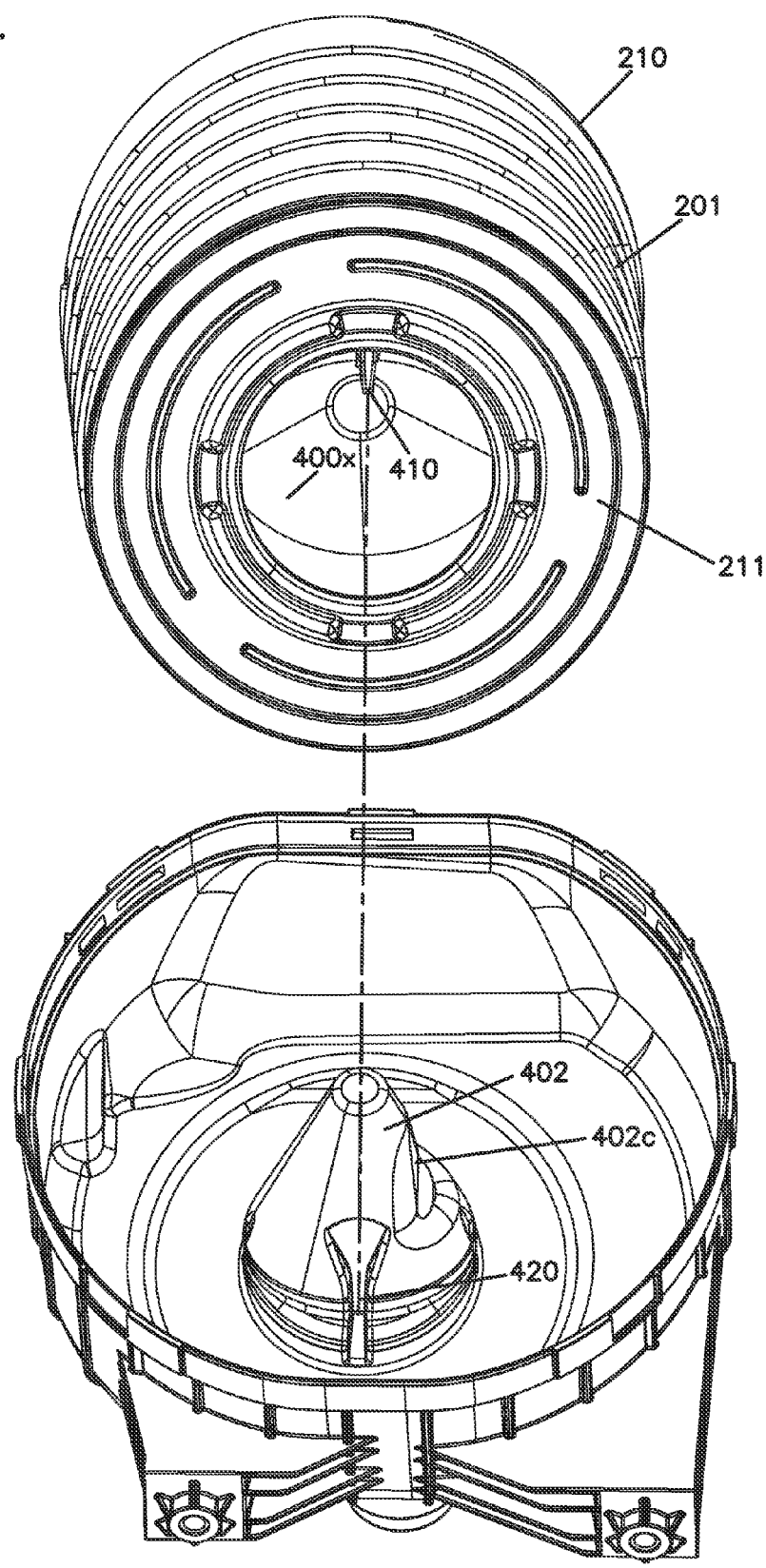
FIG. 74 is a schematic view depicting a cartridge with FIG. 57 being aligned with a housing closed end component in accord with FIG. 69.

In many instances, it is desirable to install the cartridge 201 in the housing 291, in a selected rotational orientation, as discussed above in connection with the embodiment of FIGS. 1-56. The projection/receiver arrangement 401 can be configured to provide for this. Referring to FIG. 74, exterior side 400x of projection 400 in the cartridge 201 includes an interior projecting fin, rib or (indexing) projection 410 thereon. This projection or (indexing) projecting member 410 is configured so that it will only engage the projection 402 in the bottom 296 of the housing 291, permitting full insertion, in selected radial orientation. This can be understood from FIG. 74, in which projection 402 is seen as including a (indexing) slot or receiver 420 on an interior surface thereof (facing toward cartridge end piece 210) into which the projection 410 on cartridge 201 extends as it is lowered into the bottom part 296 of the housing, but only when rotational orientation, between the cartridge 201 and housing, is as selected.

Herein, the projection/receiver arrangement comprising the guide radial projection 410 and the slot or receiver 420 will sometimes be referred to as a "radial alignment indexing projection/receiver arrangement" or by similar terms, with one member positioned on a second end piece and the other member positioned on the housing.

Of course, the projection/receiver arrangement can be configured to allow for more than one rotational orientation is possible. However, especially when the cartridge 201 has an eccentric construction as characterized herein, it will often be preferred that only one radial orientation be obtainable.

Still referring to FIG. 74, it can be seen that projection 402 has a general conical shape with an oval cross-section, except a portion at side 402c is "caved in" slightly, analogously to previously described embodiments, to facilitate desirable installation.

An interference arrangement between the cartridge 201 and the housing bottom is described, for resistance to pulling the cartridge away from the housing body, until adequate force was applied, analogous to those described above. With respect to this, attention is directed to the description of FIG. 75.

Figure 75:
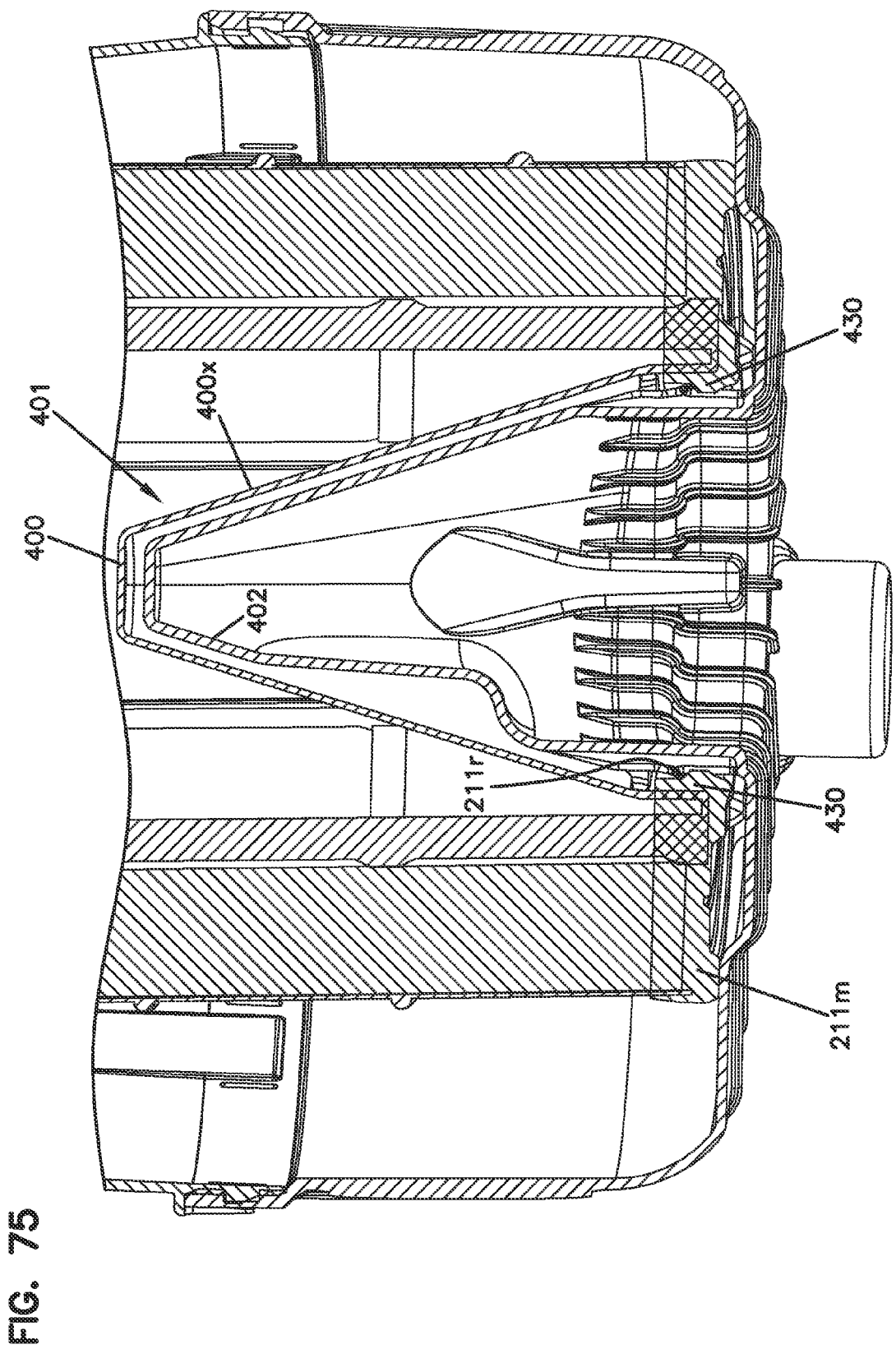
FIG. 75 is an enlarged fragmentary cross-sectional view of a portion of FIG. 72.

FIG. 75 is an enlarged fragmentary cross-sectional view depicting a lower end portion of assembly 290. At 211m, resilient material forming part of end closure 211 is shown.

In includes region 430 lining an interior of a recess 211r in end piece 211 of the cartridge 201. This material is configured to engage an end portion of projection 402 on the housing base analogously to the embodiments described above As with previous embodiments, the amount of resistance put at this location can be used to facilitate retention of the cartridge 201 in the housing base 295 as the access cover 296 is removed. If desired, the resistance to lifting the cartridge 201 during access cover 296 removal can be increased, by providing a bead or detailed arrangement on an appropriate portion of projection 402.

Region 430 can be defined as having/defining an inner perimeter definition analogous to those described above in connection with FIGS. 1-56, with respect to shape, eccentricity, etc.

Figure 76:
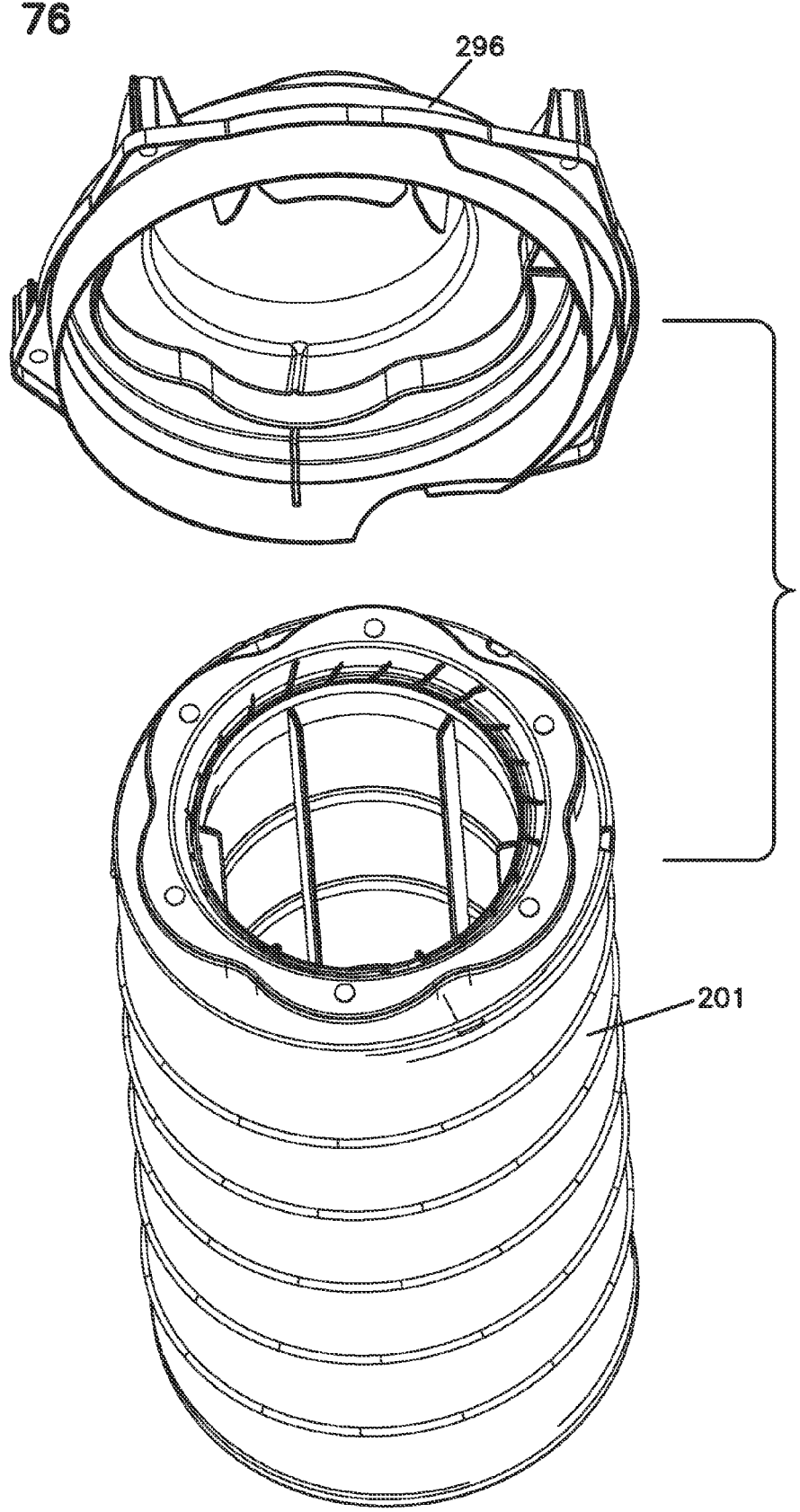
FIG. 76 is a schematic perspective view of a housing access cover in accord with FIG. 68 being aligned with a filter cartridge in accord with FIG. 57.

In FIG. 76, a schematic view is shown depicting the cartridge access cover 296 being lowered onto the cartridge 201. It is noted, of course, that this engagement would typically occur when the cartridge 201 is installed in the housing body 295.

It will be understood that the variations of cartridge 201 and assembly 290 can be implemented in the arrangement of FIGS. 1-56. Further, the variations described for the arrangements of FIGS. 1-56 can be implemented with selected features from the arrangement of FIGS. 57-78. The teachings herein are meant to indicate features that can be implemented in or more embodiments.

As to the seal member of cartridge 201, with undulation as it extends peripherally around the central seal axis X, variations in the number of lobes and specific shapes of the lobe can be used. It will be typically the case that the arrangement has 2 to 12 lobes, usually at least 3 lobes and not more than 10 lobes, often 4-8 lobes, typically separated by radially inwardly directed recesses or sections. It will also typically be the case that the seal is configured for outwardly directed sealing. However, alternate configurations, for example ones with radially inwardly directed seals can be used.

It is noted that there is no specific requirement that the housing seal arrangement have evenly spaced lobes or variations therein. Alternatives can be used in arrangements according to the present disclosure.

The variations described above will indicate that principles according to the present disclosure could be implemented in cartridges having a wide variety of seal surface configurations.

It is noted that the various variations of FIGS. 57-76 can be implemented with a secondary or safety filter, in accord with the general principles described above with respect to the arrangements of FIGS. 1-56.

D. The Variations of FIGS. 77-78

Figure 77:
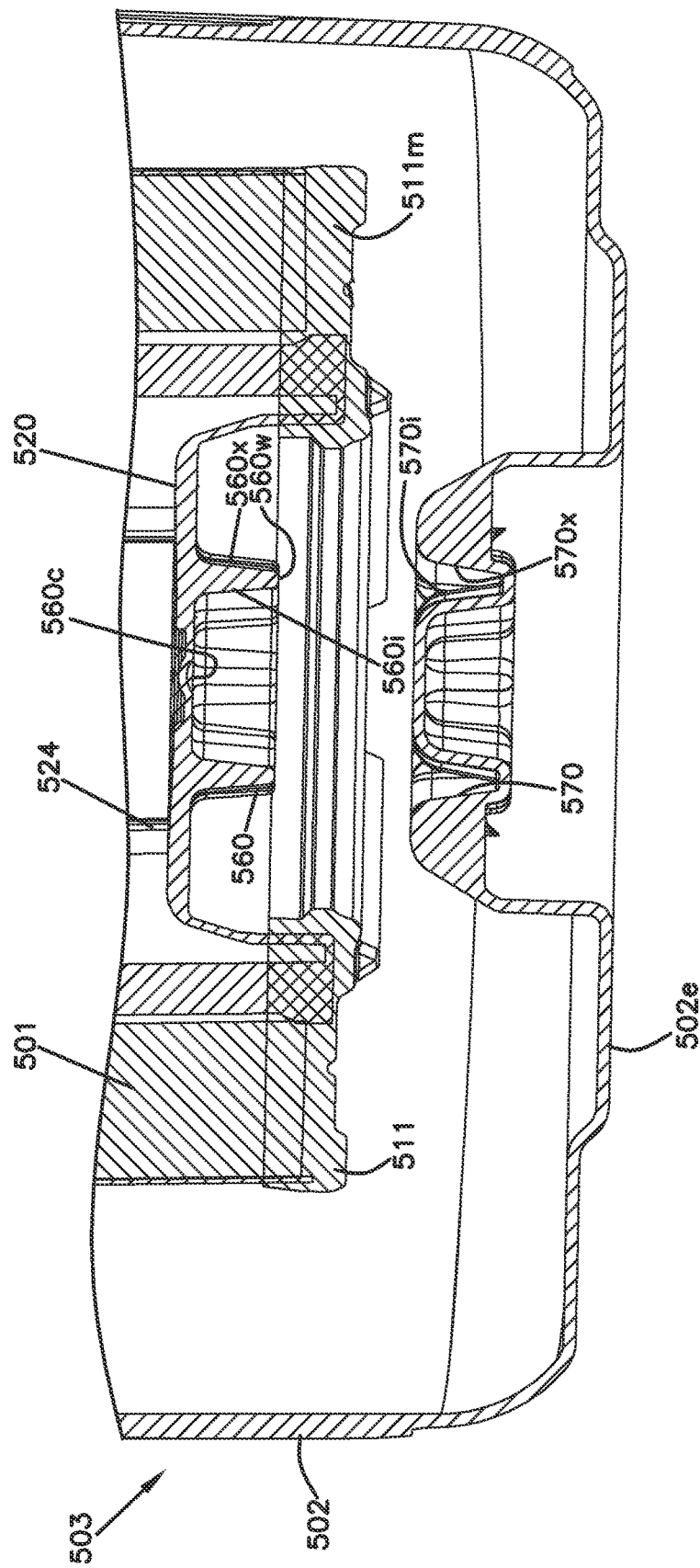
FIG. 77 is an enlarged exploded fragmentary perspective view of a filter cartridge having selected alternate closed end cap features in accord with an additional embodiment of the present disclosure, shown being inserted into alignment with the housing bottom also having alternate features in accord with the present disclosure.
Figure 78:
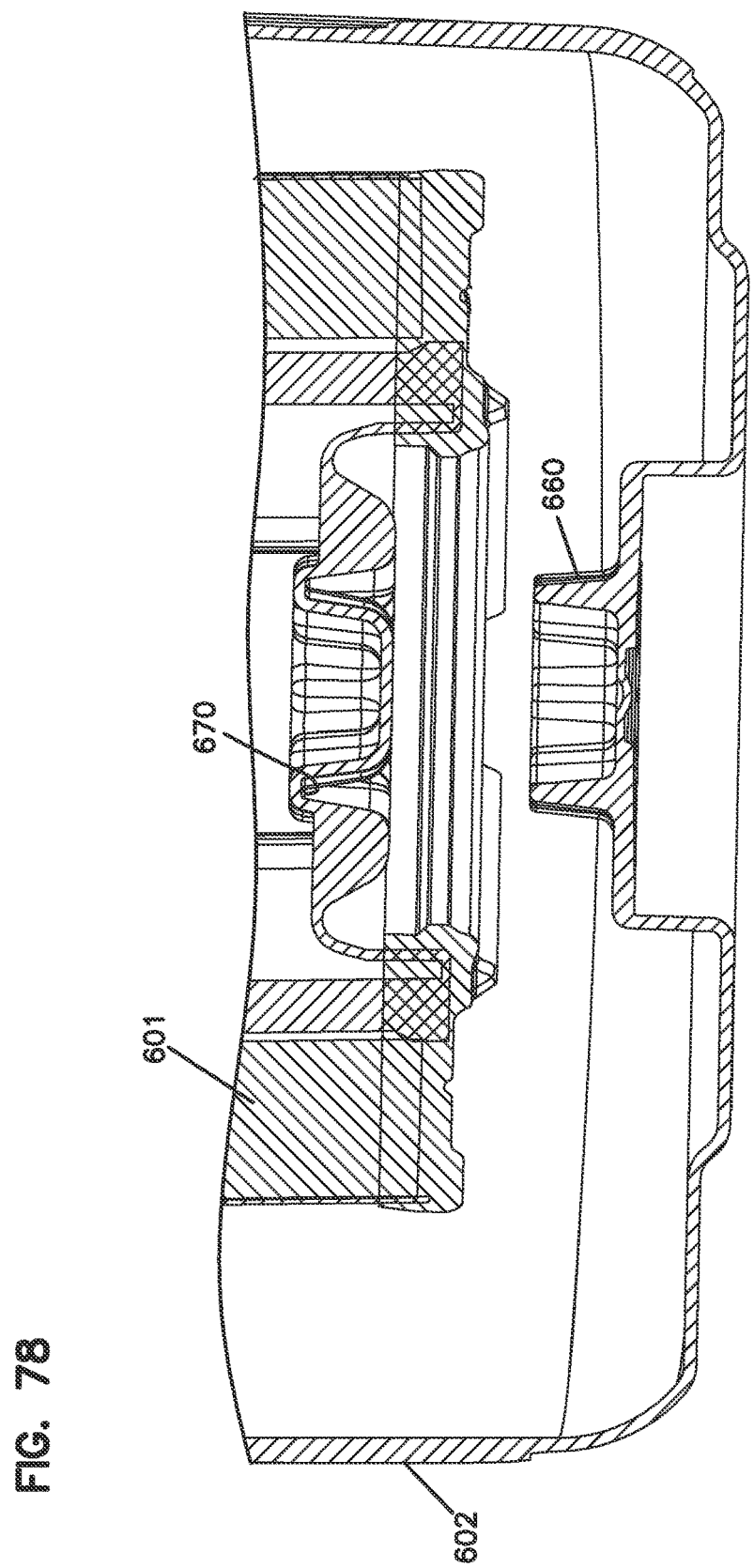
FIG. 78 is a fragmentary perspective view analogous to FIG. 77, but showing an alternate, reverse, positioning of certain projection/receiver members in accord with an alternate embodiment.

Alternate projection/receiver arrangements to those described above (or alternate such arrangements which also include those described above) at the interaction between the filter cartridge 201 and a housing body 295 can be used, for radial alignment or indexing, between the housing and cartridge. In FIGS. 77-78, some variations are shown and described. These can be implemented with either the arrangements of FIGS. 1-56 or the arrangements of FIGS. 57-76, and alternatives thereof. The example projection/receiver arrangement shown in these figures, is generally based on analogous arrangements, but between an access cover and a filter cartridge, as in U.S. Pat. No. 8,292,984; U.S. Ser. No. 12/218,580; PCT WO 2009/014982, and incorporated herein by reference.

Referring to FIG. 77, a fragmentary cross-sectional view is depicted of cartridge 501 positioned in housing 502 to form assembly 503.

Figure 77A:
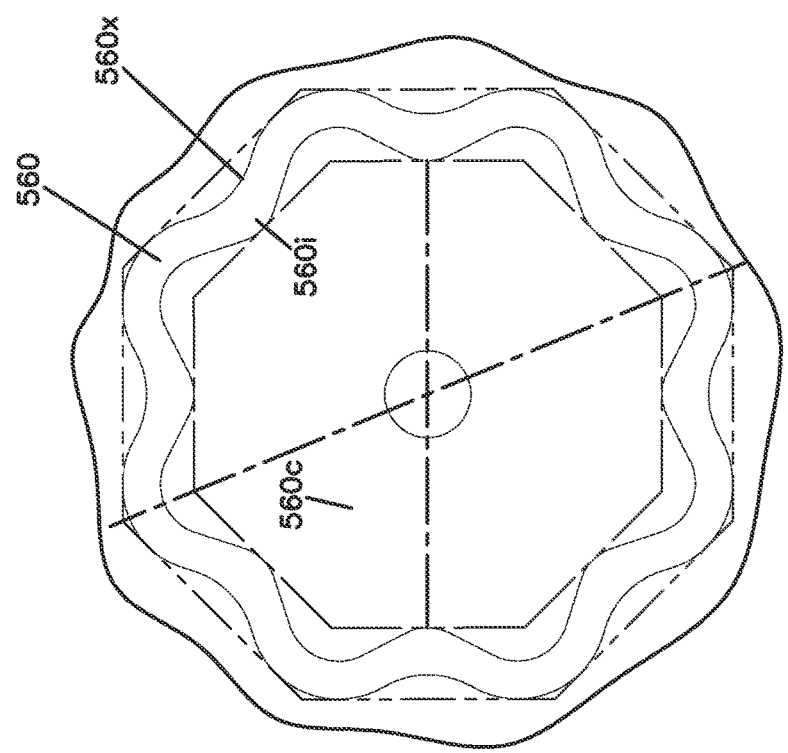
FIG. 77A is an enlarged fragmentary schematic view taken toward a projection component on the cartridge of FIG. 77.

The portion of cartridge 501 depicted is a portion adjacent the portion the closed end 511, i.e. opposite the housing seal end. The end piece 511 depicted, then, is generally analogous to end pieces 11, 211. It includes molded-in-place portion 511m and central portion 520 which is formed as part of a central preform 524. Here the central portion 524 includes a central projection 560 extending away from the first end piece and toward the bottom end 502e of the housing. This projection comprises a wall 560w surrounding a central region 560c, thus it has inner surface 560i and outer surface 560x. For the example depicted, the (opposite) inner and outer surfaces are non-circular, in the example serpentine or undulating, as can be seen in FIG. 77A.

Figure 77B:
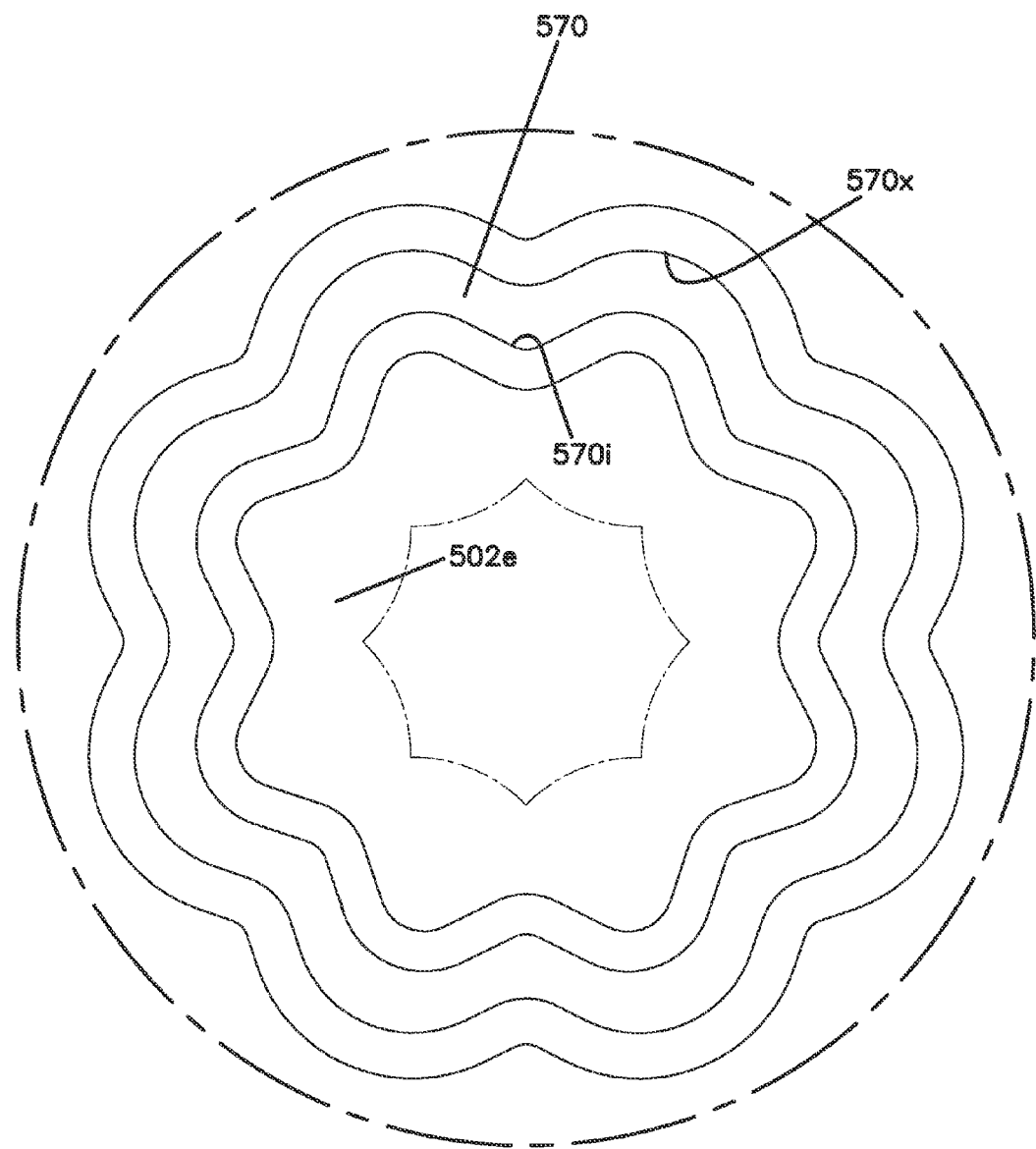
FIG. 77B is an enlarged fragmentary schematic view of a selected receiver member on a housing bottom in accord with FIG. 77.

Analogously, the housing end 502e, FIG. 77, includes a recess trough or groove 570, sized and configured to receive projection 560 therein, when complete installation occurs. This groove or trough 570 will generally be open toward the cartridge and shaped to receive whatever the shape of projection 560 is. Thus, it can be configured with a non-circular (for example serpentine) shape itself, between inner and outer walls 570i, 570x, as can be understood from FIG. 77B, an end view taken toward the groove 570.

It is noted that the serpentine shape or non-circular shape to the projection 560 and groove 570 can be used as a radial alignment indexing projection/receiver arrangement, allowing for multiple radial orientations.

Of course, alternate shapes for the projection/receiver can be used. For example, the projection 560 can be configured asymmetrically, and the trough 570 configured asymmetrically, so that only one rotational orientation between the two is possible for installation. This can be done, for example, by having one of the undulations extend either radially outwardly or radially inwardly more than the others.

In variations, the projection can be positioned on a housing bottom, and the groove or trough positioned on the cartridge, open toward the closed housing end or bottom, i.e. in a direction away from the first, open, end cap. An example of this is shown in cross-section in FIG. 78. Referring to FIG. 78, cartridge 601 is depicted in housing section 602. Projection 660 on the housing section would be received within trough or groove 670 on the cartridge when installation occurs. The shapes of the groove and projection can be similar to those described above for FIGS. 77 and 77A.

From the above, alternate variations will be understood. A variety of different shapes can be used for the projection/receiver arrangement described in this section. There is also no specific requirement that the projection member (member 560, FIG. 77 and member 660, FIG. 78) be continuous in this extension around a center, although this will be typical.

There is no specific requirement that each of the projection and receiver have a undulating or serpentine definition, although this will be typical as well, when the variations of this section are used. The number of undulations and/or projections can be varied. The examples depicted have about 2-12 members. However, typically the number will be at least two, and usually within the range of 4-10 often 6-10.

With respect to the general definitions of these features, the features of U.S. Pat. No. 8,292,984; U.S. Ser. No. 12/218,580; and, WO 2009/014982 are incorporated herein by reference.

It is noted that the variation of FIGS. 77-78 can be implemented with various ones of the housing features described in other embodiments herein.

IX. Some Additional Variations, FIGS. 79-105

A. Example Alternate Assembly Options, FIGS. 79-82

In FIGS. 79-82, an additional assembly using principles in accord with the present disclosure are provided. It is noted that many of the options of FIGS. 79-82 can be implemented with selected features of the other embodiments described herein.

Figure 79:
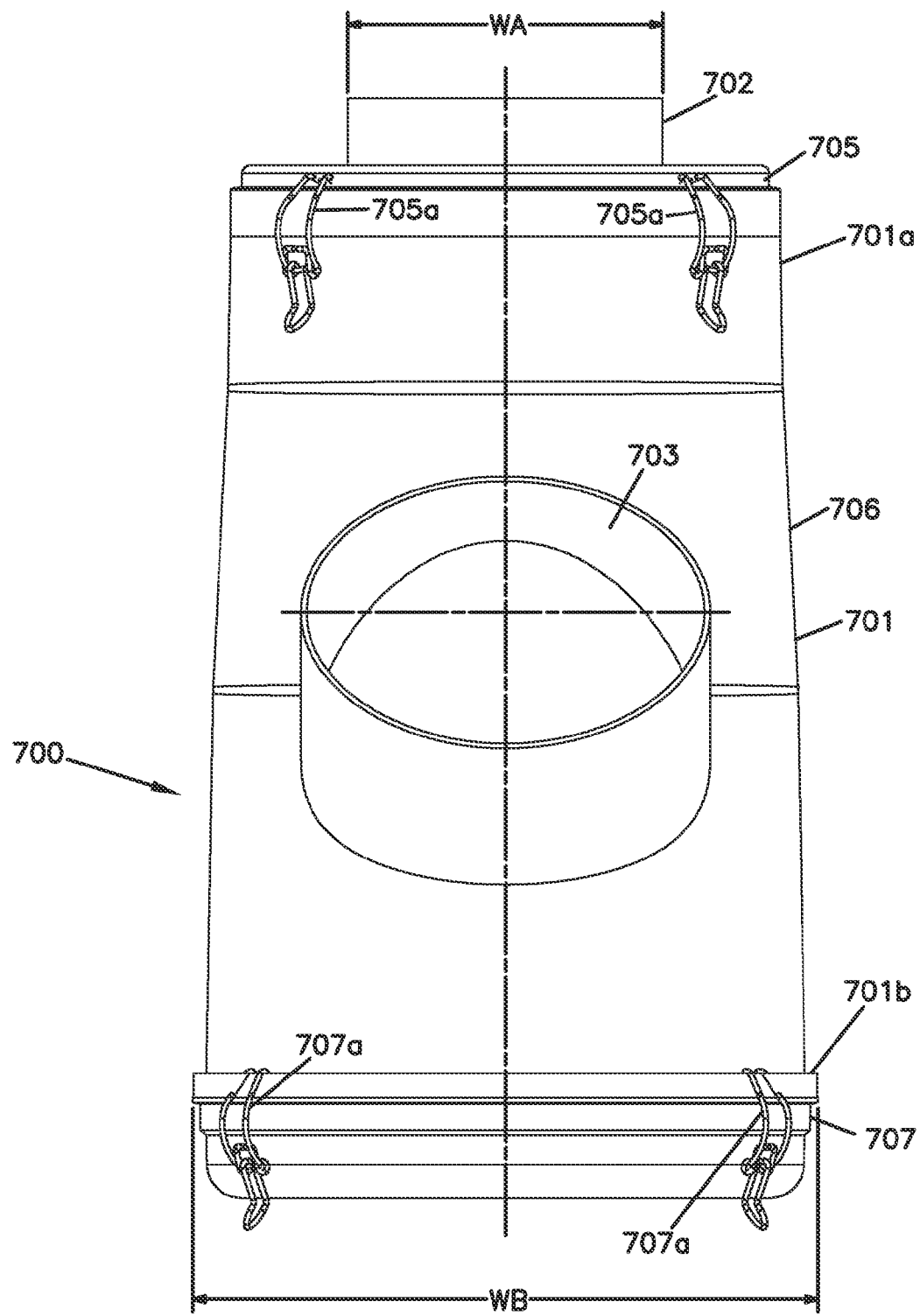
FIG. 79 is a schematic side elevational view of an air cleaner assembly including certain alternate features to selected ones of previously depicted arrangements.

Referring first to FIG. 79, at 700, an air cleaner assembly is depicted. The air cleaner assembly 708 comprises a housing 701 having a first air flow tube 702, and a second air flow tube 703 thereon. For a typical out-to-in flow use, tube 702 would be used as an outlet flow tube for filtered air, and tube 703 would be used as an inlet flow tube for air flow of air to be filtered by the air cleaner assembly 700. However, alternate practices can be used.

For the housing 701 depicted, tube 702 is a portion of a first removable access cover 705; removably secured to end 701a of a housing central section 706 by latches 705a.

The housing 701 includes a second removable end 707. Removable end 707 can be used as a service access, for example to facilitate cleaning. In some applications, the principles herein can also be used as an access end for removal and installation of an internally received filter cartridge. The removable end 707 is secured in place on central section 706 by latches 707a (to end 701b of the housing central section 706).

In some instances, then, an internally received, serviceable, filter cartridge will be sized such that it can be installed (or be removed) through either end 701a (upon removal of first access cover 705) or through end 701b (upon removal of second access cover 707) or both.

In alternate practices, end 707 can be the only removable end, with end 705 permanently positioned. However, having both ends removable and serviceable, will be preferred in some instances. It is noted that having both ends similarly removable (or the bottom and removable and serviceable) and serviceable can be a technique applied with the various embodiments described herein.

Still referring to FIG. 79, it is noted that inlet 703 is a slanted inlet, for example generally analogous to inlets previously discussed. It is not, however, depicted as a tangential inlet. However, it could be advantageously configured as a tangential inlet.

Figure 80:
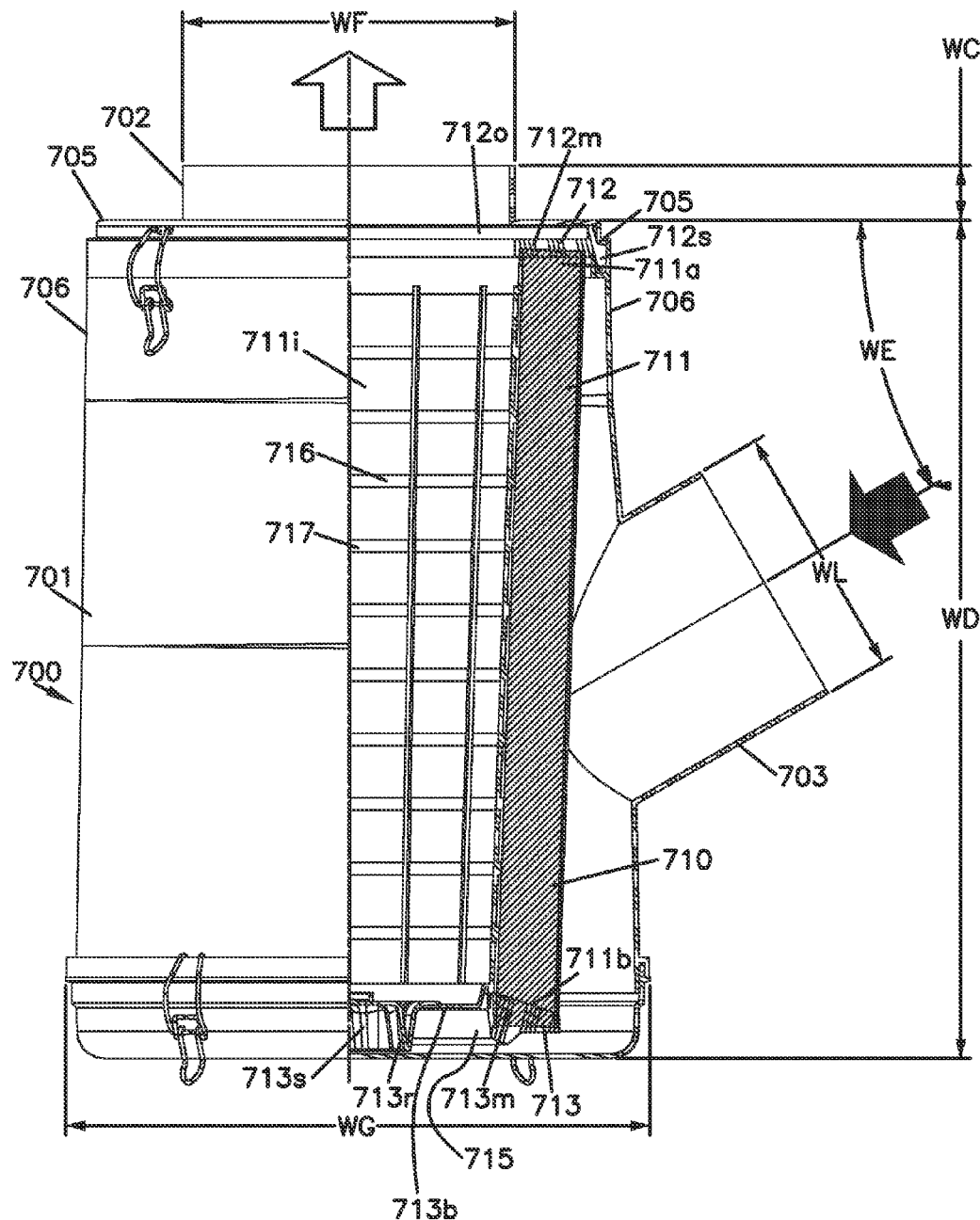
FIG. 80 is a schematic second side elevational view of the assembly depicted in FIG. 79 with portions broken away to show internal detail in cross-section; the view of FIG. 80 being from the left of the view of FIG. 79.

In FIG. 80, a second side elevational view is depicted with portions shown in cross-section to depict an internally positioned filter cartridge 710. The filter cartridge 710 comprises media 711 having first and second, opposite, ends 711a, 711b. The media 711 is positioned surrounding an open interior 711i.

The cartridge 710 includes, positioned at media end 711a, a first end piece 712. The first end piece 712 can be configured analogously to similar end pieces in various embodiments described herein. The particular end piece 712 depicted, is shown having a portion 712m molded-in-place on end 711a and having a seal member 712s oriented to sealingly engage the housing 701 when the cartridge 710 has been positioned. A variety of seals or seal types can be used at this location, or at other locations or alternate practices. Typically, the seal will be radially directed. However, in the particular example, member 712s depicted is an axial seal. Indeed as depicted it comprises a perimeter pinch seal, with sealing occurring between housing sections 705, 706.

At end 711b, the cartridge 710 includes a second end piece 713. The end piece 713 can be constructed in a variety of ways and may be constructed with various ones of the alternate features described herein. The particular end piece 713 includes a molded-in-place peripheral potion 713m and a central preform section 713b that extends across, and in the example closes, the interior 711i adjacent end 711b. Preform section 713b includes an optional projecting ring 713r thereon that extends around an interior, space or recess 713s to define a projection member for optional engagement with a portion of a housing in use. Member 713r can be a circular projection, or a particular projection having a serpentine shape in extension around a central or interior recess, for example with a plurality of lobes.

In the particular assembly 700 depicted, the housing 701 does not include a member for engagement with projection member 713r. However, in other embodiments described, approaches to allow for such an engagement are discussed.

Still referring to FIG. 80, at 715, a molded-in-place portion 713m of the end piece 713 includes a resistive housing engagement portion, generally analogous to portions discussed previously herein. It is noted that the particular housing 701 depicted is shown schematically, and thus the resistive housing engagement portion 715 is not used. However, the housing could be modified to use such an arrangement analogously to other embodiments discussed herein.

Still referring to FIG. 80, end piece 712 is an open end piece having central aperture 712o therein, in direct flow communication with interior 711i.

The filter cartridge 70 depicted includes a central liner 716 extending between end pieces 712, 713 and having the filter media 711 positioned thereon. The liner 716 is typically and preferably part of a preform 717. In the example depicted, the preform 717 includes, as an integral portion thereof, central portion 713b of end piece 713.

Still referring to FIG. 80, inlet 703 can be viewed as a slanted; and outlet 702 is generally an axial outlet.

The media and/or cartridge features may be configured with shape variations (i.e. eccentricity) as described herein for a variety of embodiments. It may be generally cylindrical (but eccentric) or it may conical.

Figure 81:
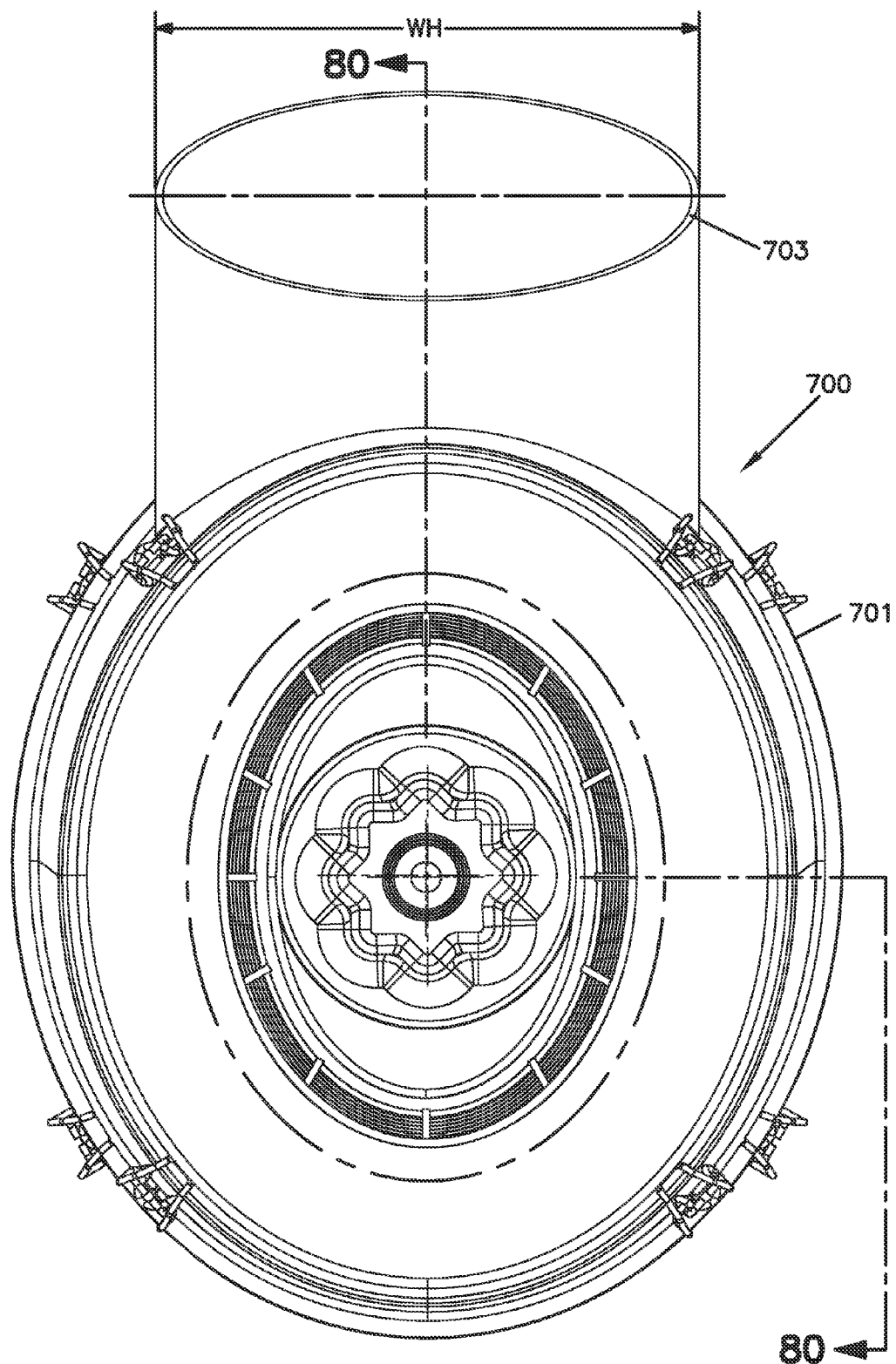
FIG. 81 is a schematic top plan view of the assembly of FIGS. 79 and 80.

In FIG. 81, a plan view directed toward the outlet end of the housing for the 701 for the assembly 700 is depicted. It can be understood than from FIG. 81 that for the example depicted, the media is configured in a somewhat oval pattern. An oval pattern can be used for the media in variations as other embodiments described herein.

Figure 82:
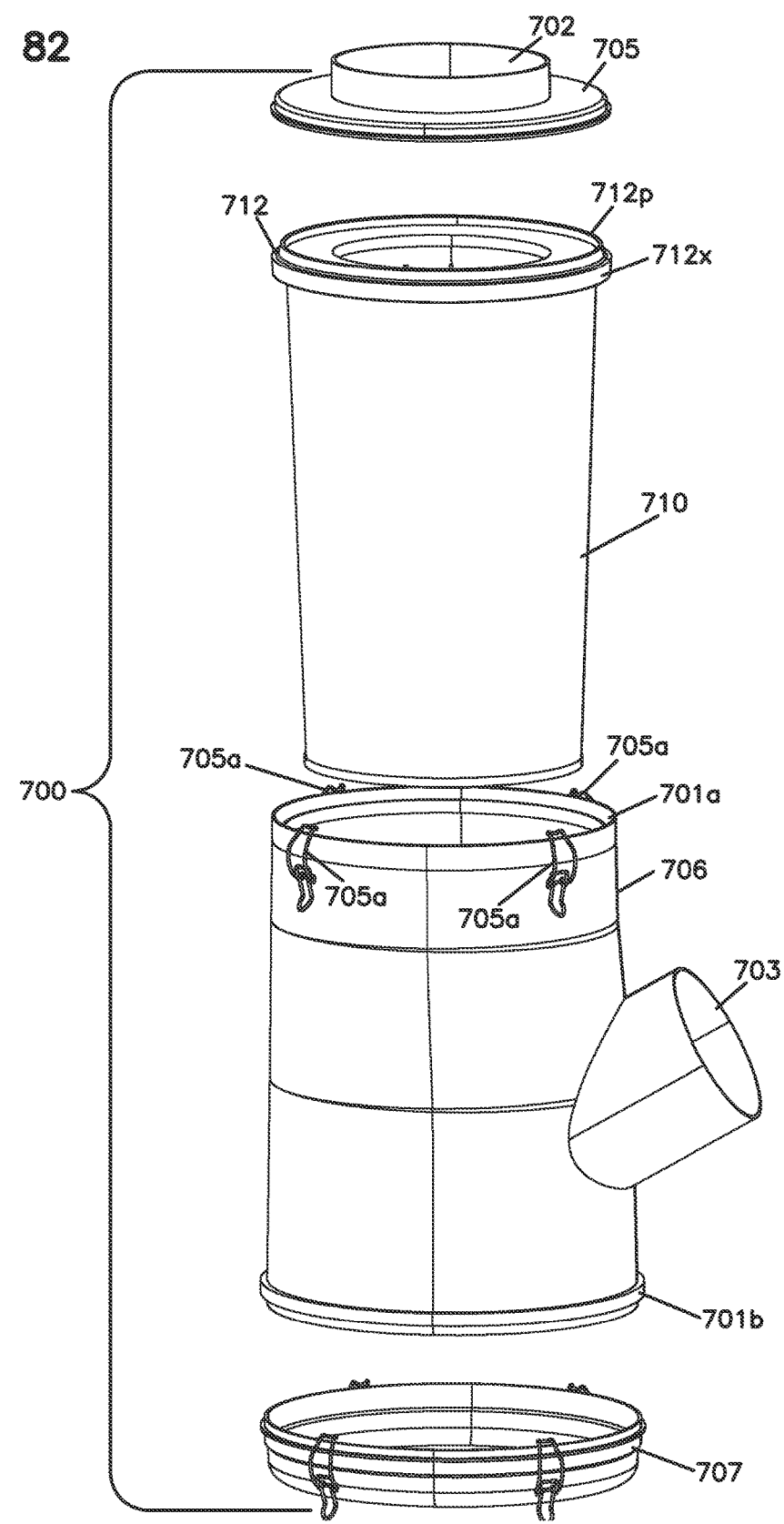
FIG. 82 is a schematic exploded view of the assembly of FIGS. 79-81.

In FIG. 82, a schematic exploded view of assembly 700 is depicted. It can be seen that the cartridge 710 can be removed one the access cover 705 is separated. It can also be seen that access cover 707 can also be removed.

Referring to FIG. 80, with an axial pinch seal depicted, the cartridge 710 could not be removed from the end opened by access cover 707, unless a very flexible seal is used. However, if a radial seal is used in place of pinch seal 712s, then such a removal would be relatively straightforward. Whether or not the cartridge can be removed through end 701b, having cover 707 removable can be advantageous, for example with respect to: assembly; and/or cleaning By the above, it is not meant to be indicated that a pinch seal or axial seal could never be used with a unit serviceable from both ends. Configurations to accomplish this could be developed. For example, and referring to FIG. 82, if the seal were an axial projection seal comprised by engaging projection 712p, with a portion of access cover 705 under pressure provided by latches 705a, or other structure, then the outer perimeter portion 712x of end piece 712 could be sufficiently small to allow the cartridge 712 to be removed from housing end 701b when access cover 707 is removed.

Alternately stated, the housing central section 706 could be defined with an end 701*a* that did not have a shelf therein for seal.

In general terms, the schematic depiction of FIGS. 79-82 is meant to indicate some options or principles that be applied with a variety of arrangements according to the present disclosure. First, both ends of the housing could be made removable. Secondly, alternate sealing (for example) to radial sealing can be used. Also, oval shape for the cartridges is possible. Further, the housing could be configured with an inlet directed toward a central axis rather than tangential, even when it is slanted. Further, the housing can be configured such that even though the cartridge has a projection arrangement for engagement with the housing at the closed end, the housing itself is not configured for such engagement. Similarly it can be configured such that even if the cartridge has a resistive engagement arrangement at the closed end, the housing is configured not to use engagement with that arrangement.

Herein, when a seal is characterized as "axial" it is meant that the seal force involving a seal member are generally directed in-line with an axis surrounded by the seal. An axis seal could, for example, be formed by pushing a seal positioned on an end piece against a housing member by axial forces, i.e. generally forces in the direction of the media. Another type of axial seal is an axial pinch seal, in which the seal member becomes pinched between separable housing sections, with the forces generally again aligned with an axis surrounded by the seal member.

In various ones of FIGS. 79-82, some selected dimensions are provided as follows: WA=166.2 mm; WB=330 mm; WC=35.4 mm; WD=546 mm; WE=30°; WF=216 mm; WG=380 mm; and, WH=216 mm; and, WL=166.2 mm. Of course, alternate dimensions can be used with the principles characterized herein. The dimensions provided, however, can be applied to understand example applications of the techniques characterized.

It will be understood that the variations discussed in this section, with respect to FIGS. 71-82 can be implemented independently or collectively in various combinations, with the features in the various embodiments described herein. The assembly depicted schematically by the drawings of FIGS. 79-82 is mean to be indicative of principles and structural features that can be implemented in a variety of ways, and not to necessarily represent any given preferred arrangement according to the present disclosure.

B. An Additional Example Cartridge, FIGS. 83-87

Figure 83:
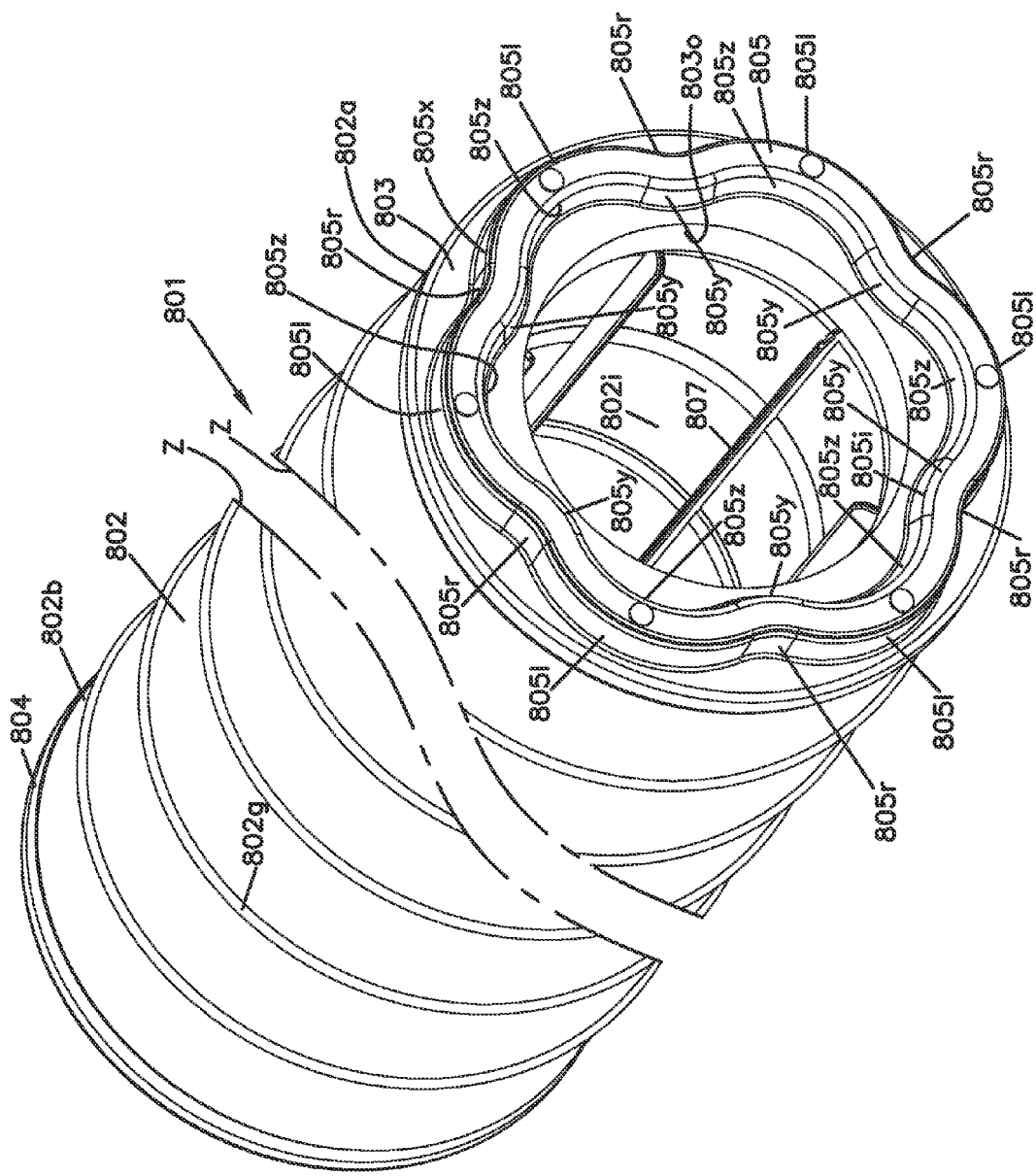
FIG. 83 is a schematic perspective view of an additional filter cartridge embodying selected features of the present disclosure.

In FIGS. 83-87, an additional filter cartridge indicating features usable in arrangements according to the present disclosure is depicted. In FIG. 83, a perspective view is provided. The reference numeral 801 generally indicates the filter cartridge variation. The filter cartridge 801 is shown with break lines Z indicating that the length is variable. A typical length would the scale indicated by the depicted distance between the opposites ends or end pieces; and, the portion shown at the break lines Z would typically be filled in with continuance of the lines shown. However, alternates are possible.

Referring to FIG. 112, the filter cartridge 801 comprises filter media 802 extending between first and second end pieces 803, 804. End piece 803 is depicted in the embodiment as open; i.e. having central air flow aperture arrangement or aperture 803*o* therethrough. End piece 804 would typically be closed, with no aperture therethrough in communication with the cartridge interior.

Media 802 extends around an open central interior 802*i*. In the example shown, frame piece 807 is depicted with the filter media 802 wrapped therearound.

In general, the media 802 will typically be pleated, but alternatives are possible. Typically, the media 802 will be configured as characterized previously herein, with respect to eccentricities between opposite ends 802*a*, 802*b*. However, alternatives are possible. The media 802 may be generally configured as a cylinder, but distorted for the eccentricity; however, it could, alternatively, be provided with an alternate shape, for example an cross-sectional oval shape.

The cartridge 801 can be provided with: an outer liner generally in accord with descriptions herein above; an optional pleat bead 802*b*, as characterized herein; or, both as desired.

End piece 803 has a seal arrangement projection or bulge 805 thereon, configured in accord with descriptions as found in U.S. Ser. Nos. 13/662,022; 14/266,560, incorporated herein by reference, as a seal projection. The seal arrangement 805 has a radially outwardly directed surface 805*x* comprising alternating (outward) convex sections or lobes 805*l* and inner concave sections or recesses 805*r*. Surface 805*x* can be used as a radially (outwardly) directed sealing surface, as discussed below. When it is so used, in general, the seal surface 805*x* would represent a non-circular, radially outwardly, directed, seal surface; generally undulating in shape in extension around a center of the seal or central axis defined by the seal. This seal surface can be centered on/around an axis extending through a center of aperture 803*o* and end cap 803, or it can be offset from that axis.

It is noted, however, that in some applications, surface 805*x* will not be used as a seal surface. This will be understood from the following characterization of the inner surface 805*i* as well as discussions below in connection with FIGS. 101-105.

Still referring to FIG. 83 and sealing bulge 805, attention is directed to the radially inwardly directed to the radially inwardly directed surface 805*i*. In the example depicted, surface 805*i* is also non-circular in extension around aperture 803*o* and a central axis of the sealing bulge 805. The particular surface 805*i* depicted, comprises a plurality of spaced inwardly directed lobes or convex sections 805*y* alternating with concave sections or recesses 805*z*. Surface 805*i* can be configured to be used as a radially (inwardly) directed) sealing surface, generally comprising a non-circular seal shape in extension around the central aperture 85*o* and/or central axis.

It will be understood that either or both of surfaces 805*x*, 805*i* can be used as a sealing surface. This is discussed below in connection with FIGS. 81-85. Referring to FIG. 83, it is noted that sealing bulge or projection 805 is relatively narrow; i.e. it has a narrower width than the dimension across end piece 803. This means that the sealing bulge 805 can be configured from molded-in-place material in a manner that conserves material use.

Still referring to FIG. 83, it can be seen that the housing seal arrangement, the form sealing bulge 805, and/or, as defined by whichever (or both) surfaces 805*x*, 805*i* is used for sealing, it can be characterized as being "axially aligned" with an end of the media 802; or, as being "in axial overlap" therewith. By this it is meant that the bulge and/or surface characterized, is positioned in alignment with an end of the media 802, that is embedded in end piece 803, rather than being positioned radially interiorly thereof or radially exteriorly thereof. This can be advantageous with respect to management of radial space issues, for example.

Figure 84:
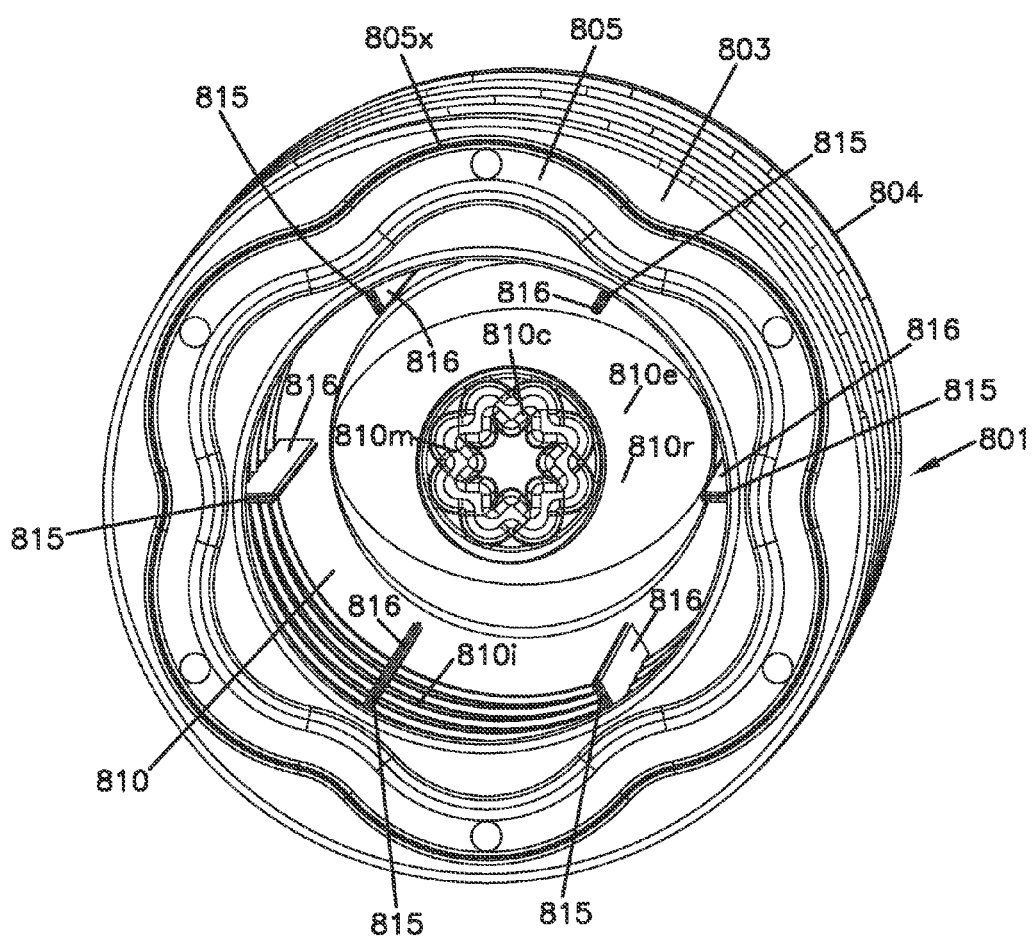
FIG. 84 is a schematic open end plan view of the cartridge of FIG. 83.

In FIG. 84, a plan view taken generally toward end piece 803 and sealing bulge 805 is shown. One can see, in FIG. 84, portion of central preform 810 around which the filter media 802, FIG. 83, is positioned. The preform 810 includes a liner 8101 around which the filter media 802 is positioned, and an end section 810e which closes an end of the cartridge 801 adjacent end piece 804. The end 810e can have an optional central receiver projection 810r thereon, extending toward the viewer in the orientation of FIG. 84. That projection 810 can have a central portion 810c with a member of a projection/receiver arrangement 810m thereon, for engagement with a housing. This member 810m can be in accord with the variations discussed herein above in connection with variations discussed herein.

The preform 810 would also typically include a portion extending over an end of the media embedded in end piece 803 that supports the seal of projection 805. This could generally be in accord with analogous arrangements discussed herein, or in U.S. Ser. Nos. 13/662,022; 14/266,560 incorporated herein by reference.

Still referring to FIG. 84, tips 815 of lateral extensions 816 can be used as a portion of a radial alignment, projection/receiver, arrangement providing for rotational alignment of the cartridge 801 with a portion of a housing (or access cover) in general accord with the principles described herein.

Figure 85:
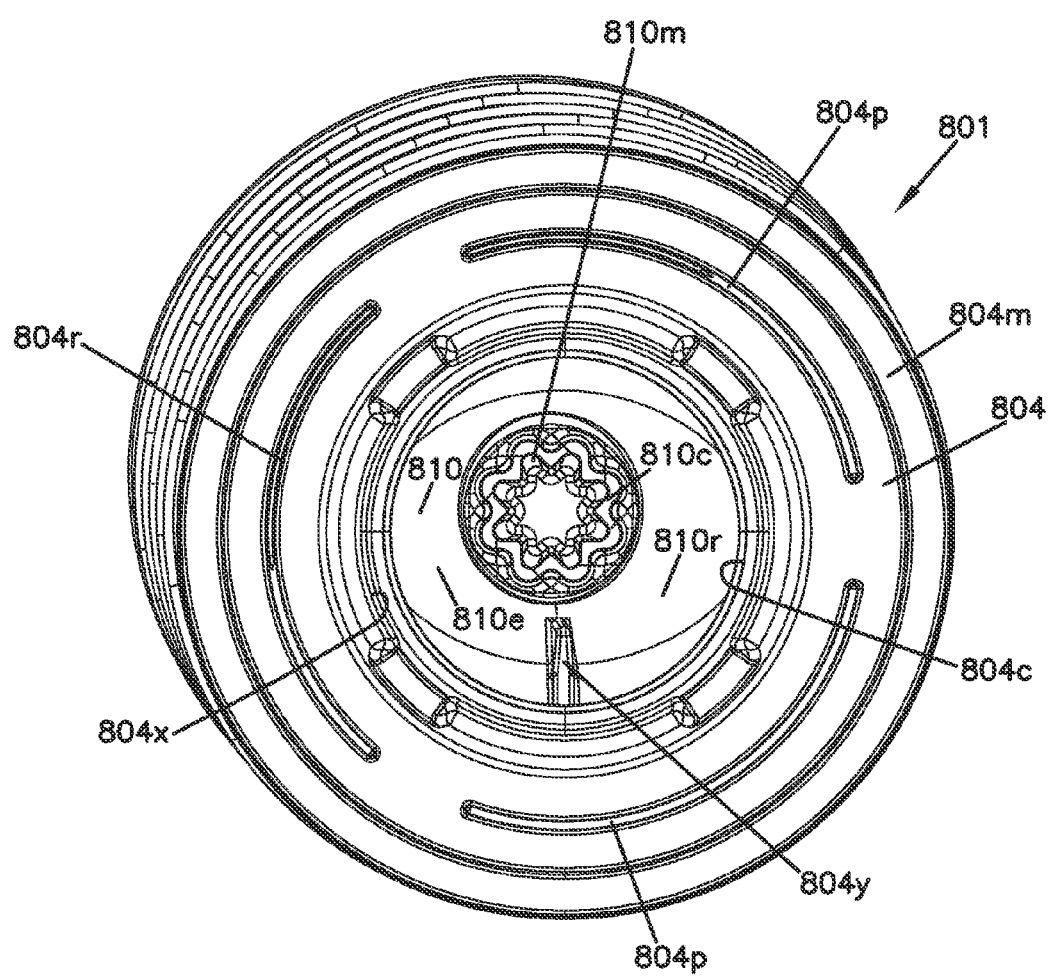
FIG. 85 is a schematic closed end plan view of the cartridge of FIG. 83.

In FIG. 85, a plan view of cartridge 801 taken generally toward closed end piece 804 is provided. The closed end piece 804 includes a molded-in-place portion 804m extending over media ends embedded therein. The center 804c of end 804 is closed by central portion or end 810e of the preform 810.

Molded-in-place portion 804 includes a projection arrangement 804p comprising, in the example depicted, a segmented ring projecting toward the viewer in FIG. 85. The projections 804p can provide cushion with a housing during installation. It is noted that the projection arrangement 804p can have alternate configurations, including a non-segmented circle.

Still referring to FIG. 85, at 804x, end piece 804 can be provided with a radially interiorly directed, resistive, housing engagement feature analogous to those described herein. It would typically have used a "compressive" such arrangement, comprising a portion of the same material from which molded-in-place portions 804m of end cap 804 are made.

Still referring to FIG. 85, attention is directed to projection 804y. this projection can operate as a portion of a radial alignment arrangement, in general accord with various descriptions herein, the alignment occurring between cartridge end 804 and an end portion of a housing associated therewith.

Figure 86:
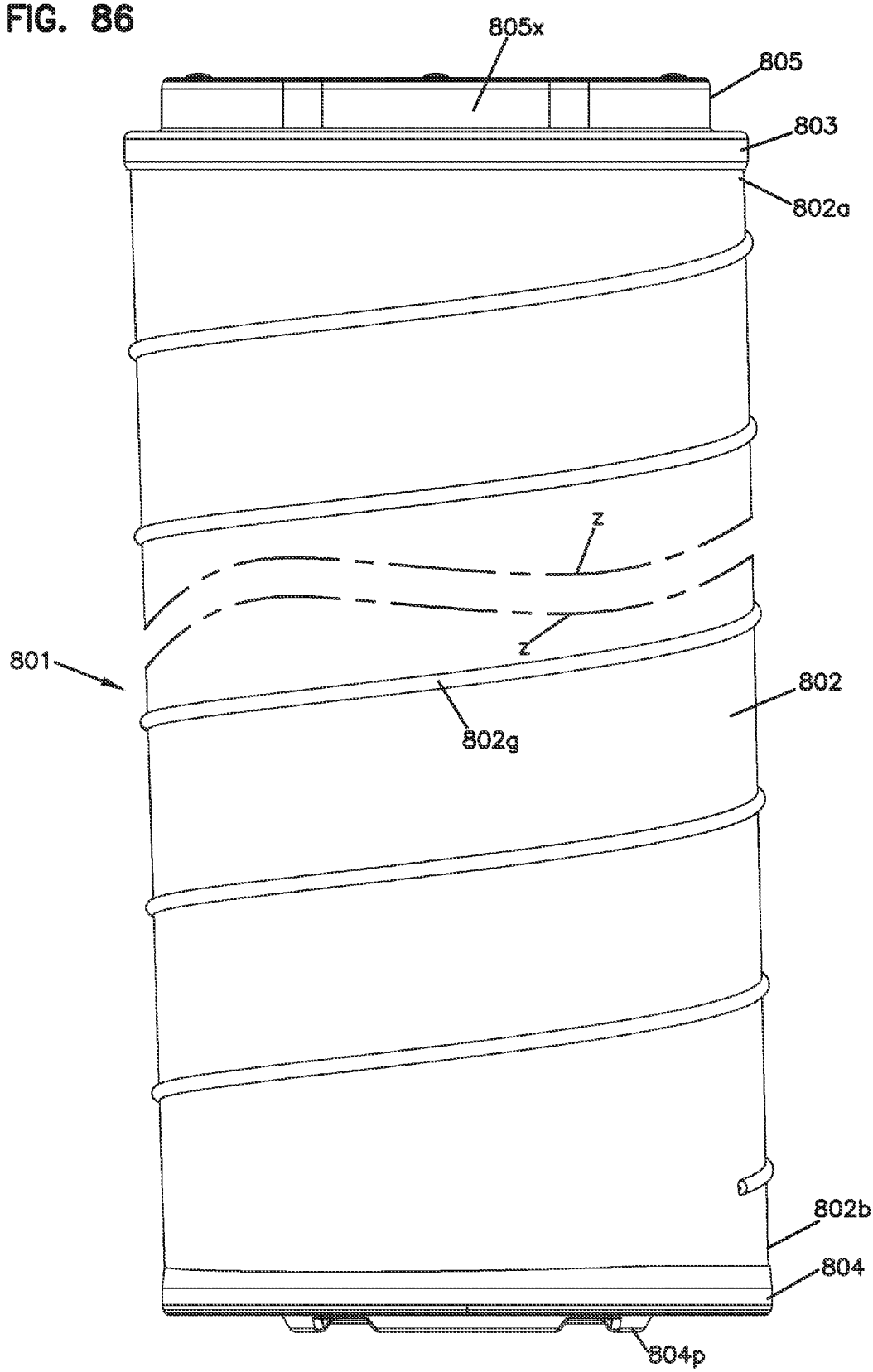
FIG. 86 is a schematic first side elevational view of the cartridge of FIG. 83.

In FIG. 86, a side elevational view of cartridge 801 is depicted.

Figure 87:
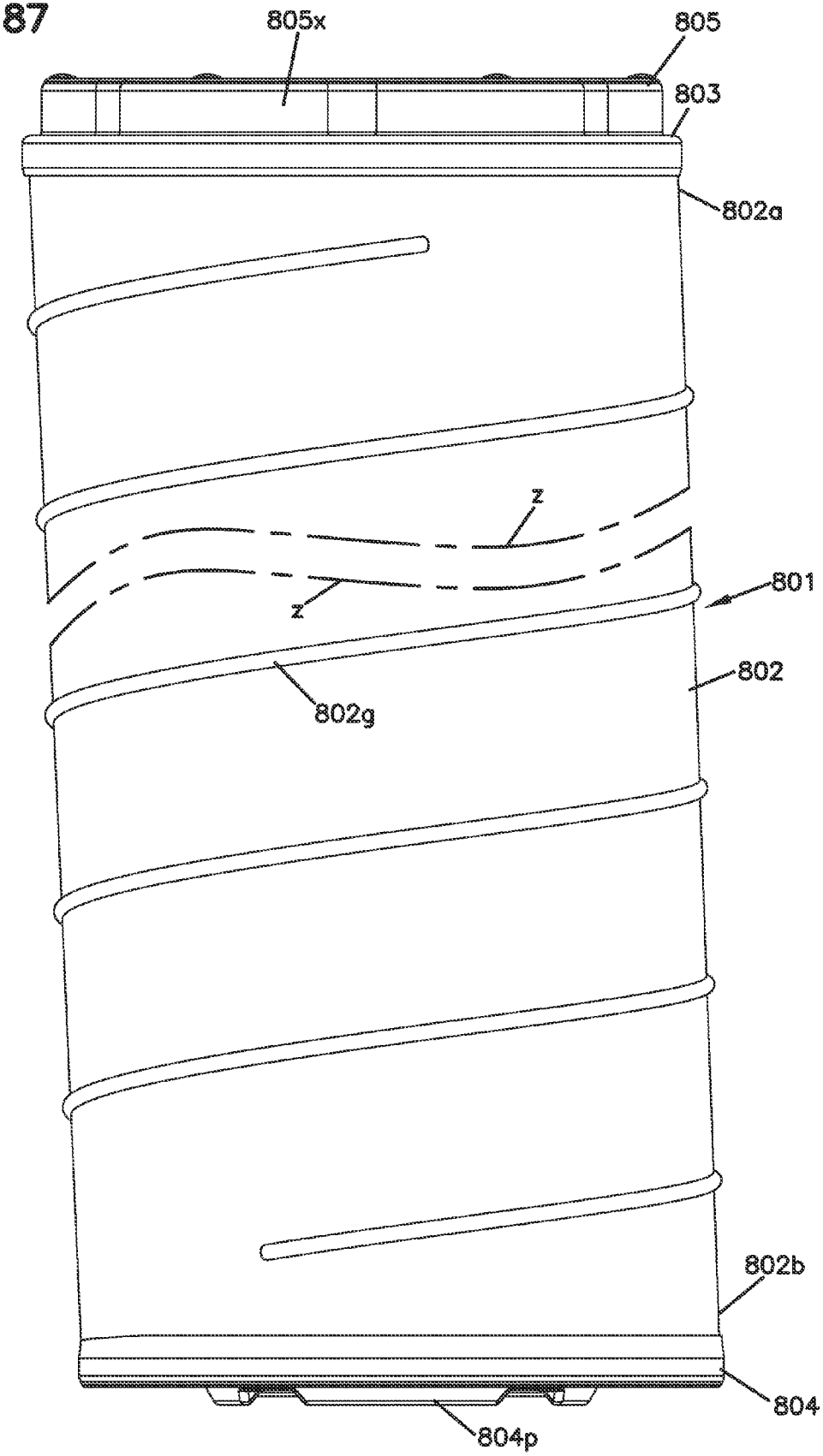
FIG. 87 is a second schematic side elevational view of the cartridge of FIG. 83.

In FIG. 87, a second side elevational view is depicted, taken generally toward the right of FIG. 86.

For the particular arrangement depicted, each of the seal surfaces 805x, 805i comprises six lobes alternating with six recesses, although the number can be varied. Further, in the example the various lobes and recesses in each surface are symmetrically and evenly positioned, but alternatives are possible. It is noted that because, for the particular cartridge 801 depicted, the seal arrangement or seal projection 805 is maintained a relatively constant thickness, the outward lobes 8051 on the surface 805x may be larger, i.e. configured to a larger radius, than the inward lobes 805y of the inner surface 805i.

C. Selected Variations in Sealing Engagement of the Cartridge with the Housing

Some selected variations in the manner in which a cartridge in general accord with FIGS. 83-87 seals to the housing can be understood from the schematic depictions FIGS. 101-105.

Figure 101:
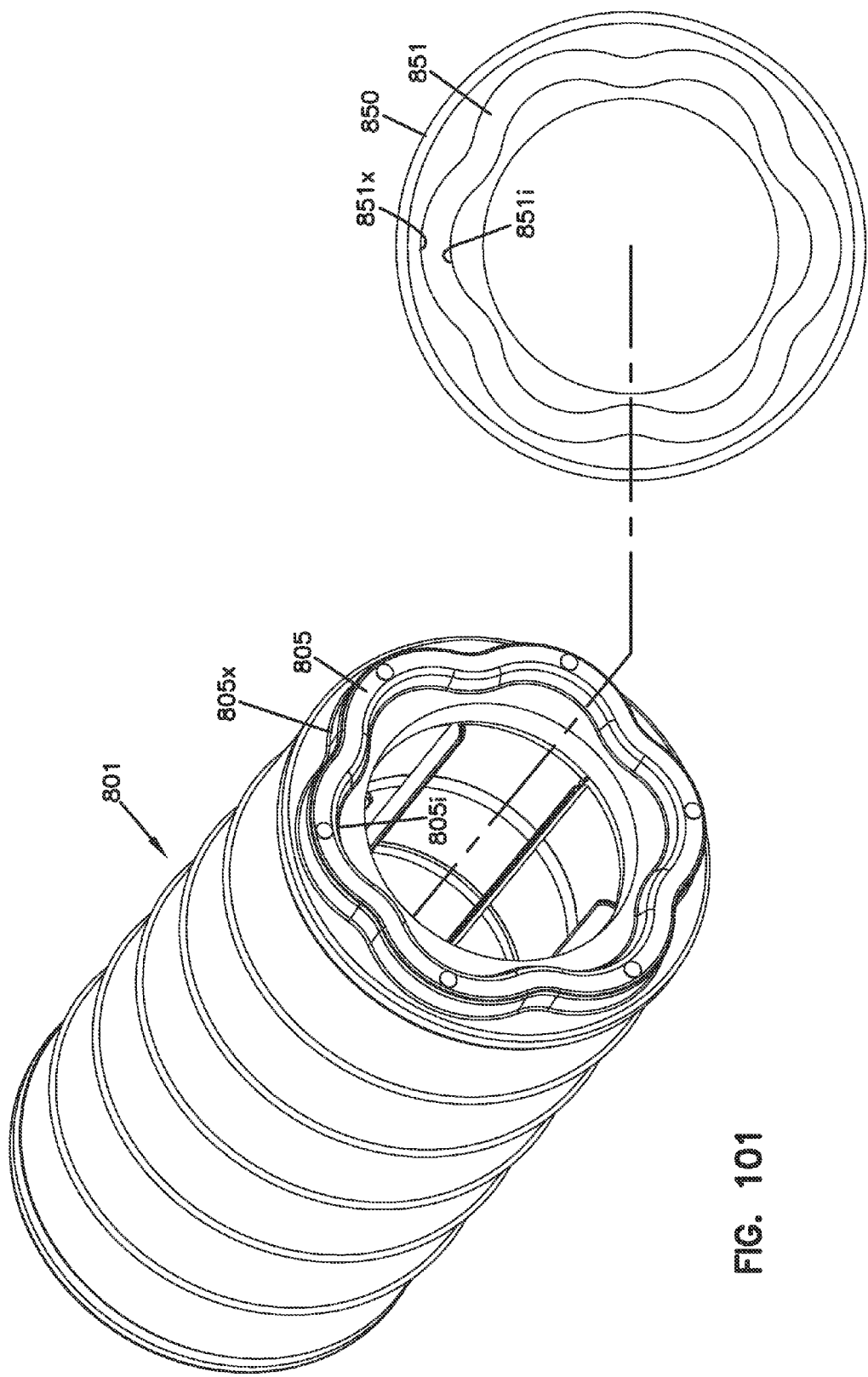
FIG. 101 is a schematic perspective view of a filter cartridge in accord with FIG. 83, depicted in association with a housing component.

Referring to FIG. 101, at 850 a portion of a housing is shown schematically. The portion 850 includes a recess or groove 851 positioned between outer and inner sidewalls 851x and 851i. The groove 851 would be shaped and configured to receive, projecting therein, seal projection 805 when the filter cartridge 801 is installed. Either or both of surfaces 851x, 851i can be configured as a housing seal surface, for resistive sealing engagement with respect to surfaces 805x, 805i, respectively, on the cartridge 801, in a sealing manner. (If both of sides 851x, 851i provide sealing, projection 805 may not need a seal support therein).

Figure 102:
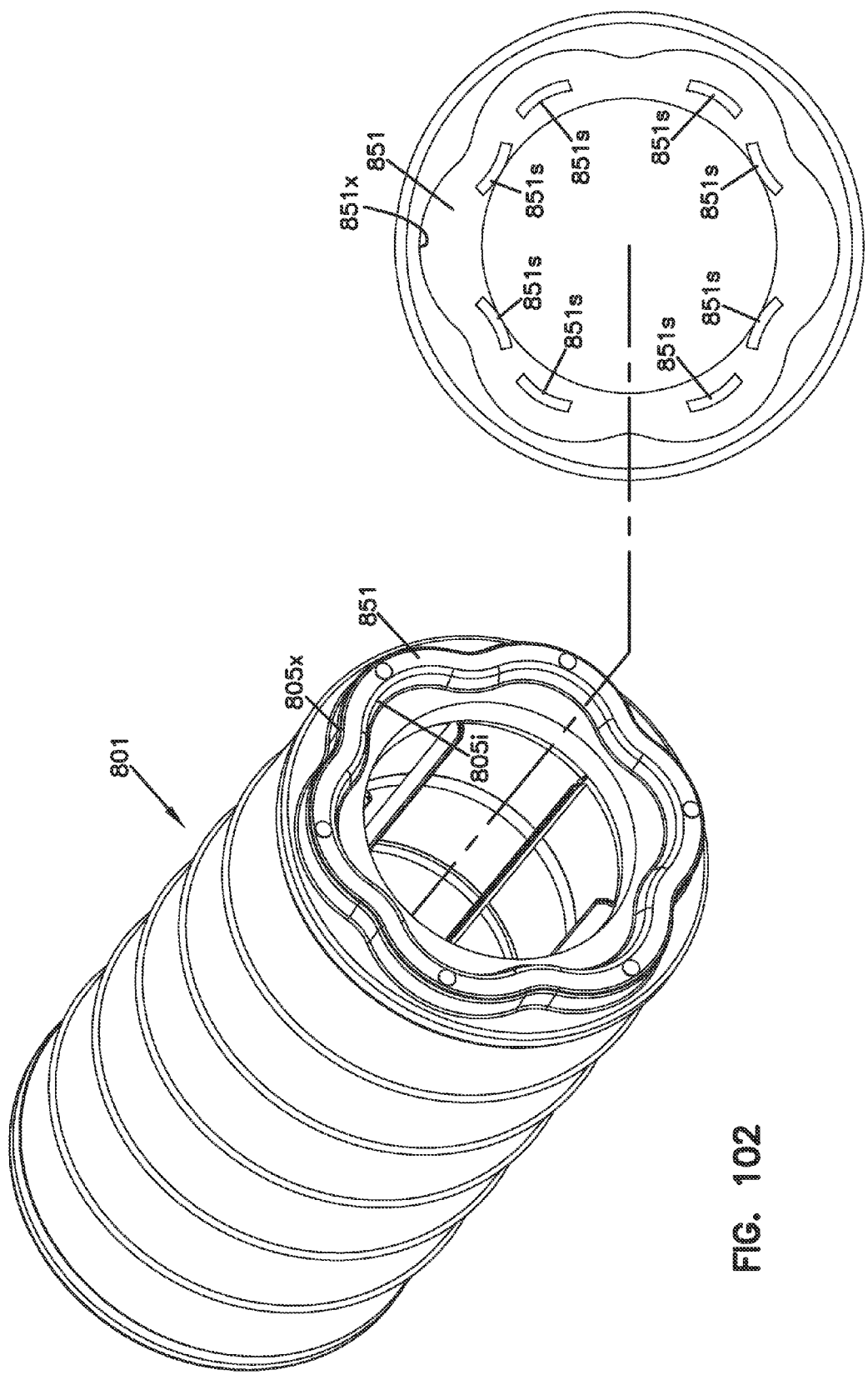
FIG. 102 is a schematic perspective view of a filter cartridge in accord with FIG. 83 in association with a first alternate housing component.

In FIG. 102, a variation in the arrangement of FIG. 101 is shown. Here, the outer wall 851x of the groove 851g is used as a housing sealing surface. However, instead of a complete surface 851i, analogous to FIG. 101, various segments or projections 851s are provided, for guiding the cartridge 801 but not providing a seal surface. The projections 851s can be configured to engage (or alternately to be spaced from) portions of surface 805s, but not the entire surface. The number of projections, location of projections, and shape of projections can be varied. However, they can be useful as guides to facilitate installation.

Figure 103:
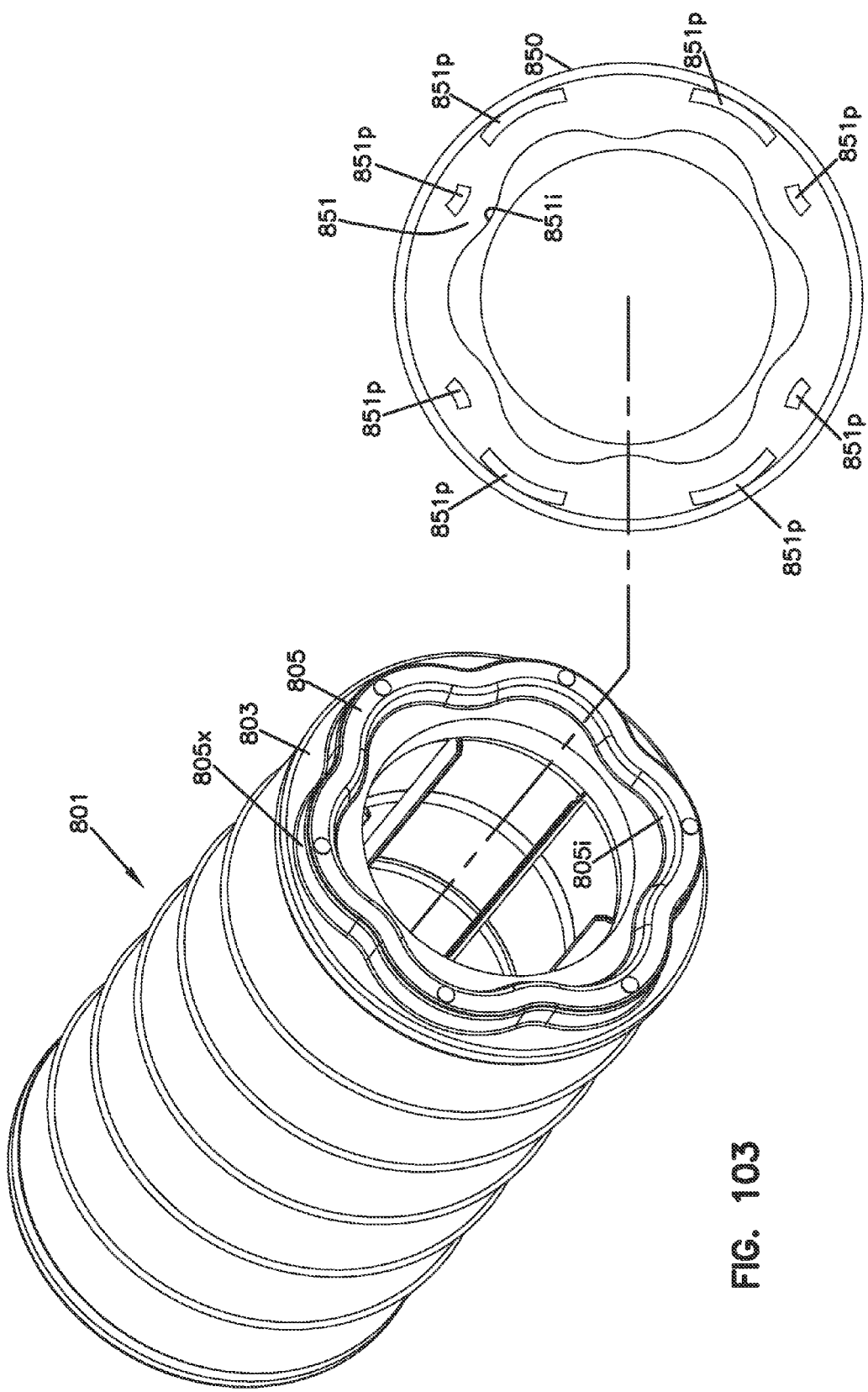
FIG. 103 is a schematic perspective view of a filter cartridge in accord with FIG. 83, depicted in association with a second alternate housing component.

In FIG. 103, a variation is shown in which guide projections are provided for alignment with the outer seal surface 805x, and wall 851i is maintained for sealing engagement, in a sealing manner, with the inner seal surface 805i of the cartridge 801.

Figure 104:
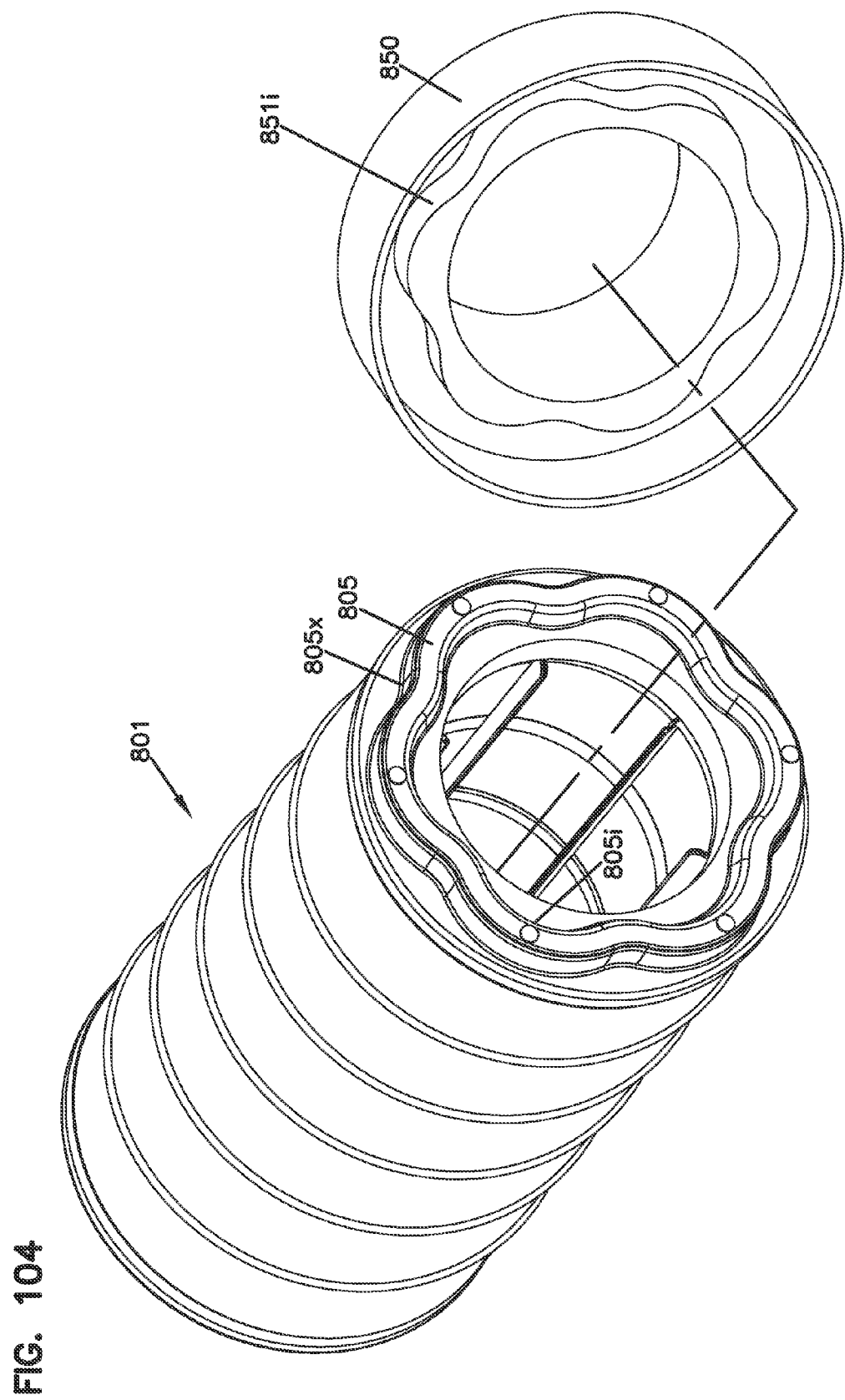
FIG. 104 is a schematic perspective view of a filter cartridge with FIG. 83 in association with a third alternate housing component.

In FIG. 104, the housing portion 850 is configured with only a portion having an outwardly directed seal surface 851i, so that engagement with seal projection 805 will be with sealing occurring along the inner or radially inwardly directed surface 805i.

Figure 105:
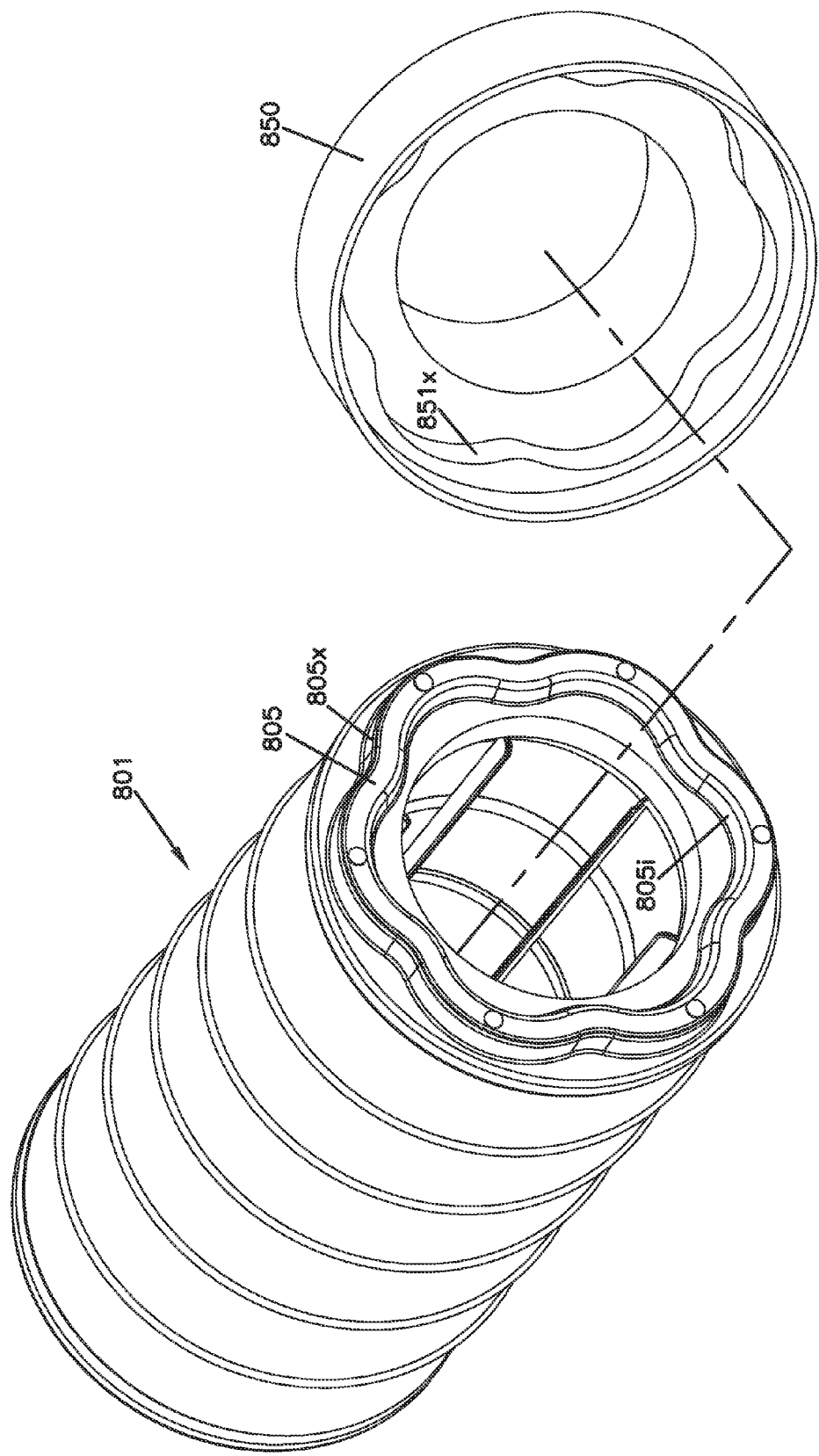
FIG. 105 is a schematic perspective view of a filter cartridge in accord with FIG. 82, in association with a fifth alternate housing component.

In FIG. 105, a variation is shown in which the housing section 850 is configured with only a radially inwardly directed surface at 851x to form a seal with the outwardly directed seal surface 805x of seal projection 805.

Of course, these variations can be used with a variety of seal configurations including being adapted for ones in which opposite surfaces of the radial projection do not both have undulating (spaced lobes) configurations.

From the depiction and descriptions of FIGS. 101-105, a variety of possibilities can be understood. A radial seal arrangement on a filter cartridge can be configured to only seal in a radially outwardly facing manner. It can be configured to only seal in a radially inwardly facing manner. It can also be configured to seal along both inner and outer surfaces. With respect to the housing component, it can be configured to only engage the outer surface, only engage the inner surface, to have both, or to have a housing seal surface that is engaged by only one of the radially directed surfaces on a sealing bulge, while having a projection arrangement that either engages or aligns with an opposite surface, whether that surface is configured as a sealing surface or not.

These variations can be implemented with a variety of arrangements according to the present disclosure, including alternate ones characterized herewith.

D. An Additional Air Cleaner Assembly and Features, FIGS. 88-100B

Figure 88:
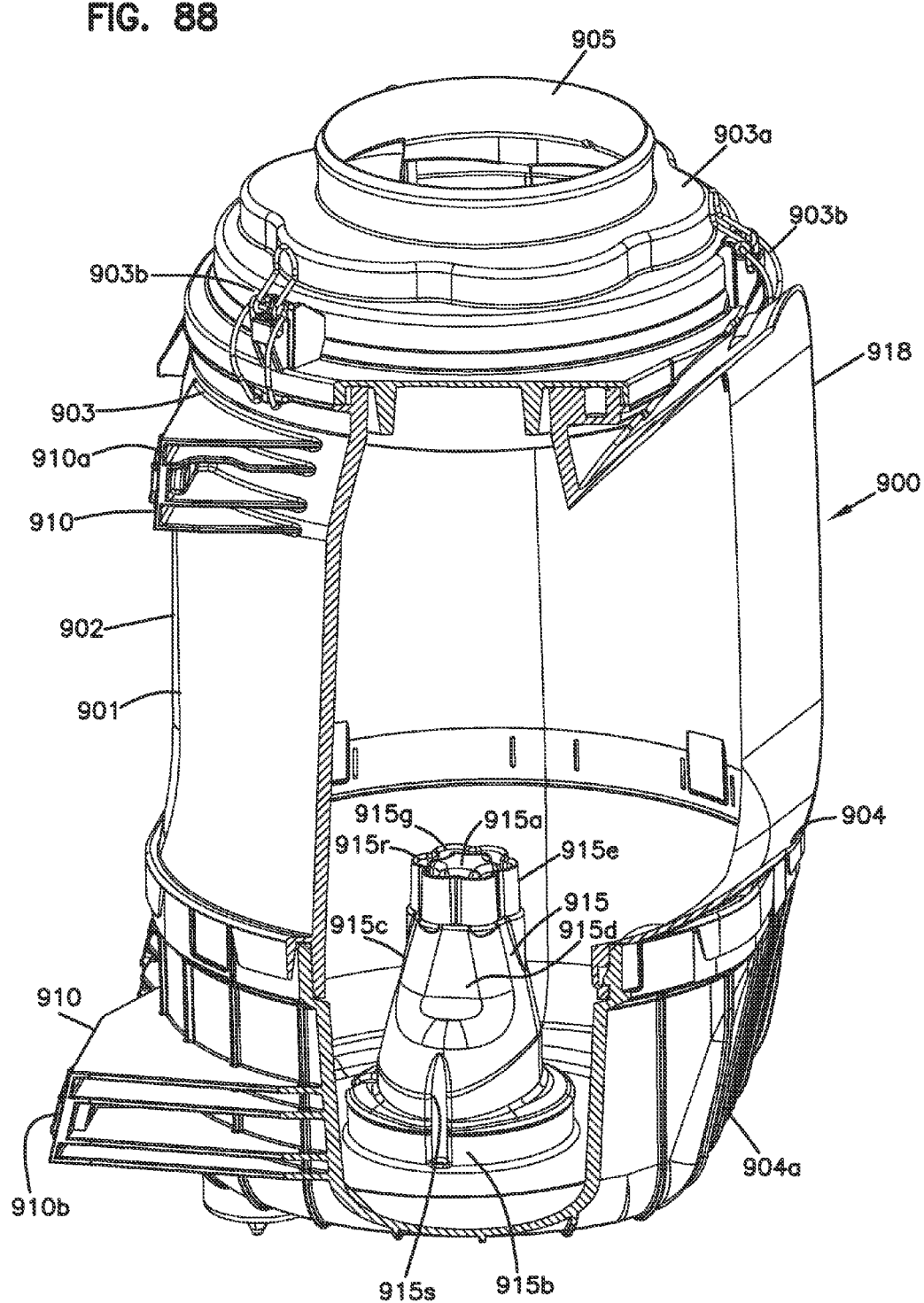
FIG. 88 is a schematic perspective view of an alternate housing for use in an air cleaner assembly with a filter cartridge in accord with selected principles of the present disclosure; the view of FIG. 88 showing portions broken away to depict internal detail.

In FIGS. 88-100B, an additional air cleaner assembly (and components) according to the present disclosure is depicted. In FIG. 88, the air cleaner assembly is indicated generally at 900. The assembly 900 is depicted with a filter cartridge (see FIG. 89 at 920) removed. Thus, what is viewable in FIG. 88 of the assembly 900 is housing 901. The housing 901 has opposite ends and includes a housing central portion 902 having a first end 903 and an opposite second end 904. The first end 903, in the assembly 900 depicted, includes a on end (in this instance removable) cover 903a, secured in place thereon by latches 903b. The (access) cover 903a is depicted with a flow tube 905 thereon, typically configured as an (axial) outlet flow tube for the system.

End 904 for the assembly depicted is provided with a second housing end or end portion, cover or bottom 904a thereon manufactured separately from central portion 902 and, in the example, non-removably secured thereto, for example snap-fit. However, end cover 904e could be configured to be removable, using principles described above.

Referring to FIG. 88, mounting pad arrangements are depicted at 910. One of those, 910b is shown positioned on housing end member 904a; whereas another 910a is shown positioned on housing central portion 902. If end member 904a was made as a removable (access) cover, typically mounting pad 910b would also be positioned on central portion 902, so that the central portion of the housing 901 would remain securely mounted in place as the lower end or access cover 904a is removed. However, since the particular end cover depicted 904a is not configured as a removable access cover, but rather is non-removably mounted on housing central section 902, mounting pads 910b can be positioned on the end 904a.

Still referring to FIG. 88, the housing 901 includes, at the second or base end, i.e. on end cover 904a, a central projection 915. This projection 915 will operate (as part of a projection/receiver arrangement) to receive thereover, a receiver, positioned in an end of the cartridge 920 (FIG. 89) when installed. This is described further below.

Referring to FIG. 88, projection 915 includes: a remote end 915e having, in the example depicted, an optional central projection 915a and an optional outer ring 915r with an optional (end) receiving groove 915g positioned between projection 915a and ring 915r. The receiving groove 915g is positioned to receive, projecting therein, a central axial projection (or portion) of the cartridge 920, during installation. This is described further below.

For the particular projection 915 depicted, the receiving groove 945g is non-circular, although an alternative is possible. In particular, central projection 915a at end 915e has a non-circular outer perimeter, in the example generally comprising a plurality of spaced, outwardly directed, lobes or projections having recesses therebetween. It is also noted that the outer ring 915r has a generally non-circular projection, in the example defining an inner surface with a plurality of spaced, recess having inward lobes or projections therebetween. These are described further below, in connection with FIGS. 92 and 92A.

Referring still to FIG. 88, projection 915a includes a base portion 915b. Positioned in part of base portion 815b and extending upwardly therefrom, is an optional radial alignment receiver, recess or receiving slot 915s. The optional receiving slot 915s is configured to receive, extending therein, a radial alignment, or locator projection on a cartridge 920, when installed. This would operate as an optional rotational alignment arrangement discussed below.

Projection 915 includes a central portion 915c having a somewhat conical or tapering shape, but with a portion 915d distorted inwardly, analogously to certain arrangements discussed above. This can facilitate installation of eccentric cartridges of the type characterized herein.

Still referring to FIG. 88 at 918, a second flow tube in housing 901 is depicted, in this instance positioned on housing central portion 902. Flow tube 908 is configured generally as an inlet flow tube, an can be analogous to arrangements previously discussed. It is depicted as a slanted, tangential, flow tube, although alternatives are possible.

Figure 89:
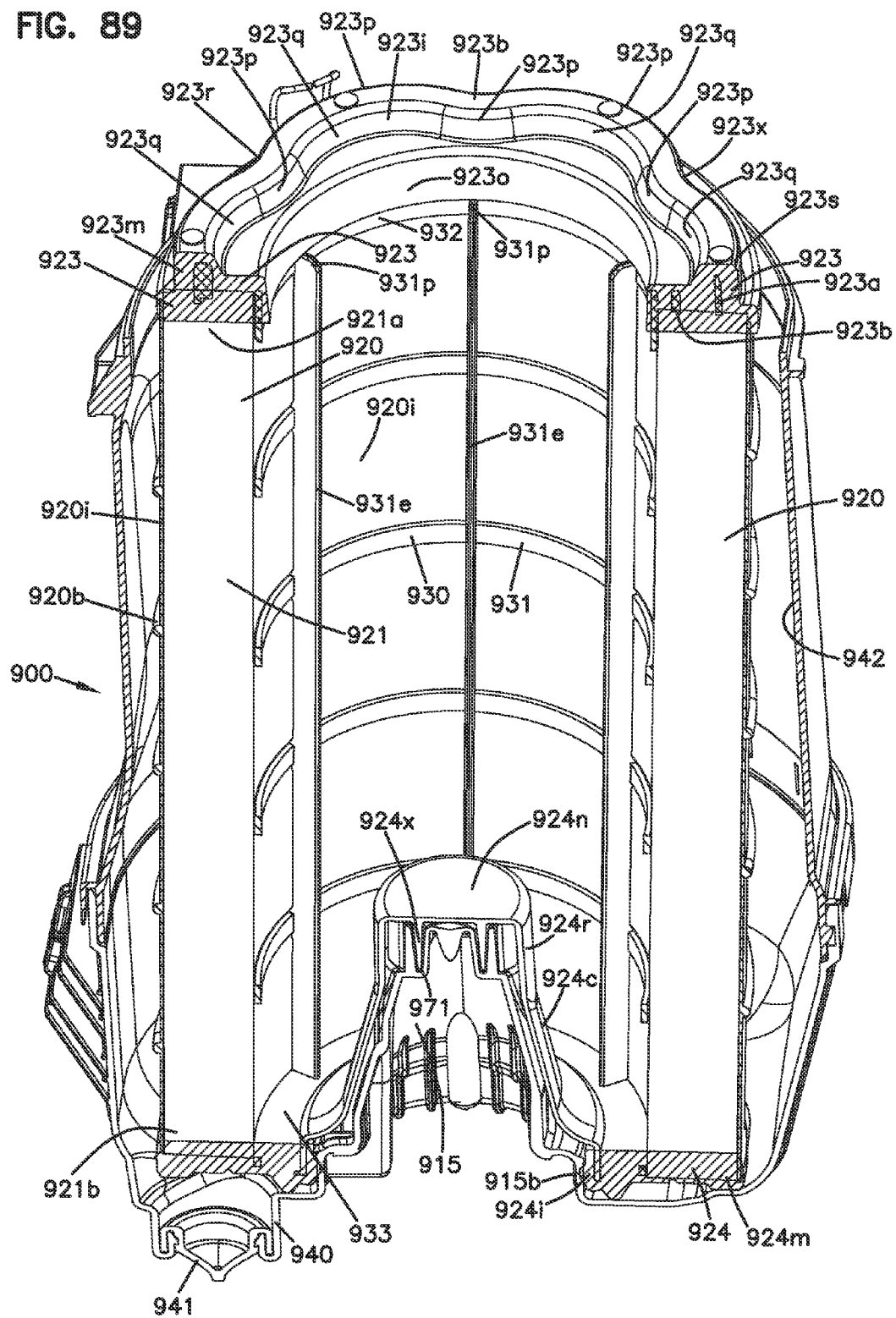
FIG. 89 is a schematic cross-sectional view of the housing of FIG. 88 depicted with an access cover removed and with a filter cartridge installed.

Attention is now directed to FIG. 89. Here, the assembly 900 is depicted with the access cover 903, FIG. 88, removed; and, with cartridge 920 installed. Various portions viewable are schematic and shown in cross-section, to facilitate understanding.

Attention is first directed to the cartridge 920. The cartridge 920 generally comprises filter media 921 positioned surrounding an interior 920i. The filter media 921 may be pleated, or it can comprise alternate materials. The filter media 921 generally extends between opposite first and second ends 921a, 921b.

Positioned at first end 921a is first end piece 923; and, positioned at second end 921b is second end piece 924. For the embodiment depicted, the first end piece 923 is generally an open end piece having central air flow aperture 923o therethrough. Second end piece 924, on the other hand, is typically a closed end piece, i.e. it has no central aperture therethrough in communication with interior 920i, although alternatives are possible.

Typically, the filter assembly 900 will be configured for "out-to-in" flow during filtering, although the principles can be applied with alternate arrangements Thus, in the example, aperture 923o will be an outlet aperture for filtered air, although, again, an alternative flow direction can be used with principles described herein. The first end piece 923 may be configured with a variety of features in accord with the various embodiments depicted and described herein. The particular first end piece 923 depicted, is generally configured with a housing seal arrangement shaped and oriented for radially outwardly directed sealing, but alternatives are possible.

Thus, the example first end piece 923 includes a sealing bulge 923b, having a radially (outwardly) directed or outer surface 923x; and, a radially inwardly directed or inner surface 923i. The outer surface 923x is configured as an outwardly directed radial sealing surface 923s. The radially inner (or inwardly directed) surface 923i is not configured as a seal surface, but it could be.

Although alternatives are possible, in the example depicted, the seal surface 923s is configured to form a non-circular seal, in extension around a central axis surrounded by the seal (or alternately stated in extension around the aperture 923o). The particular non-circular pattern depicted, comprises a plurality of spaced, radially (outwardly) directed, lobes 923p separated by a plurality of radial (outwardly facing, but inwardly directed) concave features or recesses 923r.

Typically there are at least three lobes and three recesses, usually at least four, and often a number within the range of 4-12, inclusive usually 4-10, inclusive. The seal surface 923s, then, can be characterized as defining an undulating or serpentine shape, in extension around a central axis surrounded by the seal, with alternating lobes and recesses being traced in the peripheral definition as extension around the axis is traced or followed.

Again, the inner surface 923i, in the example shown, is not configured as a sealing surface, but it could be, using principles generally discussed above in connection with FIGS. 83-87, and also herein in connection with FIGS. 101-105.

For the particular example of FIG. 89, the surface 923*i* does define an undulating or serpentine surface pattern as the peripheral definition around the central axis or aperture 923*o* is followed or traced. Here, each of the radially inwardly directing lobes 923*p* is opposite a recess 923*r*, and each of the concave sections or recesses 923*g* in surface 923*i* is opposite an outward lobe 923*p*. This provides for a sealing bulge 923*p* that is efficient with respect to seal material use. The seal material of the bulge 923*p* is generally molded-in-place as a portion of molded-in-place portion 923*m* of end piece 923.

Still referring to FIG. 89, in general, the housing seal surface (or surfaces) are positioned oriented in axial overlap with end 921*a* of the media, at a location between perimeters of the media. This is not required, but is typical in many applications.

Also, it is noted that the housing seal surface or surfaces in FIG. 89 can be characterized as defining a seal perimeter definition in a seal plan generally perpendicular to a central axis surrounded by the seal.

The cartridge 920 can be provided with an optional outer liner surrounding the media 921 if desired. It can also be provided with an optional pleat tip bead extending therearound. In the example depicted, the cartridge 920 includes both, the liner being indicated at 9201 and the pleat tip bead 920*b*. These may be as previously characterized herein.

Still referring to FIG. 89, the cartridge 920 depicted includes a support piece or preform 930 on which the media 921 is positioned. The preform 930 includes, in the example depicted, a central liner structure 931, which is generally open or porous, around which the media 920 is positioned. The liner structure 931 generally provides inner support to the media 920.

The support 931 extends between opposite ends 932, 933. End 932 generally includes thereon portions embedded within molded-in-place portions 923*m* of end piece 923. The molded-in-place portions include the sealing bulge 923*b*, as well as portions extending peripherally, (inwardly and outwardly) therefrom. The preform end 932 generally includes a portion extending at least partially across end 921*a* of the media 920 and having thereon one or more projections such as projection 932*a*, 932*b*. Projection 932*a* provides a support embedded within sealing bulge 923*b*, and will typically fit into a mold when the bulge 923*b* is molded-in-place thereon. Projection 932*b* can be providing strength to the portion of the end piece extending across end 921*a*.

Still referring to FIG. 89, the cartridge 920 includes a member of a first, non-seal, rotational alignment projection/receiver arrangements therein, associated with end piece 923, positioned in the cartridge interior, and organized to provide for rotational indexing to access cover 903*a*, FIG. 88, in use. In FIG. 89, the first member of this first, non-seal, radial alignment projection/receiver arrangement comprises projections 931*p* positioned adjacent (and projecting radially inwardly from a position adjacent) end piece 923. In the example depicted, the individual projections 931*p* comprise portions of longitudinal extensions 931*e*.

Still referring to FIG. 89, end piece 924 comprises a molded-in-place portion 924*m* and a preform central projection/receiver portion 924*c*. The portion 924*c* defines a receiver space opposite cartridge interior 920*i* that functions as a receiver for engagement with the housing. The central potion 824*c* it is generally closed so as to prevent air flow therethrough in communication with interior 920*i*. Interaction between the receiver portion 924*r* of central portion 924*c*, with the housing, is discussed further below.

Still referring to FIG. 89, the cartridge 920 is provided with a resistive (in the example compressive) radial engagement member or arrangement for engagement with the housing 901. In particular, molded-in-place portion 924*m* includes a radially inwardly directed section 924*i* configured (analogously to similar features previously described for other embodiments) for engagement around base 915*b* of central projection 915. In the example, this resistive radial engagement member or arrangement surrounds, an entrance to projection 924*c*.

Still referring to FIG. 89, the housing 901 includes an ejection port 940 therein, having a evacuator valve 941 positioned thereon. As with previously described arrangements since the assembly 900 is depicted configured for "out-to-in" flow during filtering, the evacuator port 940 is in direct flow communication with a unfiltered air annulus 942 that surrounds the cartridge 920 in use. Thus, water and other material that may enter the housing interior through the inlet 918, FIG. 88 can drain or evacuate directly through port 940 and valve 941, without passage through the filter media 921.

Figure 90:
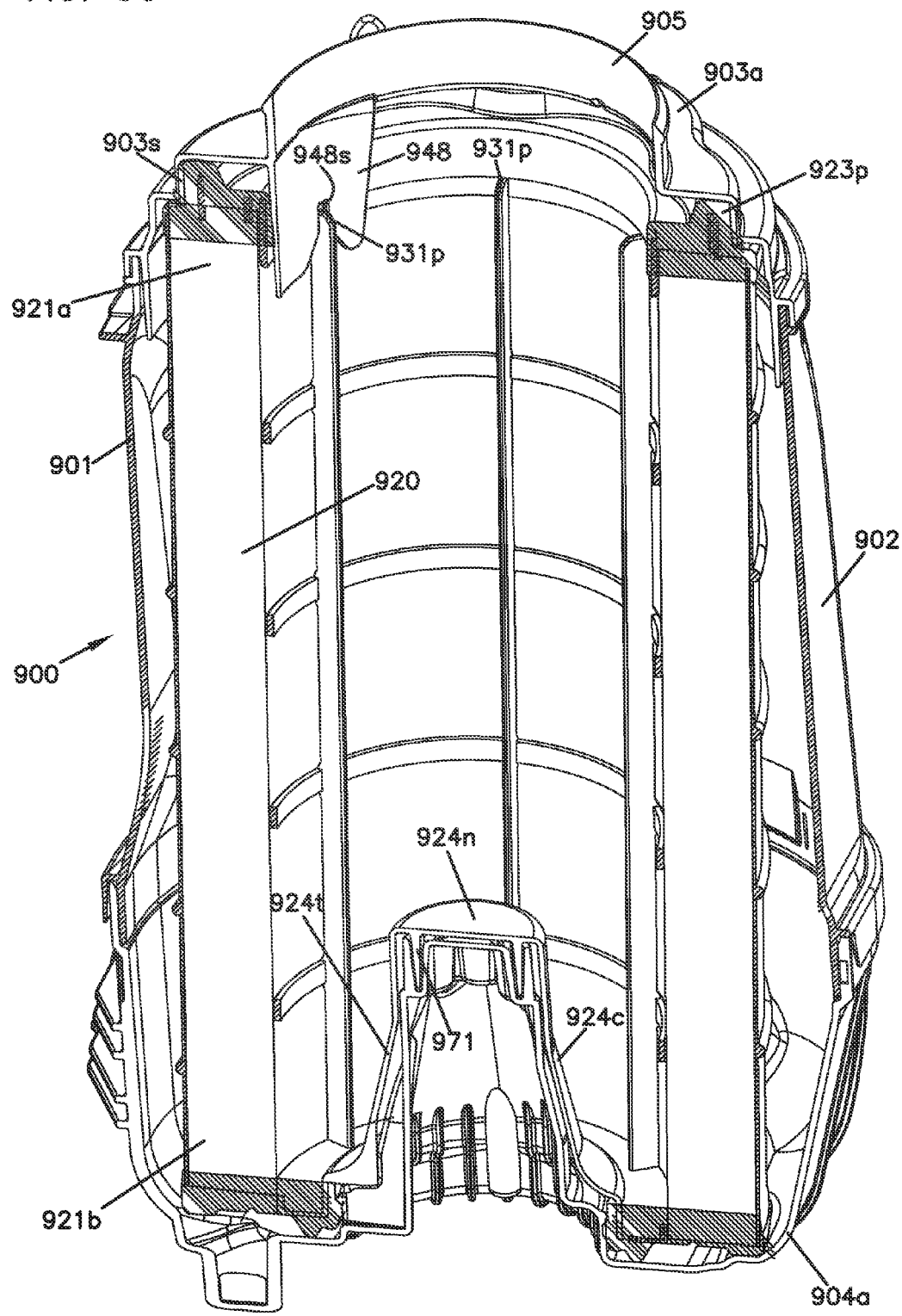
FIG. 90 is a schematic perspective cross-sectional view of the assembly of FIG. 88 depicted with a cartridge and access cover in place.

Attention is now directed to FIG. 90. In FIG. 90, the assembly 900 is depicted with a cartridge 920 positioned within the housing 901 and with access cover 903*a* in place. It can be seen that the access cover 903*a* defines, at 903*s*, a housing seal surface for engagement with a radially outwardly directed seal surface 923*s*, FIG. 89, of the cartridge 920. In order to accommodate the non-circular shape, surface 903*s* has a mating shape; in this instance, a plurality of outward lobes (recesses) surrounded by inwardly directed convex sections.

In FIG. 90, it can be seen that the access cover 903*a* includes a second member of a non-seal rotational alignment projection/receiver arrangement at 948, configured for engagement with one or more of the projections 931*p*, when the access cover 903*a* is appropriately rotationally aligned for sealing engagement with the cartridge 920. In the example depicted, the radially alignment projection/receiver arrangement comprises a receiver recess or slot 948*s* that is configured to only allow full engagement with cartridge 920*s* by receiving one of projections 931*p* therein. This can only occur when the access cover 903*a* has been appropriately rotationally aligned for proper sealing engagement between the seal bulge 923*p* and the seal surface 903*s* (or when the cartridge is restively aligned to engage the seal surface 903*s*).

Still referring to FIG. 90, it is noted that the bottom end 904*a* for the housing 901 is configured to have been made separately from central section 902 and to then be secured thereto in a manner that is not readily separable. Again, it could be a removable member, secured by latches, bolts or other connectors, if designed accordingly.

In FIG. 90, attention is directed to central projection/receiver portion 924*c* on the cartridge 920. It can be seen that this portion 924*c* includes an end, cap or end cap portion 924*n*, which, in the example depicted, is generally circular in a cross-section perpendicularly to an axis therethrough, whereas the projection 924*c* includes a central portion 924*t* at a location between the cap 924*n* and second end 921*b* of the media, which is non-circular in cross-section. Alternatives are possible, for example, both could be circular or both could be non-circular. However, the particular example depicted is convenient for assembly and manufacture, as well as implementation with certain preferred features characterized herein.

In FIG. 90A, a bottom, inside, perspective view of the access cover 903a is depicted. Here, seal surface 903s, and member 948a with slot 948s are further viewable.

It is noted that, in general, when the cartridge 920 is as depicted with a radially directed housing seal, it is preferred that surface 903x not be available as a seal surface, since the access cover 903a may be manufactured to tolerances that would not allow for this. In order to inhibit inadvertent use as a seal surface, surface 903x includes therein, recess 903y.

It is also noted that the access cover 903a can use, either alternatively or in addition to the latches (or alternate connectors) 903b, an optional snap-fit arrangement for engagement with a housing central port 902. An optional snap-fit receiver member to allow for this is indicated generally FIG. 90A at 949. In the example depicted, there would be three such members 949 spaced radially (typically evenly) around the access cover 903a.

With respect to the engagement between the access cover 903a and the housing central portion 902, attention is directed to FIG. 90B. Here, it can be seen that the housing central portion 902 is provided with optional projections 950, positioned to be engaged by receivers 949 in the access cover, for a snap-fit manner, when the access cover 903a is positioned. This can be an optional alternate connection mechanism 903b or it can be used in association with connectors such as latches, depending on the system. It is noted that the snap-fit connection can be made to be easy to separate or to be very difficult or virtually impossible, depending on the circumstances, as desired.

Figure 91:
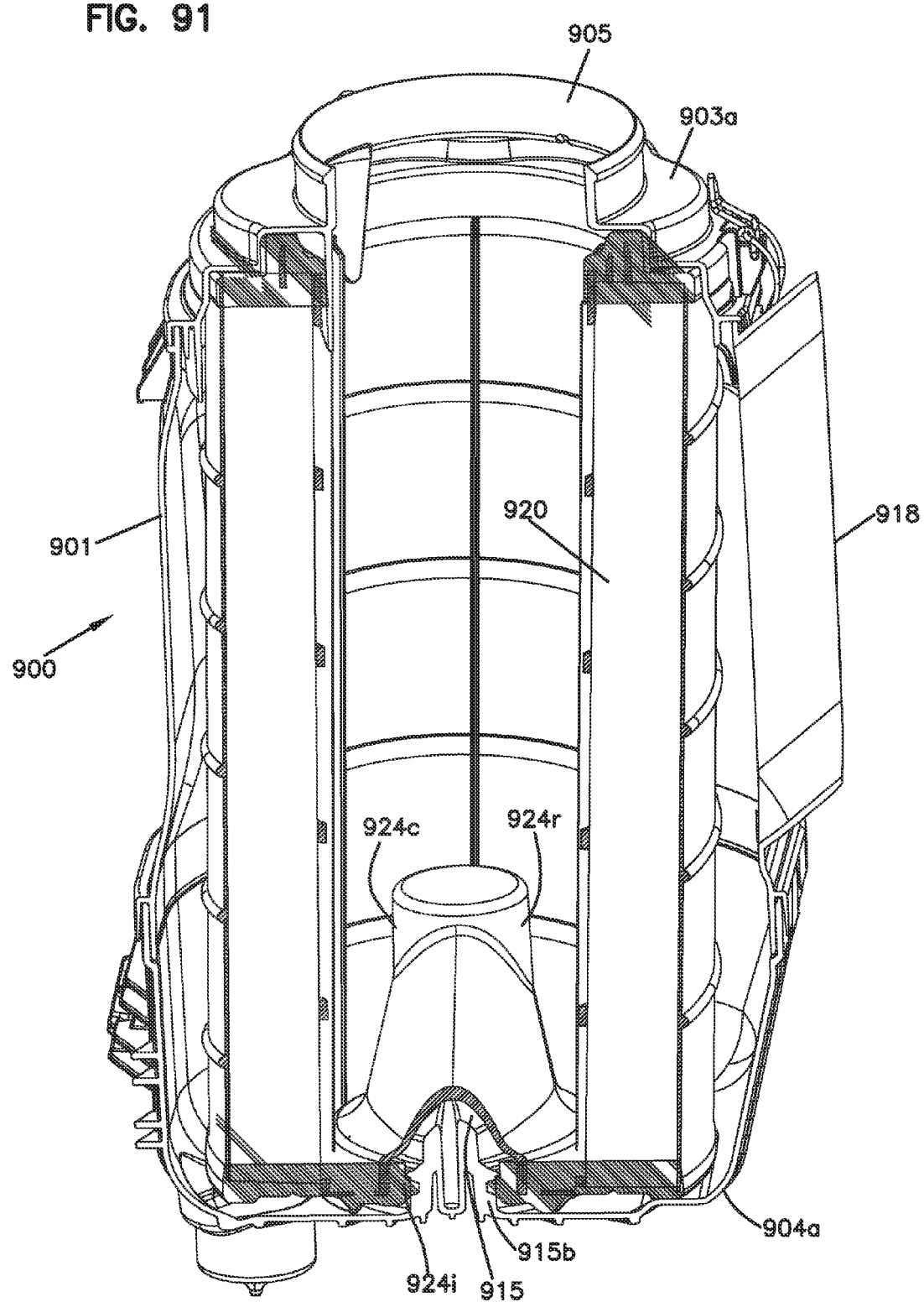
FIG. 91 is a second schematic perspective cross-sectional view of the assembly of FIG. 90.

Still referring to FIG. 90B, it is noted that bolt or alternate connector arrangements can be used to provide for securing of the access cover. An example of this option is provided by the indication of bolt receiver 951. More bolt receivers could be used. It is also noted that the shape of the access cover at 953, with the mating portion at 954 can be used as an optional rotational alignment arrangement between the access cover 903a and the housing central portion 902, if desired. In FIG. 91, an additional assembly drawing is depicted, with selected portions shown in cross-section. Here, cartridge 920 can be seen installed within housing 901, with the receiver 924r projecting over the projection 915. It is noted that one can see, through overlap in the drawing, how the end cap portion 924i would engage the base 915b through a resistive (in the example compressive) arrangement, to inhibit cartridge 920 from being removed until adequate force is applied. This would be a typical application analogous to those discussed previously.

Figure 92:
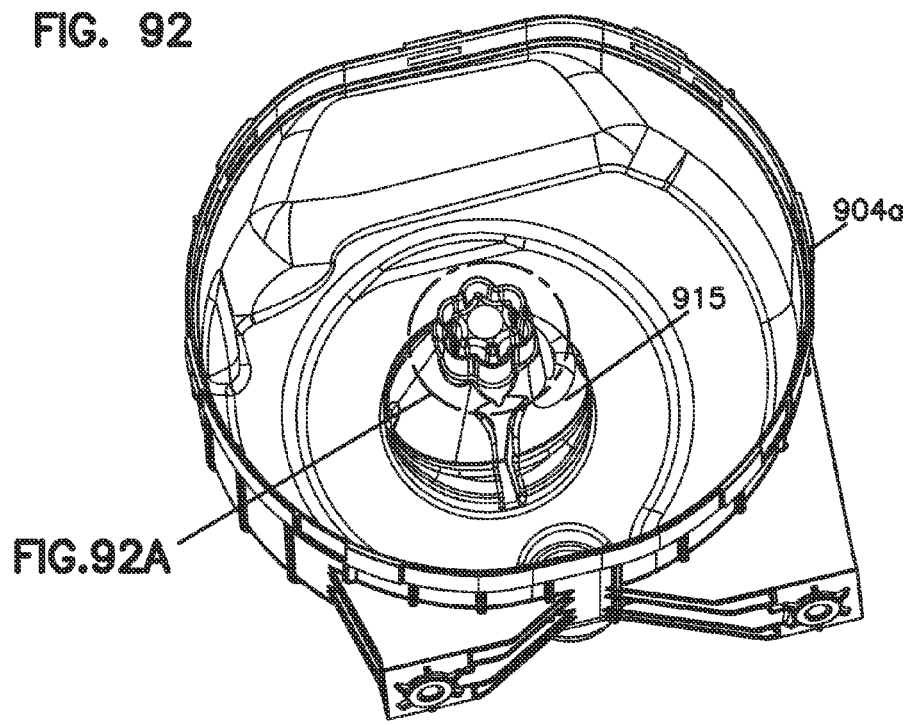
FIG. 92 is a schematic perspective view of a lower portion of the housing of the assembly of FIGS. 88-91.
Figure 92A:
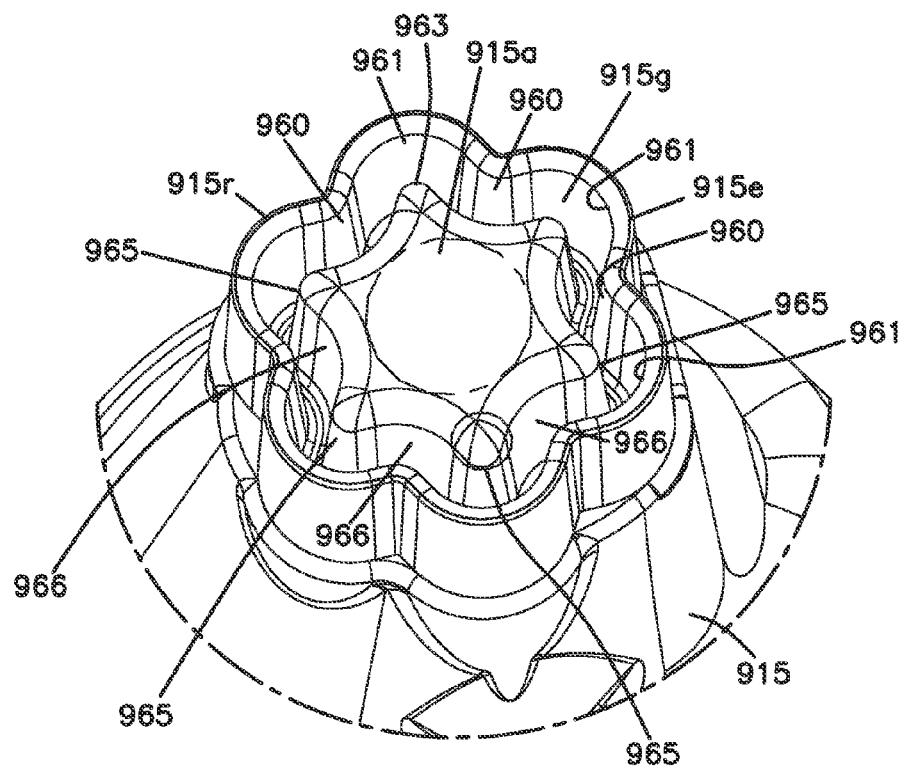
FIG. 92A is an enlarged fragmentary view of an identified portion of FIG. 92.

In FIG. 92, a top perspective view of bottom section 904a with projection 915 is provided. In FIG. 92A, an enlarged fragmentary portion of projection 915a is shown. Attention is directed to FIG. 92A.

Referring to FIG. 92A, what is viewable is end 915e of projection 915. Center member 915a and outer ring 915r, separated by receiver groove 915g are shown. In general, groove 915g is sized to receive projecting therein, projection member on the cartridge 920 discussed below.

For the particular example depicted, groove 915g does not have a circular shape, though it could be provided with a circular shape in alternate applications. Instead of a circular shape, the example groove 915g depicted has an optional serpentine or undulating shape, as a result of the outer wall 915r having inner projections 960 alternating with outer recesses 961; and, central portion 915a having outer projections 965 alternating with recesses 966. With this preferred optional approach, the groove 915g is configured so that a projection on a cartridge can only be received therein, if it has a shape to mate. This can help ensure that the cartridge is a proper one for the system intended. It can also help maintain the cartridge in a desired rotational relationship with various portions of the housing, during installation.

Figure 93:
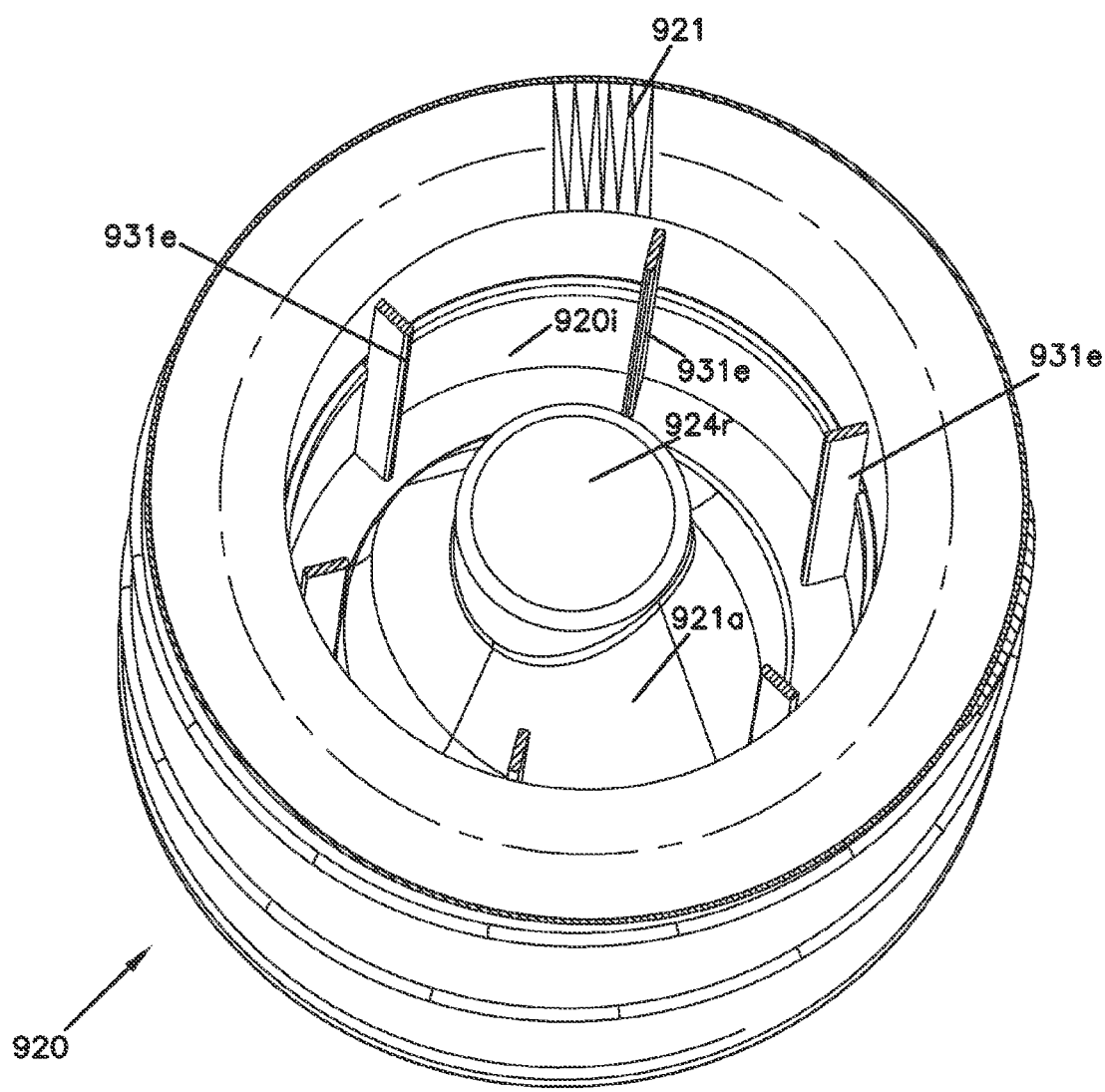
FIG. 93 is a schematic cross-sectional top perspective view of the filter cartridge portion of the assembly of FIGS. 88-91.

In FIG. 93, a cross-sectional view of cartridge 920 is shown, taken just above central receiver 924r. It can be seen that the filter media 921 is depicted schematically as (optionally) pleated.

Generally, the receiver 924r defines, on a surface opposite the cartridge interior 920i, a receiver recess positioned to receive, projecting therein, projection 915 in the housing 902. In FIG. 89, this interaction is viewable. Also, typically on the surface of receiver 924r opposite the interior 920i, cartridge central portion 924c includes a central axial projection sized to project into groove 915g. This central axial projection or projection member is shown in FIG. 89 at 924x.

Referring to FIG. 89, in general, the central axial projection 924x is surrounded at least by a portion thereof, in the example depicted, by a portion of projection 924p in the region of end piece or cap 924n that has a circular cross-section. Also, the projection 924x can be sufficiently long to project to a location surrounded by a portion of projection 924c that does not have a circular cross-section.

Figure 94:
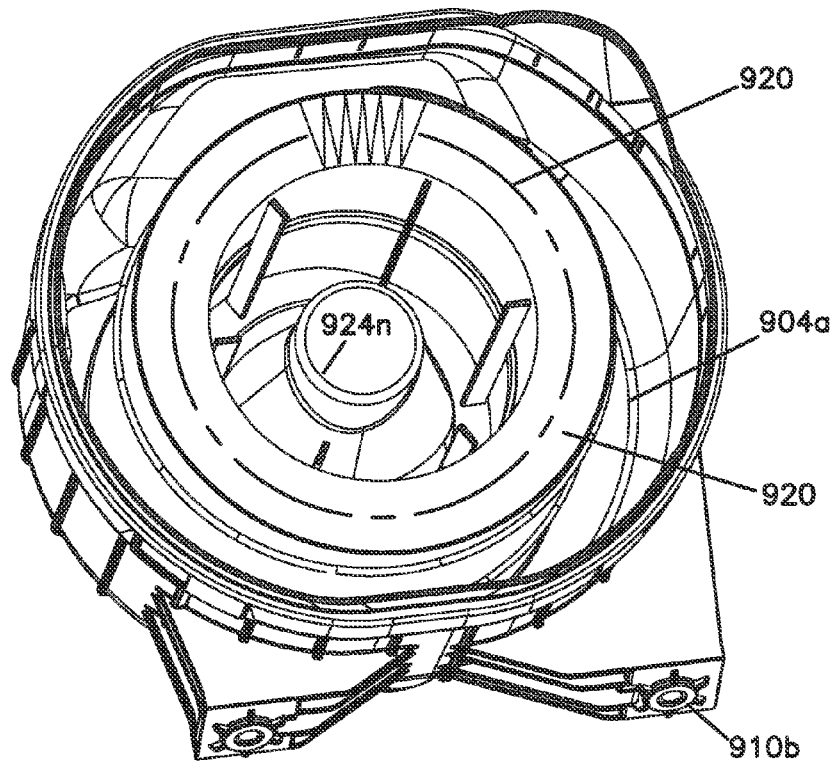
FIG. 94 is a schematic top perspective cross-sectional view of the filter cartridge portion of FIG. 93 shown installed in association with the housing portion of FIG. 92 for the assembly of FIGS. 88-91.

In FIG. 94, a cross-sectional view is shown of a portion of the cartridge 920 engaging the housing bottom 904a.

Figure 95:
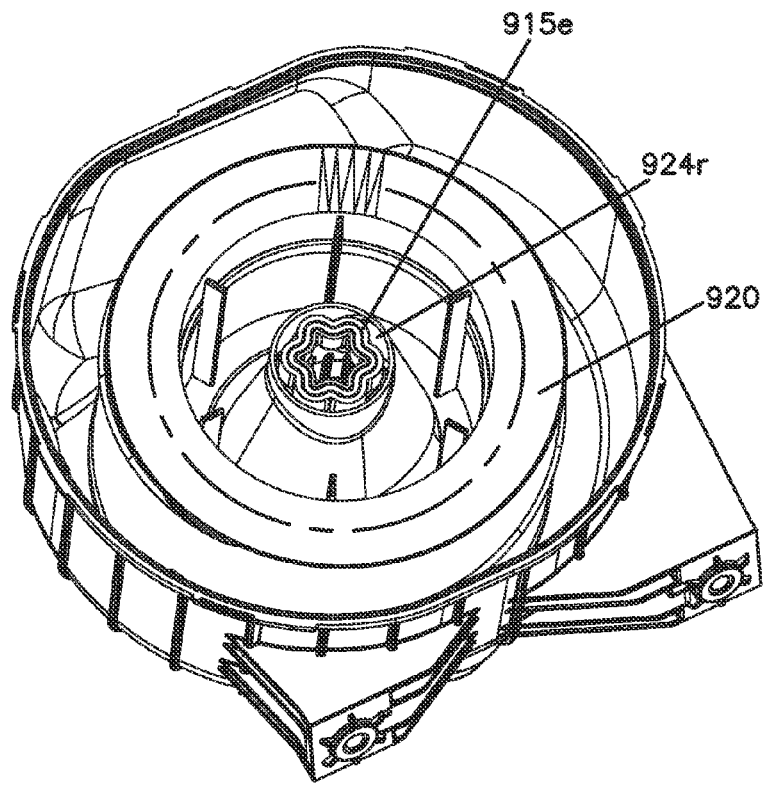
FIG. 95 is a second schematic top perspective cross-sectional view of the assembly portion of FIG. 94; the cross-sectional view being at a lower location.

In FIG. 95, a cross-sectional view slightly lower than the view of FIG. 94 is shown.

Figure 96:
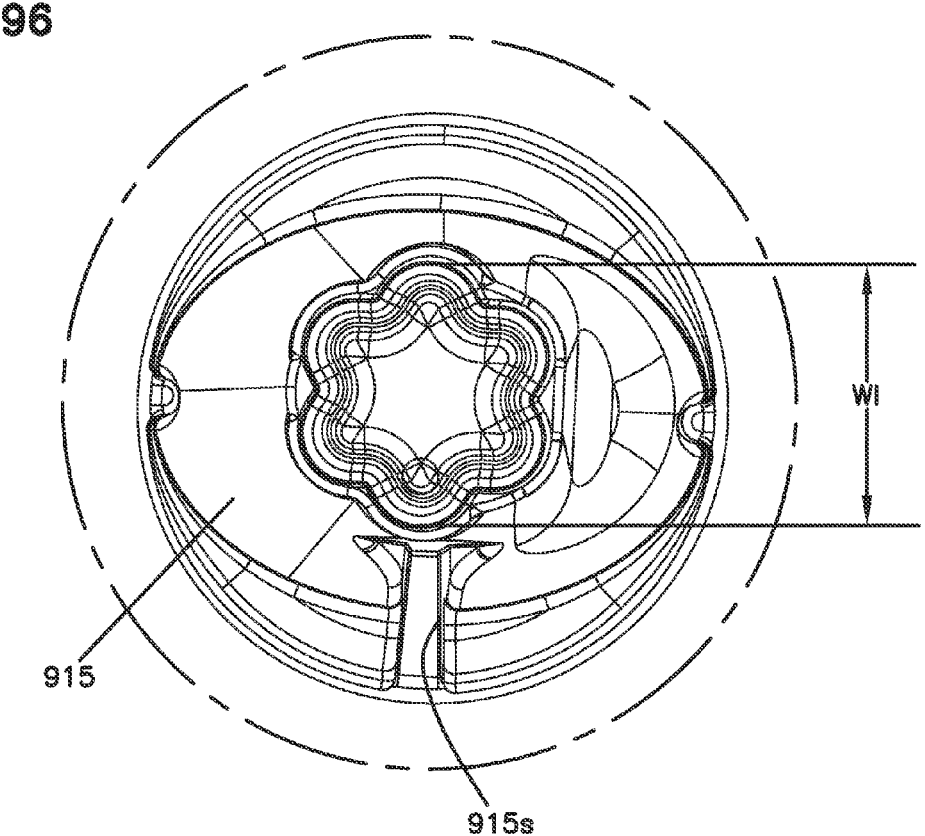
FIG. 96 is a schematic enlarged, fragmentary top view of an end portion of a projection in a housing bottom for the assembly of FIGS. 89-91.

In FIG. 96, a top plan view of the projection 915 is shown. Attention is directed to the slot 915s, which is configured to receive, projecting therein, a radial alignment projection on the closed end of the filter cartridge, when appropriate rotational alignment has occurred.

Figure 100:
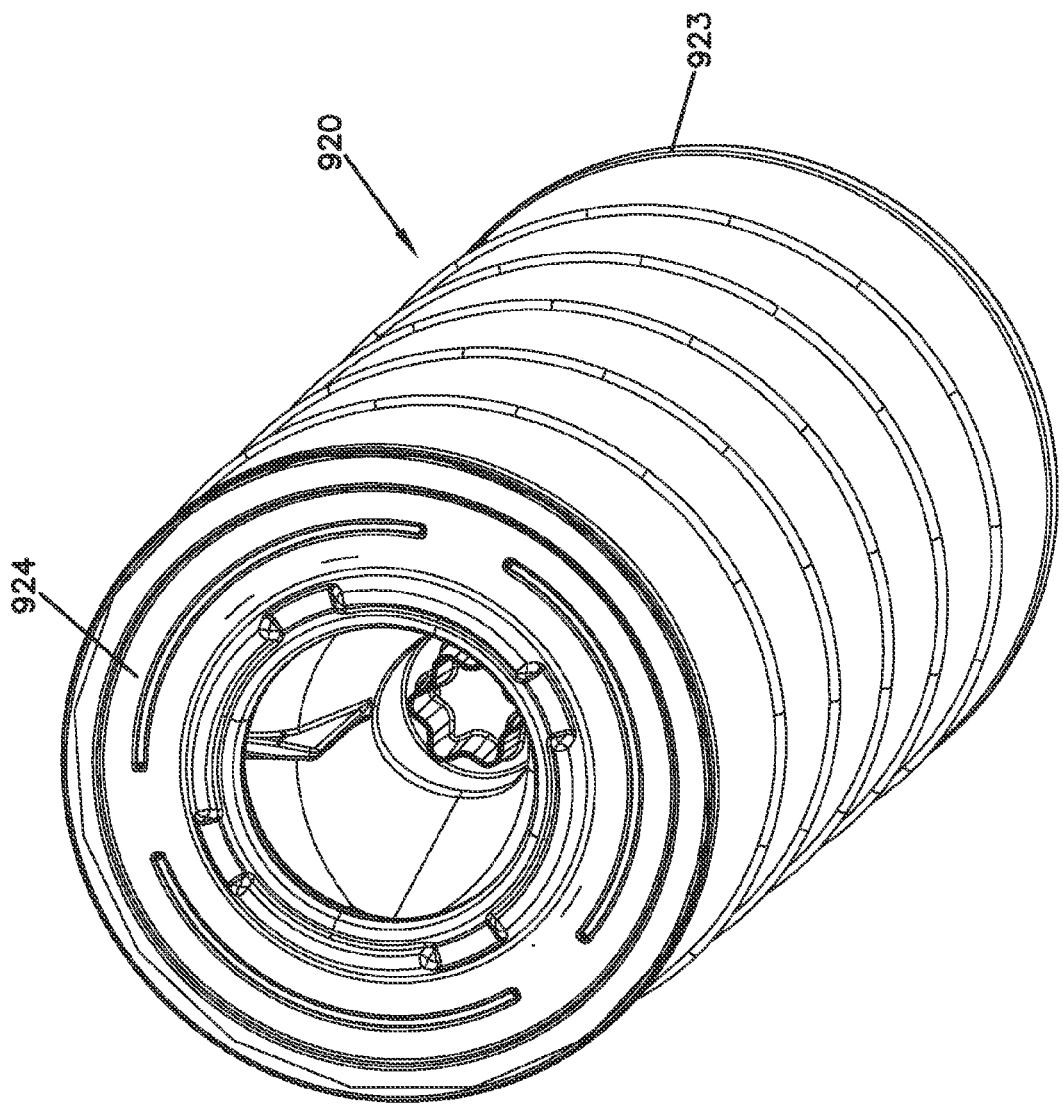
FIG. 100 is a schematic bottom perspective view of the filter cartridge depicted in the assembly of FIG. 90.

In FIG. 100, a perspective view of the cartridge 920 is shown, taken toward the closed end piece 924. A mating projection 970 can be seen sized and located to engage slot 915s, FIG. 96, as the cartridge engage the housing. Also, central axial, in the example non-circular projection 971 can be seen on receiver 924r projecting in a direction away from end piece 923 and oriented in the direction to project into groove 915g.

Typically projection 921 will define a solid wall around a receiver or recess, but alternatives are possible.

Figure 97:
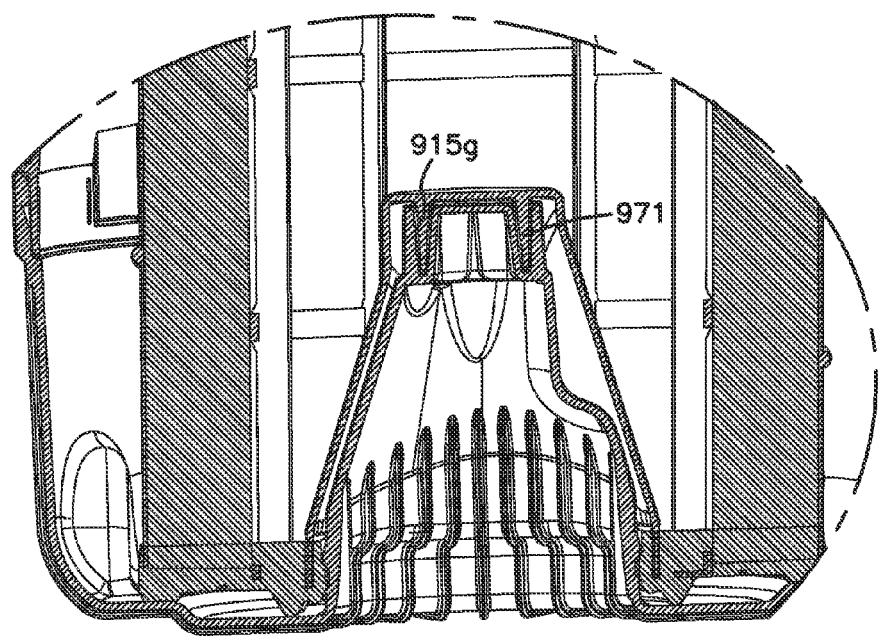
FIG. 97 is a schematic fragmentary cross-sectional view of a lower portion of an assembly in accord with FIGS. 88-91.

In FIG. 97, an enlarged fragmentary view showing the engagement between the projection 971 and the groove 915g is shown.

Figure 98:
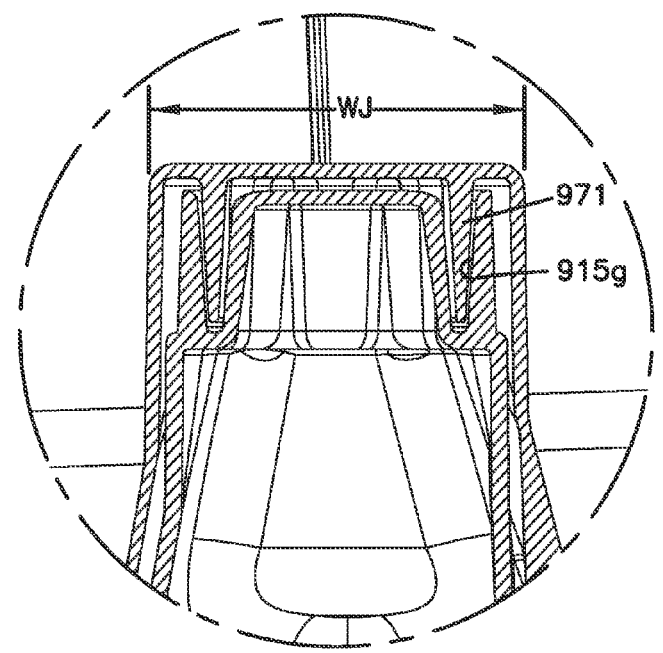
FIG. 98 is a schematic enlarged fragmentary view of a portion of FIG. 97.

In FIG. 98, a further enlargement is shown, also depicting projection 971 receiving into groove 915g.

Figure 99:
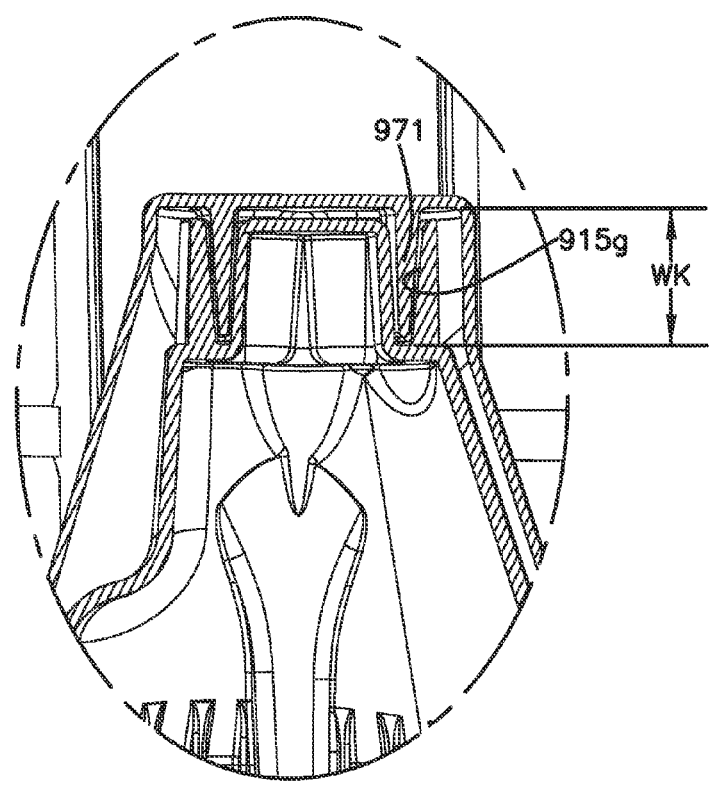
FIG. 99 is an alternate, second, schematic, enlarged fragmentary schematic view of a portion of FIG. 97.

In FIG. 99, still a further enlargement is shown in cross-section, in this instance taken from a different rotational orientation.

Figure 100A:
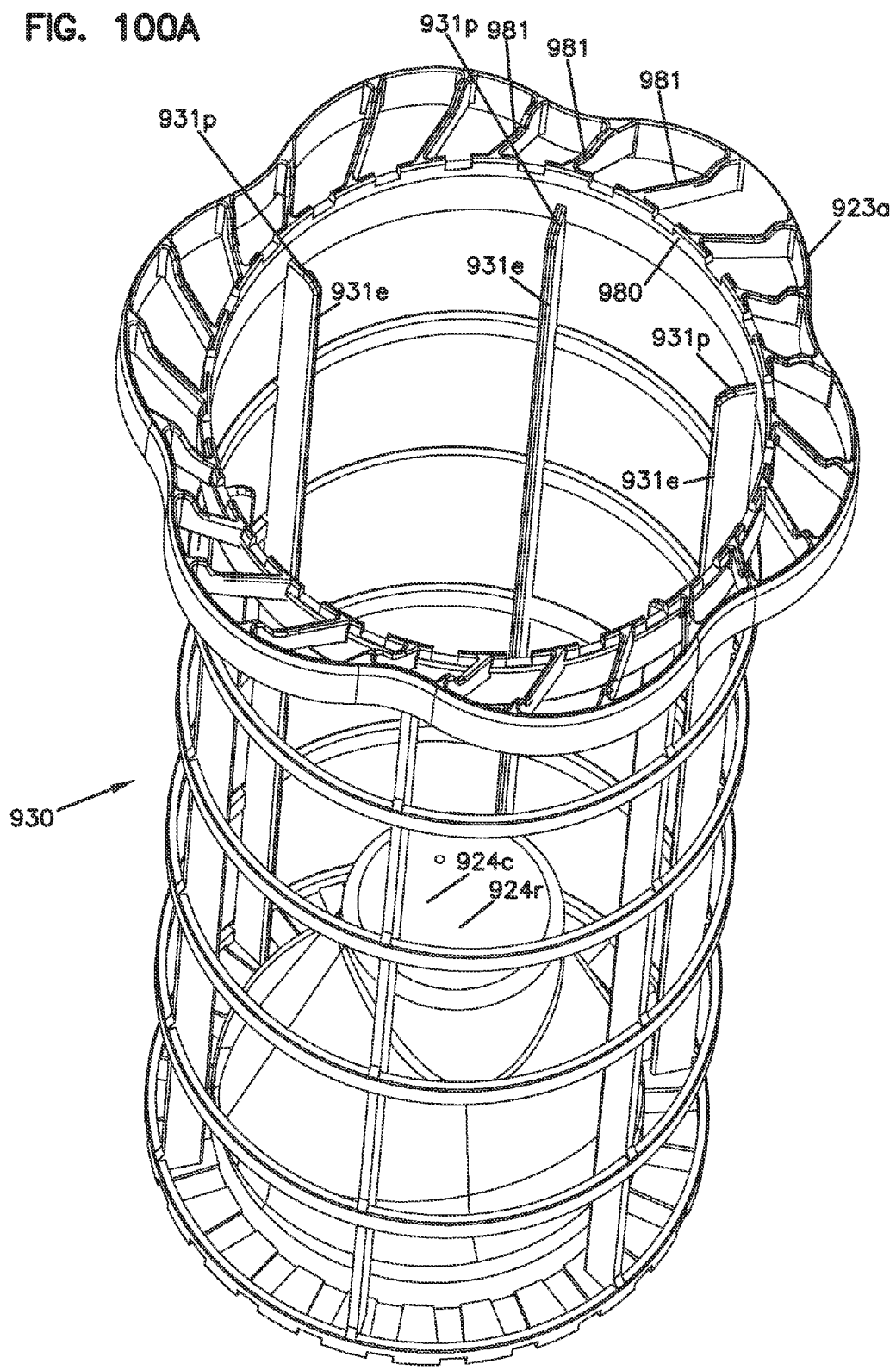
FIG. 100A is a schematic top perspective view of a preformed support component of the filter cartridge of FIG. 100.
Figure 100B:
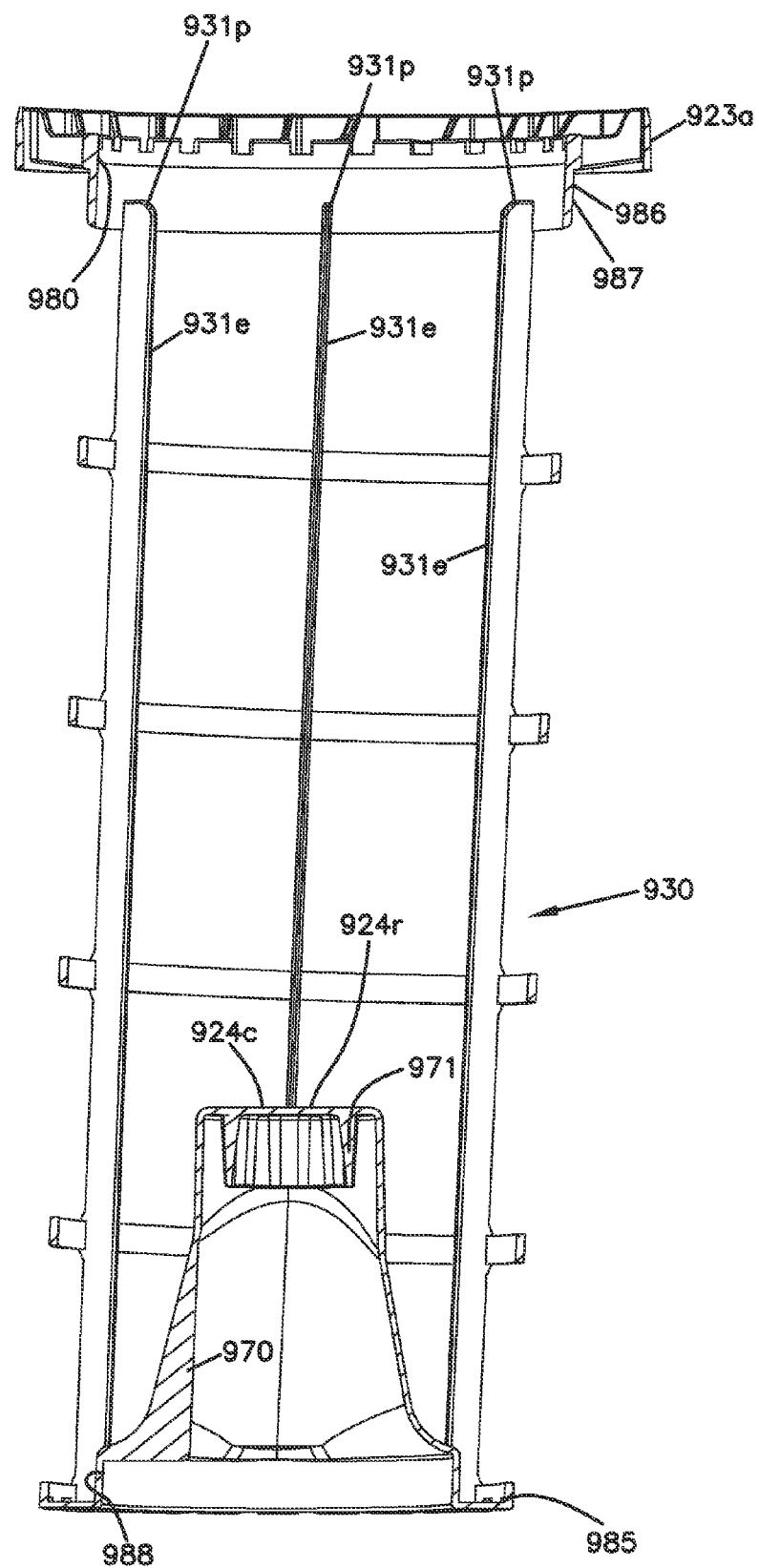
FIG. 100B is a schematic cross-sectional view of the preform support component of FIG. 100A.

In FIGS. 100A-100B, a support member 930 usable in the cartridge 920 is depicted. It could be analogous to similar preform supports as discussed above. The support member 930 can be preformed from a fairly rigid material such as a rigid plastic, and then be used to position the media therearound and molding portions thereto, to form the cartridge 920. In FIG. 100A, the port 930 can be seen as having various features described above in connection with FIG. 89. Note the seal support 923a secured to inner portion 980 by ribs 981. Member 923a can be a support member positioned within sealing bulge 923p, FIG. 89, to support the radially outwardly directed seal surface 923s, during installation.

In FIG. 100B, the support 930 is depicted in cross-section. Non-circular projection 971 is viewable. Also viewable is locator fin 970.

Referring to FIGS. 100A-100B, it can be seen that the support 930 can be used to provide for various types of eccentricities described. For example, and referring to FIG. 100B, the seal support region 923a can be configured to have an eccentric definition with respect to a lower end 985 of the support. Further, adjacent upper end 986, the support 930 can have a region 987 that is surrounded by media in use, that is eccentric with respect to the lower end 985. Further, at the lower end 988, projection 924r can be provided with a base 988, that is eccentric with respect to various features adjacent the upper end 986.

Thus, the support 930 can be configured to provide a cartridge, when used in a cartridge, that has the various types of eccentricities discussed herein.

Still referring to the embodiment of FIGS. 88-100A, it is noted that the seal member depicted can be characterized as having a (non-circular) seal pattern in a plan generally parallel to an axis around which the seal is positioned; and, the central projection 971 can be characterized as having a (non-circular) pattern in a plane surrounded by that projection 971. Those two planes may generally be parallel in many applications. Also, each may have the same number of lobes, when lobed arrangements are used; and, in some instance the lobes may "radially aligned." By the term "radially aligned" as used in this context, it is not meant that they are positioned vertically directly above one another, since typically they would have centers that are eccentric in many applications. However, it is meant that relative to a central axis, the lobes of each (of the lobed housing seal member 923s and central axial projection 971) may extend in generally the same direction, in such applications.

It is noted that the filter cartridge may include more than one housing seal arrangement thereon. By the examples herein, that show only one arrangement, it is not meant to be indicated or suggested that other housing seal arrangements cannot be included.

In various ones of FIGS. 88-100B, example dimensions are provided as follows: WI=56 mm; WJ=66 mm; and, WK=27.5 mm. Of course alternate dimensions can be used. The example dimensions are meant to indicate a usable arrangement, for a variety of applications, and to generally indicate application or principles characterized herein.

It is noted that the features of the embodiment of FIGS. 88-100B can be implemented in a variety of constructions having different specific detail, including various arrangements described herein with respect to other drawings and embodiments. There is no specific requirement that each and every embodiment practiced have all of the specific features of any selected embodiment depicted herein, in order to obtain some advantage.

X. Selected Summary Observations

Herein, a variety of features, techniques, and arrangements usable in connection with filter cartridges and/or filter assemblies are described. The features are particularly well-adapted for use with arrangements configured for use as air cleaner assemblies, for example to filter air intake for internal combustion engines used on vehicles or other equipment. However, the techniques can be applied in other applications.

In general, the filter cartridges are characterized as having features appropriate for selected interaction with housing components. A plurality of the features characterized, relate to providing eccentricity between opposite ends of the cartridge (or features at opposite ends of the cartridge). This eccentricity can provide for advantageous cartridges with respect to installation and use in a housing.

A typical filter cartridge characterized herein has filter media surrounding an open filter interior, and first and second ends. A first end piece is positioned at the first end of the media. The first end piece has a flow aperture therethrough. A second end piece is positioned at the second end of the filter media. In many typical applications, a second end piece is closed, i.e. it has no aperture therethrough.

The eccentricity between the first and second ends of the filter cartridge can be provided in a variety of ways. In certain examples characterized herein, the filter media defines a first media outer perimeter at a location adjacent the first end piece and the filter media second end defines a second media outer perimeter at a location adjacent the second end piece. The two media outer perimeters are eccentrically aligned with one another. An example is depicted, in which this is accomplished by not using conical media, but rather by using media which defines approximately the same size perimeter adjacent the first and second ends.

Alternate approaches to defining the eccentricity are provided. An example includes relating an eccentricity of a feature at one end to an outer perimeter at the other; or, relating the eccentricity between the outer perimeters of the cartridge at each end. An approach is characterized in which a radial seal member is provided at the open end, characterizing a pattern eccentric with respect to a feature at the opposite end of the cartridge; whether that feature be the outer perimeter of the second end piece, the outer perimeter of the media adjacent the second end piece, or another feature.

A variety of cartridges are depicted in which the second end piece includes a receiver projection extending into an open filter. This receiver projection defines a receiver recess on an opposite side thereof, from the open filter interior.

This receiver projection can be provided with a variety of shapes. It can be in an example shape provided, in which this receiver has an end cap or end piece, remote the second end of the media, and toward the first end of the media, which is generally circular in perimeter cross-dimension, but which also has a portion lower than the circular end piece or end cap, which is non-circular.

In certain examples characterized, this central receiver includes thereon, a central axial projection, on a surface of the central projection opposite the interior of the cartridge, and generally projecting away from the first end of the media and the first end cap. An example central axial projection is shown and described, which generally comprises a wall, typically a solid wall (i.e. a wall with no apertures completely therethrough), surrounding a central recess or receiving area. The solid wall can have a groove therein, i.e. be double sided. In the example depicted, this wall is non-circular, i.e. undulates in shape in manners defined herein. In general, then, it can be provided to define a perimeter, in a plane perpendicular to a central axis therethrough, that is non-circular.

Herein, an example filter cartridge is characterized in which a housing seal arrangement on the first end piece is non-circular, in a projection plane perpendicular to a central axis of the seal. In the example depicted, the plane of the central axis of the seal is generally parallel to a plane through a central axial projection on the outside surface (surface opposite the cartridge interior) of the receiver projection at the second end of the cartridge.

Herein, the cartridge second end is sometimes characterized as having a resistive housing engagement member thereon, in certain advantageous applications. This resistive housing engagement member can comprise a compressive arrangement, for example formed from molded-in-place compressible materials at the second end piece. Generally, this resistive housing engagement member will define a perimeter engagement pattern in a plane orthogonal to a central axis second end piece. It can be positioned to align with an entry into a central receiver at the second end. It can be generally a circular pattern or non-circular, depending on the application. An example is depicted which uses an oval engagement pattern, that engages a base portion of a projection in a housing, as that projection is extended into a receiver recess on the cartridge.

In arrangements characterized herein, a radial locator projection arrangement is positioned on the cartridge at an end adjacent the first end piece with the open aperture. The radial locator arrangement is generally a radially inwardly projecting radial locator projection arrangement, comprising one or more projections oriented to engage an access cover or other portion of the housing to achieve desired radial alignment, in use.

Also, a radially indexing locating arrangement is depicted in association with the second end piece at the second end of the cartridge. This radial indexing locator arrangement, in an example, comprises a single fin or radial inwardly directed projection member, configured to extend into a receiving slot or recess on a projection in the housing, as the cartridge is engaged therewith.

Herein, a variety of housing seal arrangements are characterized, typically positioned on the first end cap and at a location around the aperture therethrough. Circular ones can be used. The housing seal arrangement can be a perimeter seal arrangement around an outside of the first end piece, or it can be alternately positioned. In certain example arrangements depicted, the housing seal arrangement is oriented radially inwardly from the outer perimeter of the first end piece at a location in axial overlap with the first end of the media. Example arrangements are depicted, which can be either radially inwardly or radially outwardly projecting seal surfaces. Non-circular configurations are characterized as examples. Example non-circular arrangements are characterized which comprise a plurality of lobes separated by recesses, as the seal pattern is traced around the seal surface.

It is noted that many of the techniques described herein can be applied in arrangements in which the cartridge does not possess eccentricity between the media at opposite ends and/or portions of the end pieces at opposite ends of the cartridge. That is, selected features characterized herein can be applied in other applications as well, although they were specifically adapted to be particularly advantageous when used with a cartridge that is eccentric in some fashion, as characterized herein.

Herein, various advantageous liner supports usable in filter cartridges are described. A typical liner support would have a first liner support section and a second liner end. In an example depicted, first and second liner ends are eccentrically aligned with respect to one another, and the liner support is positioned in the cartridge of the filter media surrounding it. The liner support can be positioned to include, at one end thereof, an end member that extends at least in partial axial overlap with an end of the media. This first end member may be configured with a seal support member thereon, for example secured to the inner liner section by spaced extensions. The seal support can be provided in a variety in shapes, including circular and non-circular ones.

The liner support can be provided with a receiver projection at a second end thereof, having selected features as characterized herein.

According to the present disclosure, air cleaner assemblies are also provided. The air cleaner assemblies will typically comprise a housing having at least one access cover, an air flow inlet and an air flow outlet. A filter cartridge in general accord with one or more of the definitions characterized herein, would be operably positioned within the housing and be releasably sealed thereto. The cartridge can be sized such that it is a serviceable part, that can be removed from and replaced in the housing.

Herein, with respect to the various filter cartridges characterized, the cartridges are described as having a housing seal arrangement, including a housing seal member thereon. It is not meant to be suggested that the principles herein require a single housing seal member in all instances. Indeed, more than one seal member could be used, sealing to different portions of the housing. Also, when more than one seal member is used on the same cartridge, they can be of the same or different types.

A variety of housing features are characterized, generally provided for interaction with various cartridge features described herein. These features include: features for sealing engagement by a housing seal member on a cartridge; features for rotational alignment at one or both of the cartridge ends; and, projection/receiver arrangements for engagement with projection/receiver arrangements on the cartridge.

Housings are characterized in which a single access cover is positioned, but alternatives are also characterized in which each of two opposite access covers are positioned on the housing.

A variety of arrangements relating to flow tube configurations are described. In the examples depicted, a first flow tube is positioned as an axial flow tube at an end of the housing, typically as an outlet flow tube. Also, generally, a second flow tube is positioned in the side of the housing, usually for inlet flow. Preferred shapes and orientations of the various flow tubes are characterized.

Herein, example housings are characterized, which include an ejection port thereon, preferably in direct flow communication with an unfiltered air portion internally of the housing (typically externally of the cartridge).

It should be understood that air cleaner assemblies can be implemented with selected ones of the various features characterized herein, with avoidance of certain other features depicted in the specific examples. That is, there is no specific requirement that an air cleaner assembly, housing, or cartridge have all of the features characterized herein in a given embodiment, in order to obtain some advantage according to the present disclosure.

What is claimed:

1. A filter cartridge comprising:
   (a) pleated filter media surrounding an open filter interior;
      (i) the filter media having first and second ends;
   (b) a first end piece positioned at the first end of the filter media;
      (i) the first end piece having a flow aperture therethrough; and,
      (ii) the first end piece including a radially directed housing seal member thereon;
   (c) a second end piece positioned at the second end of the filter media;

(d) the filter media first end defining a first media outer perimeter at a location adjacent the first end piece; and,
(e) the filter media second end defining a second media outer perimeter at a location adjacent the second end piece;
  (i) the first and second media outer perimeters being eccentrically aligned with respect to one another; and
  (ii) the first media outer perimeter, defined by outer pleat tips, has a first dimension of length and the second media outer perimeter has a second dimension of length, the first dimension of length being within 90-110% of the second dimension of length.

2. A filter cartridge according to claim 1 wherein:
(a) the second end piece is closed, and has no aperture therethrough, in direct flow communication with the open filter interior; and,
(b) the second end piece includes a receiver projection extending into the open filter interior a distance, from the filter media second end toward the filter media first end, corresponding to at least 10% of a distance from the filter media second end to the filter media first end;
  (i) the receiver projection defining a receiver recess at an opposite side thereof, from the open filter interior.

3. A filter cartridge according to claim 2 wherein:
(a) the receiver projection of the second end piece has a portion with a non-circular cross-sectional shape in a plane perpendicular to a direction of extension of the media.

4. A filter cartridge according to claim 2 wherein:
(a) the receiver projection has a shape with:
  (i) a cap portion remote from the second end of the media having a circular cross-sectional shape; and,
  (ii) a base portion extending between the cap portion and a location adjacent the second end of the media; the base portion having a central section with a non-circular cross-sectional shape.

5. A filter cartridge according to claim 2 wherein:
(a) the second end piece includes a second housing engagement member comprising a second resistive housing engagement member.

6. A filter cartridge according to claim 5 wherein:
(a) the second resistive housing engagement member is a radially inwardly directed housing engagement member.

7. A filter cartridge according to claim 5 wherein:
(a) the second, resistive, housing engagement member comprises an axially inwardly directed engagement member surrounding an opening into a receiver projection in the second end piece.

8. A filter cartridge according to claim 1 wherein:
(a) the second end piece includes a recess therein having a radially inwardly projecting, radial alignment locator projection arrangement thereon.

9. A filter cartridge according to claim 1 wherein:
(a) the second end piece includes an outer surface portion having a central axial projection thereon projecting in a direction away from the open filter interior and the first end piece.

10. A filter cartridge according to claim 9 wherein:
(a) the central axial projection has a shape, in extension around a receiver space, having an outer surface comprising a plurality of radially outwardly projecting lobes separated by recesses.

11. A filter cartridge according to claim 1 wherein:
(a) the radially directed housing seal member includes a radially outwardly directed housing seal member.

12. A filter cartridge according to claim 1 wherein:
(a) the radially directed housing seal member comprises an integral portion of a molded-in-place portion of the first end piece.

13. A filter cartridge according to claim 12 wherein:
(a) the radially directed housing seal member defines a seal surface having non-circular configuration comprising at least three lobes alternating with at least three recesses to define a plurality of spaced radially directed lobes in the seal surface, in direction around, and relative to, a central axis surrounded by the seal surface.

14. A filter cartridge according to claim 1 wherein:
(a) the second end piece has an outer perimeter;
  (i) the radially directed housing seal member and the second end piece outer perimeter being eccentrically aligned with respect to one another.

15. A filter cartridge according to claim 1 wherein:
(a) the first end piece includes a first housing seal member thereon having a seal pattern surrounding a first housing seal member center $c_1$; and,
(b) the second end piece includes a second housing engagement member having an engagement pattern surrounding a second housing engagement member center $c_2$;
(c) the centers $c_1$ and $c_2$ being eccentrically aligned.

16. A filter cartridge according to claim 15 wherein:
(a) the centers $c_1$ and $c_2$ are offset by an eccentricity distance Z of at least 5 mm.

17. A filter cartridge according to claim 1 wherein:
(a) the first end piece having a radially outwardly directed first housing radial seal thereon; and,
(b) the second end piece has a radially inwardly directed, resistive, second housing engagement member thereon; and,
  (i) the radially directed housing seal member and the resistive second housing engagement member being eccentrically aligned relative to one another.

18. A filter cartridge according to claim 1 including:
(a) a liner support having a first inner liner support section with a first inner liner end and a second inner liner end;
  (i) the first and second inner liner ends being eccentrically aligned with respect to one another;
(b) the filter media surrounds the inner liner support section;
  (i) the first end of the filter media being adjacent the first inner liner end and the second end of the filter media being adjacent the second inner liner end.

19. A filter cartridge according to claim 18 wherein:
(a) the liner support includes a first end member in axial overlap with the first media end including a seal support member secured to the inner liner section by spaced extensions; the seal support member is non-circular and eccentrically aligned relative to the second end of the liner support.

20. An air cleaner assembly comprising:
(a) a housing having: at least one access cover; an air flow inlet; and, an air flow outlet; and,
(b) a filter cartridge according to claim 1 operably positioned within the housing and releasably sealed thereto.

* * * * *